United States Patent [19]

Brautingham

[11] 4,189,779

[45] Feb. 19, 1980

[54] PARAMETER INTERPOLATOR FOR SPEECH SYNTHESIS CIRCUIT

[75] Inventor: George L. Brautingham, Lubbock, Tex.

[73] Assignee: Texas Instruments Incorporated, Dallas, Tex.

[21] Appl. No.: 901,394

[22] Filed: Apr. 28, 1978

[51] Int. Cl.[2] .......................... G01L 1/00; G06F 15/34

[52] U.S. Cl. .................................. 364/718; 179/1 SA; 179/1 SC; 179/1 SM; 179/15 AS; 364/513

[58] Field of Search ............... 179/1 SA, 1 SC, 1 SM, 179/15 AS; 364/513, 718, 723

[56] References Cited

U.S. PATENT DOCUMENTS

| | | | |
|---|---|---|---|
| 3,974,334 | 8/1976 | Cockerell | 179/1 SA |
| 3,982,070 | 9/1976 | Flanagan | 179/1 SM |
| 4,076,958 | 2/1978 | Fulghum | 179/1 SA |

*Primary Examiner*—Jerry Smith

*Attorney, Agent, or Firm*—William K. McCord; James T. Comfort; Melvin Sharp

[57] ABSTRACT

Disclosed is a parameter interpolator for a speech synthesis circuit. Using a parameter interpolator permits the data rate to the speech synthesis circuit to be lowered inasmuch as the incoming speech data is used to slowly charge the data previously inputted to the values of the incoming data. The speech synthesis circuit includes an input circuit for receiving the target values of the speech data and a memory for stored interpolated values of the speech data. The interpolator includes a circuit coupled to the input circuit and the memory which calculates the difference between the target values and the stored values. Another circuit is used to add a portion of the difference to the values stored in the memory; the particular portion of the difference is equal to ½N where N=0, 1, 2 . . . Further, the interpolator is arranged to inhibit the normal interpolation upon certain conditions, such as changes from voiced speech to unvoiced speech, and visa versa.

8 Claims, 41 Drawing Figures

PARAMETER INTERPOLATOR FOR SPEECH SYNTHESIS CIRCUIT

BACKGROUND OF THE INVENTION

This invention relates to the interpolation of data in a speech synthesis circuit and especially to such speech synthesis circuits integrated on a semiconductor integrated circuit chip.

Several techniques are known in the prior art for digitizing human speed. For example, pulse code modulation, differential pulse code modulation, adaptive predictive coding, delta modulation, channel vocoders, cepstrum vocoders, format vocoders, voice excited vocoders and liner predictive coding techniques of speech digitalization are known. The techniques, are briefly explained in "Voiced Signals: Bit by Bit" on pages 28–34 of the October 1973 issue of IEEE Spectrum.

In certain applications and particularly those in which the digitized speech is to be stored in a memory tend to use the linear predictive coding technique because it produces very high quality speech using rather low data rates. Linear predicitve coding systems usually make use of a multi-stage digital filter. In the past, the digital filter has typically been implemented by approximately programming a large scale digital computer. However, in U.S. Pat. application Ser. No. 807,461, filed June 17, 1977 and now abandoned, there is taught a particularly useful digital filter for a speech synthesis circuit, which digital filter may be implemented on an integrated circuit using standard MOS or equivalent technology. A theoretical discussion of linear predictive coding can be found in "Speech Analysis and Synthesis by Linear Predictive of the Speech Wave" at Volumn 50, number 2 (part 2) of The Journal of the Acoustical Society of America.

Disclosed herein is a talking learning aid which utilizes speech synthesis technology for producing human speech. A complete talking learning aid is disclosed, so, in addition to describing the speech synthesis circuits in detail, this patent also discloses the details of the learning aid's controller and the Read-Only-Memory devices used to store the digitized speech. Of course, those practicing the present invention may wish to practice the invention in conjunction with a talking learning aid, such as that described herein, other learning aids or in any other application wherein the generation of human speech from digital data is desirable. Using the techniques described in the aforementioned U.S. Pat. application Ser. No. 807,461 which is now abandoned and the teachings of this patent permit those desiring to make use of digital speech technology to do so with one, or a small number, of relatively inexpensive integrated circuit devices.

This invention relates to interpolation of data in a speech synthesis circuit, as aforementioned. By interpolating the speech data applied to the speech synthesis circuit the data rate required by the synthesis circit to reproduce speech of a given quality level is effectively reduced. It was, therefore, one object of this invention to provide a speech data parameter interpolator for a voice synthesis circuit, and especially, an interpolator compatible with a synthesis circuit integrated on a semiconductor chip. It was yet another object of this invention to provide an interpolator having a small number of components so as to take a minimum amount of surface area of the aforementioned chip.

The foregoing objects are achieved as is now described. The speech synthesis circuit includes an input circuit for receiving new target values of various speech parameters and a memory for storing the interpolated values of the parameters. The interpolater includes a subtractor circuit arranged to calculate the difference between the target values of the parameters and the stored values. A portion of the differences calculated are added back to the values stored in the memory, the particular portion being selected according to the formula $\frac{1}{2}N$ where N=0, 1, 2. . . In the embodiment disclosed, the circuit which performs this division is a delay circuit which preferably delays a serial train of data from the memory by a selectable amount before the difference is added thereto in an adder. The interpolator also preferably includes means for disabling the interpolation in resonse to charges from voiced to unvoiced speech and visa versa, for instance.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of an illustrative embodiment when read in conjunction with the accompanying drawings, wherein:

GENERAL DESCRIPTION

Figure 1:
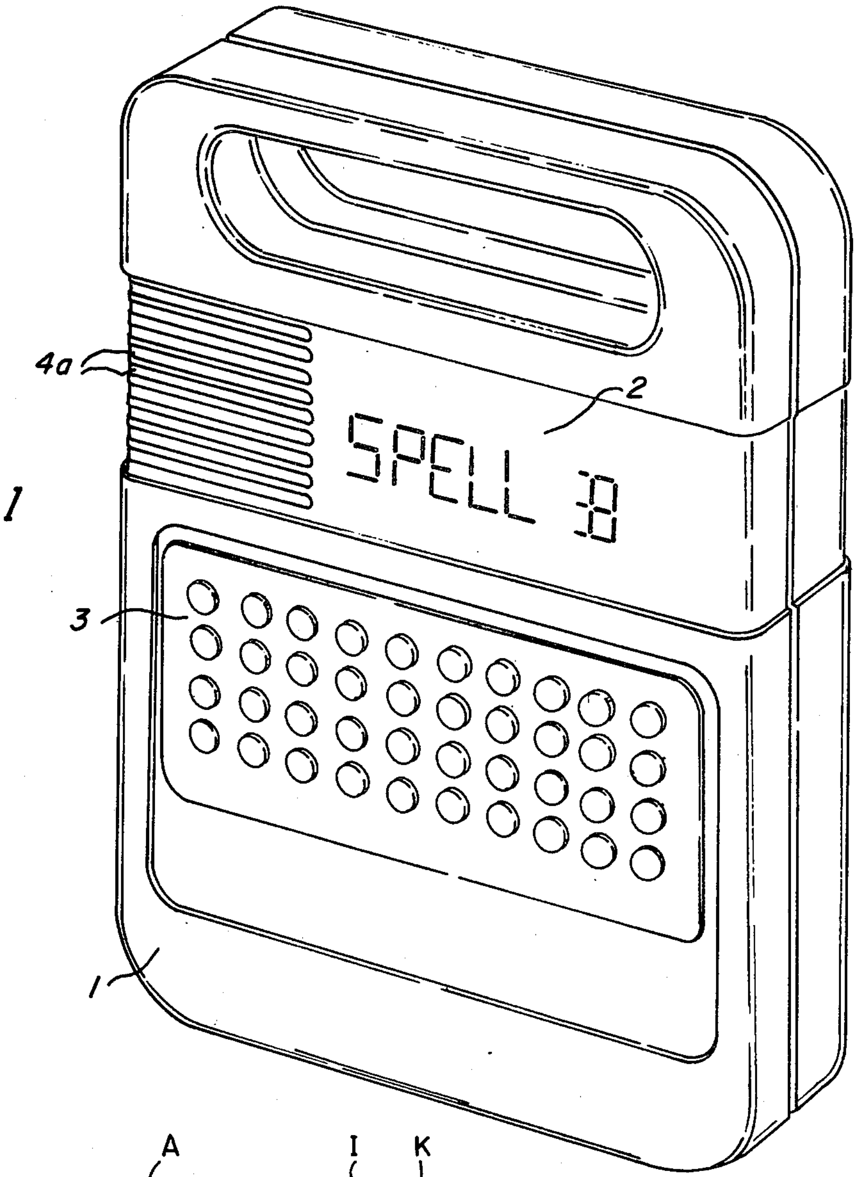
FIG. 1 is a front view of a talking learning aid.

FIG. 1 is a front view of a talking learning aid of the ype which may embody the present invention. The earning aid includes a case 1 which encloses electronic ircuits preferably implemented on integrated circuits not shown in this figure). These circuits are coupled to display 2, a keyboard 3 and a speaker 4 or other voice oil means (also not shown in FIG. 1). However, the penings 4*a* are shown behind which speaker 4 is prefrably mounted. The display is preferably of the vacum fluorescent type in the embodiment to be decribed; however, it will be appreciated by those skilled 1 the art that other display means, such as arrays of ght emitting diodes, liquid crystal devices, electrohromic devices, gas discharge devices or other dislays means alternatively may be used if desired. Also, 1 this embodiment, as a matter of design choice, the isplay has eight character positions. The keyboard 3 of 1e learning aid of this embodiment has forty key switch ositions, twenty-six of which are used to input the etters of the alphabet into the learning aid. Of the reaining fourteen key switch positions, five are utilized or mode keys (on/spelling mode, learn mode, word uesser game mode, code breaker mode and random etter mode), another five are used to control functions erformed by the learning aid in its modes (enter, say gain, replay, erase and go) and the remaining four are sed for an apostrophe key, a blank space key, a word st select key and an off key. The words spoken by the earning aid, as well as the correct spelling of those vords, are stored as digital information in one or more Read-Only-Memories.

The learning aid depicted in FIG. 1 may be battery owered or powered from a source of external electrial power, as desired. The case is preferably made from njection molded plastic and the keyboard switches may e provided by two 5 by 8 arrays of key switches of the ype disclosed in U.S. Pat. No. 4,005,293, if desired. Of ourse, other types of case materials or switches alteratively may be used.

Having described the outward appearance of the earning aid, the modes in which the learning aid may perate will be first described followed by a description f the block diagrams and detailed logic diagrams of the arious electronic circuits used to implement the learnng aid of FIG. 1.

MODES OF OPERATION

The learning aid of this embodiment has five modes f operation which will be subsequently described. It vill be evident to those skilled in the art, however, that hese modes of operation may be modified, reduced in umber or expanded in capability. As a matter of design hoice, the present talking and learning aid is provided vith the following modes of operation.

The first mode, the spelling mode, is automatically entered when the "on" key is depressed. In the spelling mode the learning aid randomly selects ten words from a selected word list and at a selected difficulty category within the selected word list. The word list may be changed by depressing the "word list select" key which is coupled to a software implemented flip flop circuit which flips each time the "word list select" key is depressed. The word list select flip flop then determines, as will be seen, which pair of read-only-memories from which the ten words will be randomly selected. Each word list preferably includes words arranged in four levels of difficulty. This embodiment of the learning automatically enters the least difficult level of difficulty. The fact that the least difficulty level has been selected is shown by displaying "SPELL A" in display 2. The level difficulty may be increased by depressing the B, C or D keys, and display 2 will show, in response, "SPELL B", "SPELL C" or "SPELL D", respectively. Having selected the word list and level difficulty, the "go" key is depressed upon which the learning aid commences to randomly select ten words and to say the word "spell" followed by the first randomly selected word. A dash, that being segment D in display 2 (FIG. 2), comes up in the left hand most character position. At this time the student may either (1) enter his or her spelling of the word and then depress the "enter" key or (2) depress the "say again" key. The student may also depress the "erase " key if he or she realizes that the spelling being inputted is incorrect before having depressed the "enter" key; the student may then again try to input the correct spelling. The "say again" key causes the word to be spoken by the learning aid again. In some embodiments a subsequent depression of the "say again" key may cause the selected word to be repeated once more, however, then at a slower rate. As the student enters his or her spelling of the word using the alphabet keys at keyboard 3, the inputted spelling appears at display 2 and the shifts from left to right as the letters are inputted. Following the depression the "enter" key, the learning aid compares the student's spelling with a correct spelling, which is stored in one of the Read-Only-Memories, and verbally indicates to the student whether the student spelling was correct or incorrect. The verbal response is also stored as digital information in a Read-Only-Memory. Of course, a visual response may likewise or alternatively be used, if desired. In this embodiment the student is given two opportunities to spell the word correctly and if the student has still failed to correctly spell the word, the learning aid then verbally (via speaker 4) and visually (via display 2) spells the word for the student and goes on to the next word from the group of ten randomly selected words.

At the end the test of the spelling of the ten randomly selected words, the learning aid then verbally and visually indicates the number of right and wrong answers. Further, in order to give the student additional reinforcement, the learning aid preferably gives a audible response which is a function of the correctness of the spellings. In this embodiment the learning aid plays a tune, the number of notes of which is a function of the correctness of the student's spellings for the group of selected words. The use of the "enter", "say again", "erase", and "go" function keys has just been described with reference to the spelling mode of operation. There is an additional function key, "replay", whose function has not yet been described. The "replay" key causes the learning aid to repeat the group of ten randomly selected words after the group has been completed or causes the learning aid to start over with the first word of the group of ten words if it is depressed during the progression through the group. Alternatively, at the end of a group of ten words, the student may depress the "go" which initiates the random selection of another group of ten words from the selected word list.

An exemplary set of spell mode problems is shown in Table I; exemplary key depressions, which a student might make during the exemplary set of problems, are listed along with the responses made by the learning aid at display 2 and speaker 4.

The learn mode is entered by depressing the "learn" key. In the learn mode, after the "go" key is depressed the learning aid randomly selects ten words from the selected word list at the selected difficulty level and then proceeds to display the first randomly selected word at display 2 and approximately one second later to speak "say it". Approximately two seconds thereafter the learning proceeds to pronounce the word shown in display 2. During this interval the student is given the opportunity to try to pronounce the word spelled at display 2; the learning aid then goes on to demonstrate how the word should be pronounced. After going through the ten randomly selected words the learning automatically returns to the aforementioned spell mode, but the ten words tested during the spell mode are the ten words previously presented during the learn mode. While in the learn mode the "say again", "erase", "repeat" and "enter" keys are invalid. The difficulty level is selected as in the spelling mode, but in the learn mode the learning aid displays the various levels as "SAY IT A", "SAY IT B", etc. Depressing the "go" key causes the learning aid to select another group of ten words in the learn mode. An exemplary set of learn mode problems are set forth in Table II.

The word guesser mode is entered by depressing the "word guesser" mode key. In the word guesser mode the learning aid randomly selected a word from the selected word list and displays dashes in a number of character positions at display 2, the number of character positions corresponding to the number of letters in the randomly selected word. Thus, if the learning aid randomly selects the word "course" for instance, then the dashes will appear in six of the eight character positions in display 2, starting with the left most position and proceeding to the right for six character positions. The dash is shown in the characters of the display by energizing the D segments in those character positions (see FIG. 2). The child may then proceed to enter his or her guesses of the letters in the randomly selected word by depressing the letter keys at keyboard 2. For a correct choice, the learning aid gives an audible response of four tones and shows every place the chosen letter occurs in the randomly selected word. Once letters have been correctly guessed, they remain in the display until the end of the game. For incorrect guesses the learning aid preferably makes no response, but may alternatively say something like "incorrect guess." In this embodiment the child is given six incorrect guesses. Upon the seventh incorrect guess the learning says "I win". On the other hand, if the child correctly guesses all the letters before making seven incorrect guesses the learning aid speaks "you win" and gives an audible response of four tones. Thus in the word guesser mode, the learning aid permits the child to play the traditional spelling game known as "hangman" either by himself or herself or along with other children. Exemplary word guesser problems are set forth in Table III.

The disclosed learning aid has another mode of operation known as "code breaker" which is entered by depressing the "code breaker" mode key. In this mode the child may enter any word of his or her choice and upon depressing the "enter key" the letters in the display are exchanged according to a predetermined code. Thus, in the code breaker mode the learning aid may be used to encode words selected by the child. Further in the code breaker mode the learning aid may be used to decode the encoded words by entering the encoded word and depressing the "enter key".

Another mode with which the learning aid may be provided is the "random letter" mode which is entered by depressing the "random letter" key. In the random letter mode the learning automatically displays in response to depression of the "go" key a randomly selected letter of the alphabet in the first character position of display 2. The letters of the alphabet occur in approximate proportion to as they occur in the english language; thus, the more commonly letters are displayed more frequently than uncommonly used letters. If the "go" key is again depressed then another randomly selected letter is displayed in the first character position and the previously selected letter moves right to the second character position and so forth in response to further depressions of the "random letter" key.

Figure 2:
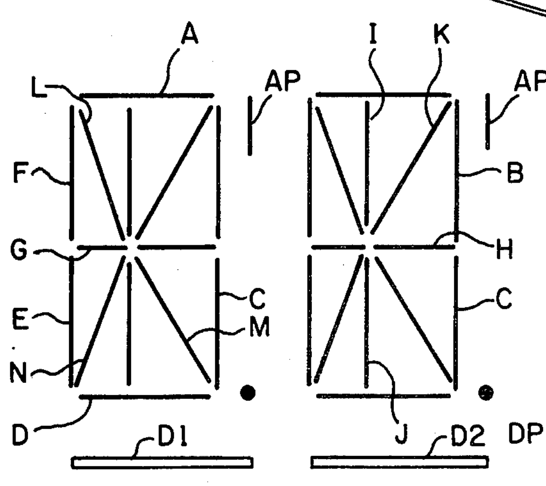
FIG. 2 depicts the segment details of the display.

Referring now to FIG. 2, there is shown a preferred arrangement of the segments of display 2. Display 2 preferably has eight character positions each of which is provided by a sixteen segment character has fourteen segments arranged somewhat like a "British flag" with an additional two segments for an apostrophe and a decimal point. In FIG. 2, segments a-n are arranged more or less in the shape of the "British flag" while segment approves apostrophe and segment dpt provides a decimal point. Segment conductors Sa through Sn, Sdp and Sap are respectively coupled to segments a through n, dpt and ap in the eight character positions of display 2. Also, for each character position, there is a common electrode, labeled as D1–D8. When display 2 is provided by a vacuum flourescent display device, the segments electrodes are provided anodes in the vacuum flourescent display device while each common electrode is preferably provided by a grid associated with each character position. By appropriately multiplexing signals on the segment conductors (Sa-Sn, Sdpt and Sap) with signals on the character common electrodes (D1–D8) the display may be caused to show the various letters of the alphabet, a period, and an apostrophe and various numerals. For instance, by appropriately energizing segment conductors A,B,C,E and F when character common electrode D1 is appropriately energized the letter A is actuated in the first character position of display 2. Further, by appropriate strobing segment conductors A,B,C,D,H,I and J when character common electrode D2 is appropriately energized, the letter B is caused to be actuated in the second character position of display 2. It should be evident to those skilled in the art that the other letters of the alphabet as well as the apostrophe, period and numerals may be formed by appropriate energization of appropriate segment conductors and common electrodes. In operation, the character common electrodes D1–D8 are sequentially energized with an appropriate voltage potential as selected segment conductors are energized to their appropriate voltage potential to produce a display of characters at display 2. Of course, the segment electrodes could alternatively be sequentially energized as the digit electrodes are selectively energized in producing a display at display 2.

BLOCK DIAGRAM OF THE LEARNING AID

Figure 3:
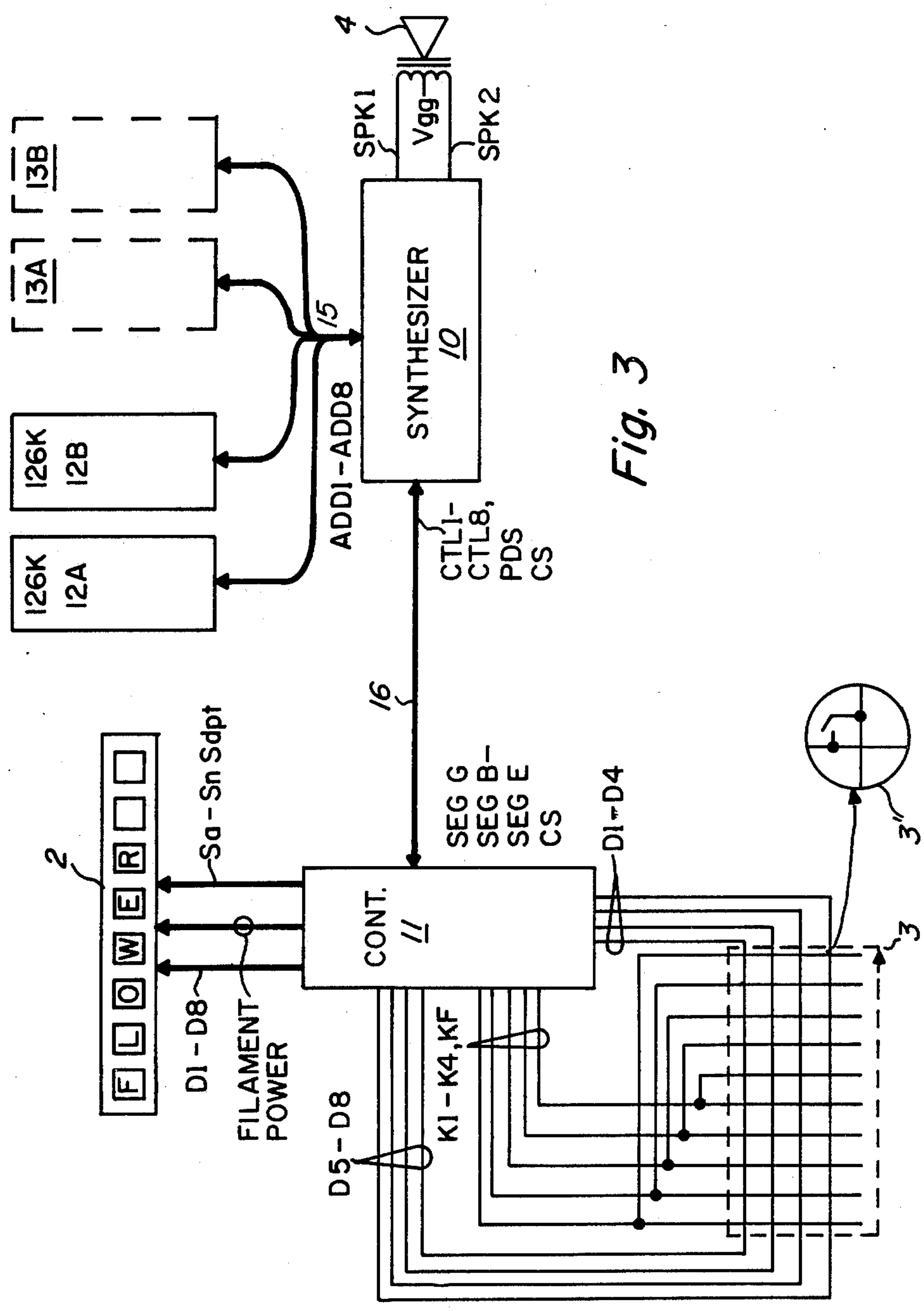
FIG. 3 is a block diagram of the major components preferably making up the learning aid.

FIG. 3 is a block diagram of the major components making up the disclosed embodiment of a speaking learning aid. The electronics of the disclosed learning aid may be divided into three major functional groups, one being a controller 11, another being a speech synthesizer 10, and another being a read-only-memory (ROM) 12. In the embodiment disclosed, these major electronic functional groups are each integrated on separate integrated circuit chips except for the ROM functional group which is integrated onto two integrated circuit chips. Thus, the speech synthesizer 10 is preferably implemented on a single integrated circuit denoted by the box labeled 10 in FIG. 3 while the controller is integrated on a separate integrated circuit denoted by a box 11 in FIG. 3. The word list for the learning aid is stored in the ROM functional group 12, which stores both the correct spellings of the words as well as frames of digital coding which are converted by speech synthesizer 10 to an electrical signal which drives speaker or other voice coil means 4. In the embodiment disclosed, ROM functional group 12 is preferably provided with 262,144 bits of storage. As a matter of design choice, the 262,144 20 bits of data is divided between two separate read-only-memory chips, represented in FIG. 3 at numerals 12*a* and 12*b*. The memory capacity of ROM functional group 12 is a design choice; however, using the data compression features which are subsequentially discussed with reference to FIG. 6, the 262,144 bits of read-only-memory may be used to store on the order of 250 words of spoken speech and their correct spellings as well as various tones, praise phrases and correction phases spoken by the learning aid.

As is discussed with reference to FIG. 1, the "word list select" key causes the learning aid to select words from another word list. In FIG. 3, the basic word list used with the learning aid is stored in ROMs 12*a* and 12*b* along with their spellings and appropriate phraseolgy which the learning aid speaks during its different modes of operation. The second word list, which may be selected by depressing the "word list select" key, is preferably stored in another pair of ROMs 13*a* and 13*b*. In FIG. 3 these are depicted by dashed lines because these read-only-memories are preferably plugged into the learning aid by a person using the system (of course, when children use the system it is preferably that an adult change the read-only-memories since children may not have the required manual dexterity) rather than normally packaged with the learning aid. In this manner many different "libraries" of word lists may be made available for use with the learning aid.

Of course, the number of chips on which the learning aid is implemented is a design choice and as large scale integration techniques are improved (using electron beam etching and other techniques), the number of integrated circuit chips may be reduced from four to as few as a single chip.

Synthesizer chip 10 is interconnected with the read-only-memories via data path 15 and is interconnected with controller 11 via data path 16. The controller 11, which may be provided by an appropriately programmed microprocessor type device, preferably actuates display 2 by providing segment information on segment conductors Sa-Sn, Sdpt and Sap along with character position information on connectors D1-D8. In the embodiment herein disclosed, controller 11 preferably also provides filament power to display 2 when a vacuum fluorescent device is used therefor. Of course, if a liquid crystal, electrochromographic, light emitting diode or gas discharge display were used such filament power would not be required. One technqiue for generating filament power on a controller chip is described in U.S. Pat. application Ser. No. 843,017 filed Oct. 17, 1977. Controller 11 also scans keyboard 3 for detecting key depressions thereat. Keyboard 3 has forty switch positions which are shown in representative form in FIG. 3, the switch locations occurring where the conductors cross within the dashed line at numeral 3 in FIG. 3. A switch closure causes the conductors shown as crossing in FIG. 3 to be coupled together. At numeral 3' the switch occurring at a crossing of conductors at numeral 3 is shown in detail. In addition to actuating display 2 and sensing key depression at keyboard 3, controller 11 also perform such functions as providing addresses for addressing ROMs 12*a* and 12*b* (via synthesizer 10), comparing the correct spellings from ROMs 12*a* or 12*b* with spellings inputted by a student at keyboard 3, and other such functions which will become apparent. Addresses from controller 11 are transmitted to ROMs 12*a–b* by synthesizer 10 because, as will be seen, synthesizer 10 preferably is equipped with buffers capable of addressing a plurality of read-only-memories. Preferably, only one of the pairs of ROMs will output information in response to this addressing because of a chip select signal which is transmitted from synthesizer 10 to all the Read-Only-Memories. Controller 11, in this embodiment, transmits addresses to the ROMs via synthesizer 10 so that only synthesizer 10 output buffers need be sized to transmit addresses to a plurality of ROMs simultaneously. Of course, controller 11 output buffers could also be sized to transmit information to a plurality of read-only-memories simultaneously and thus in certain embodiments it may be desirable to also couple controller 11 directly to the ROMs.

As will be seen, synthesizer chip 10 synthesizes human speech or other sounds according to frames of data stored in ROMs 12*a*–12*b* or 13*a*–13*b*. The synthesizer 10 employs a digital lattice filter of the type described in U.S. Pat. application Ser. No. 807,461, filed June 17, 1977. U.S. patent application Ser. No. 807,461, since abandoned and continued in U.S. patent application Ser. No. 905,328, filed May 12, 1978, is hereby incorporated herein by reference. The following discussion of the speech synthesizer assumes that the reader has a basic understanding of the operation of the lattice filter described in U.S. patent application Ser. No. 807,451, since abandoned and continued in U.S. patent application Ser. No. 905,328, filed May 12, 1978; therefore the reader is encouraged to read that patent before delving into the following detailed discussin of the speech synthesizer. As willl also be seen, synthesizer 10 also includes a digital to analog (D to A) converter for converting the digital output from the lattice filter to analog signals for driving speaker 4 or other voice coil means with those analog signals. Synthesizer 10 also includes timing, control and data storage and data compression systems which will be subsequently described in detail.

SYNTHESIZER BLOCK DIAGRAM

Figure 4A:
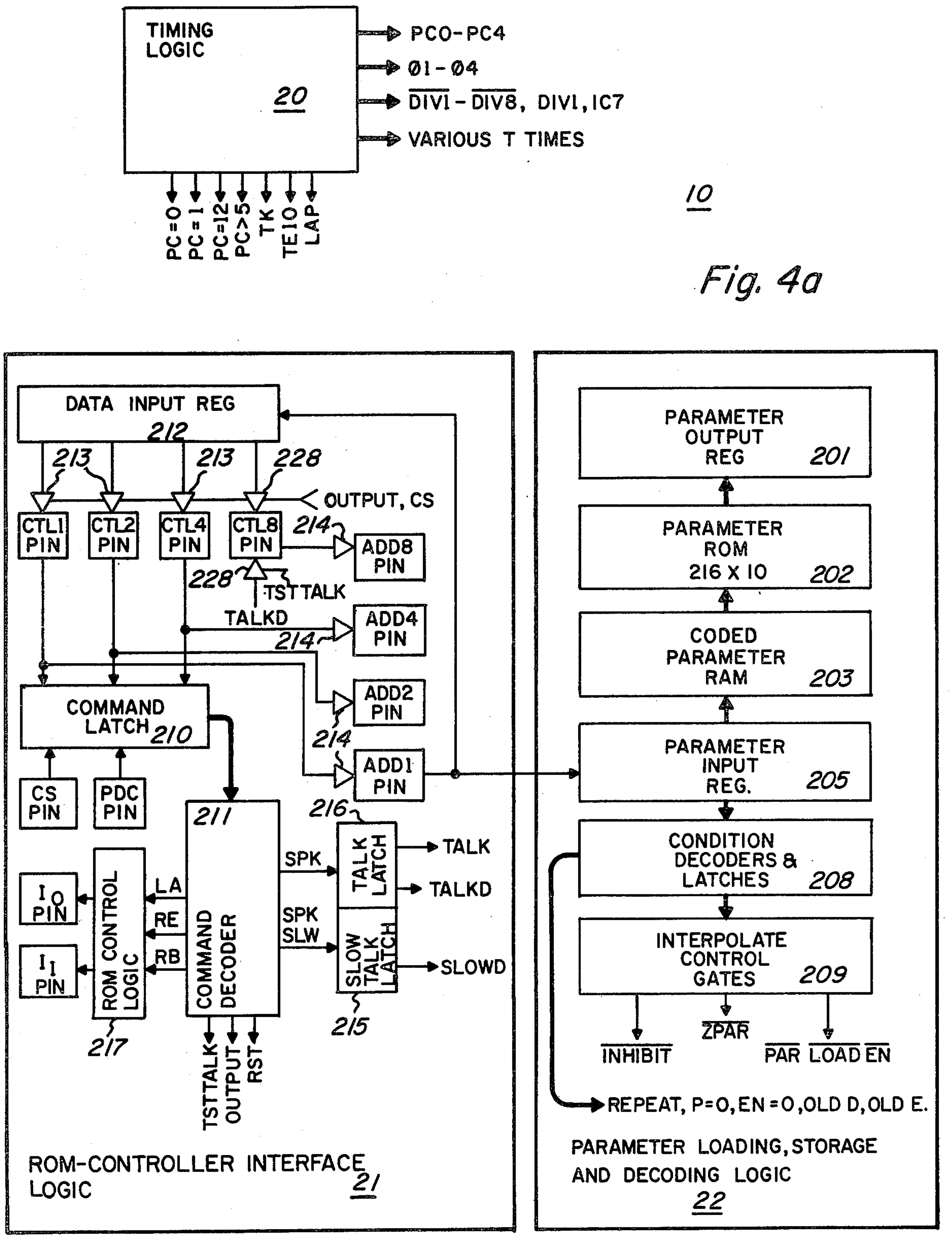
FIGS. 4*a* and 4*b* form a composite block diagram (when placed side by side) of the speech synthesizer chip.
Figure 4B:
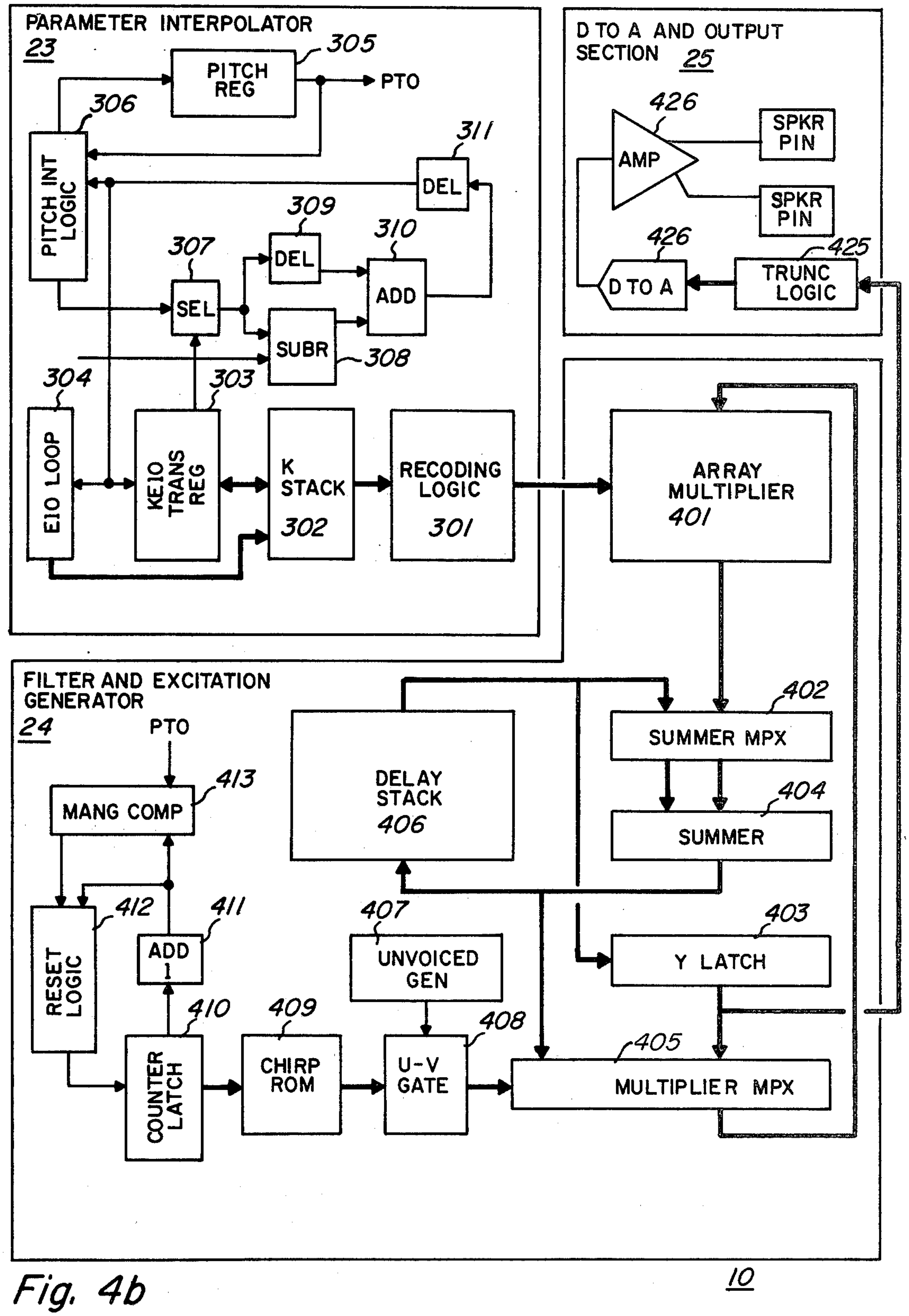

FIGS. 4a and 4b form a composite block diagram of the synthesizer 10. Synthesizer 10 is shown as having six major functional blocks, all but one of which are shown in greater detail in block diagram form in FIGS. 4a and 4b. The six major functional blocks are timing logic 20; ROM-Controller interface logic 21; parameter loading, storage and decoding logic 22; parameter interprelater 23; filter and excitation generator 24 and D to A and output section 25. Subsequentially, these major functional blocks will be described in detail with respect to FIGS. 5a-b, 6, 7a-b, 8a-c, 9a-b, 10a-d and 11a-b.

Rom/Controller Interface Logic

Referring again to FIGS. 4a and 4b, ROM/Controller interface logic 21 couples synthesizer 10 to read-only-memories 12a and 12b and to controller 11. The control 1-8 (CTL1-CTL8), chip select (CS) and processor data clock (PDC) pins are coupled, in this embodiment, to the controller while the address 1-8 (ADD1-ADD8) and instruction 0-1 (I0-I1) pins are connected to ROMs 12a and 12b (as well as ROMs 13a-13b, if used). ROM/Controller interface logic 21 sends address information from controller 11 to the Read-Only-Memories 12a-12b and preferably returns digital information from the ROMs back to the controller 12; logic 21 also brings data back from the ROMs for use by synthesizer 10 and initiates speech. A Chip Select (CS) signal enables tristate buffers, such as buffers 213, and a three bit command latch 210. A Processor Data Clock (PDC) signal sets latch 210 to hold the data appearing at CTL1-CTL4 pins from the controller. Command latch 210 stores a three bit command from controller 11, which is decoded by command decoder 211. Command decoder 211 is responsive to eight commands which are: speak (SPK) or speak slowly (SPKSLOW) for causing the synthesizer to access data from the Read-Only-Memory and speak in response thereto either at a normal rate or at a slow rate; a reset (RST) command for resetting the synthesizer to zero; a test talk (TTALK) so that the controller can assertain whether or not the synthesizer is still speaking; a load address (LA) where four bits are received from the controller chip at the CTL1-CTL8 pins and transferred to the ROMs as an address digit via the ADD1-ADD8 pins and associated buffers 211; a read and branch (RB) command which causes the Read-Only-Memory to take the contents of the present and subsequent address and use that for a branch address; a read (RE) command which causes the Read-Only-Memory to output one bit of data on ADD1, which data shifts into a four bit data input register 212; and an output command which transfers four bits of data in the data input register 212 to controller 11 via buffers 213 and the CTL1-CTL8 pins. Once the synthesizer 10 has commenced speaking in response to a SPK or SPKSLOW command it continues speaking until ROM interface logic 21 encounters a RST command or an all ones gate 207 (see FIG. 7a-7b) detects an "energy equal to fifteen" code and resets talk latch 216 in response thereto. As will be seen, an "energy equal to 15" code is used as the last frame of data in a plurality of frames of data for generating words, phases or sentences. The LA, RE and RB commands decoded by decoder 211 are re-encoded via ROM control logic 217 and transmitted to the read-only-memories via the instruction (I0-I1) pins.

The processor Data Clock (PDC) signal serves other purposes than just setting latch 210 with the data on CTL1-CTL4. It signals that an address is being transferred via CTL1-CTL8 after an LA or output command has been decoded or that the TTALK test is to be performed and outputted on pin CTL8. A pair of latches 218A and B (FIGS. 7a-7b) associated with decoder 211 disable decoder 211 when the aforementioned LA, TSTTALK and OUTPUT commands have been decoded and a subsequent PDC occurs so that the data then on pins CTL1-CTL8 is not decoded.

A TALK latch 216 is set in response to a decoded SPK or SPKSLW command and is reset: (1) during a power up clear (PUC) which automatically occurs whenever the synthesizer is energized; (2) by a decoded RST command or (3) by an "energy equals fifteen" code in a frame of speech data. The TALKD output is delayed output to permit all speech parameters to be inputed into the synthesizer before speech is attempted. The talk slow latch 215 is set in response to a decoded SPKSLOW command and reset in the same manner as latch 216. The SLOWD output is similarly a delayed output to permit all the parameters to be inputted into the synthesizer before speech is attempted.

Parameter Loading, Storage and Decoding Logic

The parameter loading, storage and decoding logic 22 includes a six bit long parameter input register 205 which receives serial data from the read-only-memory via pin ADD1 in response to a RE command outputted to the selected read-only-memory via the instruction pins. A coded parameter random access memory (RAM) 203 and condition decoders and latches 208 are connected to receive the data inputted into the parameter input register 205. As will be seen, each frame of speech data is inputted in three to six bit portions via parameter input register 205 to RAM 203 in a coded format where the frame is temporarily stored. Each of the coded parameters stored in RAM 203 are converted to a ten bit parameter by parameter ROM 202 and temporarily stored in a parameter output register 201.

As will be discussed with respect to FIG. 6, the frames of data may be either wholly are partially inputted into parameter input register 205, depending upon the length of the particular frame being inputted. Condition decoders and latches 208 are responsive to particular portions of the frame of data for setting repeat, pitch equal zero, energy equal zero, old pitch and old energy latches. The function of these latches will be discussed subsequently with respect to FIGS. 7a-7b. The condition decoders and latches 208 as well as various timing signals are used to control various interpolation control gates 209. Gates 209 generate an inhibit signal when interpolation is to be inhibited, a zero parameter signal when the parameter is to be zeroed and a parameter load enable signal which, amoung other things, permits data in parameter input register 205 to be loaded into the coded parameter RAM 203.

Parameter Interpolater

The parameters in parameter output registers 201 are applied to the parameter interpolator functional block 23. The inputted K1-K10 speech parameters, including speech energy are stored in a K-stack 302 and E10 loop 304, while the pitch parameter is stored in a pitch register 305. The speech parameters and energy are applied via recoding logic 301 to array multiplier 401 in the filter and excitation generator 24. As will be seen, howver, when a new parameter is loaded into parameter utput register 201 it is not immediately inserted into :-stack 302 or E10 loop 304 or register 305 but rather ıe corresponding value in K-stack 302, E10 loop 304 or ›gister 305 goes through eight interpolation cycles uring which a portion of the difference between the resent value in the K-stack, E10 loop 305 or register 05 and the target value of that parameter in parameter utput register 201 is added to the present value in :-stack 203, E10 loop 304 or register 305.

Essentially the same logic circuits are used to per- ›rm the interpolation of pitch, energy and the K1–K10 ›eech parameters. The target value from the parameter utput register 201 is applied along with the present alue of the corresponding parameter to a subtractor )8. A selector 307 selects either the present pitch from itch logic 306 or present energy or K coefficient data 'om KE10 transfer register 303, according to which arameter is currently in parameter output register 201, ıd applies the same to subtractor 308 and a delay cir- ıit 309. As will be seen, delay circuit 309 may provide ıywhere between zero delay to three bits of delay. The ıtput of delay circuit 309 as well as the output of sub- actor 308 is supplied to an adder 310 whose output is ›plied to a delay circuit 311. When the delay associ- :ed with delay circuit 309 is zero the target value of the ırticular parameter in parameter output register 201 is 'fectively inserted into K-stack 302, E10 loop 304 or .tch register 305, as is appropriate. The delay in delay rcuit 311 is three to zero bits, being three bits when the ›lay in the delay circuit 309 is zero bits, whereby the ›tal delay through selector, 307 delay, 309 and 311, ıder 310 and subtractor 308 is constant. By controlling ıe delays in delay circuit 309 and 311, either all, ½, ¼ or of the difference outputted from subtractor 308 (that ›ing the difference between the target value and the :esent value) is added back into the present value of ıe parameter. By controlling the delays in the fashion :t forth in Table IV, a relatively smooth eight step ırameter interpolation is accomplished.

U.S. patent application Ser. No. 807,461, since aban- ›ned and continued in U.S. patent application Ser. No. )5,328, filed May 12, 1978, discusses with reference to IG. 7 thereof a speech synthesis filter wherein speech ›efficients K1–K9 are stored in the K-stack continu- ısly, until they are updated, while the K10 coefficient ıd the speech energy (referred to by the letter A in .S. patent application Ser. No. 807,461 since aban- ›ned and continued in U.S. patent application Ser. No. )5,328, filed May 12, 1978) are periodically exchanged. ı parameter interpolator 23, speech coefficients 1–K9 are likewise stored in stack 302, until they are ›dated, whereas the energy parameter and the K10 ›efficient effectively exchange places in K-stack 302 ıring a twenty time period cycle of operations in the .ter and excitation generator 24. To accomplish this .nction, E10 loop 304 stores both the energy parameter ıd the $K_{10}$ coefficient and alternately inputs the same to the appropriate location in K-stack 302. KE10 ansfer register 303 is either loaded with the K10 or ıergy parameter from E10 loop 304 or the appropriate 1–K9 speech coefficient from K-stack 302 for interpo- tion by logics 307–311.

As will be seen, recoding logic 301 preferably per- ›rms a Booth's algorithm on the data from K-stack 302, ›fore such data is applied to array multiplier 401. Re- ›rding logic 301 thereby permits the size of the array ultiplier 401 to be reduced compared to the array multiplier described in U.S. patent application Ser. No. 807,461, since abandoned and continued in U.S. patent application Ser. No. 905,328, filed May 12, 1978.

Filter and Excitation Generator

The filter excitation generator 24 includes the array multiplier 401 whose output is connected to a summer multiplexer 402. The output of summer multiplexer 402 is coupled to the input of summer 404 whose output is coupled to a delay stack 406 and multiplier multiplexer 405. The output of the delay stack is applied as an input to summer multiplexer 402 and to Y latch 403. The output of Y latch 403 is coupled to an input of multiplier multiplexer 405 along with truncation logic 501. The output of multiplier multiplexer 405 is applied as an input to array multiplier 401. As will be seen filter and excitation generator 24 make use of the lattice filter described in U.S. patent application Ser. No. 807,461, since abandoned and continued in U.S. patent application Ser. No. 905,328, filed May 12, 1978. Various minor interconnections are not shown in FIG. 4*b* for sake of clarity, but which will be described with reference to FIGS. 10*a*, 10*b*, 11*a* and 11*b*. The arrangement of the foregoing elements generally agrees with the arrangement shown in FIG. 7 of U.S. patent application Ser. No. 807,461, since abandoned and continued in U.S. patent application Ser. No. 905,328, filed May 12, 1978; thus array multiplier 401 corresponds to element 30′, summer multiplexer 402 corresponds to elements 37*b*′, 37*c*′ and 37*d*′, gates 414 (FIGS 11*a* and 11*b*) correspond to element 33′, delay stack 406 corresponds to elements 34′ and 35′, Y latch 403 corresponds to element 36′ and multiplier multiplexer 405 corresponds to elements 38*a*′, 38*b*′, 38*c*′ and 38*d*′.

The voice excitation data is supplied from unvoiced/-voice gate 408. As will be subsequently described in greater detail, the parameters inserted into parameter input gate 205 are supplied in a compressed data format. According to the data compression scheme used, when the coded pitch parameter is equal zero in input register 205, it is interpreted as an unvoiced condition by condition decoders and latches 208. Gate 408 responds by supplying randomized data from unvoiced generator 407 as the excitation input on line 414. When the coded pitch parameter is of some other value, however, it is decoded by parameter ROM 202, loaded into parameter output register 201 and eventually inserted into pitch register 305, either directly or by the interpolation scheme previously described. Based on the period indicated by the number in pitch register 305, voiced excitation is derived from chirp ROM 409. As discussed in U.S. patent application Ser. No. 807,461, since abandoned and continued in U.S. patent application Ser. No. 905,328, filed May 12, 1978, the voiced excitation signal may be an impulse function or some other repeating function such as a repeating chirp function. In this embodiment, a chirp has been selected as this tends to reduce the "fuzziness" from the speech generated (because it apparently more closely models the action of the vocal cards than does an impulse function) which chirp is repetitively generated by chirp ROM 409. Chirp ROM 409 is addressed by counter latch 410, whose address is incremented in an add one circuit 411. The address in counter latch 410 continues to increment in add one circuit 411, recirculating via reset logic 412 until magnitude comparator 413, which compares the magnitude of the address being outputted from add one circuit 411 and the contents of the pitch register 305, indicates that the value in counter latch 410 then compares with or exceeds the value in pitch register 305, at which time reset logic 412 zeroes the address in counter 410. Beginning at address zero and extending through approximately fifty addresses is the chirp function in chirp ROM 409. Counter latch 401 and chirp ROM 409 are set up so that addresses larger than fifty do not cause any portion of the chirp function to be outputted from chirp ROM 409 to UV gate 408. In this manner the chirp function is repetitively generated on a pitch related period during voiced speech.

SYSTEM TIMING

Figure 5:
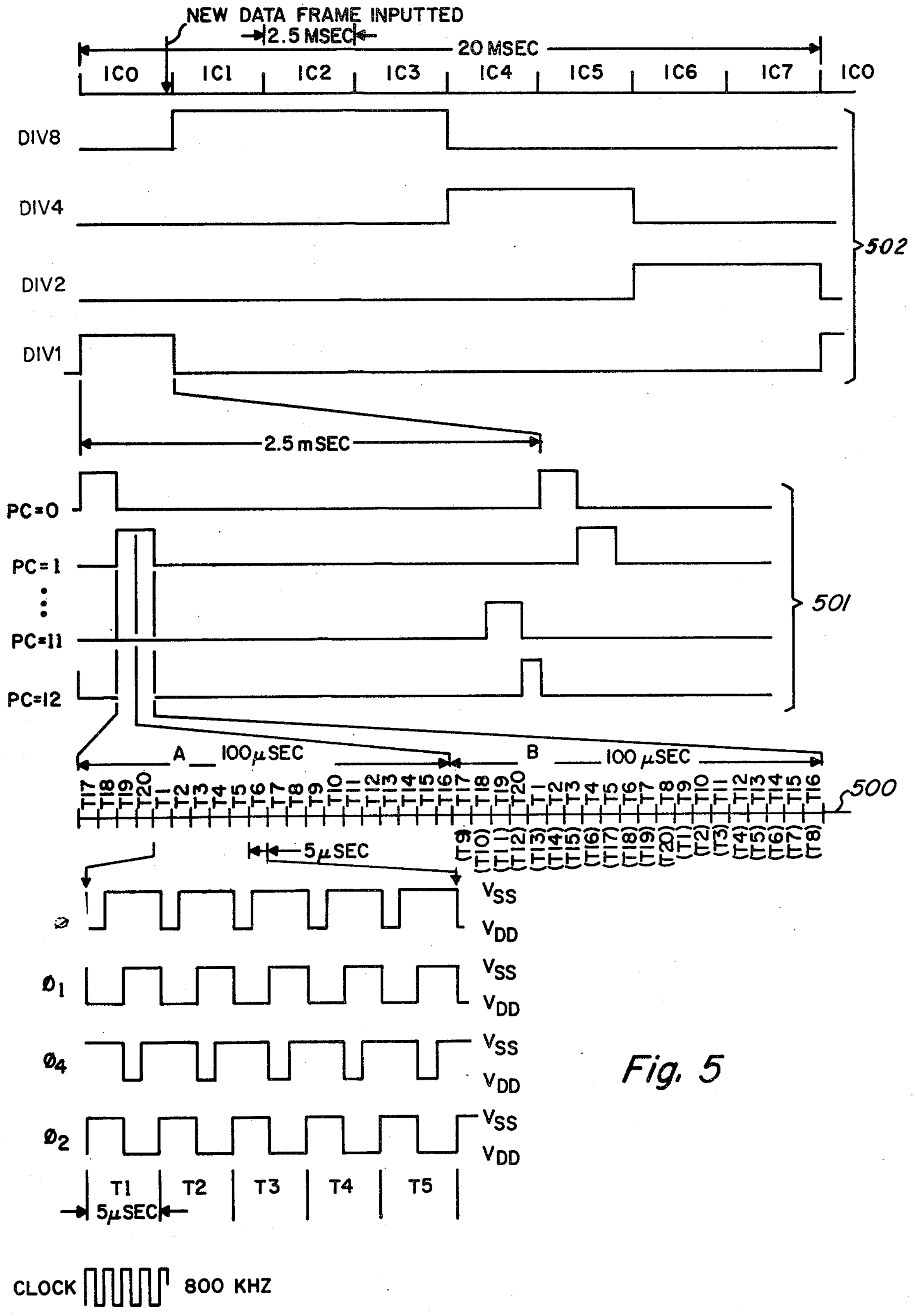
FIG. 5 is a timing diagram of various timing signals preferably used on the synthesizer.

FIG. 5 depicts the timing relationships between the occurrences of the various timing signals generated on synthesizer chip 10. Also depicted are the timing relationships with respect to the time new frames of data are inputted to synthesizer chip 10, the timing relationship with respect to the interpolations performed on the inputted parameters, the timing relations with respect to the foregoing with the time periods of the lattice filter and the relationship of all the foregoing to the basic clock signals.

The synthesizer is preferably implemented using precharged, conditional discharge type logics and therefore FIG. 5 shows clocks $\phi$1–$\phi$4 which may be appropriately used with such precharge-conditional discharge logic. There are two main clock phases ($\phi$1 and $\phi$2) and two precharge clock phases ($\phi$3 and $\phi$4). Phase $\phi$3 goes low during the first half of phase $\phi$1 and serves as a precharge therefor. Phase $\phi$4 goes low during the first half of phase $\phi$2 and serves as a precharge transfer. A set of clocks $\phi$1–$\phi$4 required to clock one bit of data and thus correspond to one time period.

The time periods are labeled T1–T20 and each preferably has a time period on the order of five microseconds. Selecting a time period on the order of five microseconds permits, as will be seen, data to be outputted from the digital filter at a ten kilohertz rate (i.e., at a 100 microsecond period) which provides for a frequency response of five kilohertz in the D to A output section 25 (FIG. 4*b*). It will be appreciated by those skilled in the art, however, that depending on the frequency response which is desired and depending upon the number of Kn speech coefficients used, and also depending upon the type of logics used, that the periods or frequencies of the clocks and clock phases shown in FIG. 5 may be substantially altered, if desired.

As is explained in U.S. patent application Ser. No. 807,461, since abandoned and continued in U.S. patent application Ser. No. 905,328, filed May 12, 1978, one cycle time of the lattice filter in filter excitation generator 24, preferably comprises twenty time periods, T1–T20. For reasons not important here, the numbering of these time periods differs between this application and U.S. patent application Ser. No. 807,461, since abandoned and continued in U.S. patent application Ser. No. 905,328, filed May 12, 1978. To facilitate the reader's understanding of the differences in the numbering of the time periods, both numbering schemes are shown at the time period time line 500 in FIG. 5. At time line 500, the time periods, T1–T20 which are not enclosed in parenthesis identify the time periods according to the convention used in this application. On the other hand, the time periods convention used in U.S. patent application Ser. No. 807,461, since abandoned and continued in U.S. patent application Ser. No. 905,328, filed May 12, 1978. Thus, time period T17 is equivalent to time period (T9).

At numeral 501 is depicted the parameter count (PC) timing signals. In this embodiment there are thirteen PC signals, PC=0 through PC=12. The first twelve of these, PC=0 through PC=11 correspond to times when the energy, pitch, and K1–K10 parameters, respectively, are available in parameter output register 201. Each of the first twelve PC's comprise two cycles, which are labeled A and B. Each such cycle starts at time period T17 and continues to the following T17. During each PC the target value from the parameter output register 201 is interpolated with the existing value in K-stack 302 in parameter interpolator 23. During the A cycle, the parameter being interpolated is withdrawn from the K-stack 302, E10 loop 304 or register 305, as appropriate, during an appropriate time period. During the B cycle the newly interpolated value is reinserted in the K-stack (or E10 loop or pitch register). The thirteenth PC, PC=12, is provided for timing purposes so that all twelve parameters are interpolated once each during a 2.5 milliseconds interpolation period.

As was discussed with respect to the parameter interpolator 23 of FIG. 4*b* and Table IV, eight interpolations are performed for each inputting of a new frame of data from ROMs 12*a–b* into synthesizer 10. This is seen at numeral 502 of FIG. 5 where timing signals DIV 1, DIV 2, DIV 4 and DIV 8 are shown. These timing signals occur during specific interpolation counts (IC) as shown. There are eight such interpolation counts, IC0–IC7. New data is inputted from the ROMs 12*a–b* into the synthesizer during IC0. These new target values of the parameters are then used during the next eight interpolation counts, IC1 through IC0; the existing parameters in the pitch register 305 K-stack 302 and E10 loop 304 are interpolated once during each interpolation count. At the last interpolation count, IC0, the present value of the parameters in the pitch register 305, K-stack 302 and E10 loop 304 finally attain the target values previously inputted toward the last IC0 and thus new target values may then again be inputted as a new frame of data. Inasmuch as each interpolation count has a period of 2.5 milliseconds, the period at which new data frames are inputted to the synthesizer chip is 20 microseconds or equivalent to a frequency of 50 hertz. The DIV 8 signal corresponds to those interpolation counts in which one-eighth of the difference produced by subtractor 308 is added to the present values in adder 310 whereas during DIV 4 one-fourth of the difference is added in, and so on. Thus, during DIV 2, ½ of the difference from subtractor 308 is added to the present value of the parameter in adder 310 and lastly during DIV 1 the total difference is added in adder 310. As has been previously mentioned, the effect of this interpolation scheme can be seen in Table IV.

PARAMETER DATA COMPRESSION

It has been previously mentioned that new parameters are inputted to the speech synthesizer at a 50 hertz rate. It will be subsequently seen that in parameter interpolator and excitation generator 24 (FIG. 4*b*) the pitch data, energy data and K1–Kn parameters are stored and utilized as ten bit digital binary numbers. If each of these twelve parameters were updated with a ten bit binary number at a fifty hertz rate from an external source such as ROMs 12*a* and 12*b*, this would require a $12\times10\times50$ or 6,000 hertz bit rate. Using the data com ression techniques which will be explained, we reduce his bit rate required for synthesizer 10 to on the order f 1,000 to 1,200 bits per second. And more importantly, : has been found that the speech compression schemes erein disclosed do not appreciably degrade the quality f speech generated thereby in comparison to using the ata uncompressed.

Figure 6:
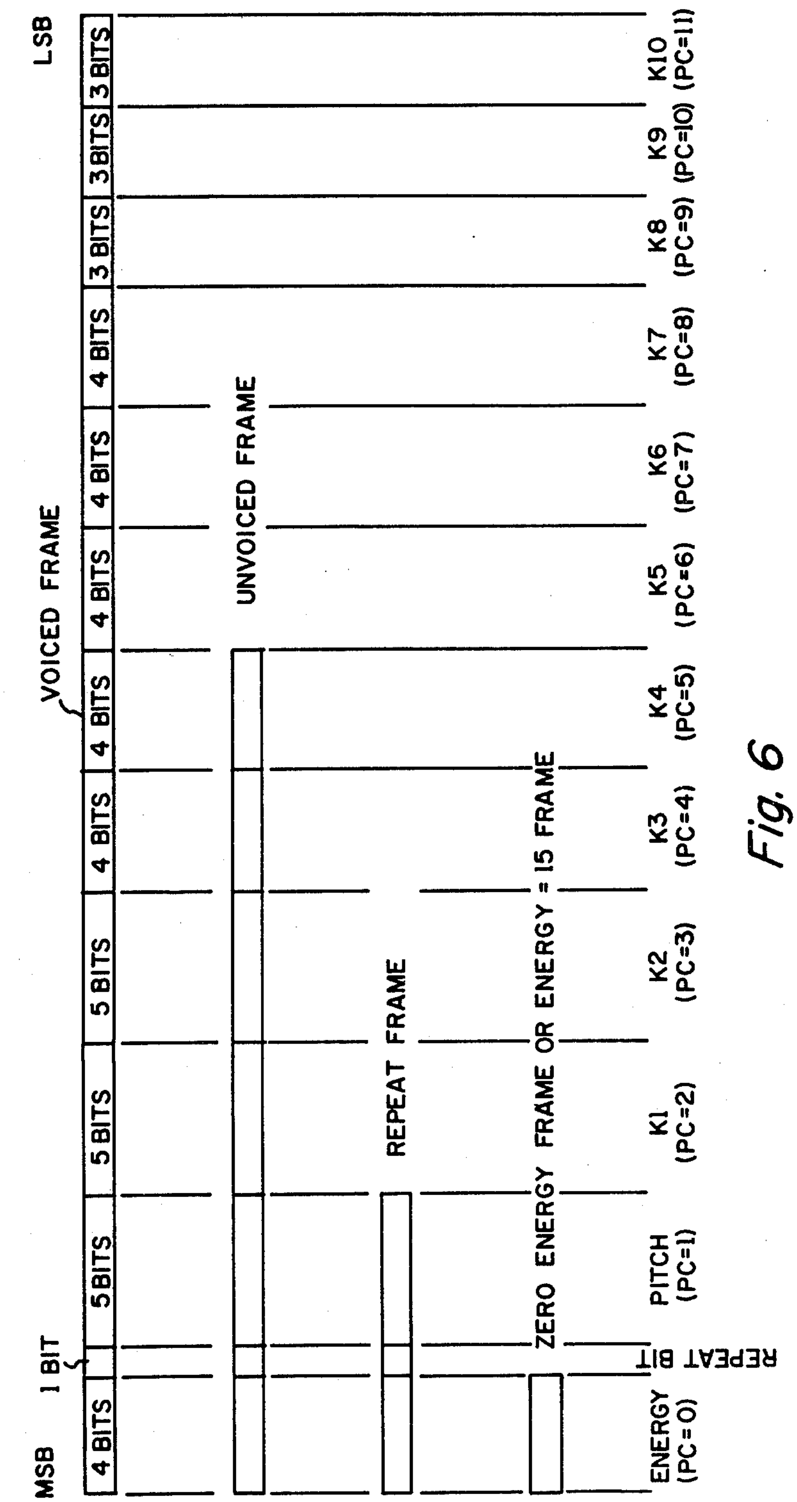
FIG. 6 pictorially shows the data compression scheme preferably used to reduce the data rate required by the synthesizer.

The data compression scheme used is pictorially hown in FIG. 6. Referring now to FIG. 6, it can be een that there is pictorially shown four different engths of frames of data. One, labeled voiced frame, as a length of 49 bits while another entitled unvoiced ame, has a length of 28 bits while still another called repeat frame" has a length of ten bits and still another hich may be alternatively called zero energy frame or nergy equals fifteen frame has the length of but four its. The "voiced frame" supplies four bits of data for a oded energy parameter as well as coded four bits for ach five speech parameters K3 through K7. Five bits f data are reserved for each of three coded parameters, itch, K1 and K2. Additionally, three bits of data are rovided for each of three coded speech parameters .8–K10 and finally another bit is reserved for a repeat t.

In lieu of inputting ten bits of binary data for each of e parameters, a coded parameter is inputted which is onverted to a ten bit parameter by addressing parame- r ROM 202 with the coded parameter. Thus, coeffici- it K1, for example, may have any one of thirty-two fferent values, according to the five bit code for K1, ich one of the thirty-two values being a ten bit numeri- l coefficient stored in parameter ROM 202. Thus, the tual values of coefficients K1 and K2 may have one of irty-two different values while the actual values of efficients K3 through K7 may be one of sixteen differ- it values and the values of coefficients K8 through K9 ay be one of eight different values. The coded pitch arameter is five bits long and therefore may have up to irty-two different values. However, only thirty-one of ese reflect actual pitch values, a pitch code of 00000 ing used to signify an unvoiced frame of data. The ded energy parameter is four bits long and therefore ould normally have sixteen available ten bit values; owever, a coded energy parameter equal to 0000 indi- tes a silent frame such as occur as pauses in and be- een words, sentences and the like. A coded energy arameter equal to 1111 (energy equals fifteen), on the her hand, is used to signify the end of a segment of oken speech, thereby indicating that the synthesizer is stop speaking. Thus, of the sixteen codes available for e coded energy parameter, fourteen are used to sig- fy different ten bit speech energy levels.

Coded coefficients K1 and K2 have more bits than ded coefficients K3–K7 which in turn have more bits an coded coefficients K8 through K10 because coeffi- ent K1 has a greater effect on speech than K2 which s a greater effect on speech than K3 and so forth rough the lower order coefficients. Thus given the eater significance of coefficients K1 and K2 than efficients K8 through K10, for example, more bits are ed in coded format to define coefficients K1 and K2 an K3–K7 or K8–K10.

Also it has been found that voiced speech data needs ore coefficients to correctly model speech than does voiced speech and therefore when unvoiced frames e encountered, coefficients K5 through K10 are not dated, but rather are merely zeroed. The synthesizer realizes when an unvoiced frame is being outputted because the uncoded pitch parameter is equal to 00000.

It has also been found that during speech there often occur instances wherein the parameters do not significantly change during a twenty millisecond period; particularly, the K1–K10 coefficients will often remain nearly unchanged. Thus, a repeat frame is used wherein new energy and new pitch are inputted to the synthesizer, however, the K1–K10 coefficients previously inputted remain unchanged. The synthesizer recognizes the ten bit repeat frame because the repeat bit between energy and pitch then comes up whereas it is normally off. As previously mentioned, there occur pauses between speech or at the end of speech which are preferably indicated to the synthesizer; such pauses are indicated by a coded energy frame equal to zero, at which time the synthesizer recognizes that only four bits are to be sampled for that frame. Similarly, only four bits are sampled when an "energy equals fifteen." Using coded values for the speech in lieu of actual values, alone would reduce the data rate to 48×50 or 2400 bits per second. By additionally using variable frame lengths, as shown in FIG. 6, the data rate may be further reduced to on the order of one thousand to twelve hundred bits per second, depending on the speaker and on the material spoken.

The effect of this data compression scheme can be seen from Table V where the coding for the word "HELP" is shown. Each line represents a new frame of data. As can be seen, the first part of the word "HELP", "HEL", is mainly voiced while the "P" is unvoiced. Also note the pause between "HEL" and "P" and the advantages of using the repeat bit. Table VI sets forth the encoded and decoded speech parameter. The 3, 4 or 5 bit code appears as a hexadecimal number in the left-hand column, while the various decoded parameter values are shown as ten bit, two's complement numbers expressed as hexadecimal numbers in tabular form under the various parameters. The decoded speech parameter are stored in ROM 203. The repeat bit is shown in Table V between the pitch and K parameters for sake of clarity; preferably, according to the embodiment of FIG. 6, the repeat bit occurs just before the most significant bit (MSB) of the pitch parameter.

SYNTHESIZER LOGIC DIAGRAMS

The various portions of the speech synthesizer of FIGS. 4*a* and 4*b* will now be described with reference to FIGS. 7*a* through 14*b* which, depict, in detail, the logic circuits implemented on a semiconductor chip, for example, to form the synthesizer 10. The following discussion, with reference to the aforementioned drawings, refers to logic signals available at many points in the circuit. It is to be remembered that in P channel MOS devices a logical zero corresponds to a negative voltage, that is, Vdd, while a logical one refers to a zero voltage, that is, Vss. It should be further remembered that P-channel MOS transistors depicted in the aforementioned figures are conductive when a logical zero, that is, a negative voltage, is applied at their respective gates. When a logic signal is referred to which is unbarred, that is, has no bar across the top of it, the logical signal is to be interpreted as "TRUE" logic; that is, a binary one indicates the presence of the signal (Vss) whereas a binary zero indicates the lack of the signal (Vdd). Logic signal names including a bar across the top thereof are "FALSE" logic; that is, a binary zero (Vdd voltage) indicates the presence of the signal whereas a binary one (Vss voltage) indicates that the signal is not present. It should also be understood that a numeral three in clocked gates indicates that phase $\phi 3$ is used as a precharge whereas a four in a clocked gate indicates that phase $\phi 4$ is used as a precharge clock. An "S" in the gate indicates that the gate is statically operated.

Timing Logic Diagram

Referring now to FIGS. *7a* and *7b*, they form a composite, detailed logic diagram of the timing logic for synthesizer 10. Counter 510 is a pseudorandom shift counter including a shift register 510*a* and feed back logic 510*b*. The counter 510 counts into pseudorandom fashion and the TRUE and FALSE outputs from shift register 510*a* are supplied to the input section 511 of a timing PLA. The various T time periods decoded by the timing PLA are indicated adjacent to the output lines thereof. Section 511*c* of the timing PLA is applied to an output timing PLA 512 generating various combinations and sequences of time period signals, such as T odd, $\overline{T10}$–$\overline{T18}$, and so forth. Sections 511*a* and 511*b* of timing PLA 511 will be described subsequently.

The parameter count in which the synthesizer is operating is maintained by a parameter counter 513. Parameter counter 513 includes an add one circuit and circuits which are responsive to SLOW and SLOW D. In SLOW, the parameter counter repeats the A cycle of the parameter count twice (for a total of three A cycles) before entering the B cycle. That is, the period of the parameter count doubles so that the parameters applied to the lattice filter are updated and interpolated at half the normal rate. To assure that the inputted parameters are interpolated only once during each parameter count during SLOW speaking operations each parameter count comprises three A cycles followed by one B cycle. It should be recalled that during the A cycle the interpolation is begun and during the B cycle the interpolated results are reinserted back into either K-stack 302, E10 loop 304 or pitch register 305, as appropriate. Thus, merely repeating the A cycle has no affect other than to recalculate the same value of a speech parameter but since it is only reinserted once back into either K-stack 302, E10 loop 304 or pitch register 305 only the results of the interpolation immediately before the B cycle are retained.

Inasmuch as parameter counter 513 includes an add one circuit, the results outputted therefrom, PC1–PC4, represent in binary form, the particular parameter count in which the synthesizer is operating. Output PC0 indicates in which cycle, A or B, the parameter count is. The parameter counter outputs PC1–PC4 are decoded by timing PLA 514. The particular decimal value of the parameter count is decoded by timing PLA 514 which is shown in adjacent to the timing PLA 514 with nomenclature such as PC=0, PC=1, PC=7 and so forth. The relationship between the particular parameters and the value of PC is set forth in FIG. 6. Output portions 511a and 511b of timing PLA 511 are also interconnected with outputs from timing PLA 514 whereby the Transfer K (TK) signal goes high during T9 of PC=2 or T8 of PC=3 or T7 of PC=4 and so forth through T1 of PC=10. Similarly, a LOAD Parameter (LDP) timing signal goes high during T5 of PC=0 or T1 of PC=1 or T3 of PC=2 and so forth through T7 of PC=11. As will be seen, signal TK is used in controlling the transfer of data from parameter output register 201 to subtractor 308, which transfer occurs at different T times according to the particular parameter count the parameter counter 513 is in to assure that the appropriate parameter is being outputted from KE10 transfer register 303. Signal LDP is, as will be seen, used in combination with the parameter input register to control the number of bits which are inputted therein according to the number of bits associated with the parameter then being loaded according to the number of bits in each coded parameter as defined in FIG. 6.

Interpolation counter 515 includes a shift register and an add one circuit for binary counting the particular interpolation cycle in which the synthesizer 10 is operating. The relationship between the particular interpolation count in which the synthesizer is operating and the DIV1, DIV2, DIV4 and DIV8 timing signals derived therefrom is explained in detail with reference to FIG. 6 and therefore additional discussion here would be superfluous. It will be noted, however, that interpolation counter 515 includes a three bit latch 516 which is loaded at TI. The output of three bit latch 516 is decoded by gates 517 for producing the aforementioned DIV1 through DIV8 timing signals. Interpolation counter 515 is responsive to a signal RESETF from parameter counter 513 for permitting interpolation counter 515 to increment only after PC=12 has occurred.

ROM/Controller Interface Logic Diagram

Figure 8A:
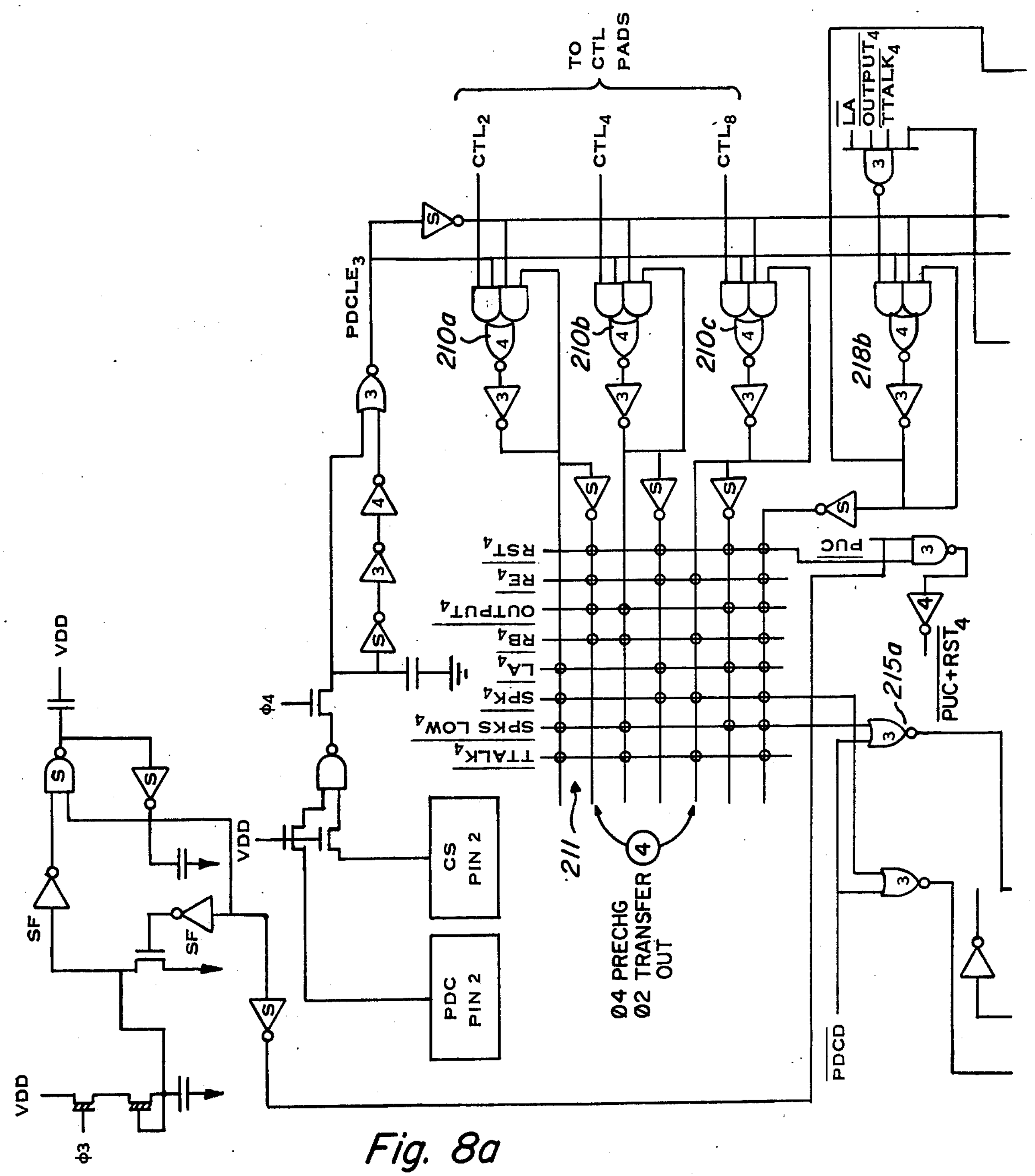
FIGS. 8*a*, 8*b* and 8*c* form a composite logic diagram of the synthesizer's ROM/Controller interface logics.
Figure 8A:
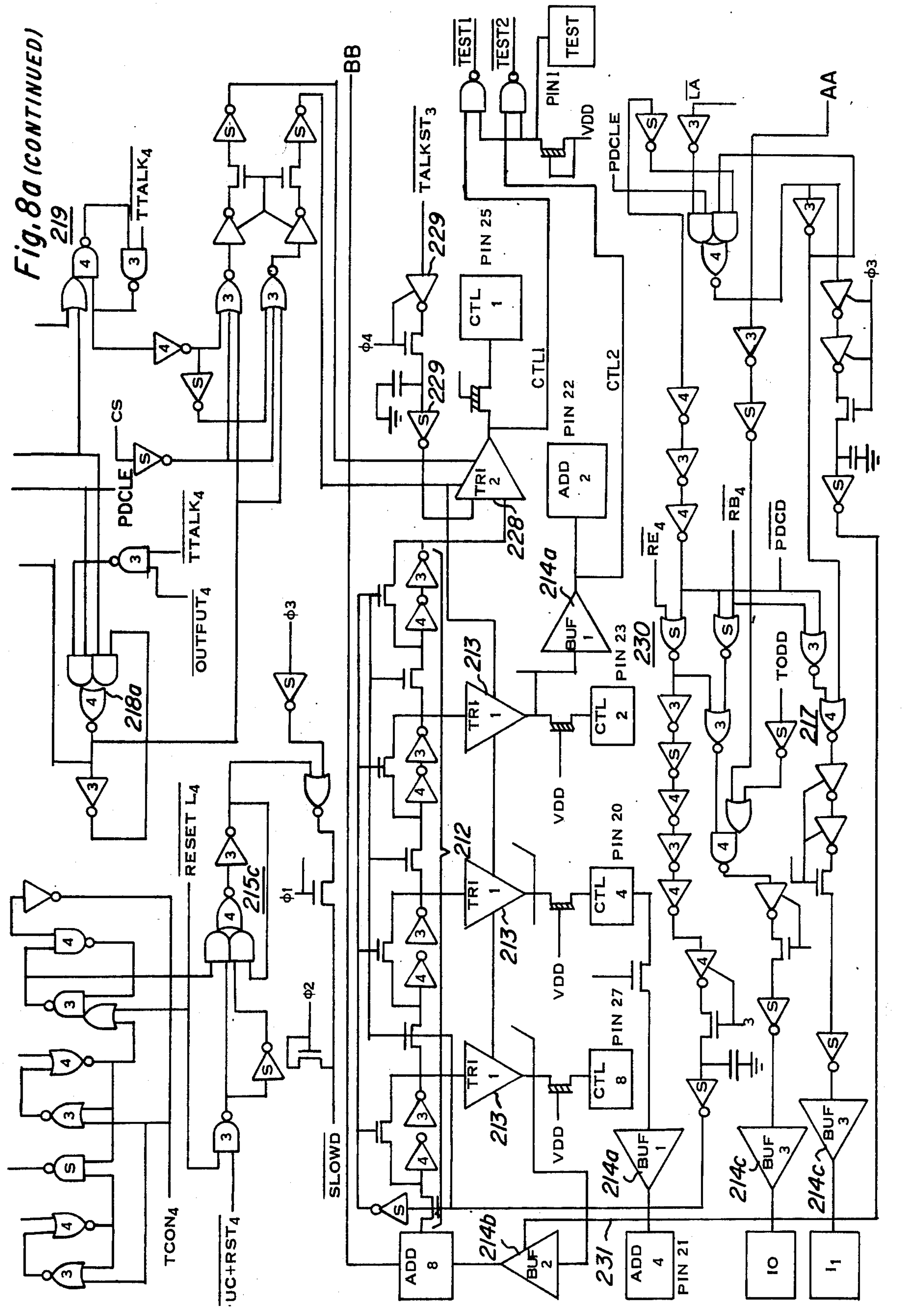
Figure 8B:
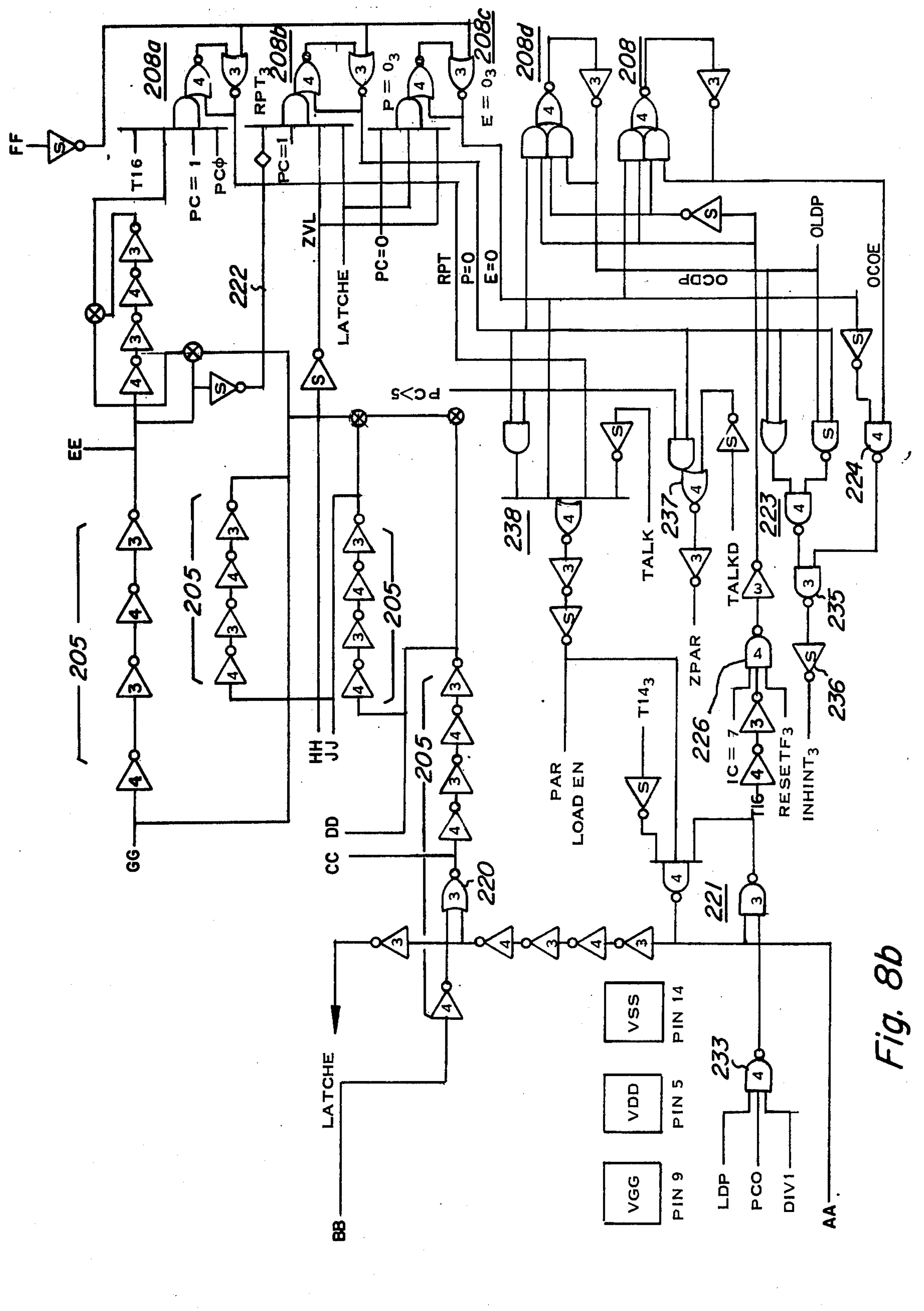
Figure 8B:
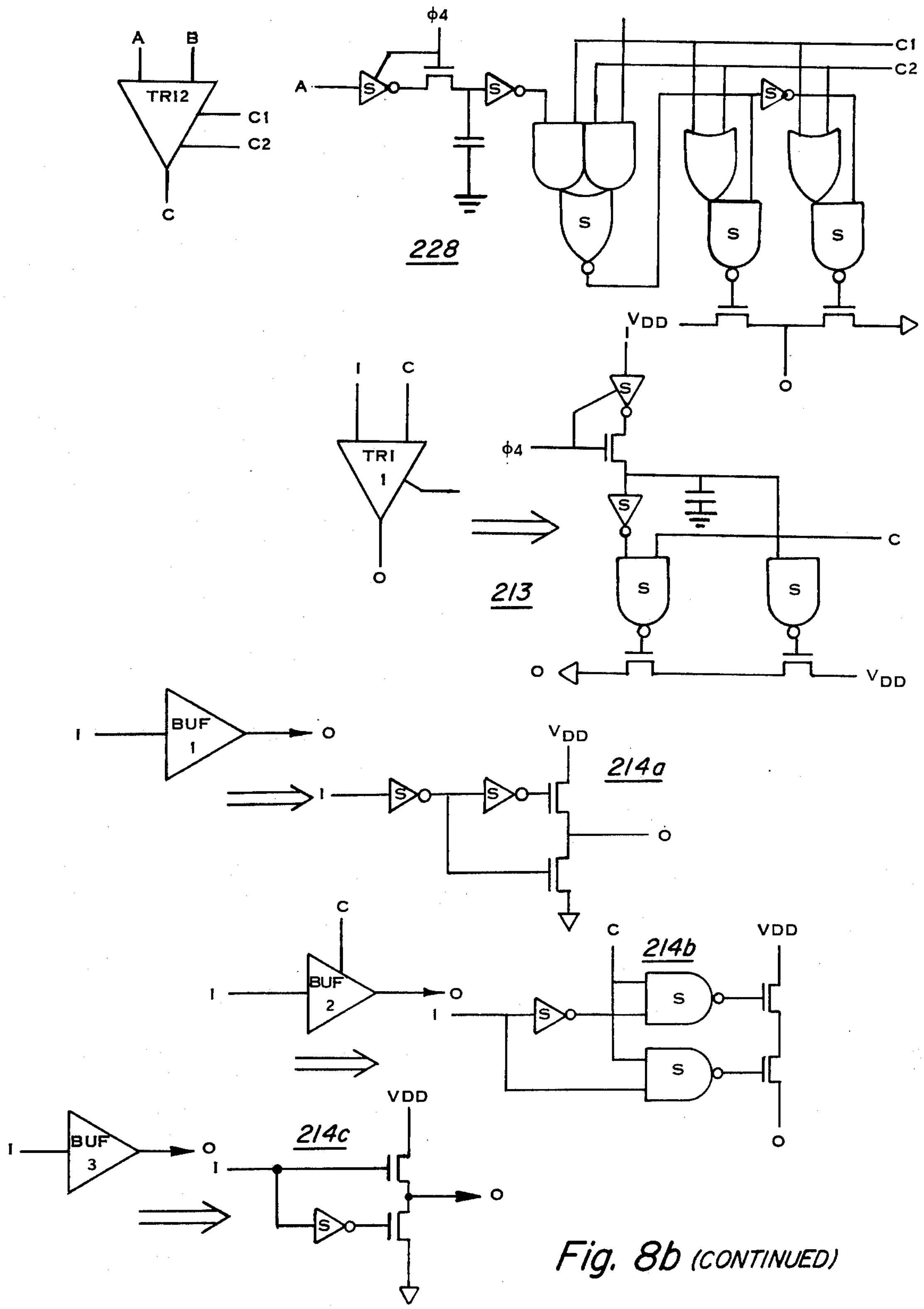
Figure 8C:
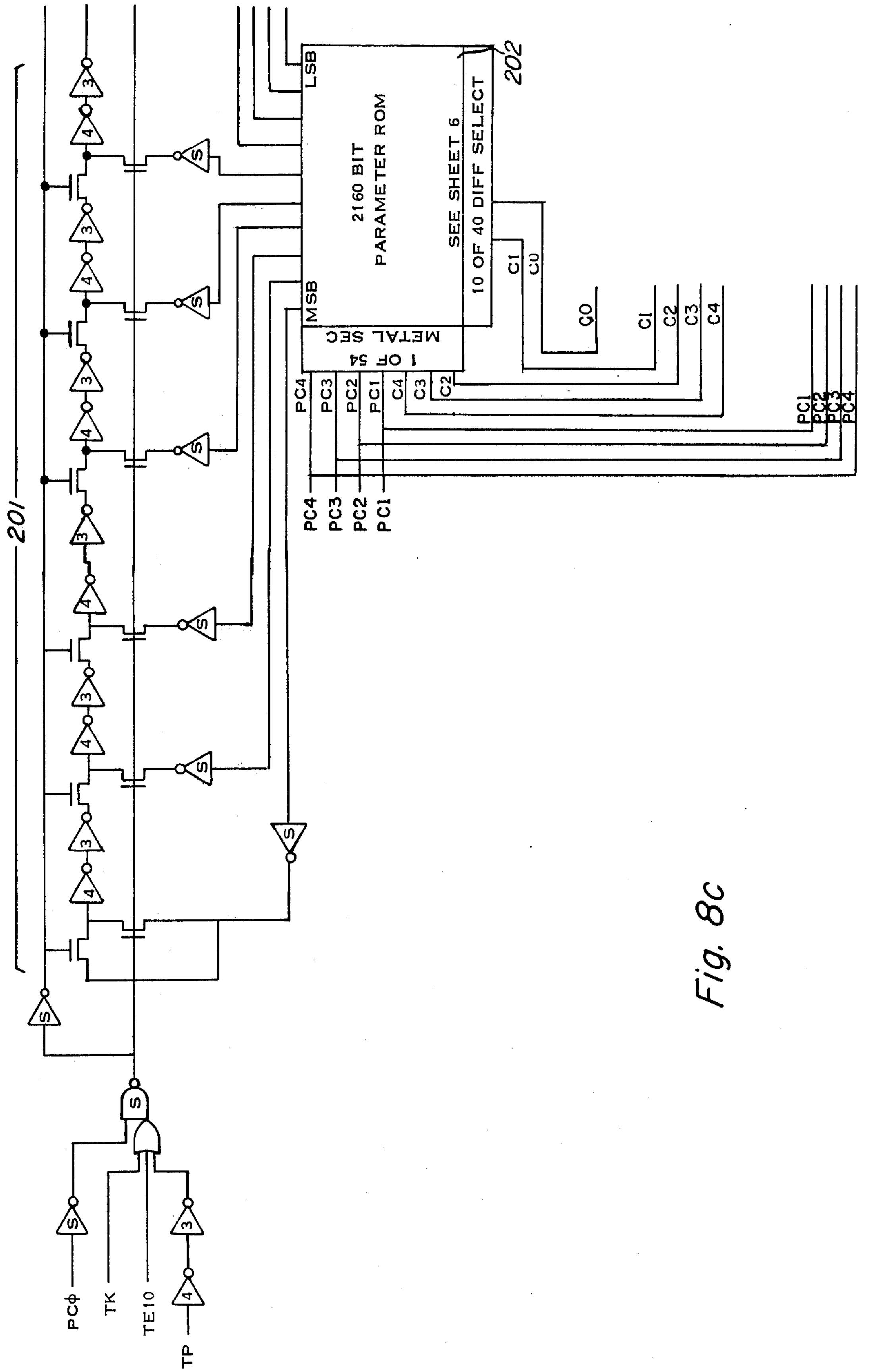
Figure 8C:
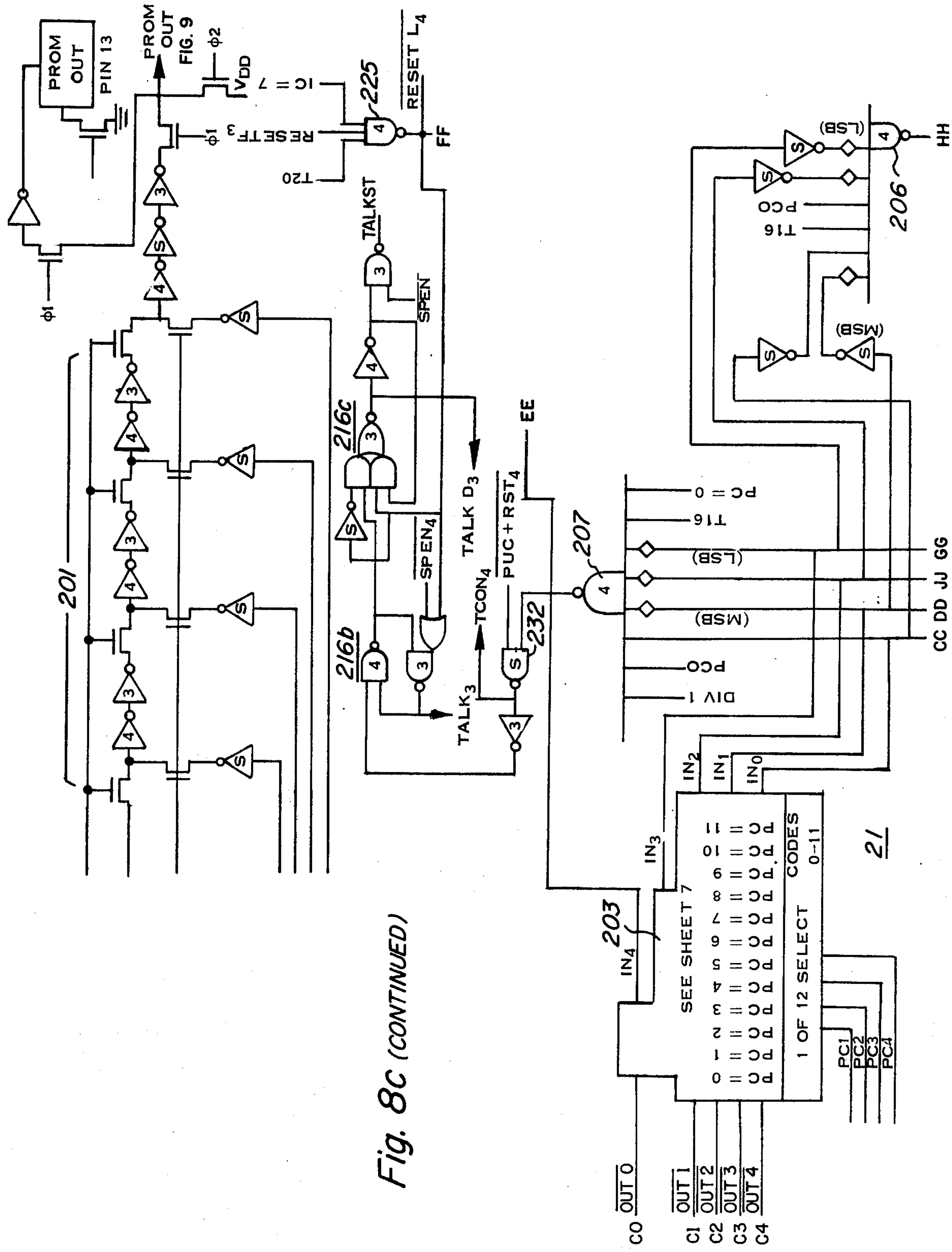

Turning now to FIGS. 8*a*, 8*b* and 8*c*, which form a composite diagram, there is shown a detailed logic diagram of ROM/Controller interface logic 21. Parameter input register 205 is coupled, at its input to address pin ADD8. Register 205 is a six bit shift register, most of the stages of which are two bits long. The stages are two bits long in this embodiment inasmuch as ROMs 12*a* and *b* output, as will be seen, data at half the rate at which data is normally clocked in synthesizer 10. At the input of parameter input register 205 is a parameter input control gate 220 which is responsive to the state of a latch 221. Latch 221 is set in response to LDP, PC0 and DIV1 all being a logical one. It is reset at T14 and in response to parameter load enable from gate 238 being a logical zero. Thus, latch 221 permits gate 220 to load data only during the A portion (as controlled by PC0) of the appropriate parameter count and at an appropriate T time (as controlled by LDP) of IC0 (as controlled by DIV1) provided parameter load enable is at a logical one. Latch 221 is reset by T14 after the data has been inputted into parameter register 205.

The coded data in parameter input register 205 is applied on lines IN0–IN4 to coded parameter RAM 203, which is addressed by PC1–PC4 to indicate which coded parameter is then being stored. The contents of register 205 is tested by all one's gate 207, all zeroes gate 206 and repeat latch 208*a*. As can be seen, gate 206 tests for all zeroes in the four least significant bits of register 205 whereas gate 207 tests for all ones in those bits. Gate 207 is also responsive to PC0, DIV1, T16 and PC=0 so that the zero condition is only tested during the time that the coded energy parameter is being loaded into parameter RAM 203. The repeat bit occurs in this embodiment immediately in front of the coded pitch parameter; therefore, it is tested during the A cycle of PC=1. Pitch latch 208*b* is set in response to all zeroes in the coded pitch parameter and is therefore responsive to not only gate 206 but also the most significant bit of the pitch data on line 222 as well as PC=1. Pitch latch 208*b* is set whenever the loaded coded pitch parameter is a 00000 indicating that the speech is to be unvoiced.

Energy=0 latch 208*c* is responsive to the output of gate 206 and PC=0 for testing whether all zeroes have been inputted as the coded energy parameter and is set in response thereto. Old pitch latch 208*d* stores the output of the pitch=0 latch 208*b* from the prior frame of speech data while old energy latch 208*e* stores the output of energy=0 latch 208*c* from the prior frame of speech data. The contents of old pitch latch 208*d* and pitch=0 latch 208*b* are compared in comparison gates 223 for the purpose of generating an INHIBIT signal. As will be seen, the INHIBIT signal inhibits interpolations and this is desirable during changes from voiced to unvoiced or unvoiced to voiced speech so that the new speech parameters are automatically inserted into K-stack 302, E10 loop 304 and pitch register 305 as opposed to being more slowly interpolated into those memory elements. Also, the contents of old energy latch 208*e* and energy=0 latch 208*c* is tested by NAND gate 224 for inhibiting interpolation for a transition from a non-speaking frame to a speaking frame of data. The outputs of NAND gate 224 and gates 223 are coupled to a NAND gate 235 whose output is inverted to INHIBIT by an inverter 236. Latches 208*a*–208*c* are reset by gate 225 and latches 208*d* and 208*e* are reset by gate 226. When the excitation signal is unvoiced, the K5–K10 coefficients are set to zero, as aforementioned. This is accomplished, in part, by the action of gate 237 which generates a ZPAR signal when pitch is equal to zero and when the parameter counter is greater than five, as indicated by PC 5 from PLA 514.

Also shown in FIGS. 8*a*–*c* is a command latch 210 which comprises three latches 210*a, b,* and *c* which latch in the data at CTL2, 4 and 8 in response to a processor data clock (PDC) signal in conjunction with a chip select (CS) signal. The contents of command latch 210 is decoded by command decoder 211 unless disabled by latches 218*a* and 218*b*. As previously mentioned, these latches are responsive to decoded LA, output and TTALK commands for disabling decoder 211 from decoding what ever data happens to be on the CTL2–CTL8 pins when subsequent PDC signals are received in conjunction with the LA, output and TTALK commands. A decoded TTALK command set TTALK latch 219. The output of TTALK latch 219, which is reset by a Processor Data Clock Leading Edge (PDCLE) signal or by an output from latch 218*b*, controls along with the output of latch 218*a* NOR gates 227*a* and *b*. The output of NOR gate 227*a* is a logical one if TTALK latch 219 is set, thereby coupling pins CTL1 to the talk latch via tristate buffer 228 and inverters 229. Tristate latch 228 is shown in detail on the right side of FIGS. 8*a*–*c*. NOR gate 227*b*, on the other hand, outputs a logical one if an output code has been detected, setting latch 228*a* and thereby connecting pins CTL1 to the most significant bit of data input register 212.

Data is shifted into data input register 212 from address pin 8 in response to a decoded read command by logics 230. RE, RB and LA instructions are outputted to ROM via instruction pins $I_0$–$I_1$ from ROM control logic 217 via buffers 214*c*. The contents of data input register 212 is outputted to CTL1–CTL4 pins via buffers 213 and to the aforementioned CTL1 pin via buffer 228 when NOR gate 227*b* inputs a logical one. CTL1–CTL4 pins are connected to address pins ADD-1–ADD4 via buffers 214*a* and CTL8 pin is connected to ADD8 pin 8 via a control buffer 214*b* which is disabled when addresses are being loaded on the ADD1–ADD8 pins by the signal on line 231.

The Talk latch 216 shown in FIGS. 8*a*–*c* preferably comprises, three latches 216*a*, 216*b* and 216*c*. Latch 216*a* is set in response to a decoded SPK command and generates, in response thereto, a speak enable (SPEN) signal. As will be seen, SPEN is also generated in response to a decoded SPKSLOW command by latch 215*a*. Latch 216*b* is set in response to speak enable during IC7 as controlled by gate 225. Latches 216*a* and 216*b* are reset in response to (1) a decoded reset command, (2) an energy equals fifteen code or (3) on a power-up clear by gate 232. Talk delayed latch 216*c* is set with the contents of latch 216*b* at the following IC7 and retains that data through eight interpolation counts. As was previously mentioned, the talk delayed latch permits the speech synthesizer to continue producing speech data for eight interpolation cycles after a coded energy=0 condition has been detected setting latch 208*c*. Likewise, slow talk latch 215 is implemented with latches 215*a*, 215*b* and 215*c*. Latch 215*a* enables the speak enable signal while latches 215*b* and 215*c* enable the production of the SLOWD signal in much the same manner as latches 216*b* 21*d* 216*c* enable the production of the TALKD signal.

Figure 7A:
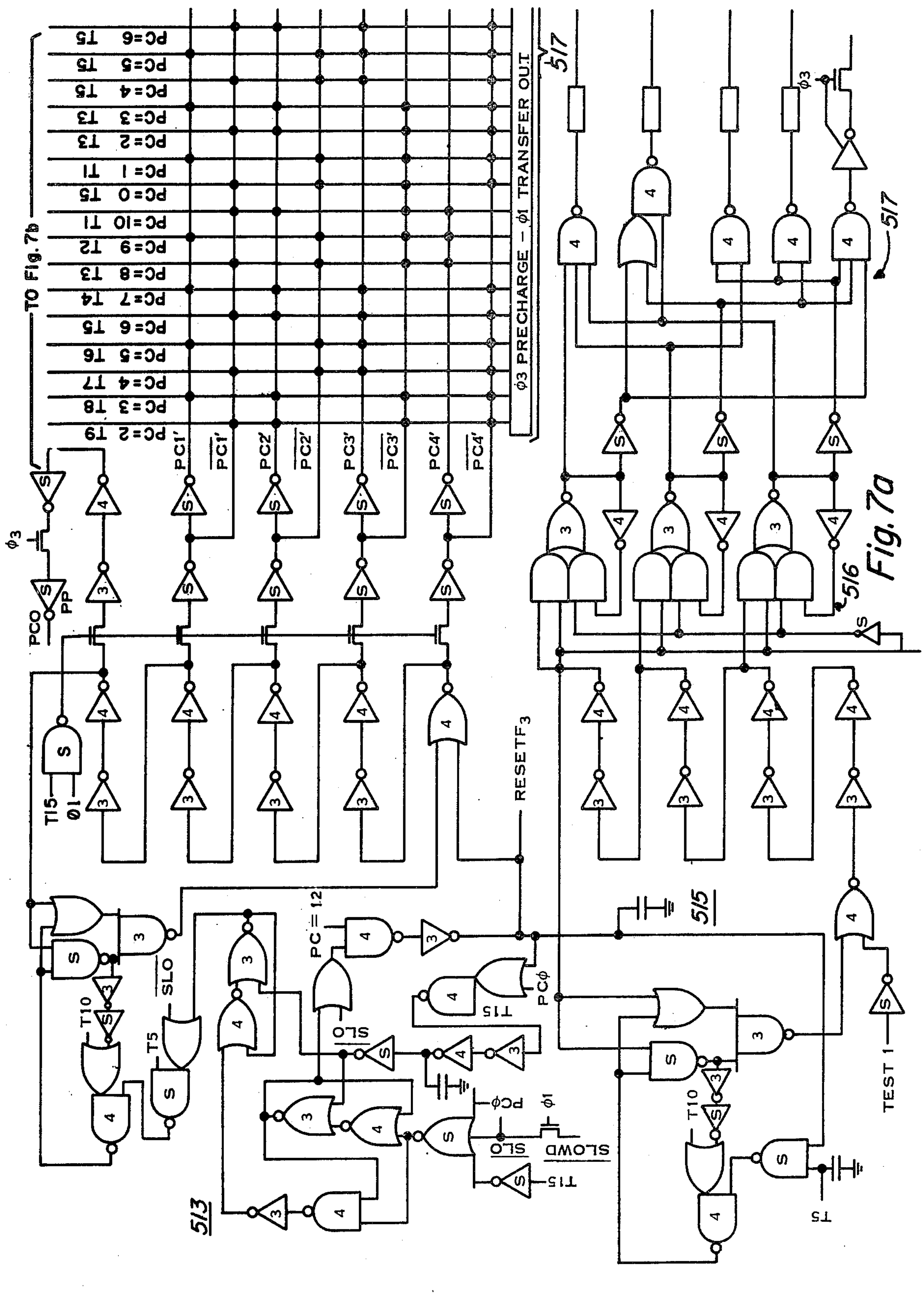
FIGS. 7*a* and 7*b* form a composite logic diagram of the synthesizer's timing circuits.
Figure 7A:
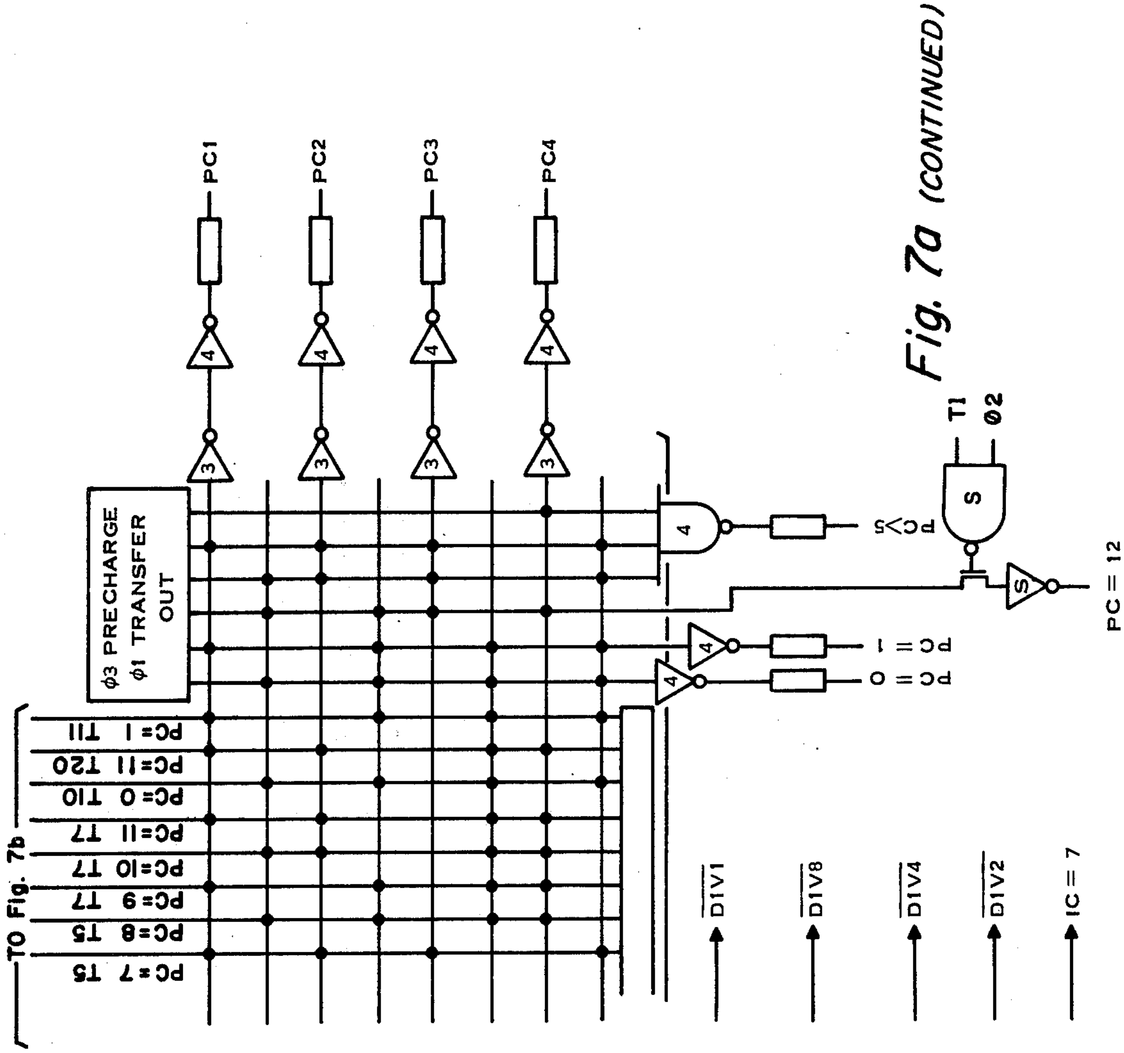
Figure 7B:
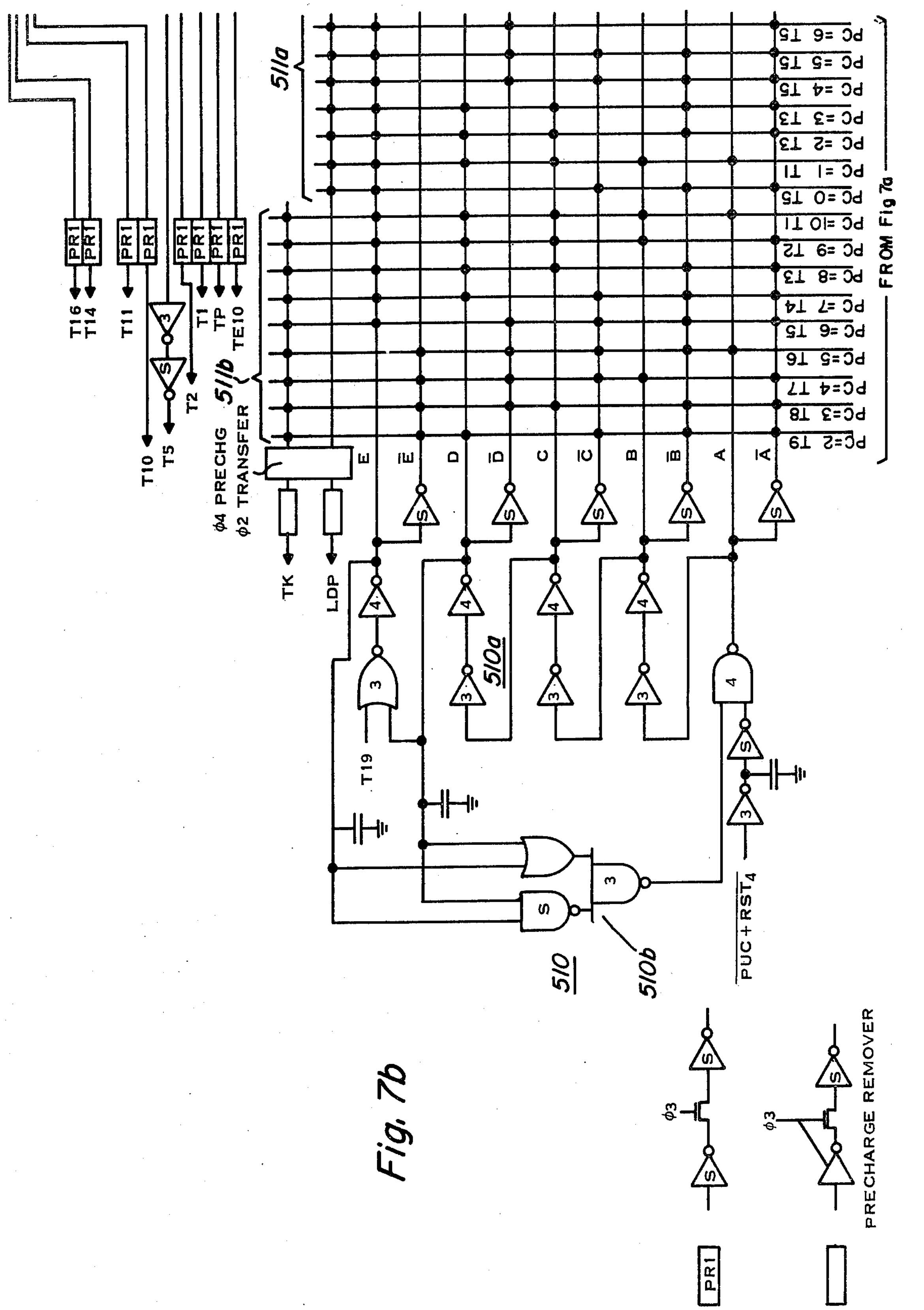
Figure 7B:
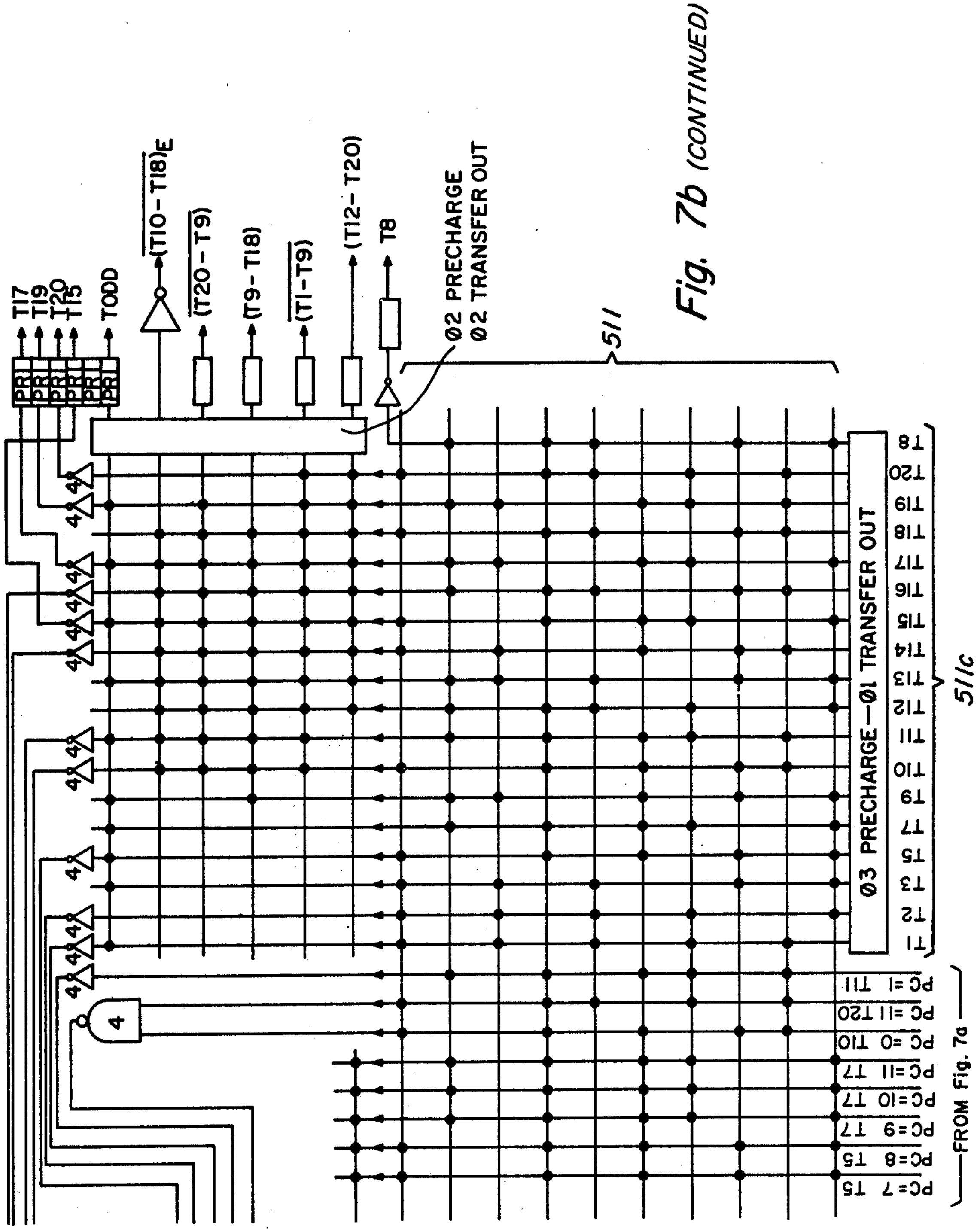

Considering now, briefly, the timing interactions for inputting data into parameter input register 205, it will be recalled that this is controlled chiefly by a control gate 220 in response to the state of a parameter input latch 221. Of course, the state of the latch is controlled by the LDP signal applied to gate 233. The PC0 and DIV1 signals applied to gate 233 to assure that the parameters are loaded during the A cycle of a particular parameter count during IC0. The particular parameter and the parameter T-Time within the parameter count is controlled by LDP according to the portion 511*a* of timing PLA 511 (FIGS. 7*a* and 7*b*). The first parameter inputted (Energy) is four bits long and therefore LDP is initiated during time period T5(as can be seen in FIGS. 7*a* and 7*b*). During parameter count 1, the repeat bit and pitch bits are inputted, this being six bits which are inputted according to LDP which comes up at time period T1. Of course, there four times periods difference between T1 and T5 but only two bits difference in the length of the inputted information. This occurs because it takes two time periods to input each bit into parameter input register 205 (which has two stages per each inputted bit) due to the fact that ROMs 12*a*–12*b* are preferably clocked at half the rate at that which synthesizer 10 is clocked. By clocking the ROM chips at half the rate, that the synthesizer 10 chip is clocked simplifies the addressing of the read-only-memories in the aforesaid ROM chips and yet, as can be seen, data is supplied to the synthesizer 10 in plenty of time for performing numerical operations thereon. Thus, in section 511*a* of timing PLA 511, LDP comes up at T1 when the corresponding parameter count indicates that a six bit parameter is to be inputted, comes up at T3 when the corresponding parameter count indicates that a five bit parameter is to be inputted, comes up at T5 when the corresponding parameter count indicates that a four bit parameter is to be inputted and comes up at time period T7b when the corresponding parameter count (EG parameter counts 9, 10, and 11) which correspond to a three bit coded parameter. ROMs 12*a*–*b* are signaled that the addressed parameter ROM is to output information when signaled via $I_0$ instruction pin, ROM control logic 217 and line 234 which provides information to ROM control logic 217 from latch 221.

Parameter Interpolator Logic Diagram

Figure 9A:
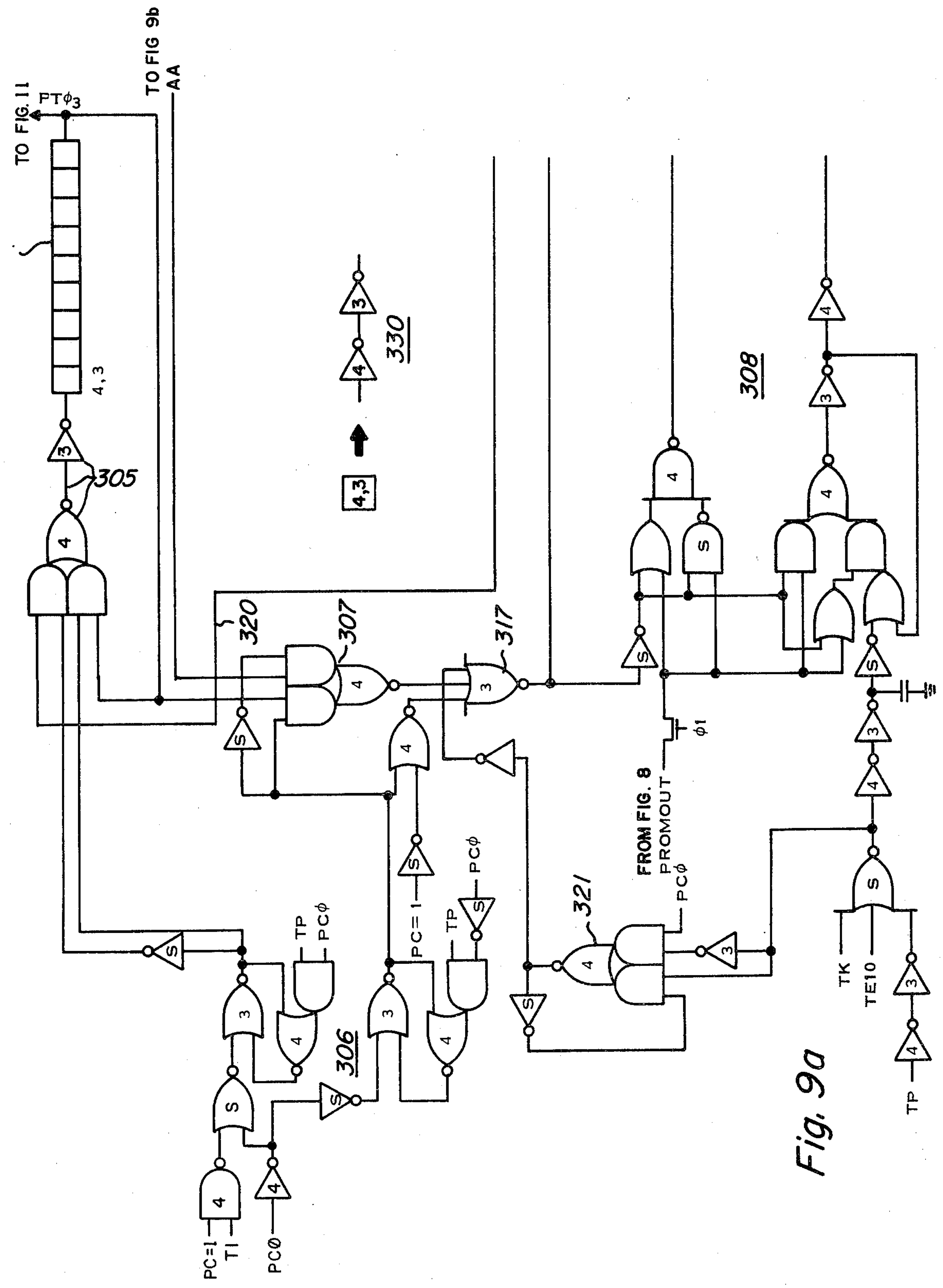
FIGS. 9*a* and 9*b* form a composite logic diagram of the iterpolator logics.
Figure 9A:
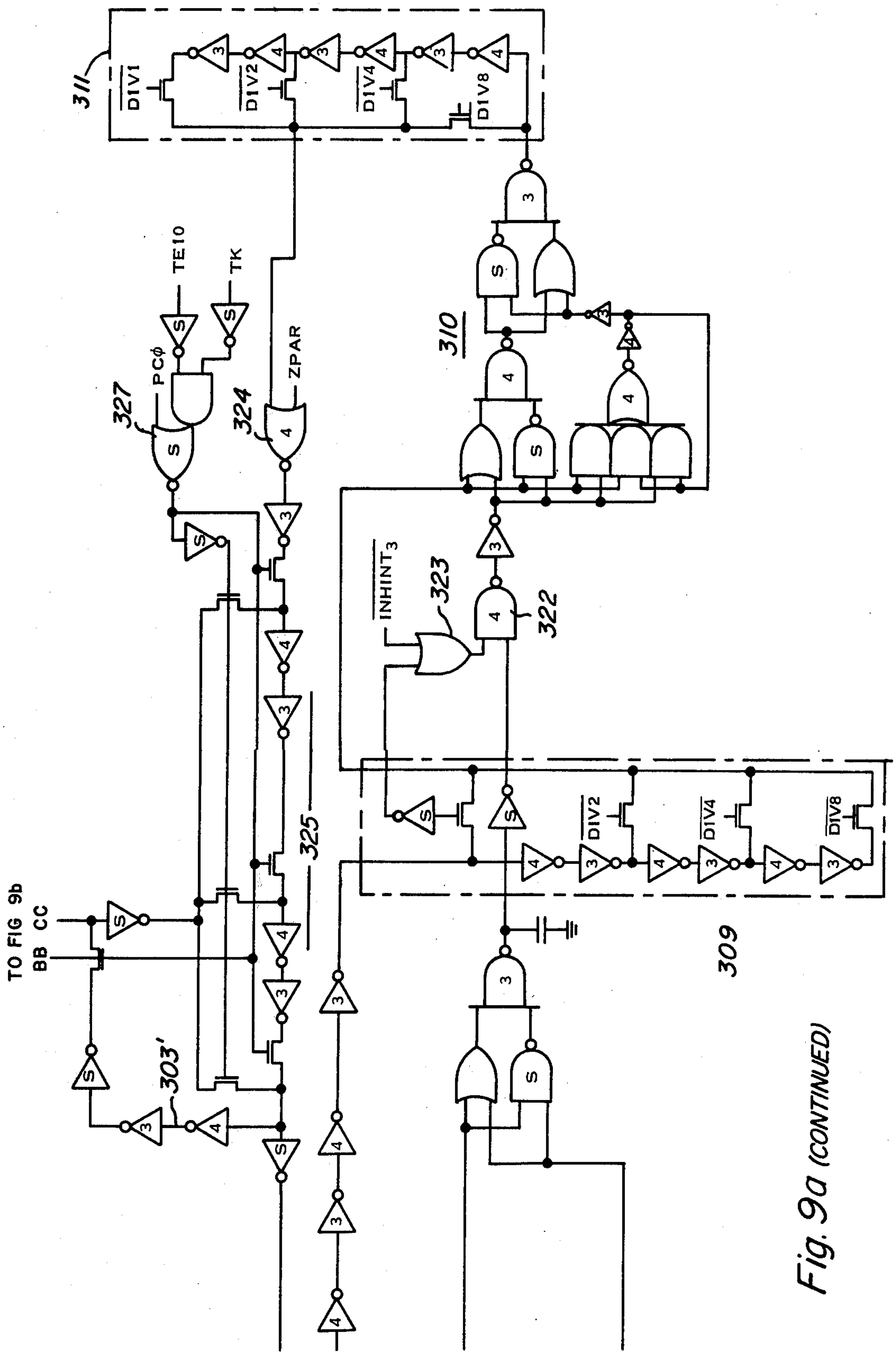
Figure 9B:
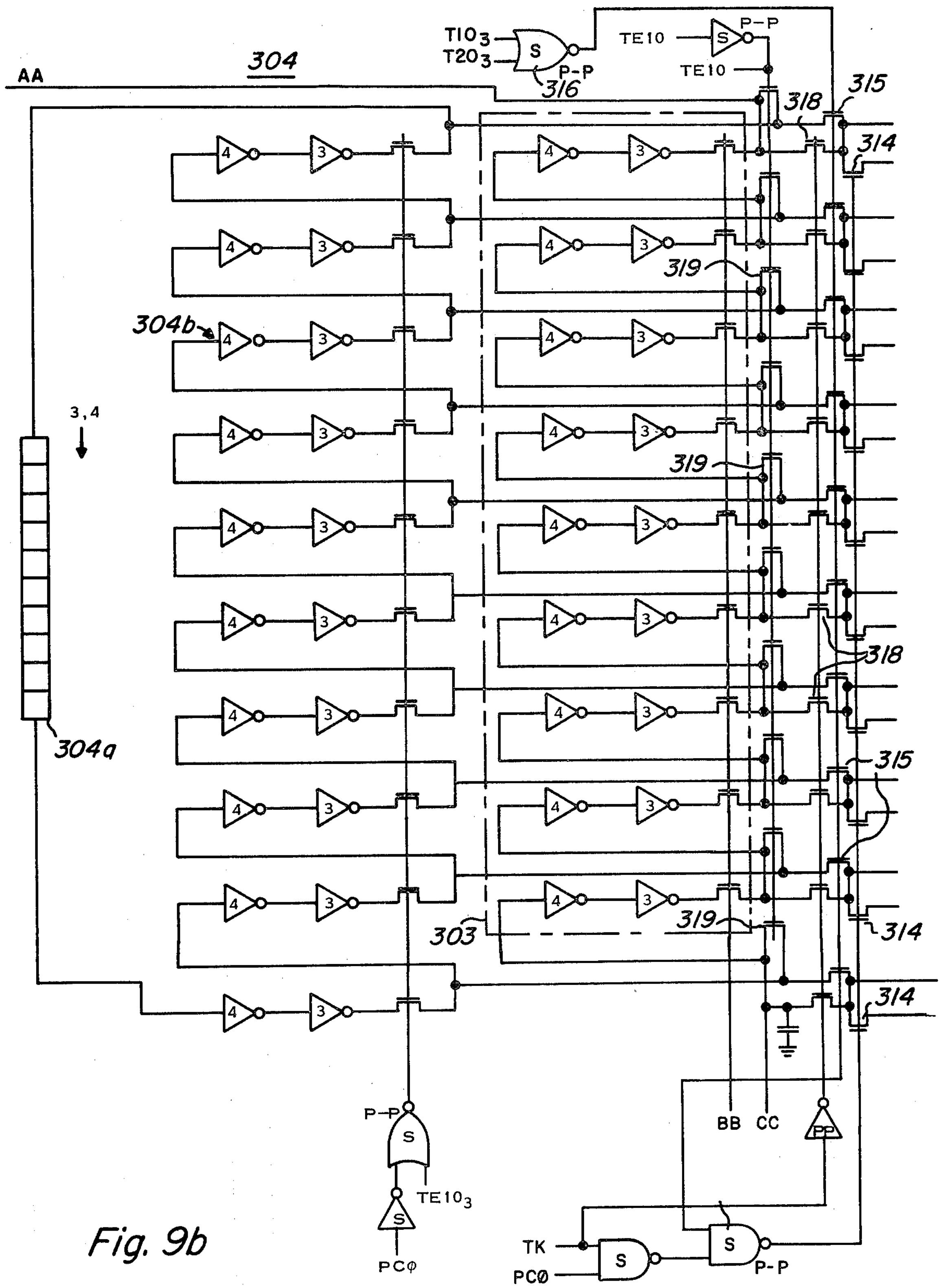
Figure 9B:
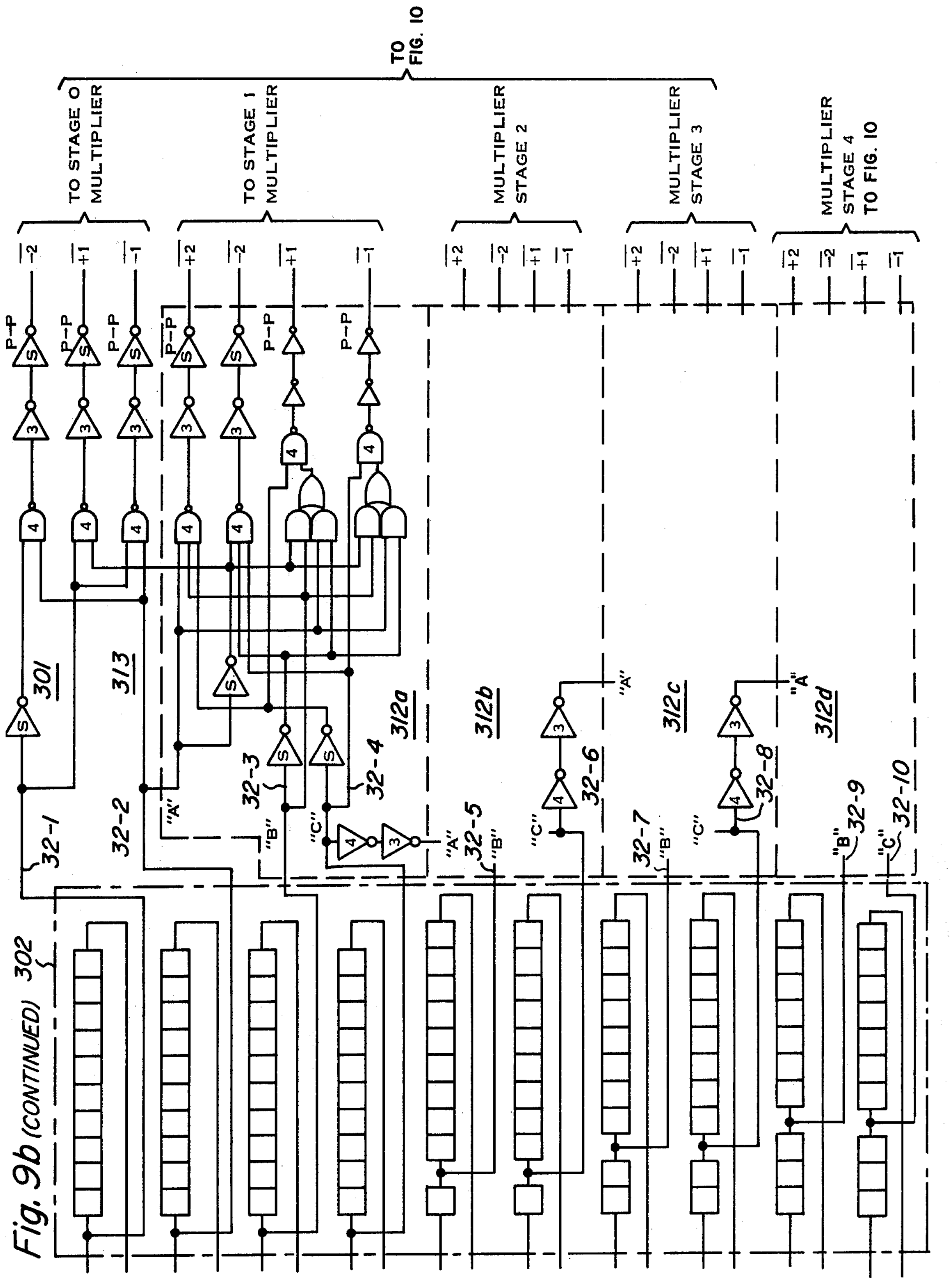

Referring now to FIGS. 9*a* and 9*b*, which form a composite diagram the parameter interpolator logic 23 is shown in detail. K-stack 203 comprises ten registers each of which store ten bits of information. Each small square represents one bit of storage, according to the convention depicted at numeral 330. The contents of each shift register is arranged to recirculate via recirculation gates 314 under control of a recirculation control gate 315. K-stack 302 stores speech coefficients K1-K9 and temporarily stores coefficient K10 or the energy parameter generally in accordance with the speech synthesis apparatus of FIG. 7 of U.S. patent application Ser. No. 807,461, since abandoned and continued in U.S. patent application Ser. No. 905,328, filed May 12, 1978. The data outputted from K-stack 302 to recoding logic 30 at various time periods is shown in Table VII. In Table III of U.S. patent application Ser. No. 807,461 since abandoned and continued in U.S. patent application Ser. No. 905,328, filed May 12, 1978, is shown the data outputted from the K-stack of FIG. 7 therof. Table VII of this patent differs from Table III of the aforementioned patent because of (1) recoding logic 301 receives the same coefficient on lines 32-1 through 32-4, on lines 32-5 and 32-6, on lines 32-7 and 32-8 and on lines 32-9 and 32-10 because, as will be seen, recoding logic 301 responds to two bits of information for each bit which was responded to by the array multiplier of the aforementioned U.S. Pat.; (2) because of the difference in time period nomenclature as was previously explained with reference to FIG. 5; and (3) because of the time delay associated with the recoding logic 301.

Figure 10A:
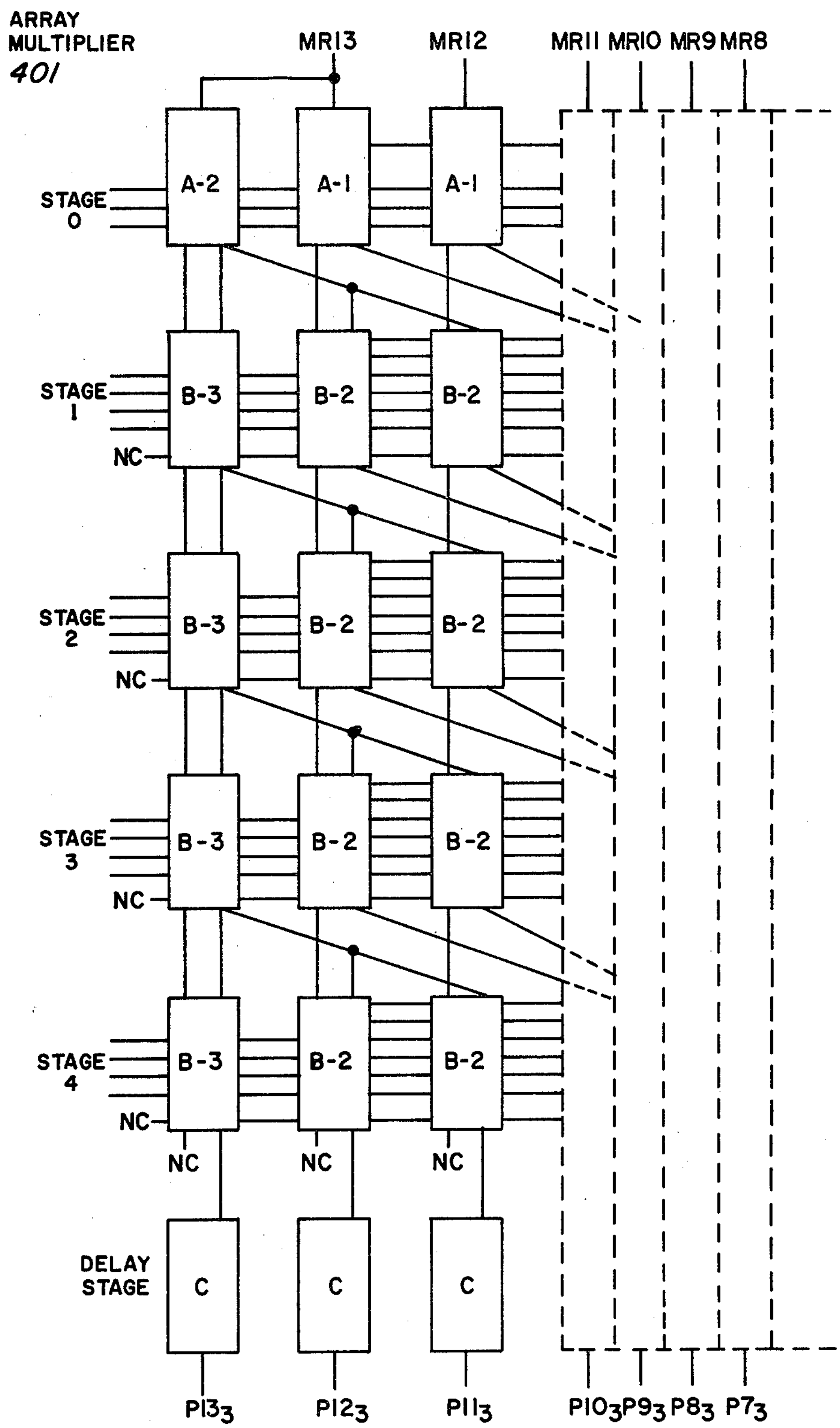
FIGS. 10*a*–10*b* form a composite logic diagram of the array multiplier.
Figure 10A:
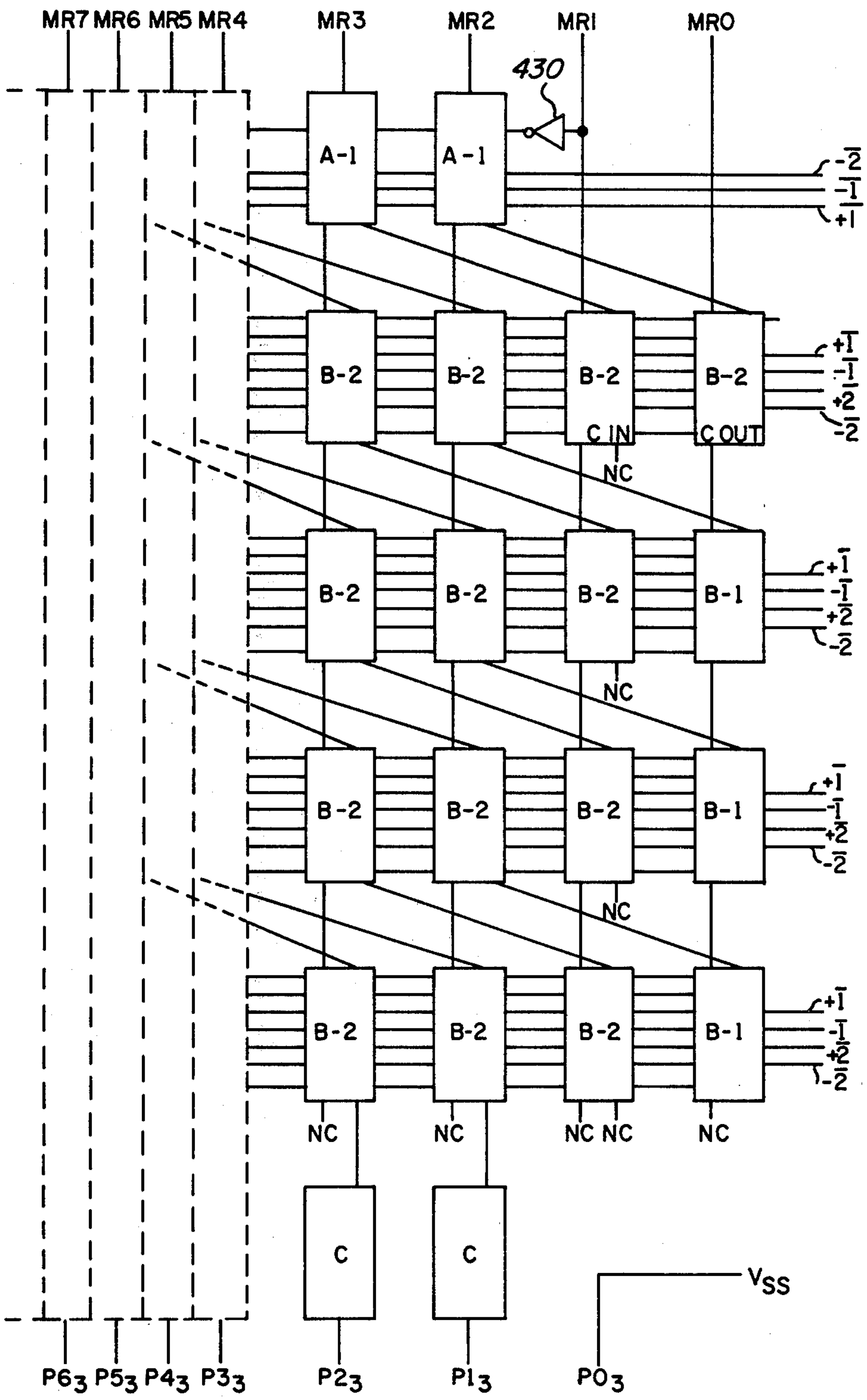
Figure 10B:
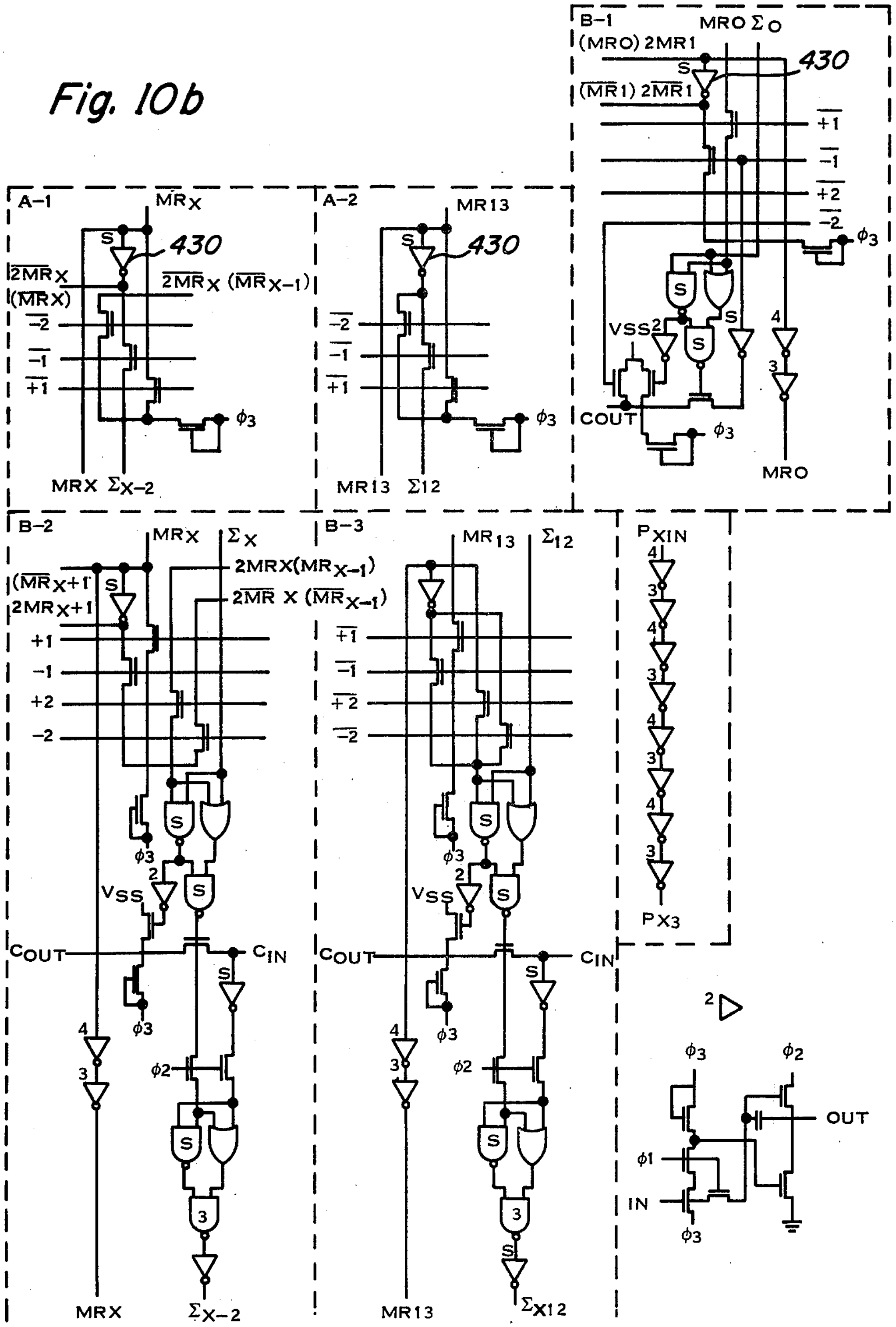

Recoding logic 301 couples K-stack 302 to array multiplier 401 (FIGS. 10*a* and 10*b*). Recoding logic 301 includes four identical recoding stages 312*a*–312*d*, only one of which, 312*a*, is shown in detail. The first stage of the recoding logic, 313, differs from stages 312*a*–312*d* basically because there is, of course, no carry, such as occurs on input A in stages 312*a*–312*d*, from a lower order stage. Recoding logic outputs $\overline{+2}$, $\overline{-2}$, $\overline{+1}$ and $\overline{-1}$ to each stage of a five stage array multiplier 401, except for stage zero which receives only $\overline{-2}$, $\overline{+1}$ and $\overline{-1}$ outputs. Effectively recoding logic 301 permits array multiplier to process, in each stage thereof, two bits in lieu of one bit of information, using Booth's algorithm. Booth's algorithm is explained in "Theory and Application of Digital SIgnal Processing", published by Prentice-Hall 1975, at pp. 517–18.

The K10 coefficient and energy are stored in E10 loop 304. E10 loop preferably comprises a twenty stage serial shift register; ten stages 304*a* of E10 loop 304 are preferably coupled in series and another ten stages 304*b* which are also coupled in series but also have parallel outputs and inputs to K-stack 302. The appropriate parameter, either energy or the K10 coefficient, is transferred from E10 loop 304 to K-stack 302 via gates 315 which are responsive to a NOR gate 316 for transferring the energy parameter from E10 loop 304 to K-stack 302 at time period T10 and transferring coefficient K10 from E10 loop 304 to K-stack 302 at time period T20. NOR gate 306 also controls recirculation control gate 315 for inhibiting recirculation in K-stack 302 when data is being transferred.

KE10 transfer register 303 facilitates the transferring of energy or the K1–K10 speech coefficients which are stored in E10 loop 304 or K-stack 302 to adder 308 and delay circuit 309 via selector 307. Register 303 has nine stages provided by paired inverters and a tenth stage being effectively provided by selector 307 and gate 317 for facilitating the transfer of ten bits of information either from E10 loop 304 or K-stack 302. Data is transferred from K-stack 302 to register 303 via transfer gates 318 which are controlled by a Transfer K (TK) signal generated by decoder portion 511*b* of timing PLA 511 (FIGS. 7*a* and 7*b*). Since the particular parameter to be interpolated and thus shifted into register 303 depends upon the particular parameter count in which the synthesizer is operating and since the particular parameter available to be outputted from K-stack 302 is a function of particular time period the synthesizer is operating in, the TK signal comes up at T9 for the pitch parameter, T8 for the K1 parameter, T7 for the K2 parameter and so forth, as is shown in FIGS. 7*a* and 7*b*. The energy parameter or the K10 coefficient is clocked out of E10 loop 304 into register 303 via gates 319 in response to a TE10 signal generated by a timing PLA 511. After each interpolation, that is during the B cycle, data is transferred from register 303 into (1) K-stack 302 via gates 318 under control of signal TK, at which time recirculation gates 314 are turned off by gate 315, or (2) E10 loop 304 via gates 319.

A ten bit pitch parameter is stored in a pitch register 305 which includes a nine stage shift register as well as recirculation elements 305*a* which provide another bit of storage. The pitch parameter normally recirculates in register 305 via gate 305*a* except when a newly interpolated pitch parameter is being provided on line 320, as controlled by pitch interpolation control logics 306. The output of pitch 305 (PTO) or the output from register 303 is applied by selector 307 to gate 317. Selector 307 is also controlled by logics 306 for normally coupling the output of register 303 to gate 317 except when the pitch is to be interpolated. Logics 306 are responsive for outputting pitch to adder 308 and delay 309 during the A cycle of PC=1 and for returning the interpolated pitch value on line 320 on the B cycle of PC=1 to register 305. Gate 317 is responsive to a latch 321 for only providing pitch, energy or coefficient information to adder 308 and delay circuit 309 during the interpolation. Since the data is serially clocked, the information may be started to be clocked during an A portion and PC0 may switch to a logical one sometime during the transferring of the information from register 303 or 305 to adder 308 or delay circuit 309, and therefore, gate 317 is controlled by an A cycle latch 321, which latch is set with PC0 at the time a transfer coefficient (TK) transfer E10 (TE10) or transfer pitch (TP) signal is generated by timing PLA 511.

The output of gate 317 is applied to adder 308 and delay circuit 309. The delay in delay circuit 309 depends on the state of DIV1-DIV8 signals generated by interpolation counter 515 (FIGS. 7*a* and 7*b*). Since the data exits gate 317 least significant bit first, by delaying the data in delay circuit 309 a selective amount, and applying the output to adder 310 along with the output of subtractor 308, the more delay there is in circuit 309, the smaller the effective magnitude of the difference from subtractor 308 which is subsequently added back in by adder 310. Delay circuit 311 couples adder 310 back into register 303 and 305. Both delay circuits 309 and 303 can insert up to three bits of delay and when adder 309 is at its maximum delay 311 is at its minimum delay and visa-versa. A NAND gate 322 couples the output of subtractor 308 to the input of adder 310. Gate 322 is responsive to the output of an OR gate 323 which is in turn responsive to INHIBIT from inverted 236 (FIGS. 8a–c). Gates 322 and 323 act to zero the output from subtractor 308 when the INHIBIT signal comes up unless the interpolation counter is at IC0 in which case the present values in K-stack 302, E10 loop 304 and P register 305 are fully interpolated to their new target values in a one step interpolation. When an unvoiced frame (FIG. 6) is supplied to the speech synthesis chip, coefficients K5–K10 are set to zero by the action of gate 324 which couples delay circuit 311 to shift register 325 whose output is then coupled to gates 305*a* and 303′. Gate 324 is responsive to the zero parameter (ZPAR) signal generated by gate 237 (FIGS. 8*a–c*).

Gate 326 disables shifting in the 304*b* portion of E10 loop 304 when a newly interpolated value of energy or K10 is being inputted into portion 304*b* from register 303. Gate 327 controls the transfer gates coupling the stages of register 303, which stages are inhibited from serially shifting data therebetween when TK or TE10 goes high during the A cycle, that is, when register 303 is to be receiving data from either K-stack 302 or E10 loop 304 as controlled by transfer gates 318 or 319, respectively. The output of gates 327 is also connected to various stages of shift register 325 and to a gate coupling 303′ with register 303. Whereby up top the three bits which may trail the ten most significant bits after an interpolation operation may be zeroed.

Array Multiplier Logic Diagram

FIGS. 10*a* and 10*b* form a composite logic diagram of array multiplier 401. Array multipliers are sometimes referred to as Pipeline Multipliers. For example, see "Pipeline Multiplier" by Granville E. Ott, published by the University of Missouri.

Array multiplier 401 has five stages, stage 0 through stage 4, and a delay stage. The delay stage is used in array multiplier 41 to give it the same equivalent delay as the array multiplier shown in U.S. patent application Ser. No. 807,461, since abandoned and continued in U.S. patent application Ser. No. 905,328, filed May 12, 1978. The input to array multiplier 401 is provided by signals $MR_0$–$MR_{13}$, from multiplier multiplexer 405. $MR_{13}$ is the most significant bit while $MR_0$ is the least significant bit. Another input to array multiplier are the aforementioned +2, −2, +1 and −1 outputs from recording logic 301 (FIGS. 8*a–c*). The output from array multiplier 401, $P_{13}$–$P_0$, is applied to summer multiplexer 402. The least significant bit thereof, P0, is in this embodiment always made a logical one because doing so establishes the mean of the truncation error as zero instead of $-\frac{1}{2}$ LSB which value would result from a simple truncation of a two's complement number.

Array multiplier 401 is shown by a plurality of box elements labeled A-1, A-2, B-1, B-2, B-3 or B-C. The specific logic elements making up these box elements are shown on the right-hand side of composite FIGS. 10*a*–10*b* in lieu of repetitively showing these elements and making up a logic diagram of FIG. 401, for simplicity sake. The A-1 and A-2 block elements make up stage zero of the array multiplier and thus are each responsive to the $\overline{-2}$, $\overline{+1}$ and $\overline{-1}$ signals outputted from decoder 313 and are further responsive to MR2–MR13. When multiplies occur in array multiplier 401, the most significant bit is always maintained in the left most column elements while the partial sums are continuously shifted toward the right. Inasmuch as each stage of array multiplier 401 operates on two binary bits, the partial sums, labeled Σn, are shifted to the right two places. Thus no A type blocks are provided for the MR0 and MR1 data inputs to the first stage. Also, since each block in array multiplier 401 is responsive to two bits of information from K-stack 302 received via recoding logic 301, each block is also responsive to two bits from multiplier multiplexer 405, which bits are inverted by inverters 430, which bits are also supplied in true logic to the B type blocks.

Filter and Excitation Generator Logic Diagram

Figure 11A:
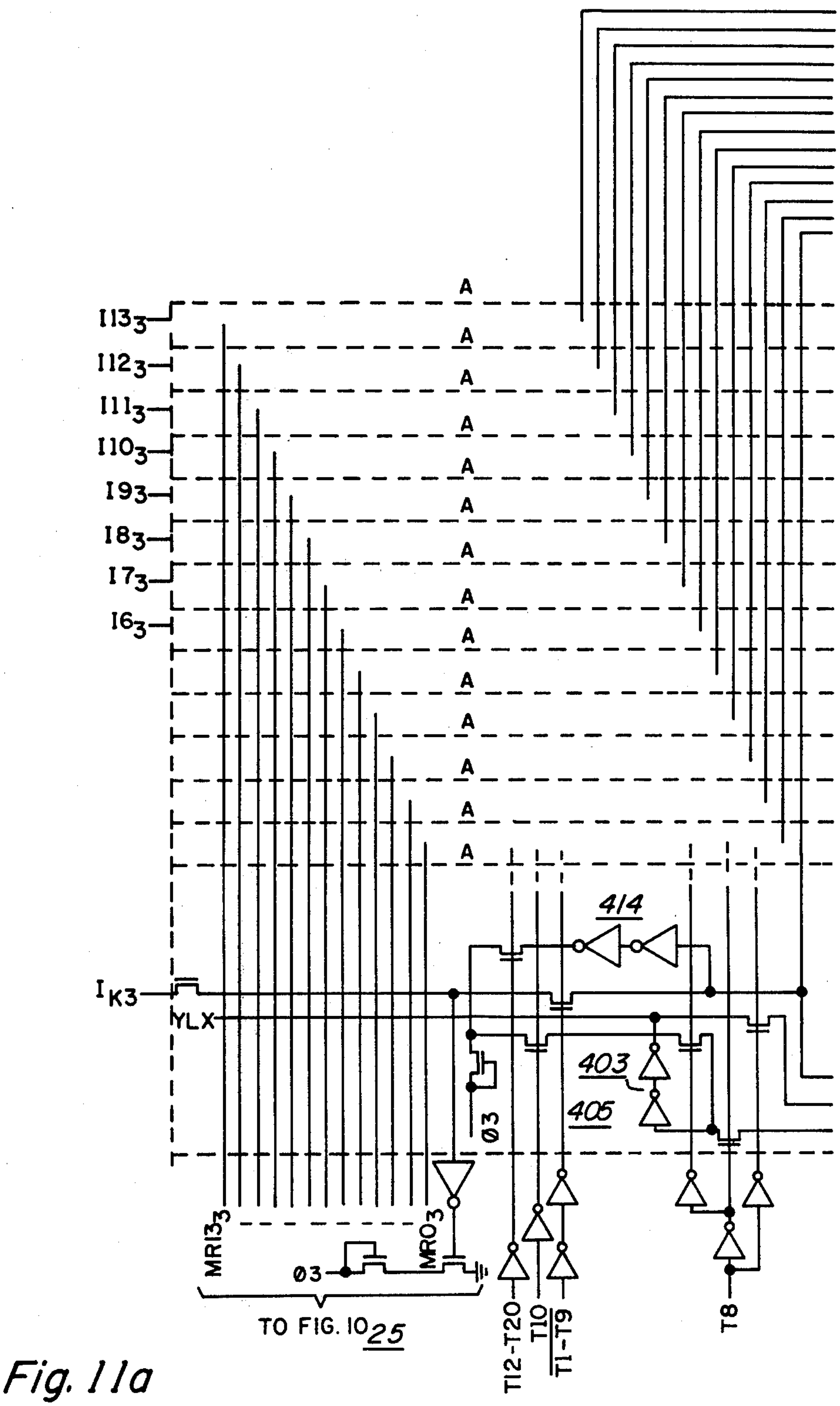
FIGS. 11*a* and 11*b* form a composite logic diagram of the speech synthesizer's lattice filter and excitation generator.
Figure 11A:
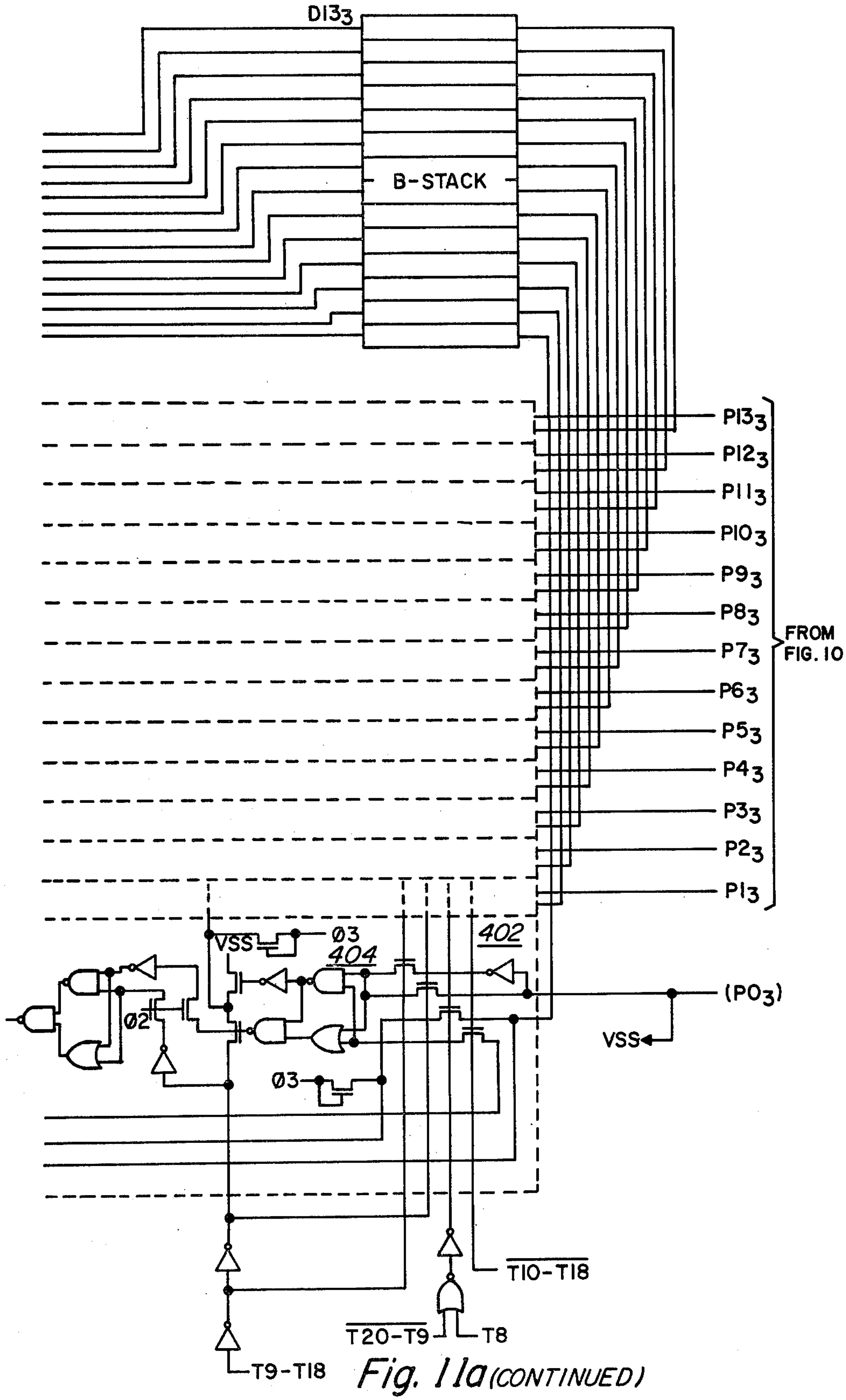
Figure 11B:
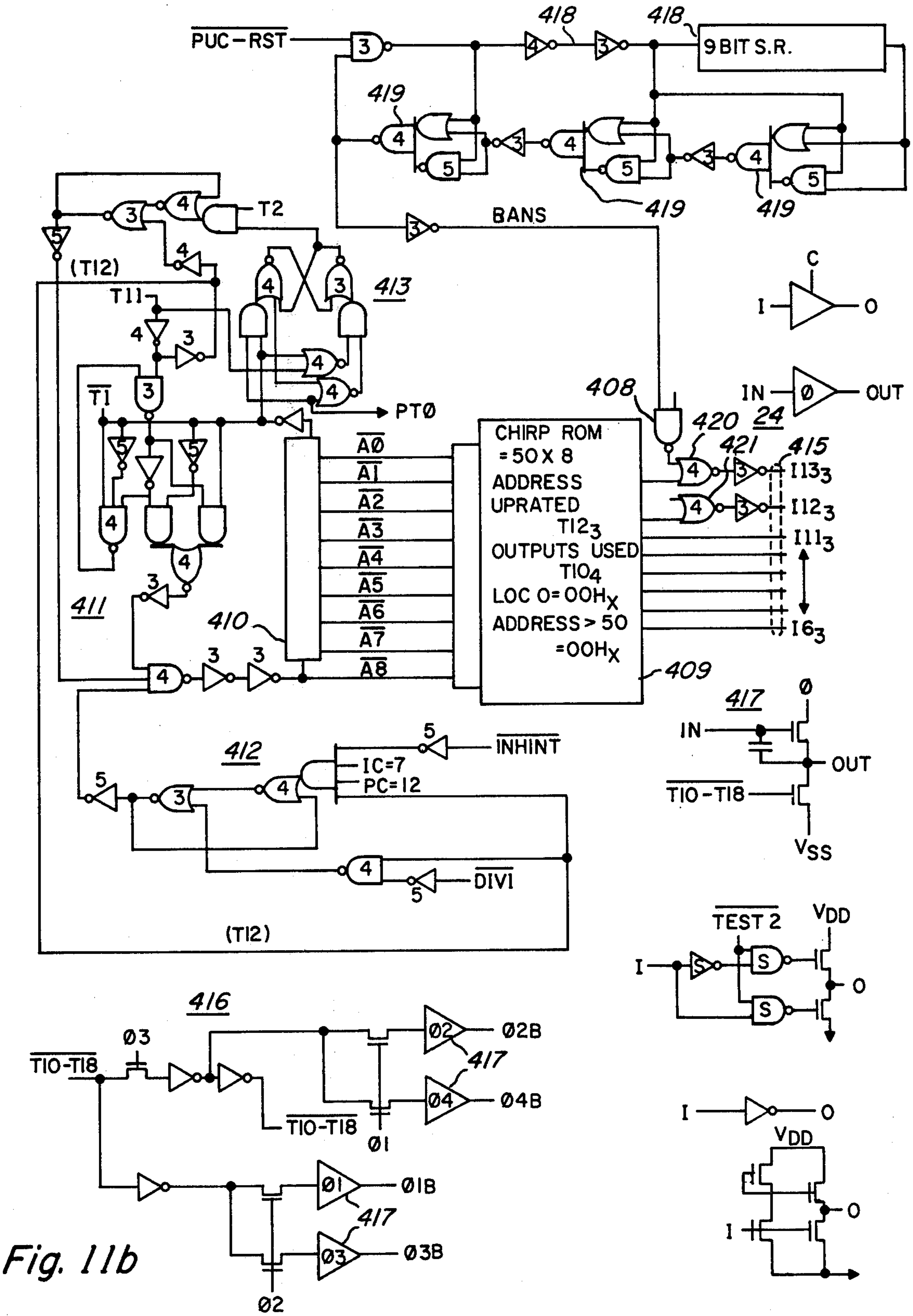
Figure 11B:
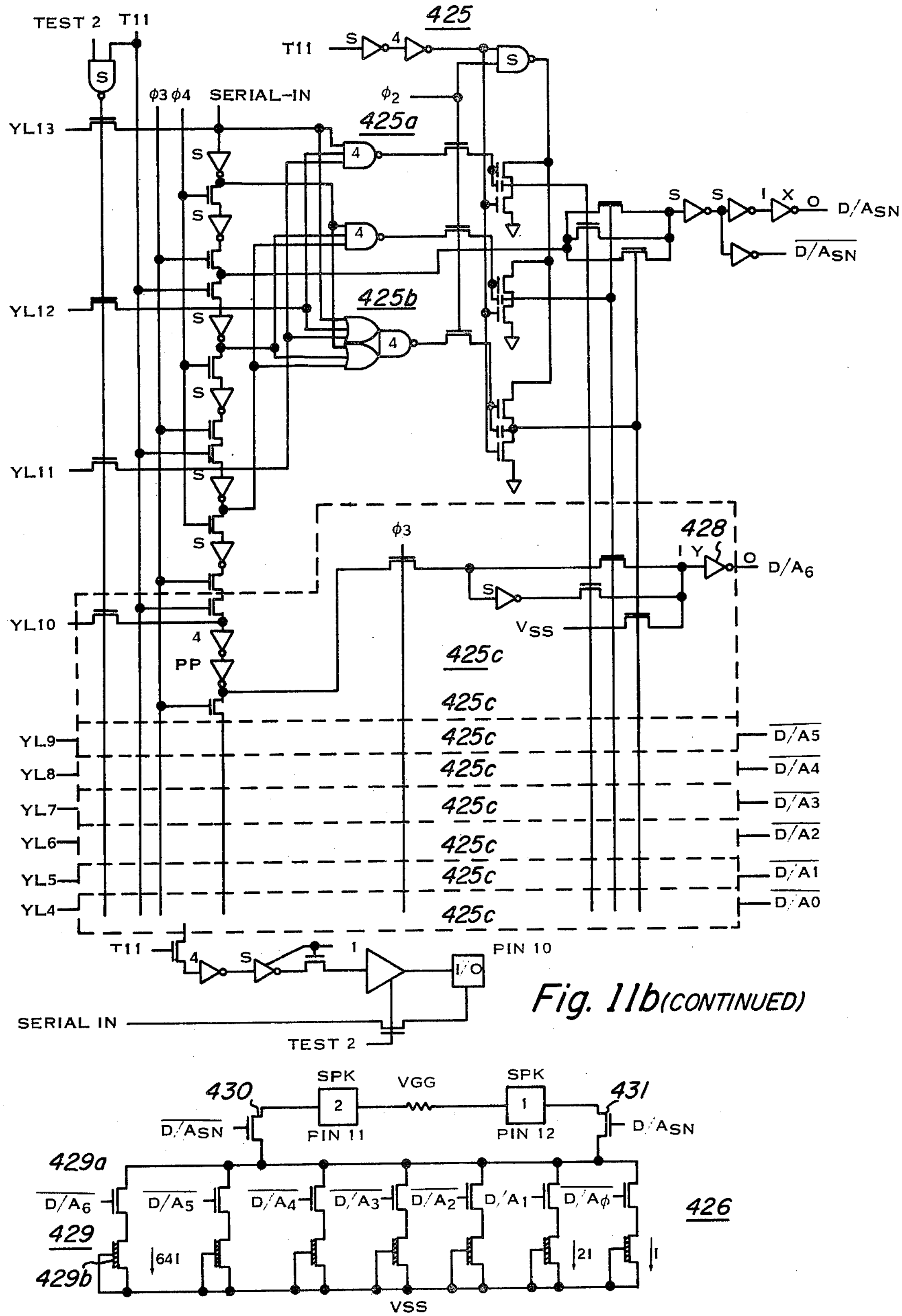

FIGS. 11*a*–11*b* form a composite, detailed logic diagram of lattice filter and excitation generator 24 (other than array multiplier 401) and output section 25. In filter and excitation generator 24 is a summer 404 which is connected to receive at one input thereof either the true or inverted output of array multiplier 401 (see FIGS. 10*a* and 10*b*) on lines P0–P13 via summer multiplexer 402. The other input of adder 404 is connected via summer multiplexer 402 to receive either the output of adder 404 (at T10–T18), the output of delay stack 406 on lines 440–453 at T20–T7 and T9), the output of Y-latch 403 (at T8) or a logical zero from φ3 precharge gate 420 (at T19 when no conditional discharge is applied to this input). The reasons these signals are applied at these times can be seen from FIG. 8 of the aforementioned U.S. patent application Ser. No. 807,461, since abandoned and continued in U.S. patent application Ser. No. 905,328, filed May 12, 1978; it is to be remembered of course, that the time period designations differs as discussed with reference to FIG. 5 hereof.

The output of adder 404 is applied to delay stack 406, multiplier multiplexer 405, one period delay gates 414 and summer multiplexer 402. Multiplier multiplexer 405 includes a one period delay gates 414 which are generally equivalent to one period delay 34′ of FIG. 7 in U.S. patent application Ser. No. 807,461, since abandoned and continued in U.S. patent application Ser. No. 905,328, filed May 12, 1978. Y-latch 403 is connected to receive the output of delay stack 406. Multiplier multiplexer 405 selectively applies the output from Y-latch 403, one period delay gates 414, or the excitation signal on bus 415 to the input MR0–MR13 of array multiplier 401. The inputs D0–D13 to delay stack 406 are derived from the outputs of adders 404. The logics for summer multiplier 402, adder 404, Y-latch 403, multiplier multiplexer 405 and one period delay circuit 414 are only shown in detail for the least significant bit as enclosed by dotted line reference A. The thirteen most significant bits in the lattice filter also are provided by logics such as those enclosed by the reference A line, which logics are denoted by long rectangular phantom line boxes labeled "A". The logics for each parallel bit being processed in the lattice filter are not shown in detail for sake of clarity. The portions of the lattice filter handling bits more significant than the least significant bit differ from the logic shown for elements 402, 403, 404, 405, and 414 only with respect to the interconnections made with truncation logics 501 and bus 415 which connects to UV gate 408 and chirp ROM 409. In this respect, the output from UV gate 408 and chirp ROM 409 is only applied to inputs I13–I6 and therefore the input labeled $I_x$ within the reference A phantom line is not needed for the six least significant bits in the lattice filter. Similarly, the output from the Y-latch 403 is only applied for the ten most significant bits, $YL_{13}$ through $YL_4$, and therefore the connection labeled $YL_x$ within the reference line is not required for the four least significant bits in the lattice filter.

Delay stack 406 comprises 14 nine bit long shift registers, each stage of which comprise inverters clocked on φ4 and φ3 clocks. As is discussed is U.S. patent application Ser. No. 807,461, since abandoned and continued in U.S. patent application Ser. No. 905,328, filed May 12, 1978, the delay stack 406 which generally corresponds to shift register 35' of FIG. 7 of the aforementioned patent, is only shifted on certain time periods. This is accomplished by logics 416 whereby φB–φ4B clocks are generated from T10–T18 timing signal from PLA 512 (FIGS. *7a* and *7b*). The clock buffers 417 in circuit 416 are also shown in detail in FIGS. 11*a* and 11*b*.

Delay stack 406 is nine bits long whereas shift register 35' in FIG. 7 of U.S. patent application Ser. No. 807,461, since abandoned and continued in U.S. patent application Ser. No. 905,328, filed May 12, 1978, was eight bits long; this difference occurs because the input to delay stack 406 is shown as being connected from the output of adder 404 as opposed to the output of one period delay circuit 414. Of course, the input to delay stack 406 could be connected from the outputs of one period delay cicuit 414 and the timing associated therewith modified to correspond with that shown in U.S. patent application Ser. No. 807,461, since abandoned and continued in U.S. patent application Ser. No. 905,328, filed May 12, 1978.

The data handled in delay stack 406, array multiplier 401, adder 402, summer multiplexer 402, Y-latch 403, and multiplier multiplexer 405 is preferably handled in two's complement notation.

Unvoiced generator 407 is a random noise generator comprising a shift register 418 with a feedback term supplied by feedback logics 419 for generating pseudo-random terms in shift register 418. An output is taken therefrom and is applied to UV gate 408 which is also responsive to OLDP from latch 208*d* (FIGS. 8*a* and 8*b*). Old pitch latch 208*d* controls gate 408 because pitch=0 latch 208*b* changes state immediately when the new speech parameters are inputted to register 205. However, since this occurs during interpolation count IC0 and since, during an unvoiced condition the new values are not interpolated into K-stack 302, E10 loop 304 and pitch register 305 until the following IC0, the speech excitation value cannot change from a periodic excitation from chirp ROM 409 to a random excitation from unvoiced generator 407 until eight interpolation cycles have occurred. Gate 420 nors the output of gate 408 into the most significant bit of the excitation signal, $I_{13}$, thereby effectively causing the sign bit to randomly change during unvoiced speech. Gate 421 effectively forces the most significant bit of the excitation signal, $I_{12}$, to a logical one during unvoiced speech conditions. Thus the combined effect of gates 408, 420 and 421 is to cause a randomly changing sign to be associated with a steady decimal equivalent value of 0.5 to be applied to the lattice filter and Filtering Excitation Generator 24.

Figure 14A:
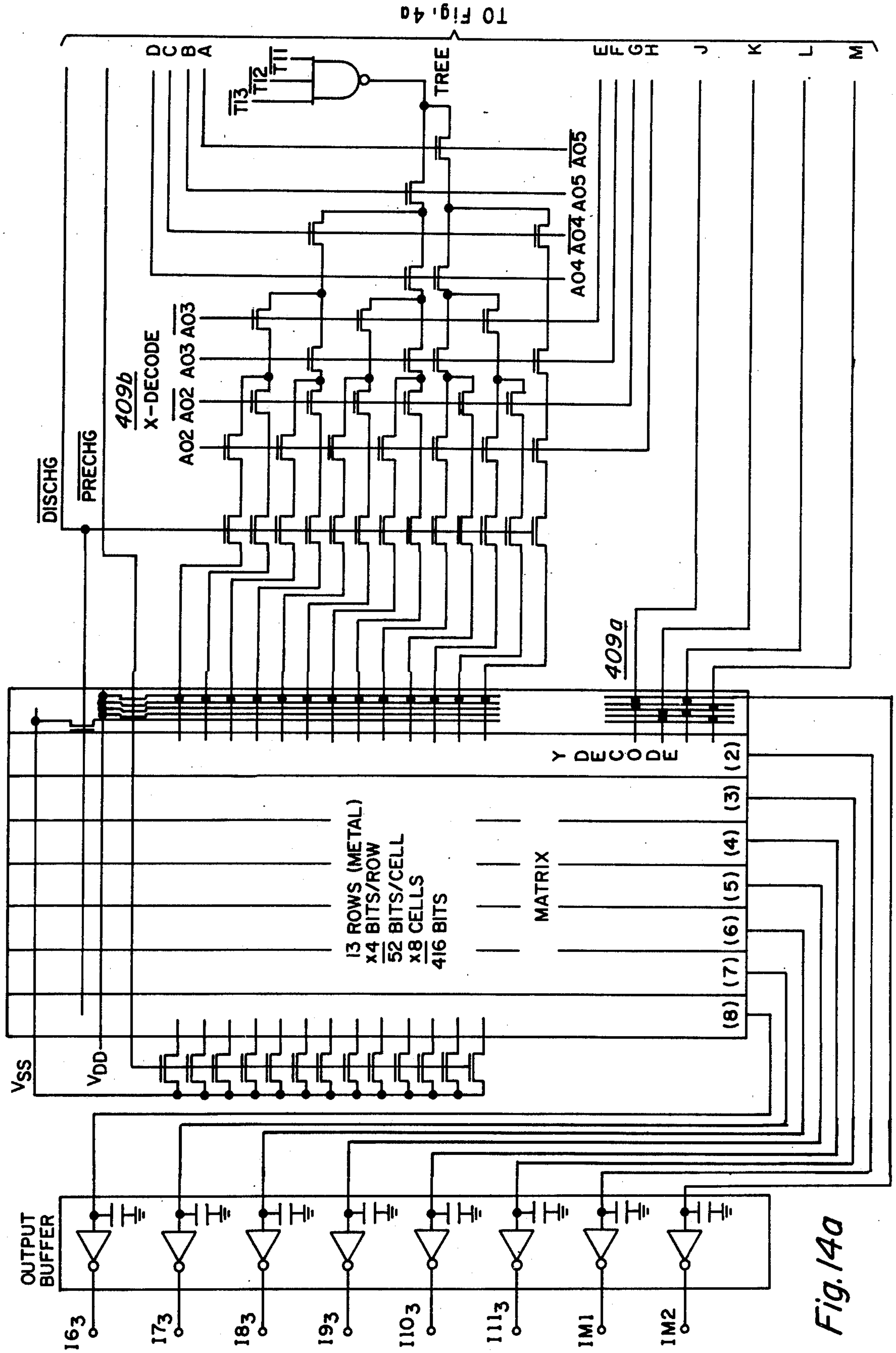
FIGS. 14*a*–14*b* form a composite diagram of the chirp ROM.
Figure 14B:
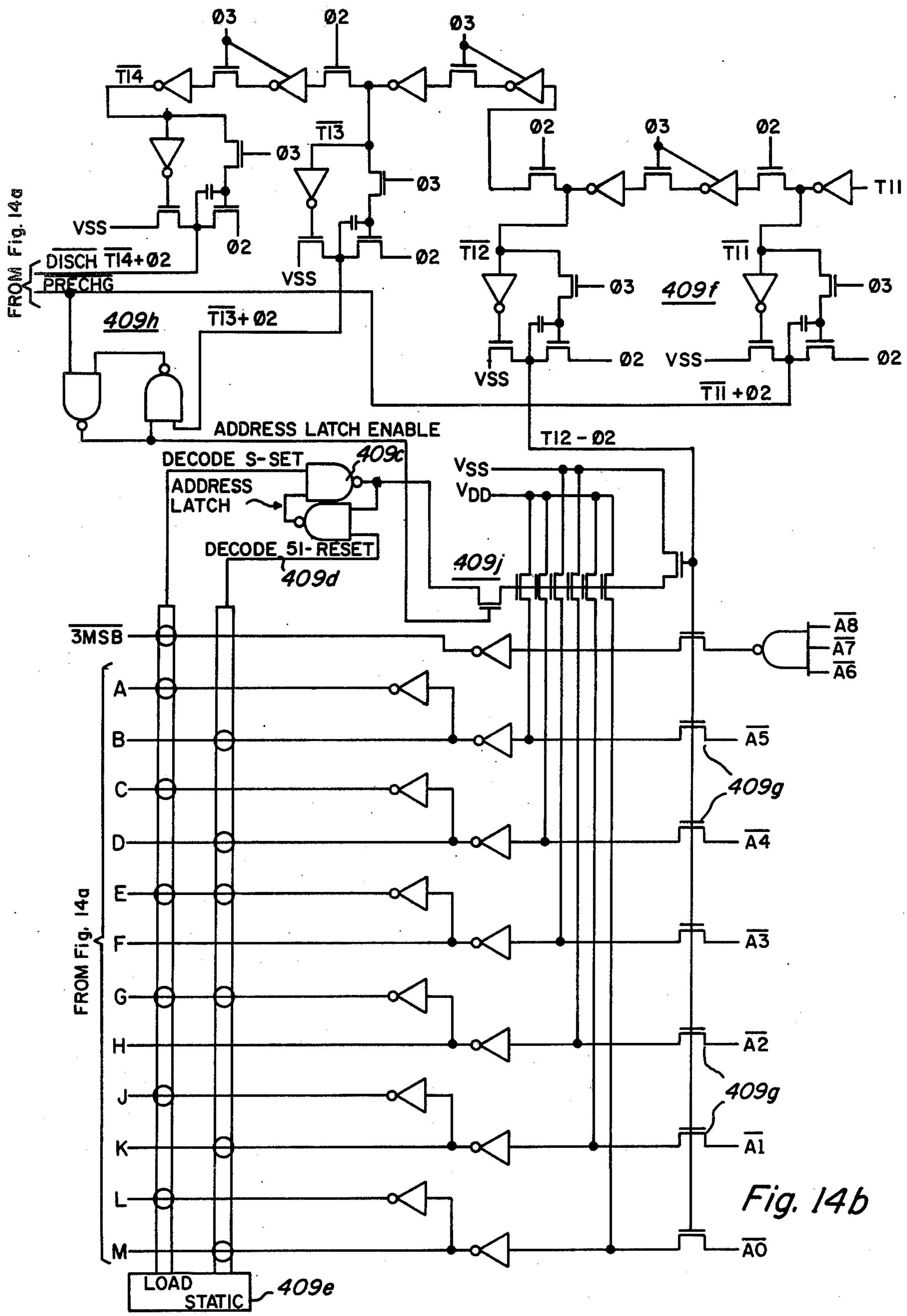

During voiced speech, chirp ROM 409 provides an eight bit output on lines $I_6$–$I_{13}$ to the lattice filter. This output comprises forty-one successively changing values which, when graphed, represent a chirp function. The contents of ROM 409 are listed in Table VIII; ROM 404 is set up to invert its outputs and thus the data is stored therein in complemented format. The chirp function value and the complemented value stored in the chirp ROM are expressed in two's complement hexadecimal notation. ROM 409 is addressed by an eight bit register 410 whose contents are normally updated during each cycle through the lattice filter by add one circuit 411. The output of register 410 is compared with the contents of pitch register 305 in a magnitude comparitor 403 for zeroing the contents of 410 when the contents of register 410 become equal to or greater than the contents of register 305. ROM 409, which is shown in greater detail in FIGS. 14*a*–14*b*, is arranged so that addresses greater than 110010 cause all zeroes to be outputted on lines $I_{13}$–$I_6$ to multiplier multiplexer 405. Zeros are also stored in address locations 41–51. Thus, the chirp may be expanded to occupy up to address location fifty, if desired.

Random Access Memory Logic Diagram

Figures 12A, 12B:
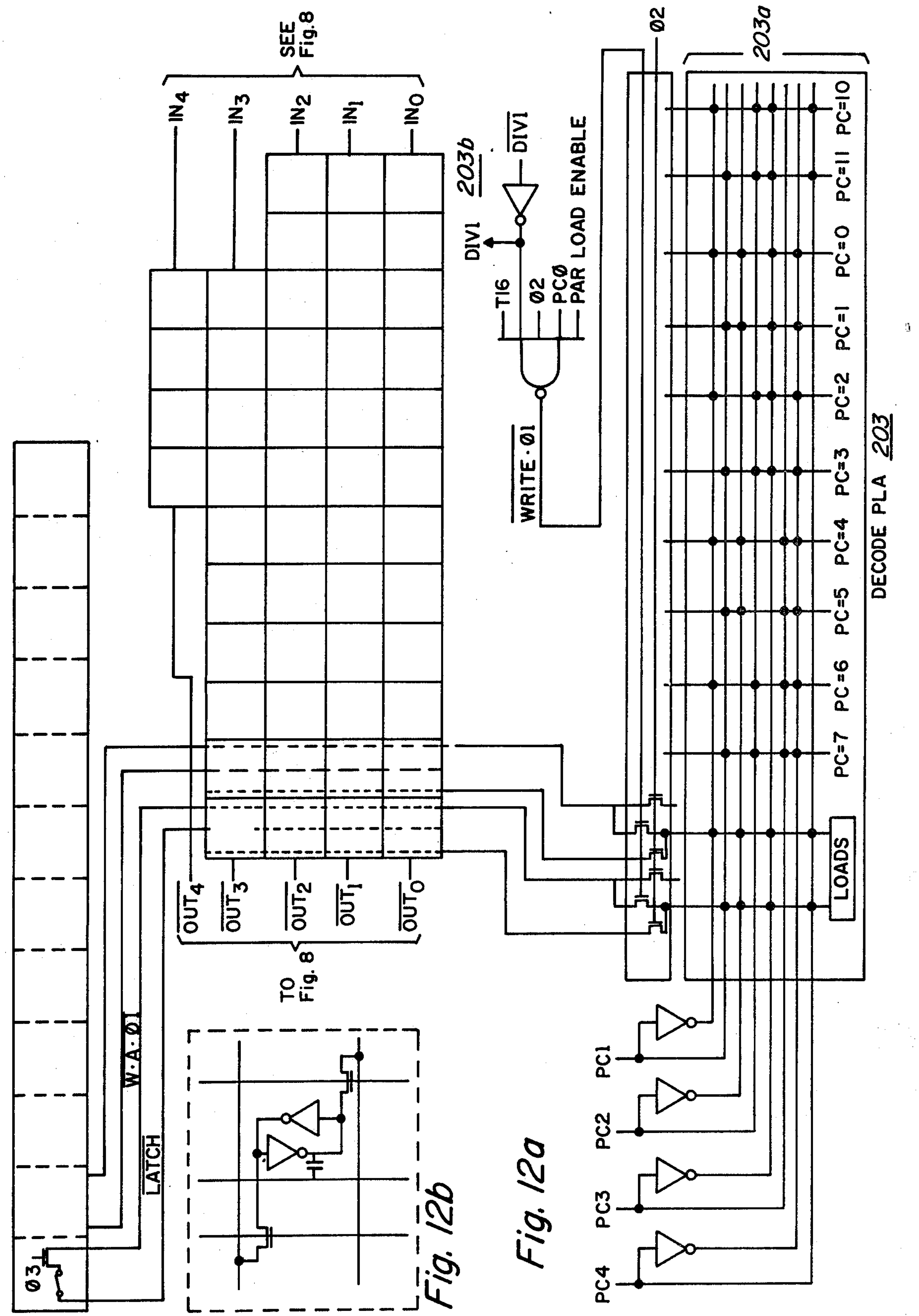
FIGS. 12*a* and 12*b* are schematic diagrams of the parameter RAM.

Referring now to FIGS. 12*a*–12*b*, there is shown a composite detailed logic diagram of RAM 203. RAM 203 is addressed by address on PC1–PC4, which address is decoded in a PLA 203*a* and defines which coded parameter is to be inputted into RAM 203. RAM 203 stores the twelve decoded parameters, the parameters having bit lengths varing between three bits and five bits according to the decoding scheme described with reference to FIG. 6. Each cell, reference B, of RAM 203 is shown in greater detail in FIG. 12*b*. Read/-Write control logic 203*b* is responsive to T1, DIV1, PC0 and parameter load enable for writing into the RAM 203 during the A cycle of each parameter count during interpolation count zero when enabled by parameter load enable from logics 238 (FIGS. 8*a*–c). Data is inputted to RAM 203 on lines IN0–IN4 from register 205 as shown in FIGS. 8*a* and 8*b* and data is outputted on lines OUT1-OUT5 to ROM 202 as is shown in the aforementioned Figures

Parameter Read-Only-Memory Logic Diagram

Figure 13A:
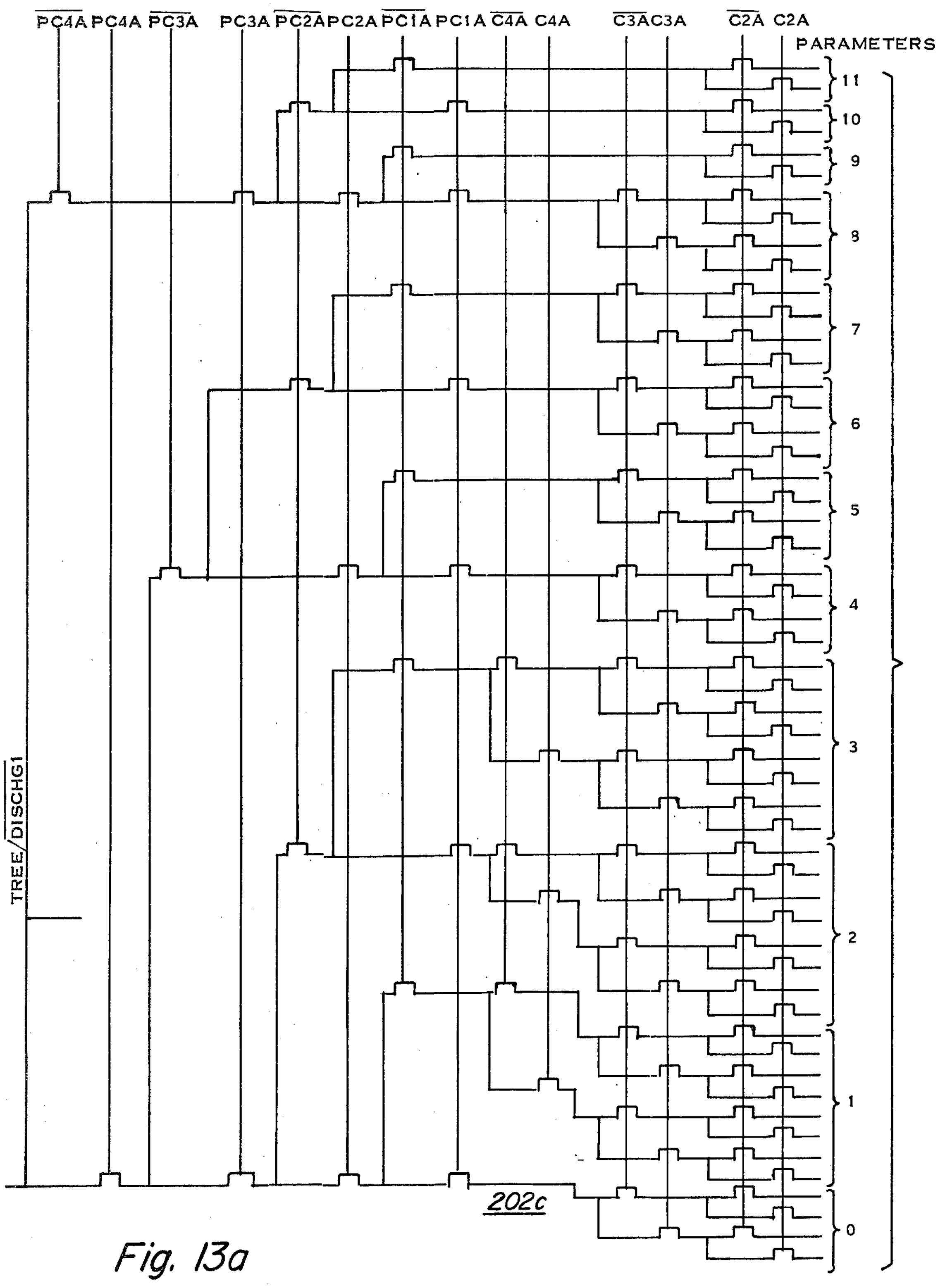
FIGS. 13*a* and 13*b* are schematic diagrams of the parameter ROM.
Figure 13B:
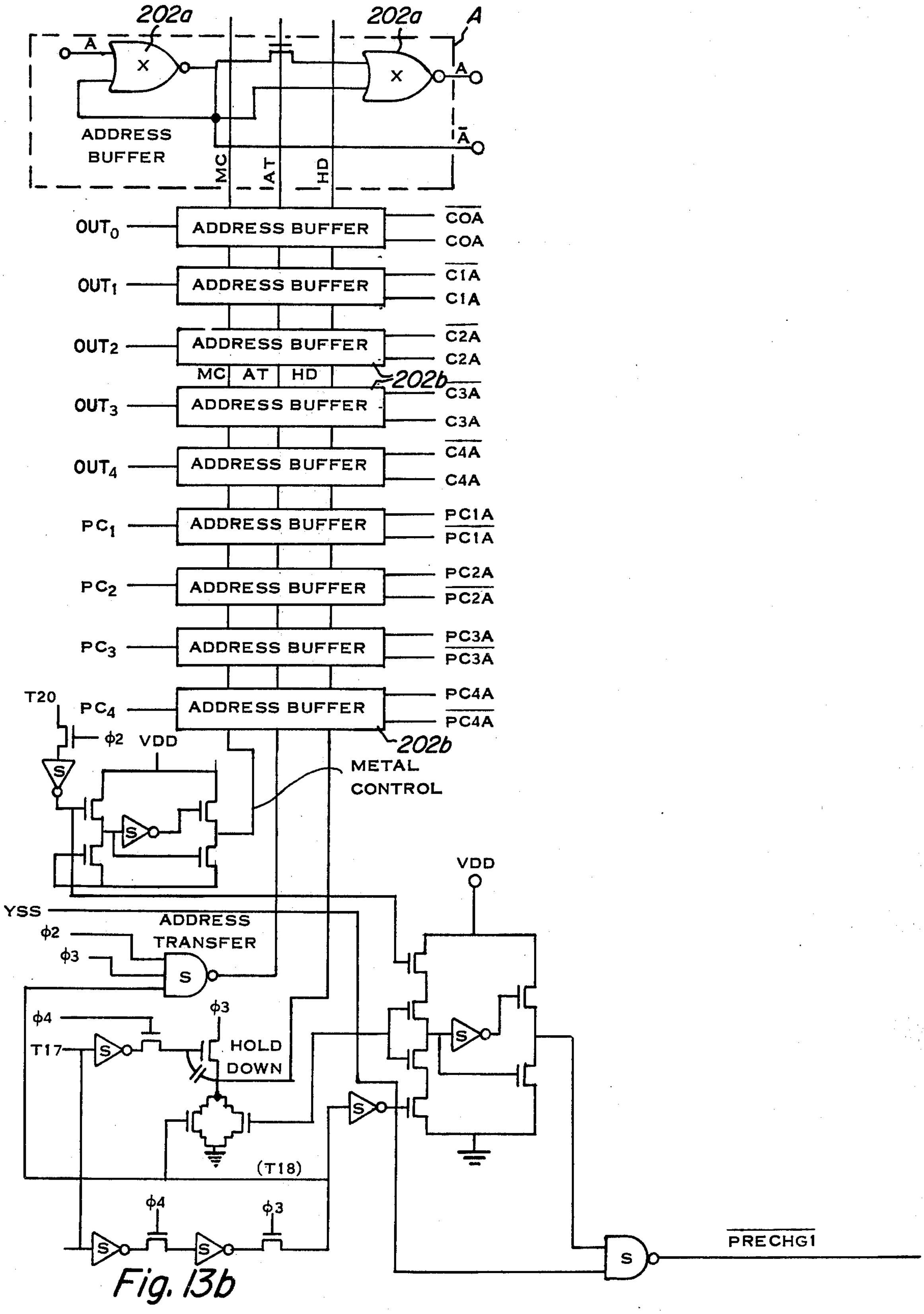

In FIGS. 13*a*–13*b*, there is shown a logic diagram of ROM 202. ROM 202 is preferably a virtual ground ROM of the type disclosed in U.S. Pat. No. 3,934,233. Address information from RAM 202 and from parameter counter 513 are applied to address buffers 202*b* which are shown in detail at reference A. The NOR gates 202*a* used in address buffers 202*b* are wn in detail at reference B. The outputs of the address buffers 202*b* are applied to an X-decoder 202*c* or to a Y-decoder 202*d*. The ROM is divided into ten sections labeled reference C, one of which is shown in greater detail. The outline for output line from each of the sections is applied to register 201 via inverters as shown in FIGS. 8*a* and 8*b*. X-decoder selects one of fifty-four X-decode lines while Y-decoder 202*d* test for the presence or nonpresence of a transistor cell between an adjacent pair of diffusion lines, as is explained in greater detail in the aforementioned U.S. Pat. No. 3,934,233. The data preferably stored in ROM 202 of this embodiment is listed in TABLE VI.

Chirp-Read-Only-Memory Logic Diagram

FIGS. 14*a*–14*b* form a composite diagram of chirp ROM 409. ROM 409 is addressed via address lines $\overline{A_0-A_8}$ from register 410 (FIG11*a*–11*b*) and output information on lines $I_6$–$I_{11}$ to multiplier multiplexer 405 and lines $I_{m1}$ and $I_{m2}$ to gates 421 and 420, all which are show in FIGS. 11*a* and 11*b*. As was previously discussed with reference to FIGS. 11*a* and 11*b*, chirp ROM outputs all zeros after a predetermined count is reached in register 410, which, in this case is the count equivalent to a decimal 51. ROM 409 includes a Y- decoder 409*a* which is responsive to the address on lines $\overline{A_0}$ and $\overline{A_1}$ (and $A_0$ and $A_1$) in an X-decoder 409*b* which is responsive to the address on lines $\overline{A_2}$ through $\overline{A_5}$ (and $A_2$–$A_5$).

ROM 409 also includes a latch 409*c* which is set when decimal 51 is detected on lines $\overline{A_0}$–$\overline{A_5}$ according to line 409*c* from a decoder 409*e*. Decoder 409*e* also decodes a logical zero on lines $\overline{A_0}$–$\overline{A_8}$ fresetting latch 409*c*. ROM 409 includes timing logics 409*f* which permit data to be clocked in via gates 409*g* at time period T12. At this time decoder 409*e* checks to determine whether either a decimal 0 or decimal 51 is occ on address line $\overline{A_0}$–$\overline{A_8}$. If either condition occur, latch 409*c*, which is a static latch, is caused to flip.

An address latch 409*h* is set at time period T13 and reset at time period T11. Latch 409*h* permits latch 409*c* to force a decimal 51 onto lines $\overline{A_0}$–$\overline{A_5}$ when latch 409*c* is set. Thus, for addresses greater than 51 address register 410, the address is first sampled at time period T12 to determine whether it has been reset to zero by reset logic 412 (FIGS. 12*a*–12*b*) for the purpose of resetting latch 409*c* and if the address has not been reset to zero then whatever address has been inputted on lines $\overline{A_0}$–$\overline{A_8}$ is written over by logics 409*j* at T13. Of course, at location 51 in ROM 409 will be stored all zeros on the output lines I6-I11, Im1 and IM2. Thus by the means of logics 409*c*, 409*h* and 409*j* addresses of a preselected value, in this case a decimal 51, aremerely tested to determine whether a reset has occurred but are not permitted to address the array of ROM cells via decoders 409*a* and 409*b*. Addresses between a decimal 0 and 50 address the ROM normally via decoders 409*a* and 409*b*. The ROM matrix is preferably of the virtual ground type described in U.S. Pat. No. 3,934,233. As aforementioned, the contents of ROM 409 are listed in Table VIII. The chirp function is located at addresses 00–40 while zeros are located a t addresses 41–51.

Truncation Logic and Digital-To-Analog Converter

Turning again to FIGS. 11*a* and 11*b*, the truncation logic 425 and Digital-to-analog (D/A) converter is shown in detail. Truncation logic 425 includes circuitry for converting the two's complement data on $YL_{1-3}$–$YL_{14}$to sign magnitude data. Logics 425*a* test the MSB from Y-latch 403 on line $YL_{13}$ for the purpose of generating a sign bit and for controlling the two's complement to sign magnitude conversion accomplished by logics 425*c*. The sign bit is supplied in true and false logic on lines D/Asn and D/Asn to D/A converter 426.

Logics 425*c* convert the two's complement data from Y-latches 403 in lines $YL_{10}$–$YL_4$ to simple magnitude notation on lines $D/A_6$–$D/A_0$. Only the logics 425*c* associated with YL10 are shown in detail for sake of simplicity.

Logics 425*b* sample the $YL_{12}$ and $YL_{11}$ bits from the Y-latches 403 and perform a magnitude truncation function thereon by forcing outputs $D/A_6$ through $D/A_0$to a logical zero (i.e., a value of one if the outputs were in true logic) wherever either $YL_{12}$ or $YL_{11}$ is a logical one and $YL_{13}$ is a logical zero, indicating that the value is positive or either $YL_{12}$ or $YL_{11}$ is a logical zero and $YL_{13}$ is a logical one, indicating that the value is negative (and complemented, of course). Whenever one of these conditions occurs, a logical zero appears on line 427 and Vss is thereby coupled to the output buffer 428 in each of logics 425*c*. The magnitude function effectively truncates the more sifnificant bits on $YL_{11}$ and $YL_{12}$. It is realized that this is somewhat unorthodox truncation, since normally the less significant bits are truncated in most other circuits where truncation occurs. However, in this circuit, large positive or negative values are effectively clipped. More important digital speech information, which has smaller magnitudes, is effectively amplified by a factor of four by this truncation scheme.

Figure 23A:
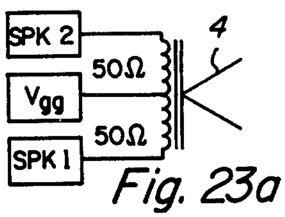
FIGS. 23*a*–23*b* depict embodiments of the voice coil onnection.

The outputs $\overline{D/A_6}$–$\overline{D/A_0}$, along with $\overline{D/Asn}$ and D/Asn, are couped to D/A converter 426. D/A converter 426 preferably has seven MOS devices 429 coupled to the seven lines $\overline{D/A_6}$ through $\overline{D/A_0}$ from truncation logics 425. Each device 429 preferably includes a MOS transistor whose gates is coupled to one of the lines $\overline{D/A_6}$–$\overline{D/A_0}$ and a series connected implanted load transistor 429*b*. Devices 429 are arranged, by controlling their length to width ratios, to act as current sources, the device 429 coupled to $\overline{D/A_6}$ sourcing twice as much current (when on) as the device 429 coupled to $\overline{D/A_5}$. Likewise the device 429 coupled to $D/A_5$is capable of sourcing twice as much current as the device 429 coupled to $\overline{D/A_4}$. This two to one current sourcing capability similarly applies to the remaining devices 429 coupled to the remaining lines $\overline{D/A_3}$–$\overline{D/A_0}$. Thus, device 429 coupled to $\overline{D/A_1}$, is likewise capable of sourcing twice as much current as the device 429 coupled to $D/A_0$, but only one-half of that source by the device 429 coupled to $\overline{D/A_2}$. All devices 429 are connected in parallel, one side of which are preferably coupled to Vss and the other side is preferably coupled to either side of the speaker 4 via transistors 430 and 431. Transistor 430 is controlled by $\overline{D/Asn}$ which is applied to its gates; transistor 431 is turned off and on in response to D/Asn. Thus, either transistor 430 and 431 is on depending on the state of the sign bit, D/Asn. The voice coil of speaker 4 preferably has a 100 ohm impedance and has a center tap connected to Vgg, as shown in FIG. 23*a*. Thus, the signals on $\overline{lD/A_6}$–$\overline{DA_0}$ control the magnitude of current flow through the voice coil while the signals on lines D/Asn and $\overline{D/Asn}$ control the direction of that flow.

Figure 23B:
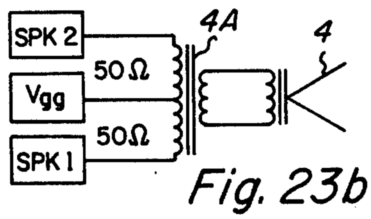

Alternatively to using a center-topped 100 ohm voice coil, a more conventional eight ohm speaker may be used along with a transformer having a 100 ohm center topped primary (connected to Vgg and transistors 430 and 431) and an eight ohm secondary (connected to the speaker's terminals, as shown in FIG. 23*b*.

It should now be appreciated by those skilled in the art that D/A converter 426 not only converts digital sign magnitude information on lines $D/A_6$–$D/A_0$ and D/Asn–D/Asn to an analog signal, but hastively amplified this analog signal to sufficient levels to permit a speaker to be driven directly from the MOS synthesis chip 10 (or via the aforementioned transformer, if desired). Of course, those skilled in the art will appreciate that simple D/A converters, such as that disclosed here, will find use in other applications in addition to speech synthesis circuits.

THE SPEECH SYNTHESIZER CHIP

Figure 22:
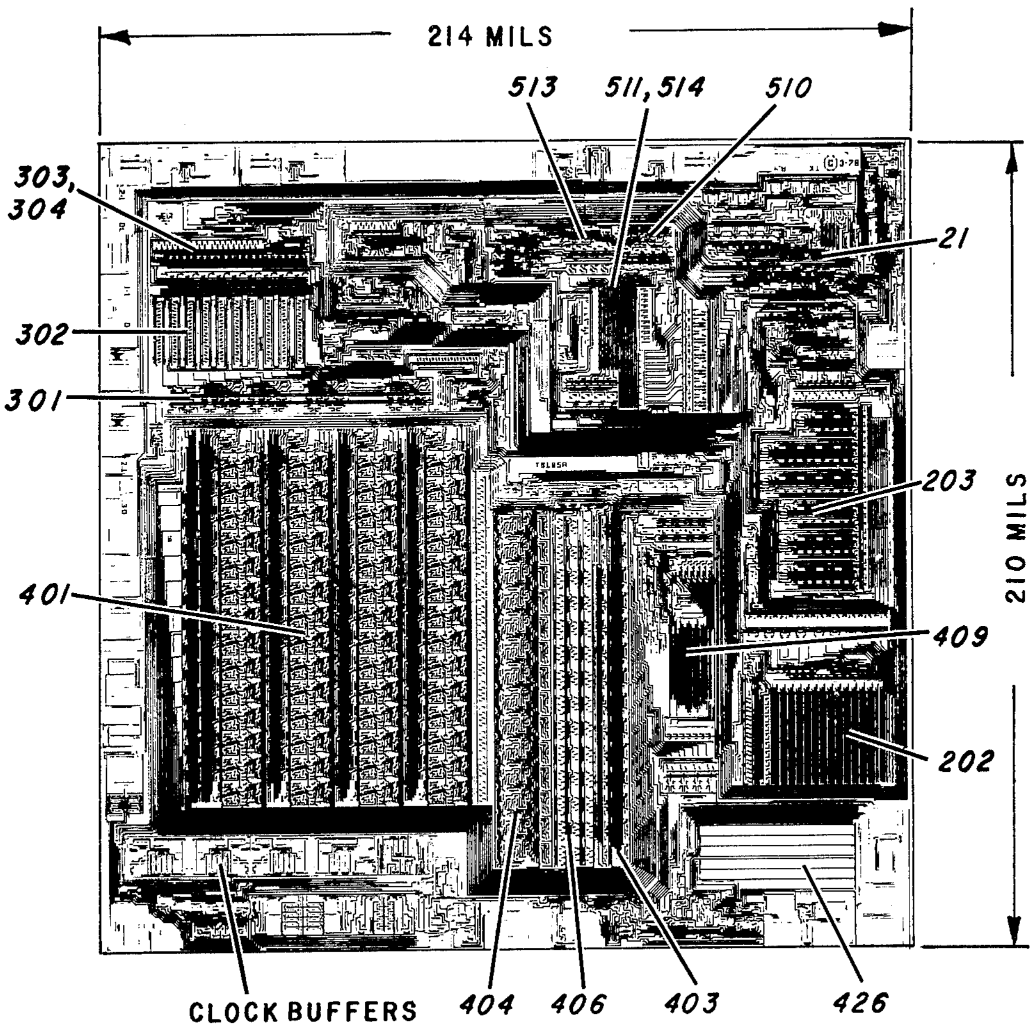
FIG. 22 is a plan view of the synthesizer chip herein lescribed, showing the metal mask or metal pattern, nlarged about fifty times.

In FIG. 22 a greatly enlarged plan view of a semiconductor chip which contains the entire system of FIGS. 4*a* and 4*b* is illustrated. The chip is only about two hundred fifteen mils (about 0.215 inches) on a side. In the example shown, the chip is manufactured by the P-channel metal gate process using the following design rules: metal line width 0.25 mil; metal line spacing 0.25 mil; diffusion line width 0.15 mil; and diffusion line spacing 0.30 mil. Of course, as design rules are tightened with the advent of electron beam mask production or slice writing, and other techniques, it will be possible to further reduce the size of the synthesizer chip. The size of the synthesizer chip can, of course also be reduced by not taking advantage of some of the features preferably used on the synthesizer chip.

The total active area of speech synthesizer chip 10 is approximately 45,000 square mils.

It will also be appreciated by those skilled in the art, that other MOS manufacturing techniques, such as N-channel, complementary MOS (CMOS) or silicon gate processes may alternatively be used.

The various parts of the system are labeled with the same reference numerals previously used in this description.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking learning aid described herein.

The microprocessor of U.S. Pat. No. 4,074,355 is an improved version of an earlier microprocessor described in U.S. Pat. No. 3,991,305. One of the improvements concerned the elimination of digit driver devices so that arrays of light emitting diodes (LED's) forming a display could be driven directly from the microprocessor. As a matter of design choice, the display used with this learning aid is preferably a vacuum fluorescent (VF) display device. Those skilled in the art will appreciate that when LED's are directly driven, the display segments are preferably sequentially actuated while the display's common character position electrodes are selectively actuated according to information in a display register or memory. When VF displays are utilized, on the other hand, the common character position electrodes are preferably sequentially actuated while the segments are selectively actuated according to information in the display register or memory. Thus, the microprocessor of U.S. Pat. No. 4,074,355 is preferably altered to utilize digit scan similar to that used in U.S. Pat. No. 3,991,305.

The microprocessor of U.S. Pat. No. 4,074,355 is a four bit processor and to process alphanumeric information, additional bits are required. By using six bits, which can represent $2^6$ or 64 unique codes, the twenty-six characters of the alphabet, ten numerals as well as several special characters can be handled with ease. In lieu of converting the microprocessor of U.S. Pat. No. 4,074,355 directly to a six bit processor, it was accomplished indirectly by software pairing the four bit words into eight bit bytes and transmitting six of those bits to the display decoder.

Figure 15A:
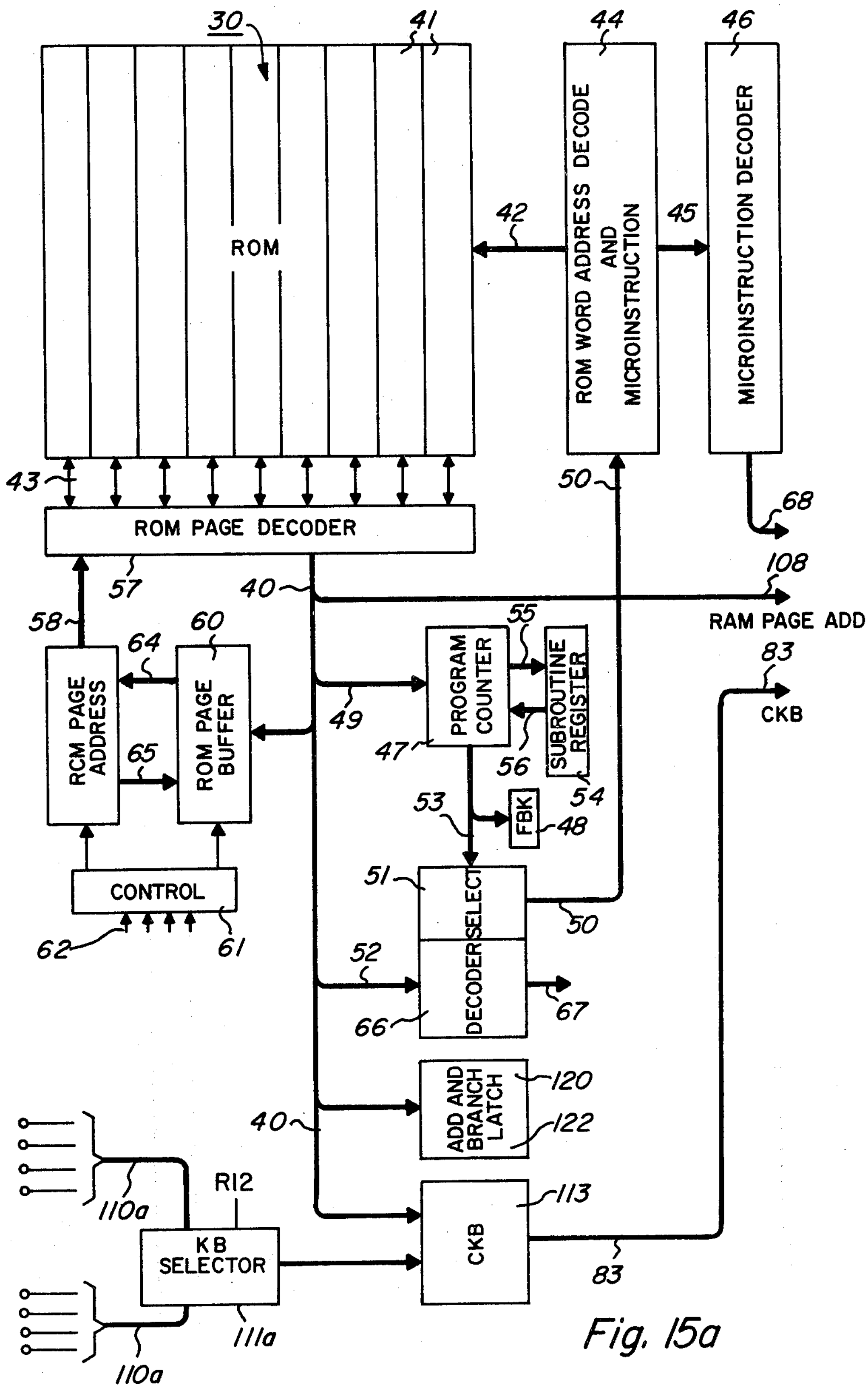
FIGS. 15*a*–15*b* form a composite block diagram of a microprocess or which may be utilized as the controller.
Figure 15B:
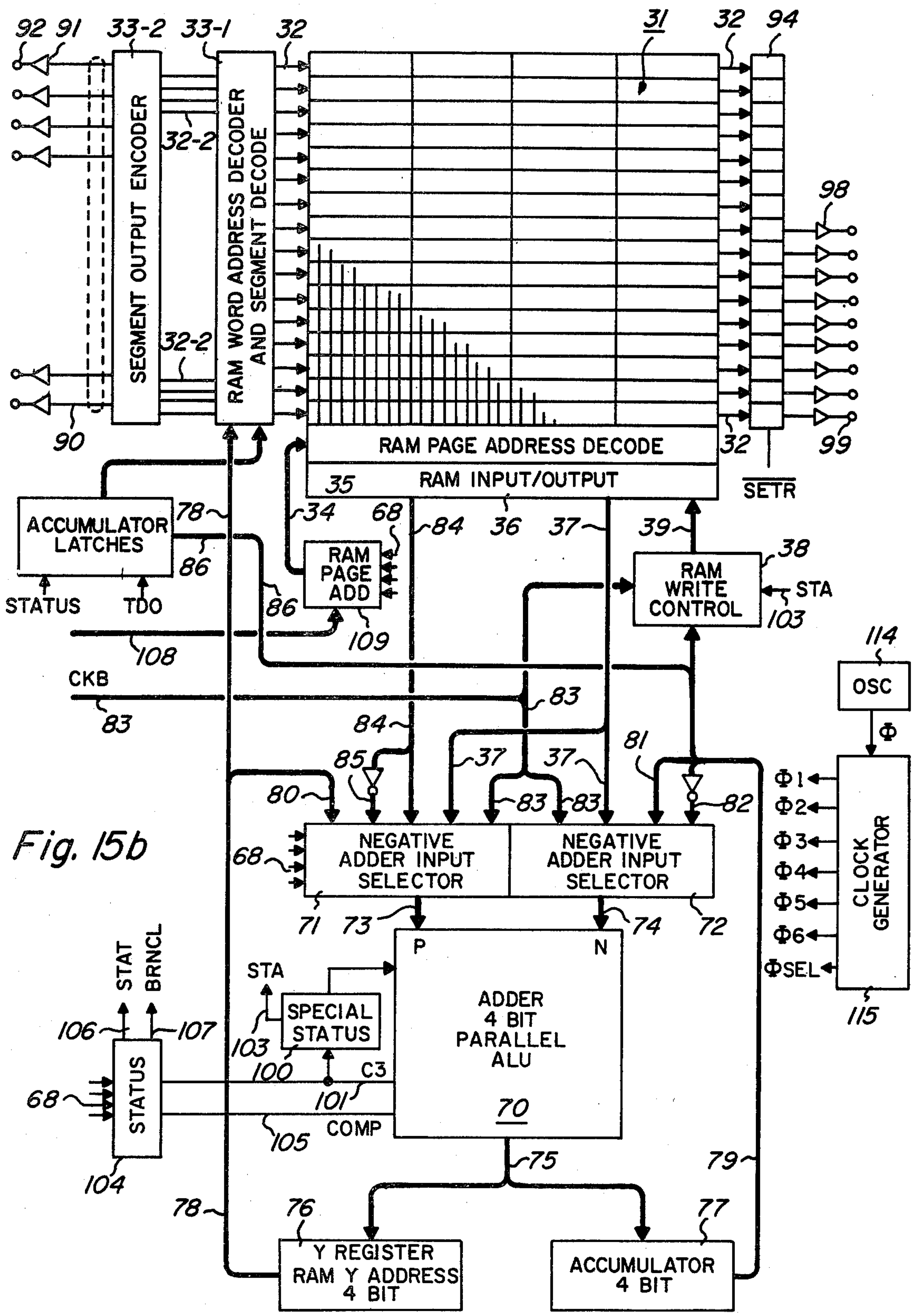

Referring now to FIGS. 15*a*–15*b*, which form a composite block diagram of the microprocessor preferably used in the learning aid, it should be appreciated that this block diagram generally corresponds with the block diagram of FIGS. 7*a* and 7*b* of U.S. Pat. No. 4,074,355; several modifications to provide the aforementioned features of six bit operation and VF display compatability are also shown. The numbering shown in FIGS. 15*a* and 15*b* generally agrees with that of U.S. Pat. No. 4,074,355. The modifications will now be described in detail.

Figure 13B:
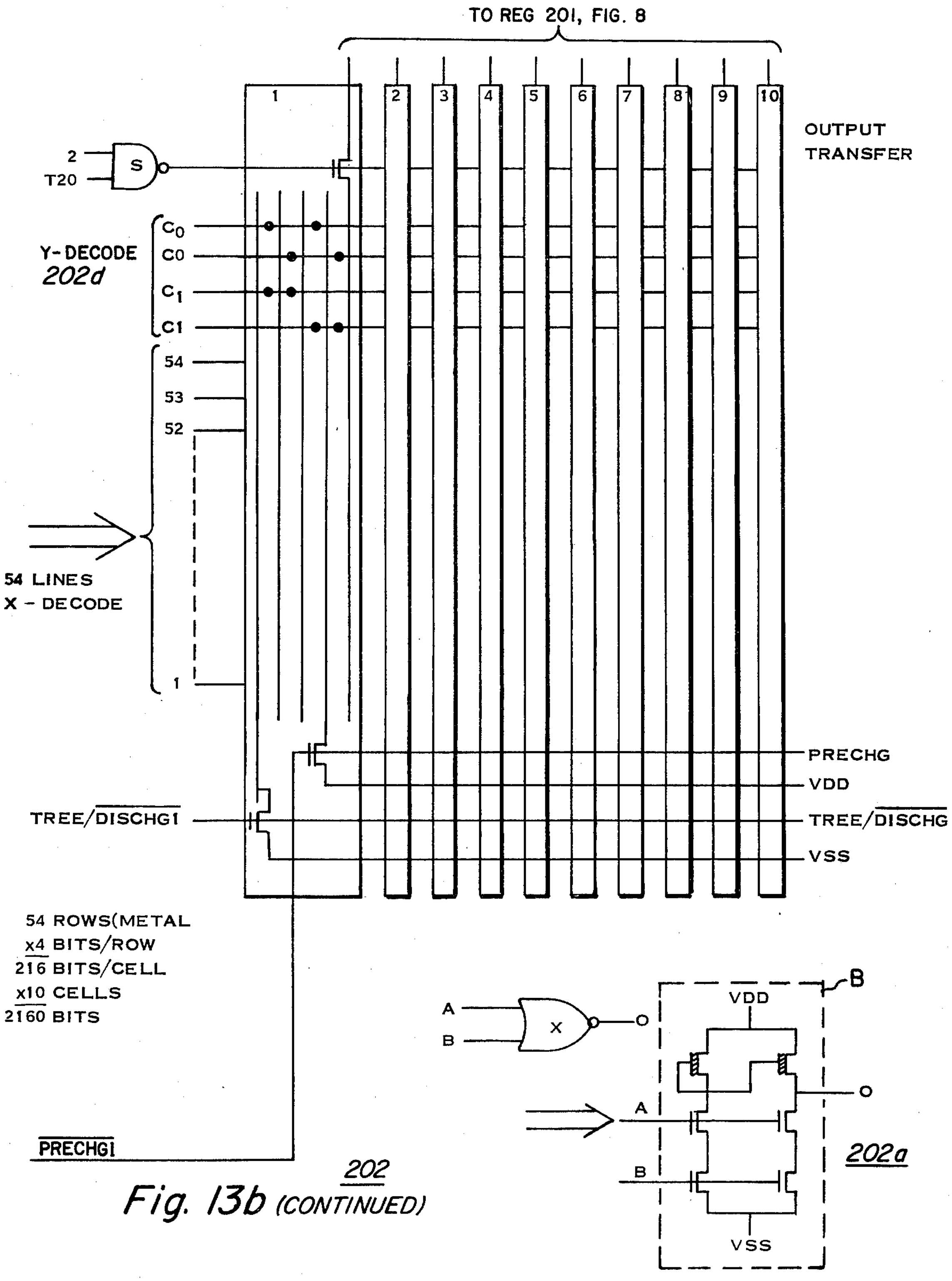
Figure 16A:
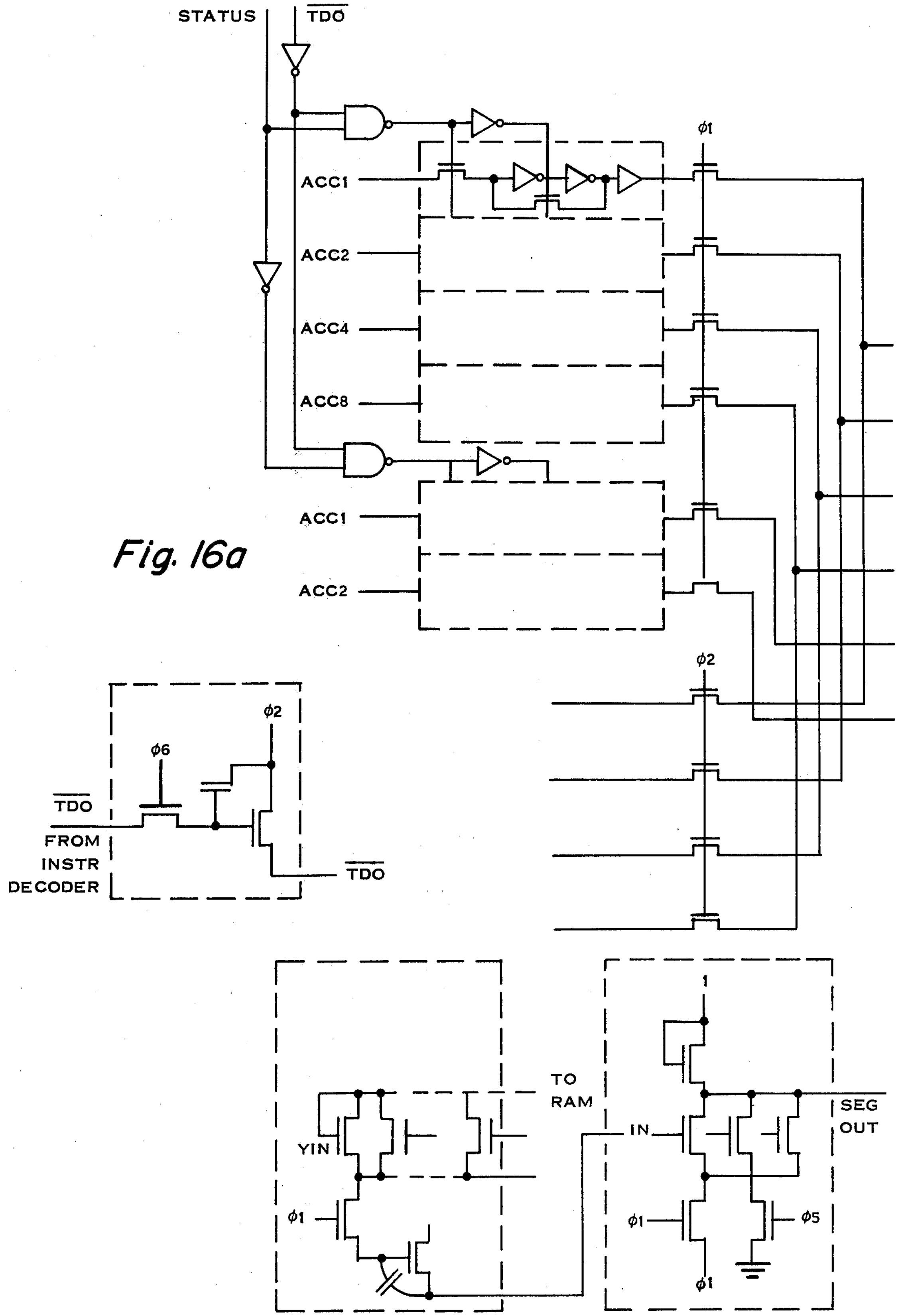
FIGS. 16*a* and 16*b* form a composite logic diagram of the segment decoder of the microprocessor.
Figure 16B:
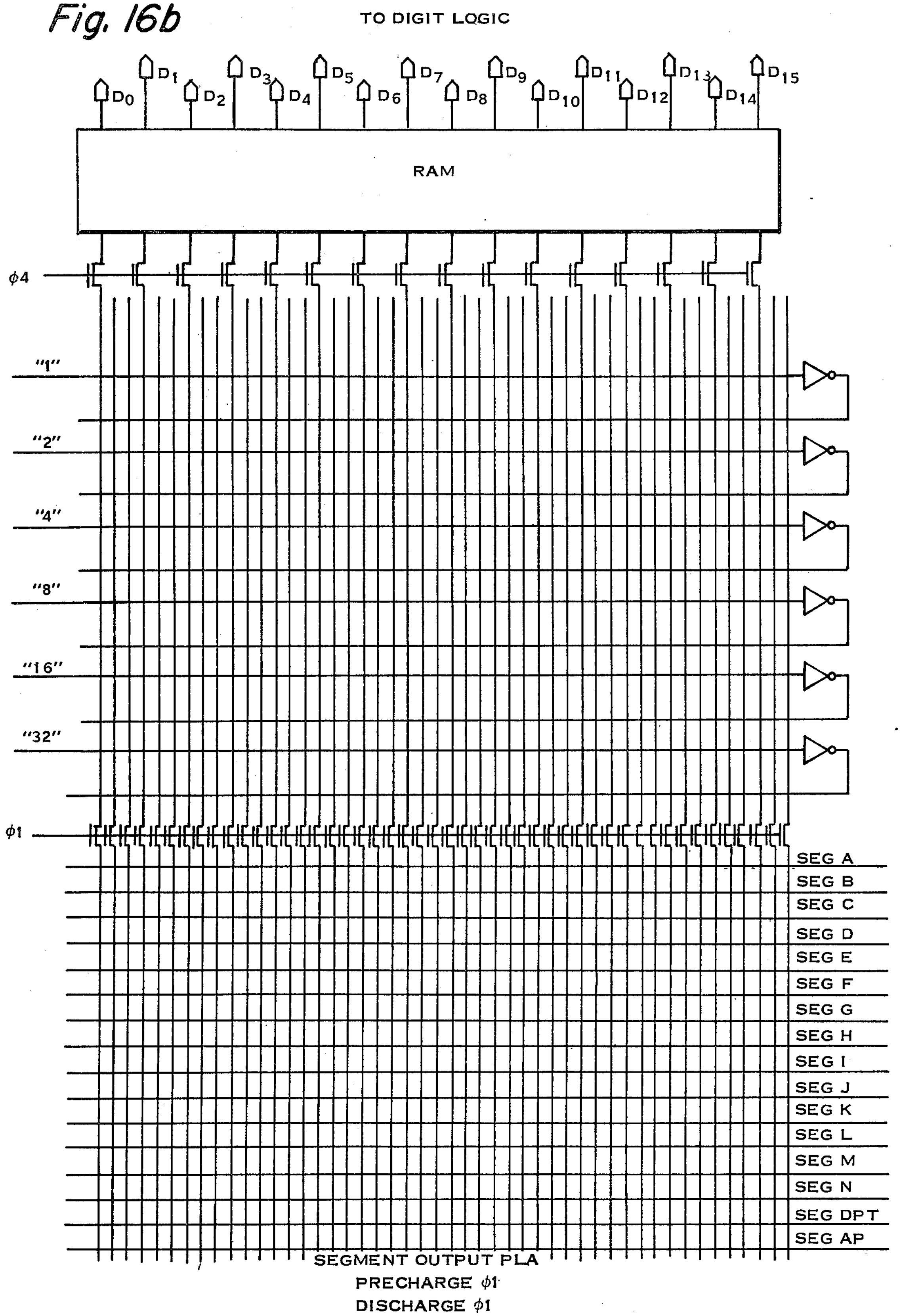
Figure 16B:
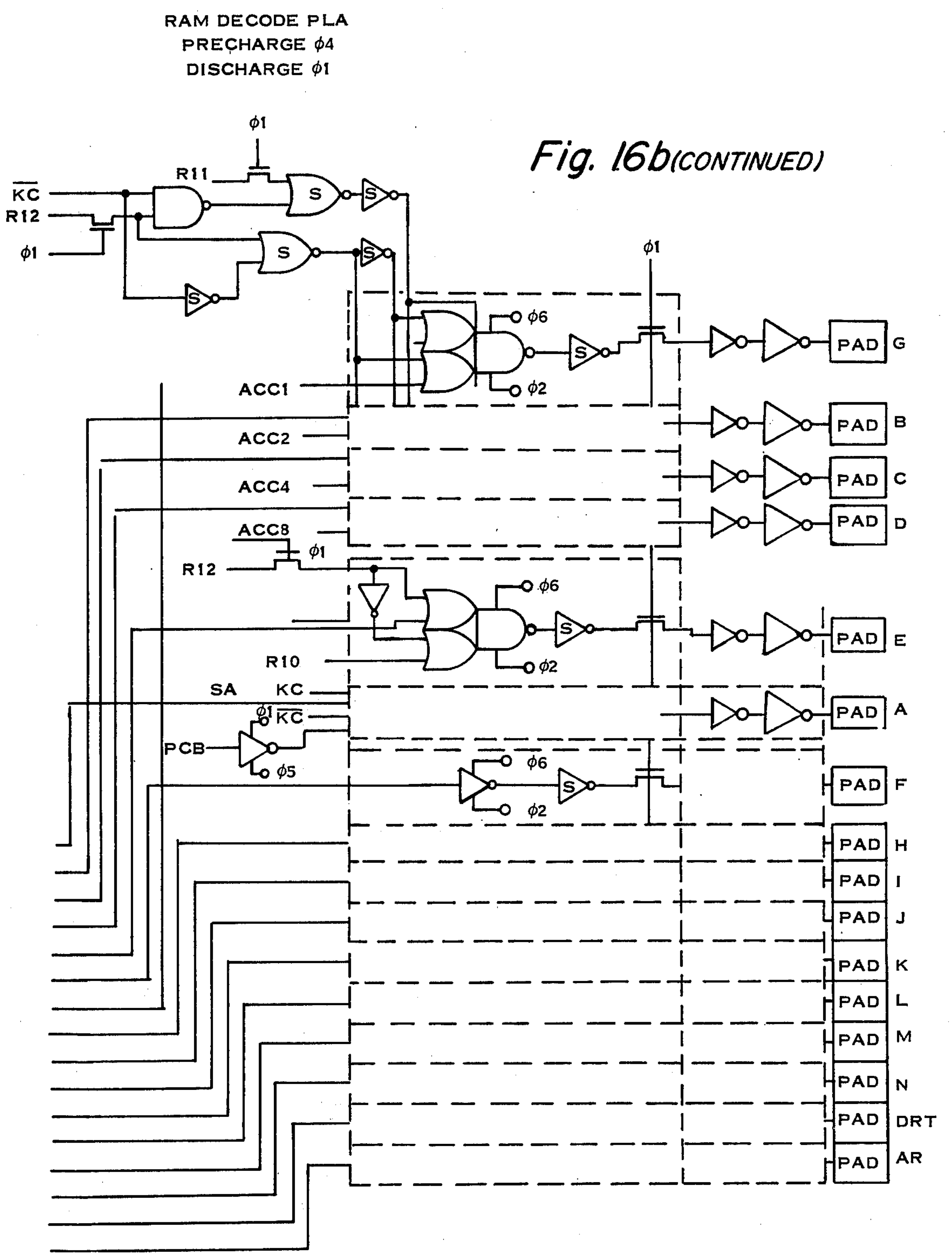

Referring now to the composite diagram formed by FIGS. 16*a*-16*b*, which replace FIG. 13 of U.S. Pat. No. 4,074,355, there can be seen the segment decoder and RAM address decoder 33-1 which decodes RAMY for addressing RAM 31 or ACC1–ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TDO instruction when status is a logical zero. Then the six bits in latches 87-1 through 87-32 is decoded in decoder 33-1. Segment drivers 91 may preferably be of one of three types, 91A, 91B or 91C as shown on FIGS. 16*a*-16*b*. The 91A type drivers permits the data on ACC-1–ACC8 to be communicated externally via pins SEG G, SEG B, SEG C and SEG D. The 91B type driver coupled to pin SEG E permits the contents of digit register 94-10 to be communicated externally when digit register 94-12 is set. The 91B type driver coupled to pin SEG A permits the contents of the program counter to be outputted during test operations.

Figure 17:
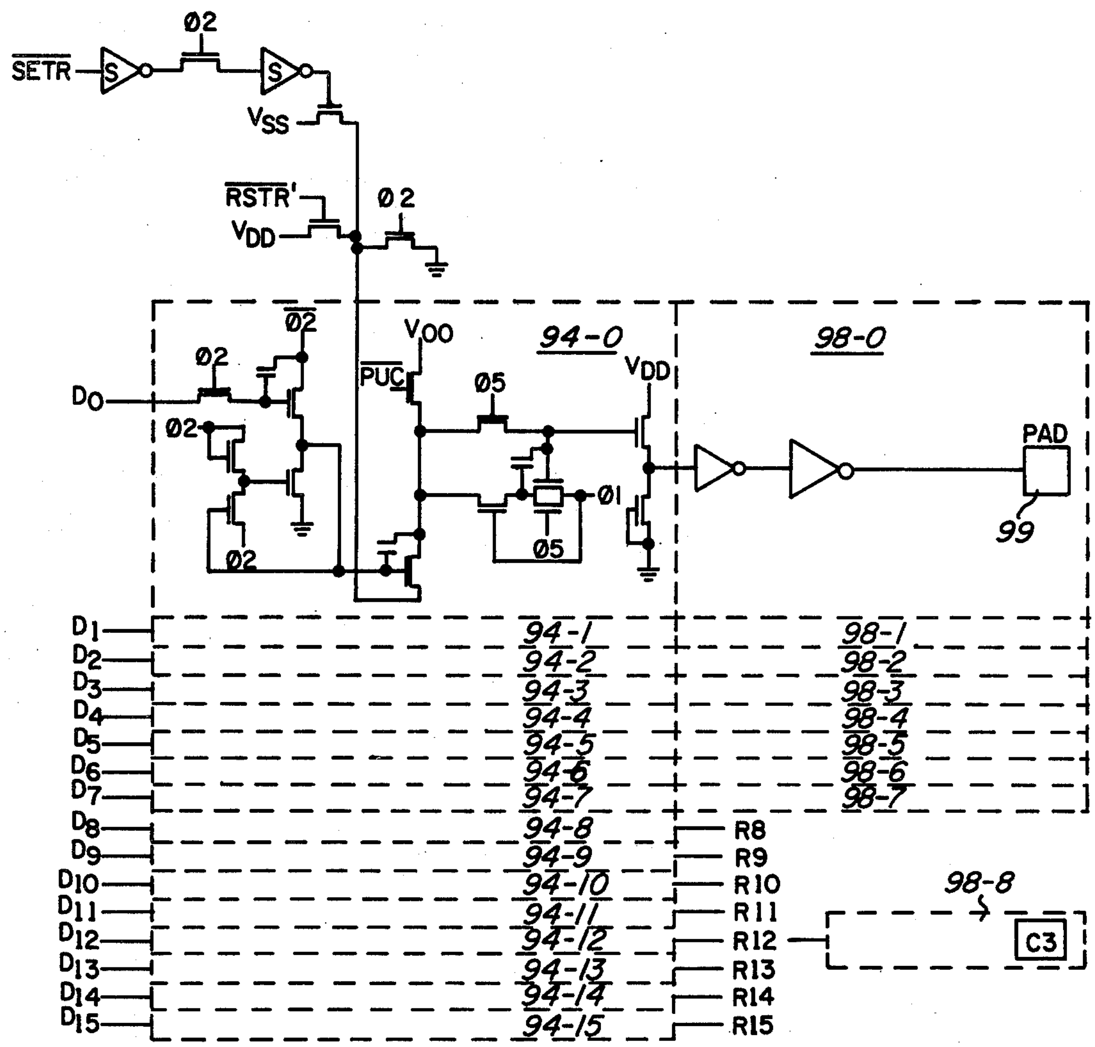
FIG. 17 depicts the digit output buffers and digit registers of the microprocessor.

The digit buffers registers and TDO latches of FIG. 14 of U.S. Pat. No. 4, 074,355 are also preferably replaced with the digit buffers registers of FIG. 17 herein inasmuch as (1) the DDIG signal is no longer used and (2) the digit latches (elements 97 in U.S. Pat. No. 4,074,355) are no longer used. For simplicity's sake, only one of the digit output buffer registers 94 is shown in detail. Further, since in this embodiment of the learning aid, display 2 preferably has eight character positions, eight output buffers 98-0 through 98-7 connect $D_0D_7$ to the common electrodes of display 2 via registers 94-0 through 94-7 are shown in FIG. 17. An additional output buffer 98-8 communicates the contents of registers 94-12, which is the chip select signal, to synthesizer 10.

Figure 18:
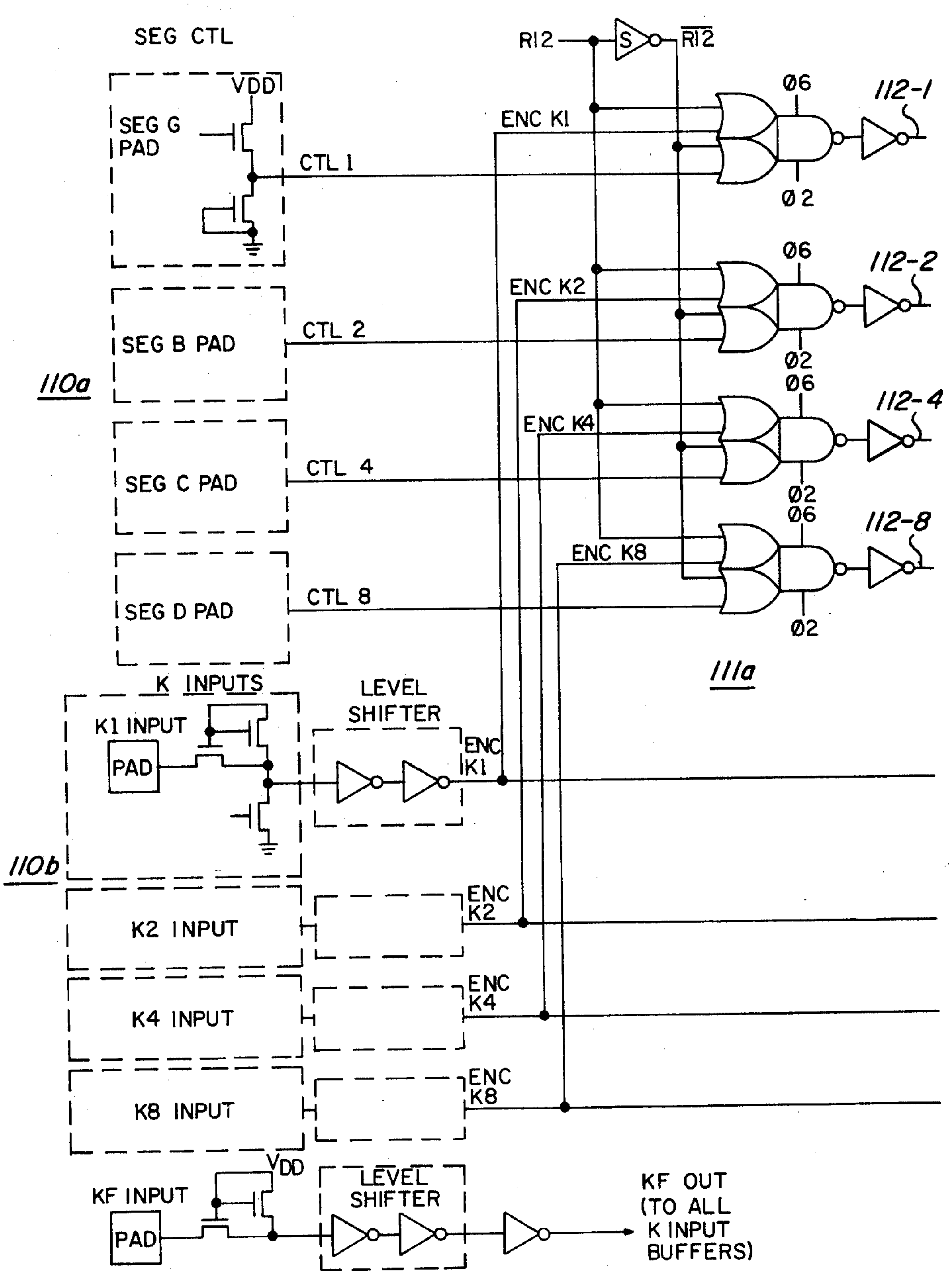
FIG. 18 depicts the KB selector circuit of the microprocessor.

To facilitate bi-directional communication with synthesizer 10, the microprocessor of U.S. Pat. No. 4,074,355 is preferably modified to permit bi-directional communication on pins SEG G, SEG B, SEG C and SEG D. Thus, in FIG. 18, these SEG pins are coupled to the normal K lines, 112-1 through 112-8, via an input selector 111*a* for inputting information when digit registers 94-12 (R12) is set. Further, these pins are also coupled to ACC1–ACC8 via segment drivers 91A when digit registers 94-12 (R12) and 94-11 (R11) are set for outputting information in accumulator 77.

Thus, when digit latch 94-12(which communicates the chip select signal externally) is set, SEG E is coupled to R10 (digit registers 94-10) for communicating the PDC signal to synthesizer 10. Also, ACC1–ACC8 is outputted on SEG G and SEG B-SEG D, during the time R12 is and R11 are set. When R11 is a logical 0, i.e., is reset, segment drivers 91A are turned off and data may be read into CKB circuit 113 for receiving data from ROMS 12*a*–12*b* via synthesizer 10, for instance, FIG. 18 replaces the keyboard circuit 111 shown in FIG. 22 of U.S. Pat. No. 4,064,554.

Preferably, pins SEG G and SEG B-SEG D are coupled to CTL1–CTL8 pins of synthesizer 10, while pin SEG E is coupled to the PDC pin of synthesizer 10.

In Table IX (which comprises Tables 0 through IX-15) is listed the set of instructions which may be stored in the main Read-Only Memory 30 of FIGS. 15*a*–15*b* to provide controller 11. Referring now to Table IX, there are several columns of data which are, reading from left to right: PC (Program Counter), INST (Instruction), BRLN (Branch Line), Line and Source Statement (which includes Name, Title and Comments). In U.S. Pat. No. 4,074,355, it can be seen that main Read-Only-Memory 30 is addressed with a seven bit address in program counter 47 and a four bit address in a buffer 60. The address in buffer 60 is referred to as a page address in the main Read-Only-Memory. The instructions listed on Table IX-0 correspond to page zero in the microprocessor while the instructions listed in Table IX-1 are those on page one and so forth through to the instructions in Table IX-15 which are stored on page fifteen in the microprocessor.

The program counter 47 of the aforementioned microprocessor is comprised of a feedback shift register and therefore counts in a pseudorandom fashion, thus the addresses in the left-hand column of Table IX, which are expressed as a hexadecimal number, exhibit such pseudorandomness. If the instruction starting at page zero were read out sequentially from the starting position in the program counter (00) then the instructions would be read out in the order shown in Table IX. In the "Line" column is listed a sequentially increasing decimal number associated with each source statement and its instruction and program counter address as well as those lines in which only comments appear. The line number starts at line 55 merely for reasons of convenience not important here. When an instruction requiring either a branch or call is to be performed, the address to which the program counter will jump and the page number to which the buffer will jump, if required, is reflected by the binary code comprising the instruction or instructions performing the branch or call. For sake of convenience, however, the branch line column indicates the line number in Table IX to which the branch or call will be made. For example, the instruction on line 59 (page 0, Program Counter Address OF) is a branch instruction, with a branch address of 1010111 (57 in hexadecimal). To facilitate finding the 57 address in the program counter, the branch line column directs the reader to line 80, where the 57 address is located.

READ-ONLY MEMORY LOGIC DIAGRAMS

Figure 19:
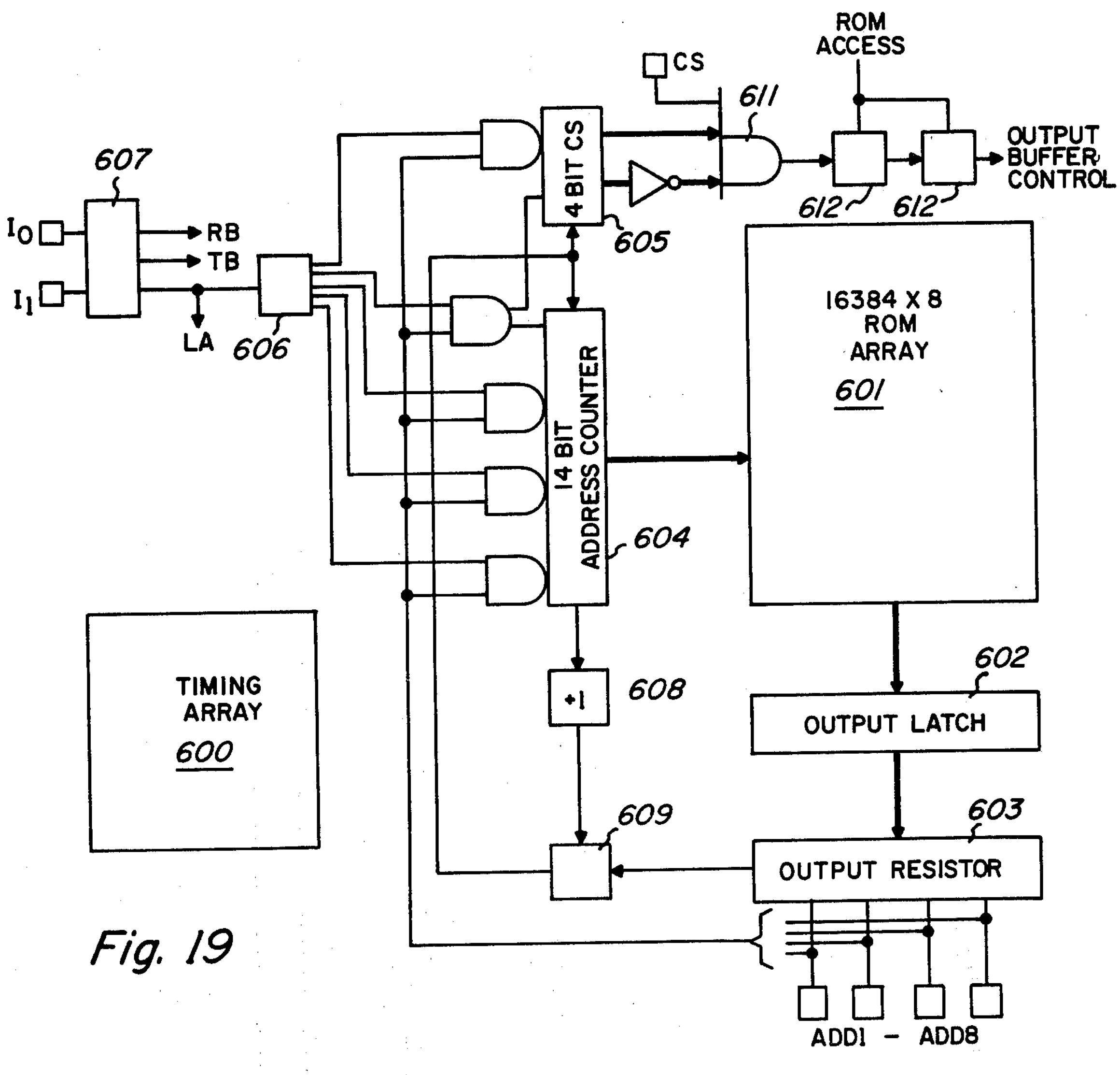
FIG. 19 is a block diagram of ROM's 12*a*, 12*b*, 13*a* or 3*b*.
Figure 20A:
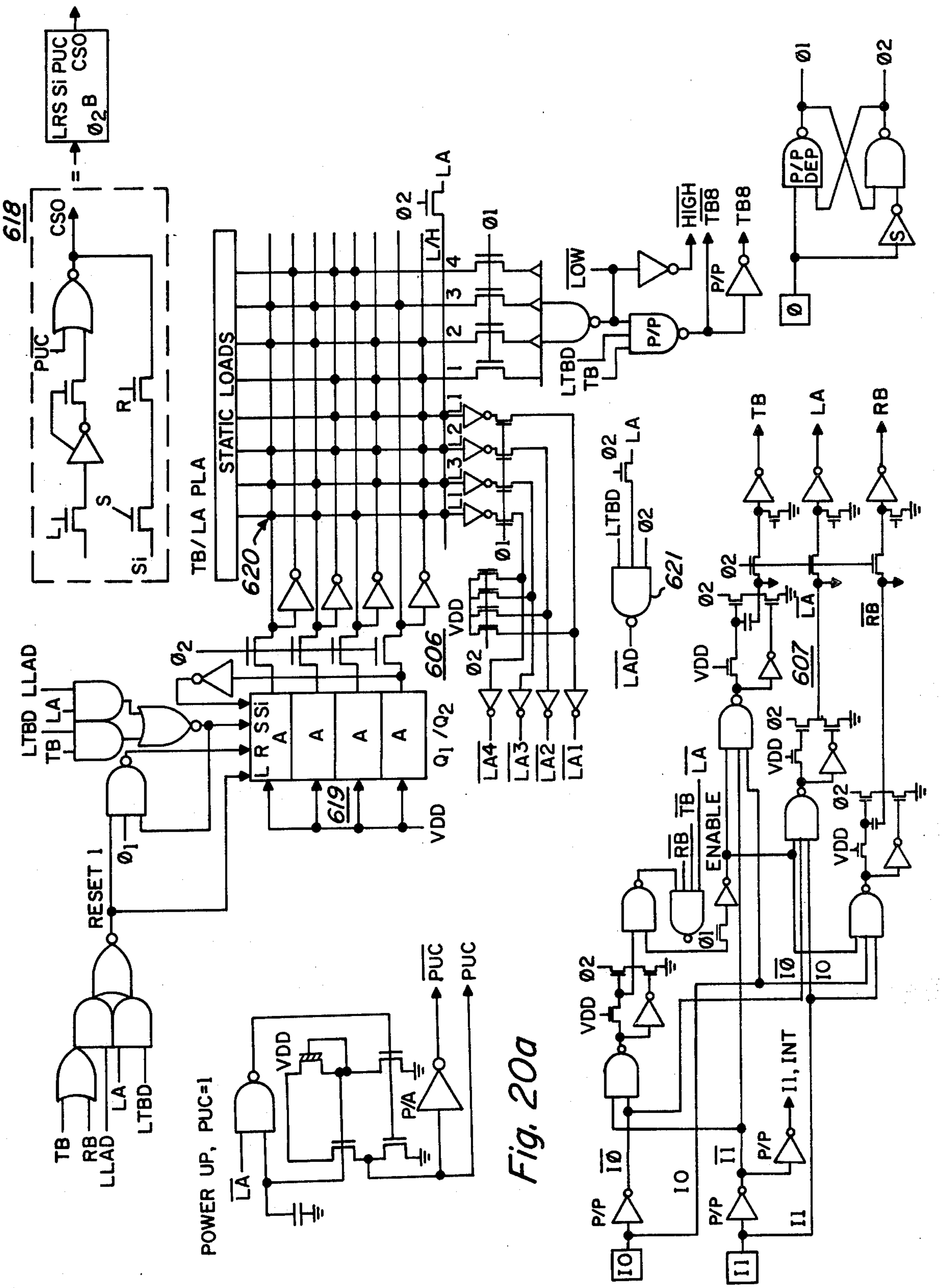
FIGS. 20*a*–20*e* form a composite logic diagram of the ontrol logic for ROMS 12*a*, 12*b*, 13*a* or 13*b*.
Figure 20B:
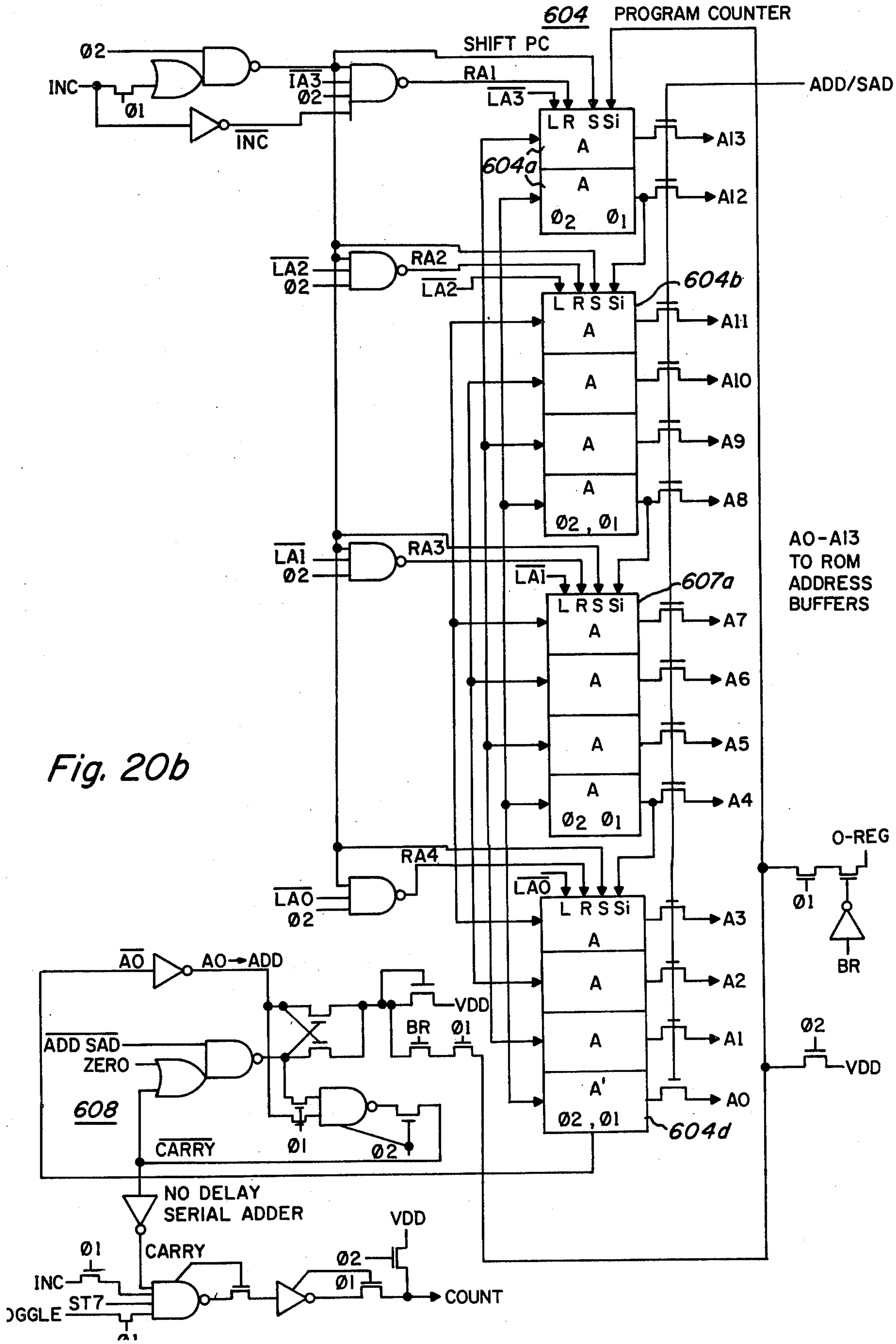
Figure 20C:
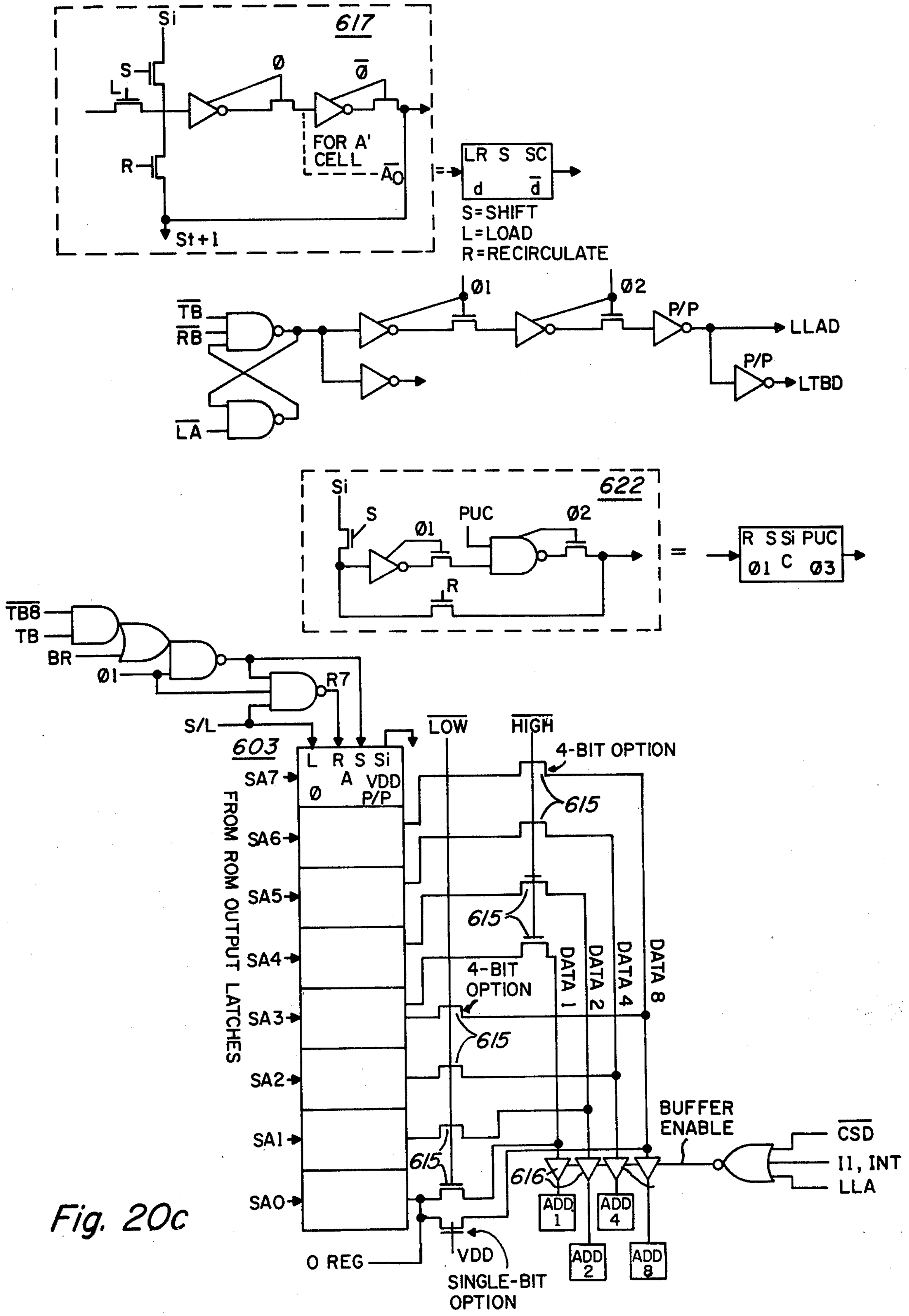
Figure 20D:
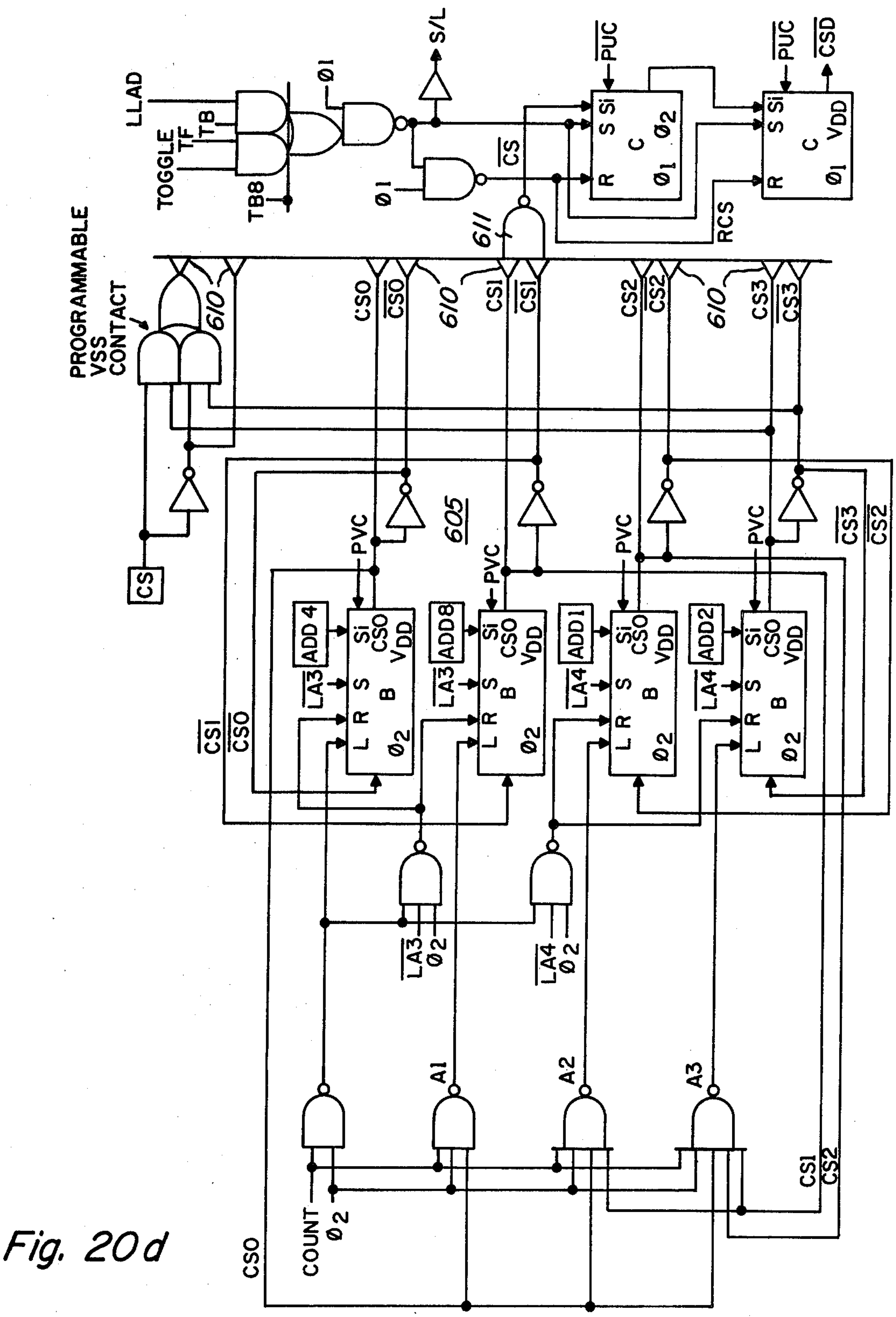
Figure 20E:
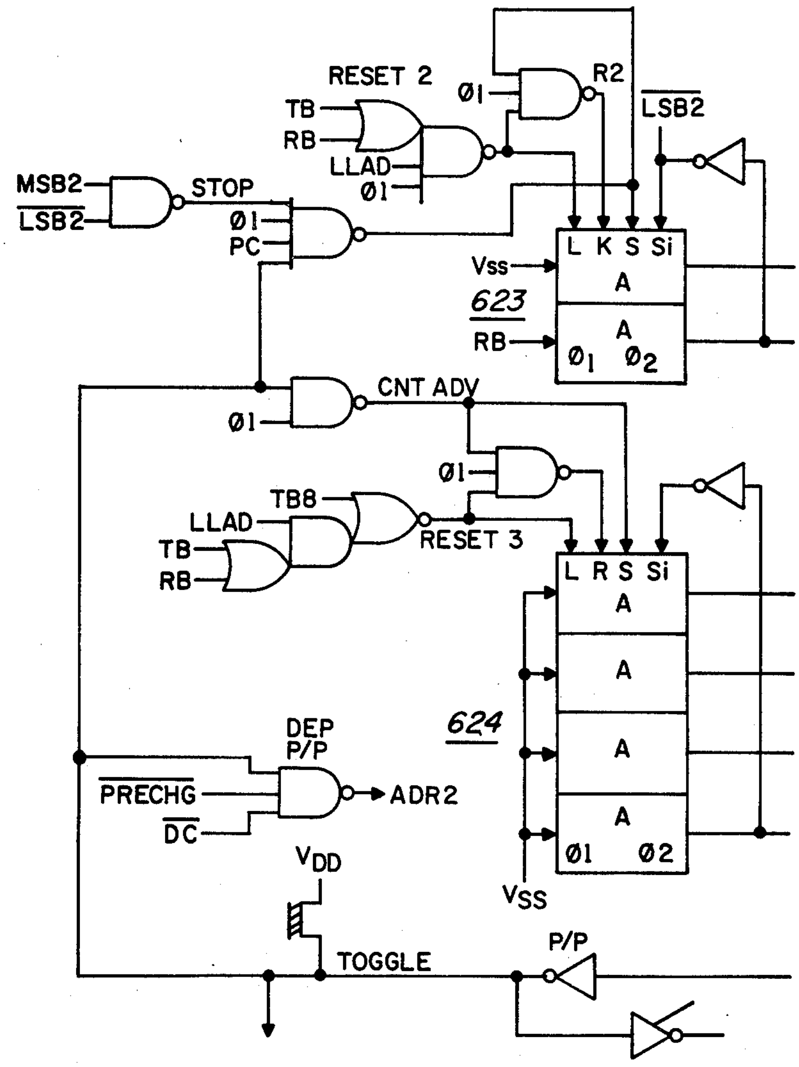
Figure 20E:
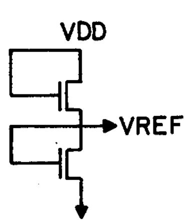
Figure 20E:
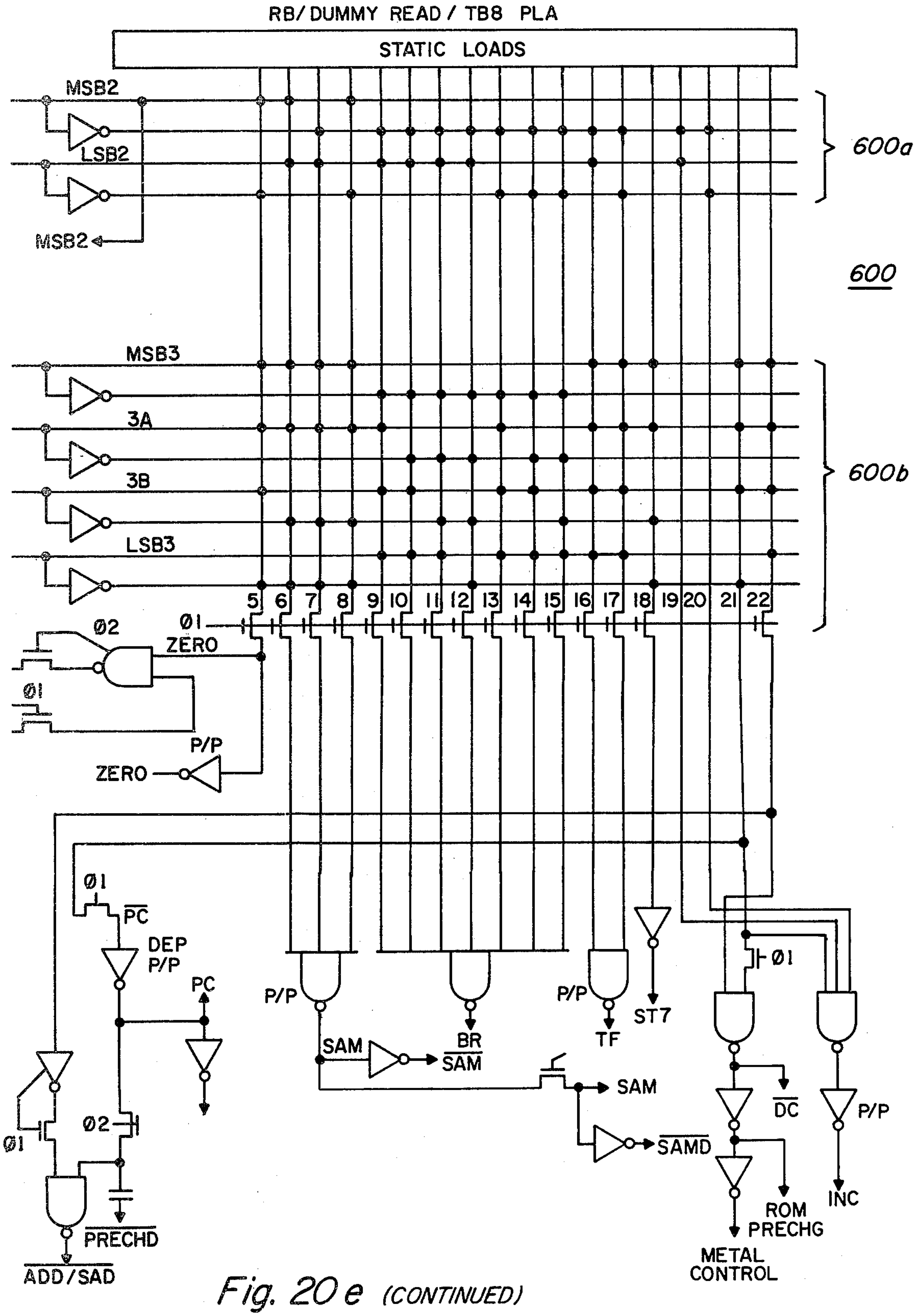

Read-Only-Memories 12*a* or 12*b* or 13*a* or 13*b* are shown in FIGS. 19, 20*a*, 20*b*, 21*a* and 21*b*. FIG. 19 is a block diagram of any one of these ROMs. FIGS. 20*a* and 20*b* form a composite logic diagram of the control logic for the ROMs while FIGS. 20*a* and 20*b* form a composite logic diagram of the X and Y address decoders and pictorially show the array of memory cells.

Referring now to FIG. 19, the RAM array 601 is arranged with eight output lines, one output line from each section of 16,384 bits. The eight output lines from ROM array 601 are connected via an output latch 602 to an eight bit output register 603. The output register 603 is interconnected with pins ADD1–ADD8 and arranged either to communicate the four high or low order bits from output register 603 via the four pins ADD1–ADD8 or alternatively to communicate the bit serially from output register 603 via pin ADD1. The particular alternative used may be selective according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1–ADD8 in response to a decoded Load Address (LA) command. The first LA command loads the four least significant bits in address counter 604 (bits $A_0$–$A_3$), and subsequent LA commands load the higher order bits, $A_4$–$A_7$, $A_8$–$A_{11}$ and $A_{12}$–$A_{13}$). During the fourth LA cycle the $A_{12}$ and $A_{13}$ bits are loaded at the same time the CS0 and CS1 bits in chip select counter 605 are loaded. Upon the fifth LA command the two most significant bits in chip select counter 605 are loaded from ADD1 and ADD2. A counter 606 counts consecutively received LA commands for indicating where the four bits on ADD-1–ADD8 are to be inputted into counters 604 and/or 605.

Commands are sent to the ROM chip via $I_0$ and $I_1$ pins to a decoder 607 which outputs the LA command to TB (transfer bit) and a RB (read and branch) command.

Address register 604 and chip select register 605 have an add-one circuit 608 associated therewith for incrementing the address contained therein. When a carry occurs outside the fourteen bit number stored in address register 604 the carry is carried into shift select register 605 which may enable the chip select function if not previously enabled or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1–ADD8. The delay imposed by delay circuits 612 effect the two byte delay in this embodiment, because the address information inputted on pins ADD1–ADD8 leads the data outputted in response thereto by the time to require to access ROM array 601. The CS pin is preferably used in the embodiment of the learning aid disclosed herein.

A timing PLA 600 is used for timing the control signals outputted to ROM array 601 as well as the timing of other control signals.

Referring now to the composite drawing formed by FIGS. 20*a* and 20*b* output register 603 is formed by eight "A" bit latches, an exemplary one of which is shown at 617. The output of register 603 is connected in parallel via a four bit path controlled on $\overline{LOW}$ or $\overline{HIGH}$ signals to output buffers 616 for ADD1–ADD4 and 616*a* for ADD8. Buffers 616 and 616*a* are shown in detail on FIGS. 21*a*–21*b*.

Gates 615 which control the transferring of the parallel outputs from register 603 via in response to LOW and HIGH are preferably mask level programmable gates which are preferably not programmed when this chip is used with the learning aid described herein. Rather the data in register 603 is communicated serially via programmable gate 614 to buffer 616*a* and pin ADD8. The bits outputted to ADD1–ADD8 in response to a HIGH signal are driven from the third through sixth bits in register 603 rather that the fourth through seventh bits inasmuch as a serial shift will normally be accomplished between a LOW and HIGH signal.

Address register 604 comprises fourteen of the bit latches shown at 617. The address in address 604 on lines $A_0$–$A_{13}$ is communicated to the ROM X and Y address buffers shown on FIG. 21*a*–21*b*. Register 604 is divided into four sections 610*a*–601*d*, the 601*d* section loading four bits from ADD1–ADD8 in response an LAO signal, the 610*c* section loading four bits from ADD1–ADD8 in response to an LA0 signal and likewise for section 601*b* in response to an LA2 signal. Section 601*a* is two bits in length and loads the ADD1 and ADD2 bits in response to an LA2 signal. The chip select register 605 comprise four B type bit latches of the type shown at 618. The low order bits, CS0 and CS1 are loaded from ADD4 and ADD8 in response to an LA3 signal while the high order bits CS2 and CS3 are loaded from ADD1 and ADD2 on an LA4 signal. The LA0–LA4 signals are generated by counter 606. Counter 606 includes a four bit register 619 comprised of four A bit latches 617. The output of the four bit counter 619 is applied to a PLA 620 for decoding the LA1–LA4 signals. The LA0 signal is generated by a NAND gate 621. As can be seen, the LA0 signal comes up in response to an LA signal being decoded immediately after a TB signal. The gate 621 looks for a logical one on the LA signal and a logical one on an LTBD (latched transer bit delay) signal from latch 622. Decoder 607 decodes the $I_0$ and $I_1$ signals applied to pins $I_0$ and $I_1$ for decoding the TB, LA and RB control signals. The signals on the $I_0$ and $I_1$ pins are set out in Table X. Latch circuit 622 is responsive to LA, RB and TB for indicating whether the previously received instruction was either an LA or a TB or RB command.

In addition to counting successive LA commands, four bit counter 609 and PLA 620 are used to count successive TB commands. This is done because in this embodiment each TB command transfers one bit from register 603 on pin ADD8 to the synthesizer chip 10 and output register 603 is loaded once each eight successive TB commands. Thus, PLA 620 also generates a TB8 command for initiating a ROM array addressing sequence. The timing sequence of counter 619 and PLA 620 are set forth in Table XI. Of course, the LA1–LA4 signal is only generated responsive to successive LA commands while the TB8 signals only generate in response to successive TB commands.

Figure 21A:
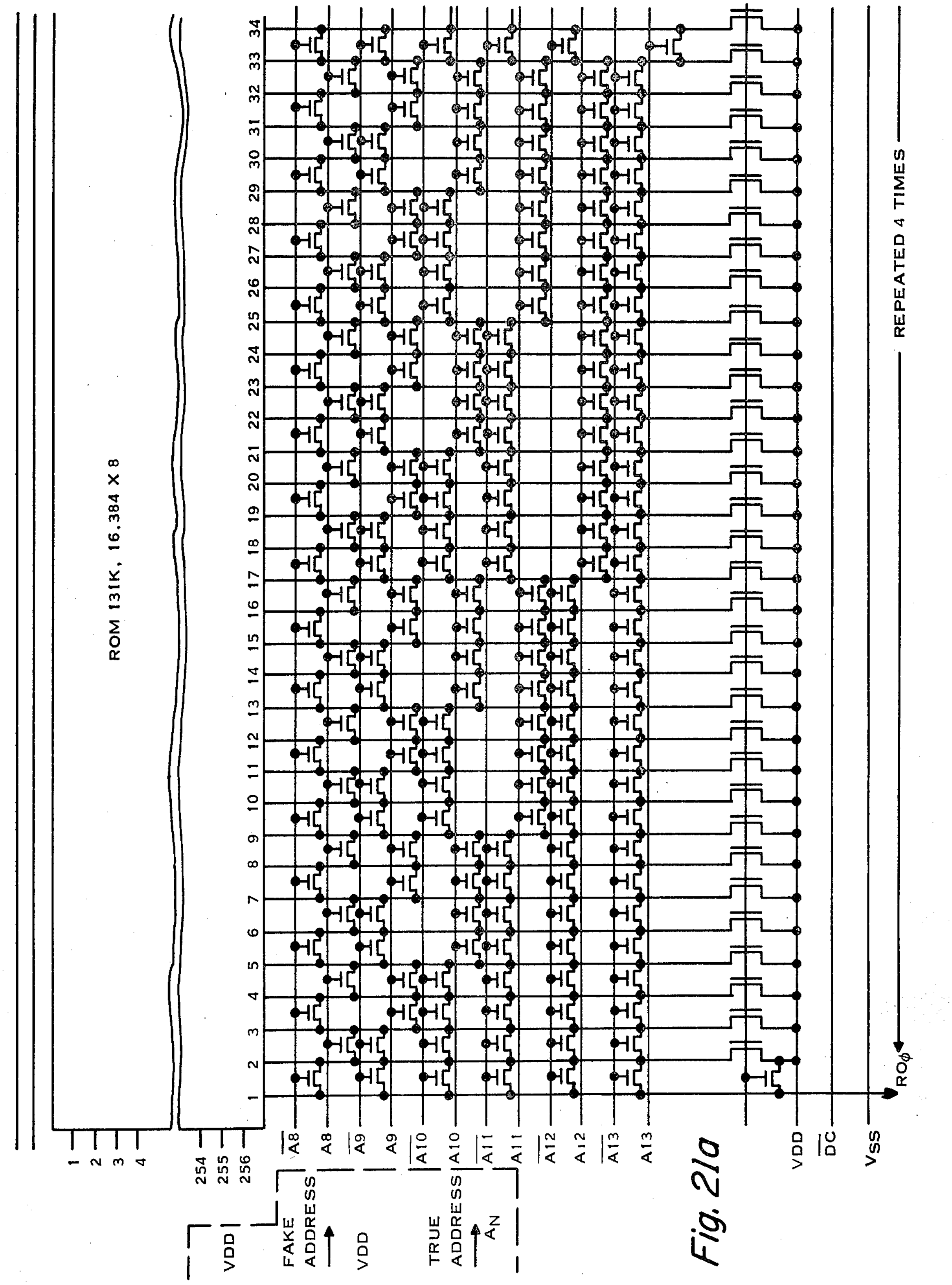
FIGS. 21*a* and 21*b* form a composite logic diagram of he X and Y address decoders and the array of memory ells.
Figure 21A:
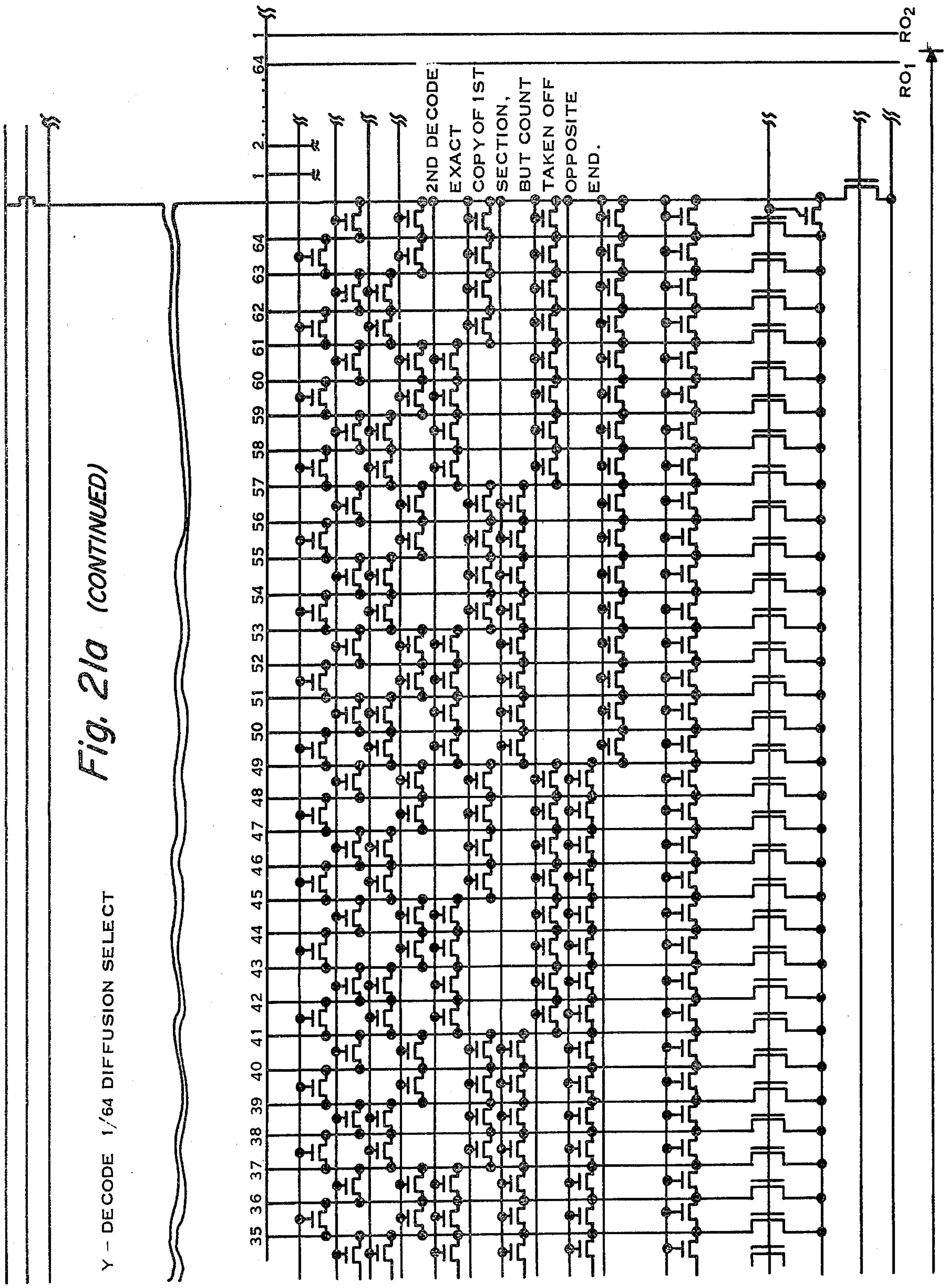
Figure 21B:
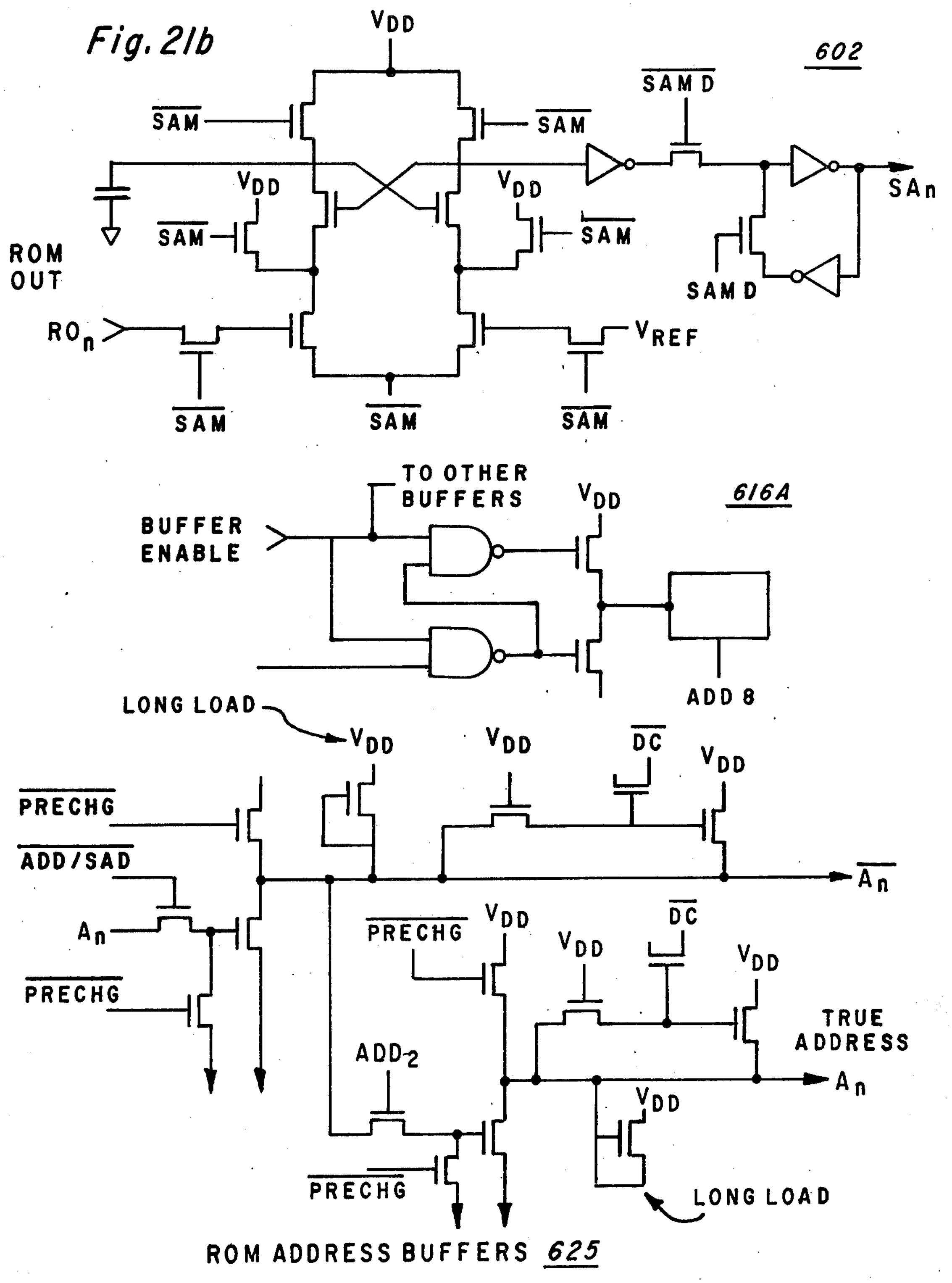
Figure 21B:
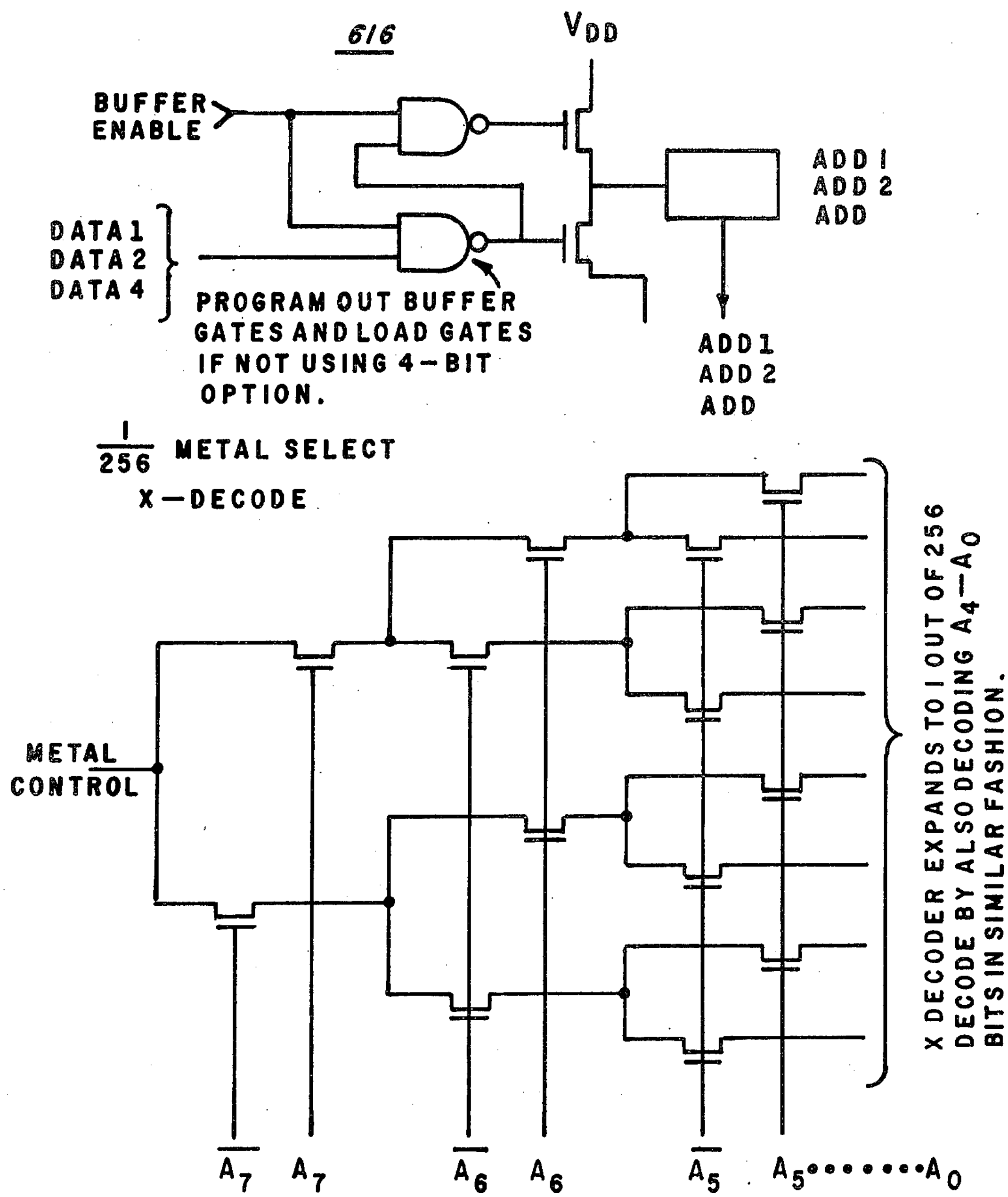

Add-one circuits 608 increments the number in program counter 604 in response to a TB command or an RB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to gate 611 or compared with the contents of CS3. Thus, gate 611 can test for either (1) the state of the CS signal, (2) a specific count in counter 605 or (3) a comparison between the state on the chip select and the state of CS3 or (4) some combination of the foregoing, as may be controlled by those knowledgeable in the art according to how programmable links 610 are programmed during chip manufacture. The output of gate 611 is applied via two bit latches of the C type, which are shown at 622. Timing array 600 controls the timing of ROM sequencing during RB and TB sequences. Array 600 includes PLA sections 600*a* and 600*b* and counter 623 and 624. Counter 623 is a two bit counter comprising two A type bit latches shown at 617. Counter 63 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The timing sequence for a TB command is shown in Table XI which depicts the states in counter 623 and 624 in the signals generated in response thereto. A similar timing sequence for an RB command is shown in Table XIII. The various signals generated by PLA 600*a* and 600*b* will now be briefly descrbied. The BR signal controls the transfer of two serial bits from the output register 603 to the program counter 604. The TF signal controls the transfer of eight bits from the sense amp latch 602 (FIG. 21–21*b*) to output register 603 on lines SA0–SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. SAM gates the data outputted from the ROM into the sense amp latch 602 while SAD gates the address lines by gating the address from th program counter into the ROM address buffers 625 (FIGS. 21*a*–21*b*).

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

| THE FOLLOWING SEQUENCE IS AN EXAMPLE OF THE LEARNING AID IN THE SPELLING MODE. | | |
|---|---|---|
| EY | DISPLAY | SPEAKER |
| OMPUSPELL | | 4 RANDOM TONES |
| | SPELL A | |
| B | SPELL B | B |
| C | SPELL C | C |
| D | SPELL D | D |
| P | SPELL D | P |
| A | SPELL A | A |
| GO | — | SPELL DO AS IN DO NOT |
| D | D- | D |
| O | DO- | O |
| NTER | DO | THAT IS CORRECT, NOW SPELL |
| | — | WAS |
| W | W- | W |
| U | WU- | U |
| S | WUS- | S |
| RASE | — | |
| W | W- | W |
| A | WA- | A |
| S | WAS- | S |
| NTER | WAS | THAT IS RIGHT, NEXT SPELL |
| | — | ANY |
| A | A- | A |
| N | AN- | N |
| I | ANI- | I |
| NTER | ANI | TRY AGAIN, |
| | — | ANY |
| | — | |
| EPEAT | — | ANY |
| EPEAT | — | ANY (½ SPEED) |
| E | E- | E |
| N | EN- | N |
| Y | ENY- | Y |
| NTER | ENY | THAT IS INCORRECT, THE CORRECT SPELLING OF ANY IS |
| | A | A |
| | AN | N |
| | ANY | Y |
| | ANY | ANY NOW TRY |
| | — | FULL |
| | F- | F |
| J | FU- | U |
| | FUL- | L |
| | FULL- | L |
| | FULL | THAT IS CORRECT, TRY SHOE MEANING FOOTWEAR |
| | — | |
| | S- | S |
| I | SH- | H |
| ) | SHO- | O |
| : | SHOE- | E |
| :NTER | SHOE | YOU ARE CORRECT, SPELL COMB |
| : | C- | C |
| ) | CO- | O |
| / | COM- | M |
| : | COME- | E |
| :NTER | COME | TRY AGAIN, COMB |
| | — | |
| : | C- | |
| ) | CO- | |
| / | COM- | |
| 3 | COMB- | |
| :NTER | COMB | YOU ARE CORRECT, NOW SPELL FOUR AS IN THE NUMBER |
| | — | |
| | F- | F |
| ) | FO- | O |
| J | FOU- | U |
| | FOUR- | R |
| :NTER | FOUR | THAT IS CORRECT, |
| | — | NEXT SPELL WHO |
| N | W- | W |

TABLE I-continued

| THE FOLLOWING SEQUENCE IS AN EXAMPLE OF THE LEARNING AID IN THE SPELLING MODE. | | |
|---|---|---|
| KEY | DISPLAY | SPEAKER |
| H | WH- | H |
| O | WHO- | O |
| ENTER | WHO | YOU ARE RIGHT, |
| | — | NOW TRY SOUP |
| S | S- | S |
| O | SO- | O |
| U | SOU- | U |
| P | SOUP- | P |
| ENTER | SOUP | THAT IS RIGHT, |
| | — | TRY MOST |
| M | M- | M |
| O | MO- | O |
| S | MOS- | S |
| T | MOST- | T |
| ENTER | MOST | YOU ARE CORRECT |
| | +8 −2 | 4 TONES |
| | +8 −2 | 4 TONES |
| | +8 −2 | HERE IS YOUR SCORE, EIGHT CORRECT, TWO DID NOT COMPUTE. |

TABLE II

| LEARN MODE | | |
|---|---|---|
| KEY | DISPLAY | SPEAKER |
| | BUSY | (1 SECOND PAUSE) SAY IT (2 SECOND PAUSE) BUSY |
| | MANY | (1 SECOND PAUSE) SAY IT (2 SECOND PAUSE) MANY |
| | CARRY | (1 SECOND PAUSE) SAY IT (2 SECOND PAUSE) CARRY |
| | YOUR | (1 SECOND PAUSE) SAY IT (2 SECOND PAUSE) YOUR |
| | WILD | (1 SECOND PAUSE) SAY IT (2 SECOND PAUSE) WILD |
| | LOVE | (1 SECOND PAUSE) SAY IT (2 SECOND PAUSE) LOVE |
| REPEAT, REPEAT, REPEAT, REPEAT } IGNORED | BUSH | (1 SECOND PAUSE) SAY IT (2 SECOND PAUSE) BUSH |
| | EARN | (1 SECOND PAUSE) SAY IT (2 SECOND PAUSE) EARN |
| | — | SPELL MANY |
| M | M- | M |
| A | MA- | A |
| N | MAN- | N |
| Y | MANY- | Y |
| ENTER | MANY | YOU ARE CORRECT, |
| | — | NOW SPELL EARN |
| THE LEARNING AID CONTINUES THROUGH THE REMAINING 9 WORDS AS IN THE SPELLING MODE. | | |

TABLE III

IN THE WORD GUESSER MODE THE LEARNING AID RANDOMLY SELECTS A WORD FROM LEVEL C OR D AND DISPLAYS DASHES TO REPRESENT THE NUMBER OF LETTERS IN THE CHOSEN WORD. THE USER TRIES TO GUESS THE WORD. THE USER MUST COMPLETE THE WORD BEFORE MAKING SEVEN INCORRECT GUESSES. THE FOLLOWING IS AN EXAMPLE OF THE FUNCTION OF THE LEARNING AID IN THE SPELLING MODE.

| KEY | DISPLAY | SPEAKER |
|---|---|---|
| HANGMAN | -------- | 4 TONES |
| A | -------- | |
| E | E-E----E | 4 TONES |
| I | E-E----E | |
| O | E-E--O-E | 4 TONES |
| U | E-E--O-E | |
| B | E-E--O-E | |
| C | E-E--O-E | |
| D | E-E--O-E | |
| F | E-E--O-E | |
| | EVERYONE | 4 TONES, I WIN |
| | ------ | |
| A | ------ | |
| E | -----E | 4 TONES |
| I | -----E | |
| O | -O---E | 4 TONES |
| U | -OU--E | 4 TONES |
| B | -OU--E | |
| C | COU--E | 4 TONES |
| R | COUR-E | 4 TONES |
| S | COURSE | 4 TONES |
| | COURSE | 4 TONES, YOU WIN |

TABLE IV

The synthesizer 10 includes interpolation logics to accomplish a nearly linear interpolation of all twelve speech parameters at eight points within each frame that is, once each 2.5 msec. The parameters are interpolated one at a time as selected by the parameter counter. The interpolation logics calculate a new value of a parameter from its present value (i.e. the value currently stored in the K-stack, pitch register or E-10 loop) and the target value stored in encoded form in RAM 203 (and decoded by ROM 202). The value computed by each interpolation is listed below.

Where $P_i$ is the present value of the parameter, $P_{i+1}$ is the new parameter value $P_t$ is the target value $N_i$ is an integer determined by the interpolation counter The values of $N_i$ for specific interpolation counts and the values $$\frac{P_i - P_o}{P_t - P_o}$$

($P_0$ is initial parameter value) are as follows:

| INTERPOLATION COUNT | $N_i$ | $\frac{P_i - P_o}{P_t - P_o}$ |
|---|---|---|
| 1 | 8 | 0.125 |
| 2 | 8 | 0.234 |
| 3 | 8 | 0.330 |
| 4 | 4 | 0.498 |
| 5 | 4 | 0.623 |
| 6 | 2 | 0.717 |
| 7 | 2 | 0.859 |
| 0 | 1 | 1.000 |

TABLE V

"HELP"

| ENERGY | PITCH | REPEAT | $K_1$ | $K_2$ | $K_3$ | $K_4$ | $K_5$ | $K_6$ | $K_7$ | $K_8$ | $K_9$ | $K_{10}$ | |
|---|---|---|---|---|---|---|---|---|---|---|---|---|---|
| 0000 | | | | | | | | | | | | | |
| 0100 | 00000 | 0 | 10011 | 01110 | 1001 | 0111 | | | | | | | |
| 0111 | 00000 | 1 | | | | | | | | | | | |
| 1101 | 10010 | 0 | 10000 | 10100 | 1000 | 0110 | 0111 | 1000 | 1010 | 100 | 101 | 010 | |
| 1101 | 10011 | 1 | | | | | | | | | | | |
| 1110 | 10011 | 1 | | | | | | | | | | | |
| 1101 | 10100 | 0 | 01101 | 01111 | 1010 | 1010 | 1001 | 0111 | 1000 | 100 | 101 | 101 | |
| 1101 | 10100 | 0 | 01110 | 01011 | 1000 | 1100 | 1101 | 1000 | 0100 | 100 | 011 | 101 | HEL |
| 1101 | 10011 | 0 | 10001 | 01010 | 0110 | 1001 | 1111 | 1011 | 0101 | 010 | 000 | 110 | |
| 1011 | 10010 | 1 | | | | | | | | | | | |
| 1010 | 10010 | 0 | 01101 | 00111 | 1000 | 1100 | 1111 | 0111 | 0010 | 001 | 010 | 110 | |
| 1001 | 10000 | 1 | | | | | | | | | | | |
| 1001 | 01110 | 1 | | | | | | | | | | | |
| 1000 | 01101 | 1 | | | | | | | | | | | |
| 0010 | 01110 | 0 | 00101 | 00101 | 1101 | 1001 | 1110 | 0101 | 0111 | 001 | 011 | 011 | |
| 0000 | | | | | | | | | | | | | |
| 0000 | | | | | | | | | | | | | |
| 0000 | | | | | | | | | | | | | |
| 0111 | 00000 | 0 | 10100 | 01011 | 1011 | 1000 | | | | | | | |
| 0111 | 00000 | 0 | 10001 | 01011 | 1011 | 0110 | | | | | | | |
| 0101 | 00000 | 1 | | | | | | | | | | | P |
| 0011 | 00000 | 0 | 10011 | 00111 | 1010 | 0110 | | | | | | | |
| 0010 | 00000 | 0 | 10010 | 00101 | 1011 | 0101 | | | | | | | |
| 0000 | | | | | | | | | | | | | |
| 1111 | | | | | | | | | | | | | |

TABLE VI

DECODED PARAMETERS

| CODE | E | P | K1 | K2 | K3 | K4 | K5 | K6 | K7 | K8 | K9 | K10 |
|---|---|---|---|---|---|---|---|---|---|---|---|---|
| 00 | 000 | 000 | 208 | 2A3 | 273 | 28F | 2C1 | 2DE | 2DD | 326 | 31F | 34D |
| 01 | 000 | 029 | 20F | 2B8 | 293 | 282 | 2E2 | 304 | 300 | 37B | 363 | 386 |
| 02 | 001 | 02B | 213 | 2CF | 2B9 | 2D8 | 306 | 32F | 328 | 3DA | 3AF | 3C3 |
| 03 | 001 | 02D | 218 | 2F8 | 2E6 | 30B | 320 | 35D | 352 | 038 | 3FD | 001 |
| 04 | 002 | 02F | 229 | 304 | 31B | 341 | 358 | 38E | 380 | 098 | 04C | 03F |

TABLE VI-continued

| ODE | E | P | K1 | K2 | K3 | K4 | K5 | K6 | K7 | K8 | K9 | K10 |
|---|---|---|---|---|---|---|---|---|---|---|---|---|
| | | | DECODED PARAMETERS | | | | | | | | | |
| 5 | 003 | 031 | 229 | 321 | 356 | 370 | 286 | 3C2 | 3B0 | 0EB | 097 | 07B |
| 6 | 005 | 033 | 234 | 340 | 398 | 3HD | 286 | 3F7 | 3E1 | 131 | 0DC | 0B3 |
| 7 | 007 | 035 | 242 | 362 | 3DC | 3FF | 3E7 | 02C | 013 | 169 | 118 | 0E7 |
| 8 | 00A | 037 | 255 | 384 | 023 | 040 | 018 | 061 | 045 | | | |
| 9 | 00F | 03A | 268 | 3A8 | 068 | 080 | 049 | 083 | 075 | | | |
| A | 015 | 03C | 286 | 3CD | 0A9 | 0BC | 079 | 0C2 | 0A3 | | | |
| B | 01F | 03F | 2A8 | 3F2 | DF4 | DF3 | 0A7 | DEF | 0CF | | | |
| C | 028 | 042 | 2CF | 017 | 119 | 123 | 0D2 | 116 | 0F6 | | | |
| D | 03D | 046 | 2FD | 03C | 146 | 14C | 0F9 | 139 | 118 | | | |
| E | 056 | 048 | 332 | 061 | 16C | 16F | 11D | 158 | 13C | | | |
| F | 000 | 04C | 360 | 085 | 18C | 18D | 13E | 173 | 159 | | | |
| 0 | | 04F | 3AA | 0A7 | | | | | | | | |
| 1 | | 053 | 3F8 | 0C7 | | | | | | | | |
| 2 | | 057 | 02D | 0E6 | | | | | | | | |
| 3 | | 05A | 06E | 103 | | | | | | | | |
| 4 | | 05E | 0AB | 11F | | | | | | | | |
| 5 | | 063 | 0F3 | 136 | | | | | | | | |
| 6 | | 067 | 115 | 14D | | | | | | | | |
| 7 | | 068 | 147 | 162 | | | | | | | | |
| 8 | | 070 | 165 | 1754 | | | | | | | | |
| 9 | | 176 | 184 | 185 | | | | | | | | |
| A | | 018 | 19D | 194 | | | | | | | | |
| B | | 081 | 182 | 1A1 | | | | | | | | |
| C | | 086 | 163 | 1AD | | | | | | | | |
| D | | 080 | 1D0 | 187 | | | | | | | | |
| E | | 093 | 1DA | 101 | | | | | | | | |
| F | | 099 | 1E2 | 1FA | | | | | | | | |

TABLE VII

| K-STACK OUTPUT | DATA OUTPUTTED FROM K-STACK 302 TO RECODING LOGIC 301 BY TIME PERIODS | | | | | | | | | | | | | | | | | | | |
|---|---|---|---|---|---|---|---|---|---|---|---|---|---|---|---|---|---|---|---|---|
| | TIME PERIODS | | | | | | | | | | | | | | | | | | | |
| IT LINE | T8 | T9 | T10 | T11 | T12 | T13 | T14 | T15 | T16 | T17 | T18 | T19 | T20 | T21 | T22 | T23 | T24 | T25 | T26 | T27 |
| SB 32-1 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| 32-2 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| 32-3 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| 32-4 | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ | $K_3$ |
| 32-5 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| 32-6 | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ | $K_4$ |
| 32-7 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| 32-8 | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ | $K_5$ |
| 32-9 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |
| ISB 32-10 | $K_5$ | $K_4$ | $K_3$ | $K_2$ | $K_1$ | A | $K_9$ | $K_8$ | $K_7$ | $K_6$ | $K_5$ | $K_4$ | $K_3$ | $K_2$ | $K_1$ | $K_{10}$ | $K_9$ | $K_8$ | $K_7$ | $K_6$ |

TABLE VIII

| ADDRESS | CHIRP FUNCTION VALUE | STORED VALUE (COMPLEMENTED) |
|---|---|---|
| | CHIRP ROM CONTENTS | |
| 00 | 00 | FF |
| 01 | 2A | D5 |
| 02 | D4 | 2B |
| 03 | 32 | CD |
| 04 | B2 | 4D |
| 05 | 12 | ED |
| 06 | 25 | DA |
| 07 | 14 | EB |
| 08 | 02 | FD |
| 09 | E1 | 1E |
| 10 | C5 | 3A |
| 11 | 02 | FD |
| 12 | 5F | A0 |
| 13 | 5A | A5 |
| 14 | 05 | FA |
| 15 | 0F | F0 |
| 16 | 26 | D9 |
| 17 | FC | 03 |
| 18 | A5 | 5A |
| 19 | A5 | 5A |
| 20 | D6 | 29 |

TABLE VIII-continued

| ADDRESS | CHIRP FUNCTION VALUE | STORED VALUE (COMPLEMENTED) |
|---|---|---|
| | CHIRP ROM CONTENTS | |
| 21 | DD | 22 |
| 22 | DC | 23 |
| 23 | FC | 03 |
| 24 | 25 | DA |
| 25 | 2B | D4 |
| 26 | 22 | DD |
| 27 | 21 | DE |
| 28 | 0F | F0 |
| 29 | FF | 00 |
| 30 | F8 | 07 |
| 31 | EE | 11 |
| 32 | ED | 12 |
| 33 | EF | 10 |
| 34 | F7 | 08 |
| 35 | F6 | 09 |
| 36 | FA | 05 |
| 37 | 00 | FF |
| 38 | 03 | FC |
| 39 | 02 | FD |
| 40 | 01 | FE |

TABLE IX-0 LEARNING AID INSTRUCTION SET

| Add-ress | Instruction | Branch Line | Line | Name | Title | | Comments |
|---|---|---|---|---|---|---|---|
| 0000 | [illegible] | | 0055 | KC5 | TAMZA | | ADD 5 TO KEY |
| 0001 | [illegible] | | 0056 | | ACAAC | 5 | CODE EACH TIME |
| 0003 | [illegible] | | 0057 | | TCY | 14 | R-LINE POINTER IS DECREMENTED |
| 0007 | [illegible] | 0112 | 0058 | | CALL | ADDCARRY | |
| 000F | [illegible] | [illegible] | 0059 | | BRANCH | KD2 | |
| 001F | [illegible] | | 0060 | KEYDOWN | TCMIY | 0 | RESET DEBOUNCE COUNTER |
| 003F | [illegible] | | 0061 | | LDX | 1 | |
| 007F | [illegible] | | 0062 | | TCY | 14 | |
| 007E | [illegible] | | 0063 | | TKM | | |
| 007D | [illegible] | | 0064 | | MNEZ | | DOUBLE CHECK KEY DOWN |
| 007B | [illegible] | 0064 | 0065 | | BRANCH | KD1 | |
| 0077 | [illegible] | | 0066 | | LDX | 0 | |
| 006F | [illegible] | 0134 | 0067 | | BRANCH | CAR3 | KEY NOT DOWN |
| 005F | [illegible] | | 0068 | KD1 | LDX | 0 | |
| 003E | [illegible] | | 0069 | | TCMIY | 0 | |
| 007C | [illegible] | | 0070 | | TCMIY | 0 | |
| 0079 | [illegible] | | 0071 | | TCY | 13 | |
| 0073 | [illegible] | | 0072 | | IMY | | |
| 0067 | [illegible] | | 0073 | | RSTR | | RESET PRESENT R-LINE |
| 004F | [illegible] | | 0074 | | TCY | 13 | |
| 001E | [illegible] | | 0075 | | CLA | | |
| 003D | [illegible] | | 0076 | | ACACC | 6 | PUT 6 IN ACC |
| 007A | [illegible] | | 0077 | | MNEZ | | SEE IF KEY IS ON VSS |
| 0075 | [illegible] | [illegible] | 0078 | | BRANCH | KD2 | VSS |
| 006B | [illegible] | | 0079 | | TMA | | |
| 0057 | [illegible] | | 0080 | KD2 | TAY | | * STORE 6 IF K=VSS |
| 002F | [illegible] | | 0081 | | TCY | 13 | |
| 005E | [illegible] | | 0082 | | DMAN | | |
| 003B | [illegible] | 0055 | 0083 | | BRANCH | KD3 | |
| 0076 | [illegible] | | 0084 | SUMNIT | LDX | ONE | * BUMP ROUTINE TO CALCUL VALUE OF KP |
| 006D | [illegible] | | 0085 | | TCY | VALUE | ** |
| 0043 | [illegible] | | 0086 | | TMA | | ** |
| 0006 | [illegible] | | 0087 | | ALEC | 2 | |
| 000D | [illegible] | 0096 | 0088 | | BRANCH | ARND+5 | |
| 001A | [illegible] | | 0089 | | ACACC | 15 | |
| 0037 | [illegible] | | 0090 | | ALEC | 3 | |
| 006E | [illegible] | 0096 | 0091 | | BRANCH | ARND+5 | |
| 005D | [illegible] | | 0092 | | ACACC | 13 | |
| 005A | [illegible] | | [illegible] | | ALEC | 4 | |
| [illegible] | [illegible] | [illegible] | [illegible] | | BRANCH | ARND+5 | |

TABLE IX-0 (Continued)

```
0069  01110101         0095              ACACC     10
0053  01111111         0096   A[illegible]+S  ACACC  MINUS#1      **
0026  01001000         0097              LDX       ZERO         **
004C  00110101         0098              TCY       VALUE        **
0014  11111000  0112   0099              CALL      ADDCARRY
0031  01000111         0100   EVLSOUT    BL        KEYBEVL
0062  10000100  2262   0101
                       0102   * THIS ROUTINE USES ,CARRY, TO INCREMENT THE RANDOM NUMBER/TIMEOUT COUNTER
0045  00100011         0103   TIMEUP     TCY       12
004A  00000111         0104              KNEZ
0015  10001111  0128   0105              BRANCH    CAR2
0024  01001110         0106   TIMEUP1    LDX       3
0056  00100001         0107              TCY       8
002C  10000010  0116   0108              BRANCH    CARRYON
                       0109   *
                       0110   *   CARRY:  FOR ADDITION IN ROM ADDR SECTION OF RAM
                       0111   *
0058  00001101         0112   ADDCARRY   AMAAC
0030  10100001  0115   0113              BRANCH    CARRY
0060  10000011  0116   0114              BRANCH    NOCARRY
0041  00011101         0115   CARRY      TAMIYC                 CARRY
0002  00011010         0116   CARRYON    IMAC                   INCREMENT MEM IF CARRY
0005  10100001  0115   0117              BRANCH    CARRY
0003  00001111         0118   NOCARRY    TAM
0017  01011111         0119              RETN
002F  00100011         0120              TCY       12
005E  00101001         0121              TMA                    CHECK TIMEOUT COUNTER
003C  01110110         0122              ALEC      3
0078  10100111  0126   0123              BRANCH    CAR1
0071  00100011         0124   OFF        TCY       13           TURNS OFF CALCULATOR
0063  00011110         0125              RSTR
0047  01001000         0126   CAR1       LDX       0
000E  10011110  0133   0127              BRANCH CAR3
001D  00010101         0128   CAR2       TMA
0034  00100101         0129   CAR4       TCY       10           TEST DEBOUNCE COUNTER
0076  00010011         0130              TMIT      3            ACCEPT KEY IF COUNTER>7
0062  10101001  0135   0131              BRANCH    CAR5         RESET DEBOUNCE COUNTER
0059  00110000         0132              TCMIY     0
0036  01000111         0133   CAR3       BL        DISP/KB1
006C  10111010  2245   0134
0053  01111011         0135   CAR5       ALEC      13           *TEST TO SEE IF SPEECH IS
0032  10111110  0134   0136              BRANCH    CAR3         *FINISHED (TEST TALK COUNTER=14)
0064  10011111  0062   0137              BRANCH    KEYDOWN
                       0138   *
```

TABLE IX-0 (Continued)

| | | | | | | | |
|---|---|---|---|---|---|---|---|
| | | | 0139 | * | | | |
| | | | 0140 | * | | | |
| | | | 0141 | * | | | |
| 0049 | 01001001 | | 0142 | GAME#3 | LDX | 0 | |
| 0012 | 00101110 | | 0143 | | TCY | 7 | |
| 0025 | 00110101 | | 0144 | | TMA | | |
| 0034 | 01110111 | | 0145 | | ALEC | 6 | |
| 0014 | 10101010 | 0148 | 0146 | | BRANCH | FIRST | |
| 0029 | 10010001 | 0152 | 0147 | | BRANCH | GM3A | |
| 0052 | 00111110 | | 0148 | FIRST | TCMIY | 7 | |
| 0024 | 01010010 | | 0149 | | SBIT | 1 | |
| 0048 | 01001000 | | 0150 | | CALLL | CLEAR | |
| 0010 | 11011010 | 0230 | 0151 | | | | |
| 0021 | 01000010 | | 0152 | GM3A | CALLL | CURLEVL | |
| 0042 | 11110111 | 0709 | 0153 | | | | |
| 0003 | 00110000 | | 0154 | | TCMIY | 0 | |
| 0009 | 00110001 | | 0155 | | TCMIY | 8 | * TO 008C; 008C=008D |
| | | | 0156 | * | | | * CONTAIN ADDRESS FOR |
| | | | 0157 | * | | | * RANDOM LETTER TABLE |
| 0013 | 01000011 | | 0158 | | CALLL | MEMADDR | ADDRESS 0350 |
| 0027 | 11111000 | 1501 | 0159 | | | | |
| 004E | 01000110 | | 0160 | | CALLL | LOADRESS | * LOAD DATA FROM 0350 INTO |
| 001C | 11100010 | 1121 | 0161 | | | | |
| | | | 0162 | * | | | * ROM ADDRESS LOCATION |
| 0039 | 01001100 | | 0163 | | LDX | 3 | |
| 0072 | 00100001 | | 0164 | | TCY | 9 | |
| 0065 | 01010111 | | 0165 | | RBIT | 3 | |
| 004B | 00101001 | | 0166 | | TMA | | |
| 0016 | 01001100 | | 0167 | | LDX | 1 | * ADD |
| 002D | 00100101 | | 0168 | | TCY | 11 | * TO |
| 005A | 11101000 | 0112 | 0169 | | CALL | ADDCARRY | * ROM ADDRESS |
| 0034 | 01001110 | | 0170 | | LDX | 3 | GET LSD OF RANDOM NUMBER |
| 0068 | 00100001 | | 0171 | | TCY | 8 | GET MSD OF RANDOM NUMBER |
| 0051 | 00101001 | | 0172 | | TMA | | |
| 0022 | 01001100 | | 0173 | | LDX | 1 | |
| 0044 | 00100101 | | 0174 | | TCY | 10 | |
| 0008 | 11101000 | 0112 | 0175 | | CALL | ADDCARRY | * ADD TO ROM ADDRESS |
| 0011 | 01000101 | | 0176 | | CALLL | MEMADDR | LOAD ADDRESS TO 0350 |
| 0023 | 11101100 | 1501 | 0177 | | | | |
| 0046 | 01000111 | | 0178 | | CALLL | ROTADDR2 | GET LSD OF RANDOM LETTER |
| 000C | 11100001 | 1083 | 0179 | | | | |
| 0019 | 01001000 | | 0180 | | LDX | 0 | |
| 0033 | 00100111 | | 0181 | | TCY | 14 | |

TABLE IX-0 (Continued)

```
0000 000111111        0182        TA·
0040 010001110        0183        CALLL   OUTADDR2    GET MSD OF RANDOM LETTER
001A 111000011  1083  0184
0035 011001000        0185        LDX     0           * STORE
006A 001001111        0186        TCY     15          * LIKE A
0055 000101111        0187        TAM                 * KEYPRESS
002A 010011100        0188        LDX     2
0054 011100000        0189        TCMIY   0
002B 010001011        0190        BL      TRANSFER    ** SAYS LETTER AND
0050 101111111  1875  0191                            ** PUTS IT IS DISPLAY
                      0192    *
```

TABLE IX-1

```
                      0193            ORGPG   1
0000 000101101        0194  NOTFULL   TAMIYC
0001 001101000        0195            TCMIY   1
0003 001000111        0196            TCY     14
0007 000101001        0197            TMA
000F 001001101        0198            TCY     11
001F 001011010        0199            TMY
003F 010011000        0200            LDX     1
007F 000101101        0201            TAMIYC
007F 001100011        0202            TCMIY   12
007. 010010000        0203            LDX     0
0078 001011101        0204            TCY     NXT$DSP     **
0077 000110010        0205            IMAC                **
006F 000101111        0206            TAM                 **
005F 010000010        0207            BL      NOSTRANS    **
003E 100111100  0680  0208
                      0209    *
                      0210    *   GO ROUTINE==> DECIDES WHICH MODE YOUR IN AND BRANCHES
                      0211    *       TO THAT MODE, ELSE GOES TO DISP/KB.
                      0212    *
```

TABLE IX-1 (Continued)

```
007C 01001010        0213  GO       -L       RANDOM
0079 10000000  0753  0214
0073 01001001        0215  RANDTN   LDX      8              DAM
0067 00100110        0216           TCY      6
004F 01010110        0217           RBIT     1
001E 00100001        0218           TCY      8              SET GO MODE FLAG
0030 01010010        0219           SBIT     1              *
007A 00101110        0220           TCY      7              TEST WHICH MODE
0075 00101001        0221           TMA
006B 01001101        0222           LDX      5
0057 00101011        0223           TCY      13
002E 00110000        0224           TCMIY    0
005C 01001101        0225           CALLL    CORR$SPL
003B 11000000  1552  0226
0070 01000100        0227           LDP      2
0061 01110100        0228           ALEC     1              SPELL?
0043 10000000  0342  0229           BRANCH   USPELL         *
0006 01000001        0230           LDP      8              *
000C 01111100        0231           ALEC     3              LEARN?
0013 10011001  1209  0232           BRANCH   ULRN+1
0037 01001101        0233           LDP      11
006E 01110110        0234           ALEC     6              GAME#1?
005D 10111110  1590  0235           BRANCH   CORR+1
003A 00100000        0236  CLEAR    TCY      0
0074 01001000        0237  HERE     LDX      0
0069 00111000        0238           TCMIY    1
0053 00000100        0239           DYN
0026 01001100        0240           LDX      1
004C 00111101        0241           TCMIY    11
0018 00101001        0242           YNEC     8
0031 11111100  0237  0243           BRANCH   HERE
0062 00100000        0244           TCY      0
0045 00111011        0245           TCMIY    12
000A 01001000        0246           LDX      0
0015 00101101        0247           TCY      11
0024 00110000        0248           TCMIY    0
0056 01011111        0249           RETN
002C 10111011  0215  0250  REPLAY   BRANCH   RANDTN
                     0251  *
                     0252  *  ENTER-  ROUTINE TO PROCESS ENTER KEY DEPRESS
                     0253  *
005B 01001001        0254  ENTER    LDX      8              DAM
003B 00101110        0255           TCY      7              FLAG
```

TABLE IX-1 (Continued)

| | | | | | | | |
|---|---|---|---|---|---|---|---|
| 0061 | 00110011 | | 0256 | | MNEZ | | SPELL MODE? |
| 0041 | 10000011 | 0259 | 0257 | | BRANCH | TST4A3 | NO |
| 0002 | 10110011 | 0273 | 0258 | | BRANCH | SPACE=3 | |
| 0005 | 00010010 | | 0259 | TST4A3 | TMY | | |
| 0008 | 00111100 | | 0260 | | YNEC | 3 | SPELL IT MODE? |
| 0017 | 10111110 | 0263 | 0261 | | BRANCH | TST4A6 | NO |
| 002F | 10111011 | 0273 | 0262 | | BRANCH | SPACE=3 | |
| 005F | 00101110 | | 0263 | TST4A6 | YNEC | 6 | GAME 2 MODE? |
| 003C | 11110011 | 0273 | 0264 | | BRANCH | SPACE=3 | |
| 0078 | 01100110 | | 0265 | | BL | CRYPTO | |
| 0071 | 10000000 | 0894 | 0266 | | | | |
| | | | 0267 | * | | | |
| | | | 0268 | * TEST FOR CURSER POSITION | | | |
| | | | 0269 | * FIRST POSITION? ***RETURN | | | |
| | | | 0270 | * ELSE, REPLACE CURSER WITH SPACE | | | |
| | | | 0271 | * | | | |
| | | | 0272 | * TEST FOR POSITION OF CURSER AND REPLACE WITH SPACE | | | |
| 0063 | 01001110 | | 0273 | SPACE=3 | TCY | 7 | LAST CHAR |
| 0047 | 01001100 | | 0274 | | LDX | 1 | |
| 000F | 00000110 | | 0275 | SPACE=2 | CLA | | ACC=0 |
| 0010 | 01111101 | | 0276 | | ACACC | 11 | 1B=SPACE |
| 003F | 10001001 | | 0277 | | MNEA | | MEM=11? |
| 0076 | 10111001 | 0283 | 0278 | | BRANCH | CHAROR6 | NO |
| 0060 | 01001000 | | 0279 | | LDX | 0 | YES |
| 005A | 00111011 | | 0280 | | MNEZ | | BLANK? |
| 0036 | 10010001 | 0296 | 0281 | | BRANCH | SPACE=1 | YES, GO TO SPACE=1 |
| 006C | 10010110 | 0293 | 0282 | | BRANCH | CHAR | ELSE, CHAR |
| 0059 | 01001100 | | 0283 | CHAROR6 | LDX | 1 | |
| 0032 | 00111100 | | 0284 | | ACACC | 1 | ACC=12 FOR CURSER |
| 0064 | 00001001 | | 0285 | | MNEA | | |
| 0049 | 10110100 | 0293 | 0286 | | BRANCH | CHAR | CHAR |
| 0012 | 01101000 | | 0287 | | LDX | 0 | TEST MSW |
| 0025 | 00110011 | | 0288 | | MNEZ | | CURSER |
| 004A | 10011001 | 0291 | 0289 | | BRANCH | CUR=1 | YES |
| 0014 | 10101100 | 0293 | 0290 | | BRANCH | CHAR | NO, THEN CHAR |
| 0029 | 01011000 | | 0291 | CUR=1 | LDX | 1 | LSW |
| 0052 | 00111011 | | 0292 | | TCMIY | 11 | |
| 0024 | 01111111 | | 0293 | CHAR | RETN | | |
| 004A | 01000010 | | 0294 | | BL | SPLENTER | GO TO SPELL ROUTINE |

TABLE IX-1 (Continued)

```
0019  10101111  0373  0295  SPACE-1   DYN                   SEARCH FOR CURSER
0021  00001100        0296            LDX       1           *
0042  11011000        0297            BRANCH    SPACE-2     *
0004  10001110  0275  0298
                      0299  *
                      0300  *
                      0301  *    NOPHRASE LOADS ROM ADDR WITH SECOND WRONG RESPONSE
                      0302  *       THEN CONTINUES TO NEXT WORD
                      0303  *
0069  01011100        0304  NOPHRASE  LDX       3           FLAG
0013  00100011        0305            TCY       13          *
0027  00111100        0306            TCMIY     3
004F  01001010        0307            CALLL     CURLEVL
001C  11110111  0763  0308
0039  00110100        0309            TCMIY     2
0072  00110110        0310            TCMIY     6
0065  01000101        0311  SP*4      CALLL     MEMADDR
0048  11101100  1501  0312
0016  01000110        0313            CALLL     LOADRESS
0020  11100010  1121  0314
005A  01000101        0315            CALLL     MEMADDR
0034  11101100  1501  0316
0066  01000011        0317            BL        LNKSET      ALWAYS BRANCH
0051  10111000  1751  0318
0022  01001100        0319  F-SCORE   LDX       2           RETNBCH FLAG
0044  00100111        0320            TCY       14
0006  00110100        0321            TCMIY     1
0011  00110000        0322            TCMIY     0           *
0023  01001010        0323            CALLL     CURLEVL     ZERO ROM ADDR
0046  11110111  0769  0324
000C  01000110        0325            LDP       6
0019  01110001        0326            ALEC      9           10 CORRECT?????
0033  10011111  0955  0327            BRANCH    F2          NO.
0060  01001000        0328            LDX       0
0040  00100100        0329            TCY       2
001A  00110010        0330            TCMIY     2
0035  01011000        0331            LDX       1           ELCE--------
0062  00100110        0332            TCY       1
0055  00110101        0333            TCMIY     1
0023  00110000        0334            TCMIY     0
0054  01010100        0335            LDX       2
0024  00100111        0336            TCY       14
0053  00011010        0337            TMAC
0021  01001101        0338            BL        TONE22
0041  10110011  1656  0339
```

```
                                      ORGPG    2
                              *
0000 [illegible]                USPELL   CONXA                     ADDRESS DAM
0001 [illegible]                         TCY      4
0003 [illegible]                         TCMIY    0
0007 [illegible]                USPELL+1 CALLL    CLEAR             * BLANK DISPLAY - INPUT CURSER
000F 11011101[illegible] 023[illegible]
                              *  LOAD PHRASE INTO ROM ADDRESS REG
001F [illegible]                DISSPELL CALLL    CURLEVL
003F 11110111[illegible] 7[illegible]
007F [illegible]                         TCMIY    4
007[illegible] [illegible]                TCMIY    6
0070 [illegible]                ADDCTR   CONXA                     ADDRESS DAM
007[illegible] [illegible]                TCY      4                 PHRASE COUNTER-->ACC
0077 [illegible]                         TMA                        *
006F [illegible]                         LDX      1
005F [illegible]                         TCY      10
003[illegible] [illegible]                RETN
007C [illegible]                         CALLL    ADDCARRY
0079 111[illegible] 0112
                              *  SET UP WORD ADDRESS IN LAR/EDT
0073 [illegible]                         LDX      2
0067 [illegible]                         TCY      15
004F [illegible]                         TCMIY    9
001F [illegible]                         CALLL    MEMADDR
003[illegible] 111[illegible] 1501
007[illegible] [illegible]                CALLL    LDADRESS
0075 111[illegible] 1121
006[illegible] [illegible] [illegible]23  BRANCH   WAIT3
                              *
                              *  SPLENTER- BEGINS BY COMPARING CORRECT SPELLING BUFFER
                              *        TO DISPLAY BUFFER
                              *
0057 [illegible]                SPLENTER TCY      0                 FIRST LETTER--LSA
002[illegible] [illegible]                SPLNTR+1 LDX      3                 *
005C [illegible]                         TMA
003[illegible] [illegible]                LDX      1                 DISPLAY BUFFER
007[illegible] [illegible]                MNEA                       SAME?
00[illegible] [illegible] [illegible]25  BRANCH   *ISS1
[illegible] [illegible]                   LDX      2                 YES, TEST MSW
0006 [illegible]                         CLA
[illegible] [illegible]                   TBIT1    [illegible]
```

TABLE IX-2 (Continued)

| | | | | | | | |
|---|---|---|---|---|---|---|---|
| 0018 | 10110111 | 0384 | 0382 | | BRANCH | CONXT1 | |
| 0037 | 10111101 | 0385 | 0383 | | BRANCH | CONXT2 | |
| 006F | 01111000 | | 0384 | CONXT1 | ACACC | 1 | |
| 0050 | 01001000 | | 0385 | CONXT2 | LDX | 0 | |
| 003A | 00000101 | | 0386 | | MNEA | | SAME? |
| 0074 | 10110110 | 0425 | 0387 | | BRANCH | MISS1 | |
| 0069 | 00000110 | | 0388 | | CLA | | |
| 0053 | 01011111 | | 0389 | | RETN | | |
| 0026 | 00000101 | | 0390 | | IYC | | NEXT LETTER |
| 004C | 00110001 | | 0391 | | YNEC | 8 | |
| 001B | 10010111 | 0374 | 0392 | | BRANCH | SPLNTH+1 | NO |
| | | | 0393 | * | SPELLING IS CORRECT | | |
| 0031 | 01011010 | | 0394 | | COMXA | | ADDRESS DAM |
| 0062 | 00100110 | | 0395 | | TCY | 6 | FLAG |
| 0045 | 00010000 | | 0396 | | TBIT | 0 | BIT 0==>0=FIRST TRY |
| 0004 | 10010111 | 0400 | 0397 | | BRANCH | WRIT | * 1==>MORE TN ONE |
| 0015 | 01010000 | | 0398 | | SBIT | 0 | |
| | | | 0399 | * | BEGIN LOADING PRAISE PHRASE | | |
| 002A | 01001110 | | 0400 | WRIT | LDX | 3 | |
| 0056 | 00101011 | | 0401 | | TCY | 13 | FLAG |
| 002C | 00110100 | | 0402 | | TCMIY | 1 | |
| 005A | 01011010 | | 0403 | | COMXA | | |
| 0030 | 00100100 | | 0404 | | TCY | 1 | |
| 0060 | 00110000 | | 0405 | | TCMIY | 1 | |
| 0041 | 01001100 | | 0406 | | LDX | 2 | |
| 0002 | 00100111 | | 0407 | | TCY | 15 | |
| 0005 | 00110110 | | 0408 | | TCMIY | 3 | |
| 0008 | 01001010 | | 0409 | | CALLL | CM-LEVL | |
| 0017 | 11110111 | 0769 | 0410 | | | | |
| 002F | 00110001 | | 0411 | | TCMIY | 8 | |
| 005F | 00110101 | | 0412 | | TCMIY | 5 | |
| 003C | 11111101 | 0352 | 0413 | | CALL | ADDCTR | |
| 0078 | 01110110 | | 0414 | | ALEC | 6 | |
| 0071 | 10111110 | 0421 | 0415 | | BRANCH | WRIT2 | |
| 0063 | 01011010 | | 0416 | | COMXA | | |
| 0047 | 00100010 | | 0417 | | TCY | 4 | |
| 000E | 00110000 | | 0418 | | TCMIY | 0 | |
| 001C | 00000110 | | 0419 | | CLA | | |
| 0038 | 01011010 | | 0420 | | COMXA | | |
| 007B | 01000000 | | 0421 | WRIT2 | LDP | 0 | |
| 0070 | 11100000 | 112 | 0422 | | CALL | ADDCARRY | |
| 0058 | 01000010 | | 0423 | WRIT3 | RL | ADDCTR6 | |
| 0030 | 10111001 | 0704 | 0424 | | | | |

TABLE IX-2 (Continued)

| | | | | | | | |
|---|---|---|---|---|---|---|---|
| 006C | 000000110 | | 0425 | MISS1 | CLA | | |
| 0059 | 001110011 | | 0426 | | ACACC | 12 | |
| 0032 | 010010000 | | 0427 | | LDX | 0 | |
| 0064 | 010111111 | | 0428 | | RETN | | |
| 0049 | 010000101 | | 0429 | | BL | MISSPELL | |
| 0012 | 100111001 | 1546 | 0430 | | | | |
| 0025 | 010001000 | | 0431 | F3 | CALLL | CLEAR | CLEAR DISPLAY |
| 004A | 110111010 | 0236 | 0432 | | | | |
| 0014 | 010010001 | | 0433 | | LDX | 8 | |
| 0029 | 001000001 | | 0434 | | TCY | 8 | |
| 0052 | 010100001 | | 0435 | | SBIT | 2 | |
| 0024 | 010100110 | | 0436 | | RBIT | 1 | |
| 0048 | 001001000 | | 0437 | | TCY | 1 | |
| 0010 | 010010000 | | 0438 | | LDX | 0 | |
| 0021 | 001100100 | | 0439 | | TCMIY | 2 | |
| 0042 | 001001110 | | 0440 | | TCY | 7 | |
| 0004 | 001100100 | | 0441 | | TCMIY | 2 | |
| 0009 | 010011000 | | 0442 | | LDX | 1 | |
| 0013 | 001000000 | | 0443 | | TCY | 0 | |
| 0027 | 001101011 | | 0444 | | TCMIY | 13 | |
| 004F | 001000110 | | 0445 | | TCY | 6 | |
| 001C | 001100111 | | 0446 | | TCMIY | 14 | |
| 0039 | 010011010 | | 0447 | | LDX | 5 | |
| 0072 | 001001011 | | 0448 | | TCY | 13 | |
| 0065 | 000101001 | | 0449 | | TMA | | |
| 0048 | 010011000 | | 0450 | | LDX | 1 | |
| 0016 | 001001110 | | 0451 | | TCY | 7 | |
| 0020 | 000101111 | | 0452 | | TAM | | |
| 005A | 010001110 | | 0453 | | CALLL | FL2 | |
| 0034 | 110001100 | 1145 | 0454 | | | | |
| 006E | 010011000 | | 0455 | | LDX | 1 | |
| 0051 | 001001000 | | 0456 | | TCY | 1 | |
| 0022 | 000101111 | | 0457 | | TAM | | |
| 0044 | 010001000 | | 0458 | | BL | F=SCORE | |
| 0008 | 100100010 | 0319 | 0459 | | | | |
| | | | 0460 | * LEARN MODE BEGINS HERE | | | |
| | | | 0461 | * | | | |
| 0011 | 010010001 | | 0462 | SPELL | LDX | 8 | |
| 0023 | 001001110 | | 0463 | | TCY | 7 | |
| 0046 | 001101000 | | 0464 | | TCMIY | 0 | |
| 000C | 101001101 | 0469 | 0465 | | BRANCH | SPELL9 | |

TABLE IX-2 (Continued)

| | | | | | | | |
|---|---|---|---|---|---|---|---|
| 0019 | 010010001 | | 0466 | LEARN | LDX | 8 | |
| 0033 | 001001110 | | 0467 | | TCY | 7 | |
| 0066 | 001100100 | | 0468 | | TCMIY | 2 | |
| 0040 | 010001111 | | 0469 | SPELL9 | BL | DSP7 | |
| 001A | 101110000 | 2188 | 0470 | | | | |
| 0035 | 011111100 | | 0471 | MISS3 | ACACC | 3 | |
| 006A | 000101111 | | 0472 | | TAM | | |
| 0055 | 010000010 | | 0473 | | LDP | 4 | |
| 002A | 011100110 | | 0474 | | ALEC | 6 | |
| 0054 | 100101100 | 0680 | 0475 | | BRANCH | NOSTRANS | |
| 0028 | 010001100 | | 0476 | | BL | TWIN | |
| 0050 | 100101100 | 0541 | 0477 | | | | |

TABLE IX-3

| | | | | | | | |
|---|---|---|---|---|---|---|---|
| | | | 0478 | | ORGPG | 3 | |
| 0000 | 010010100 | | 0479 | GAME#1 | LDX | 2 | |
| 0001 | 000000110 | | 0480 | | CLA | | |
| 0003 | 001001011 | | 0481 | | TCY | 13 | CLEAR GUESS COUNTER |
| 0007 | 000101111 | | 0482 | | TAM | | |
| 000F | 010011100 | | 0483 | | LDX | 3 | HANGMAN FLAG |
| 001F | 001100111 | | 0484 | | TCMIY | 14 | |
| 003F | 001000101 | | 0485 | | TCY | 10 | * TEST RANDOM COUNTER |
| 007F | 000100000 | | 0486 | | TBIT | 0 | * BIT AND PUT 2 OR 3 |
| 007E | 101111011 | 0489 | 0487 | | BRANCH | HANG2 | * IN ACC |
| 007D | 001111000 | | 0488 | | ACACC | 1 | * |
| 007B | 001110100 | | 0489 | HANG2 | ACACC | 2 | |
| 0077 | 010011000 | | 0490 | | LDX | 1 | * STORE 2 OR 3 IN LEVEL |
| 006F | 001001111 | | 0491 | | TCY | 15 | * OF DIFFICULTY |
| 005F | 000101111 | | 0492 | | TAM | | DAM |
| 003E | 010010001 | | 0493 | | LDX | 8 | |
| 007C | 001001110 | | 0494 | | TCY | 7 | |
| 0079 | 001101010 | | 0495 | | TCMIY | 5 | SET HANGMAN MODE |
| 0073 | 010001010 | | 0496 | | BL | CURLEVL | |
| 0067 | 101101111 | 0769 | 0497 | | | | |

TABLE IX-3 (Continued)

```
                          0498   * 'RANDOM' GENERATES A RANDOM WORD,
                          0499   * PUTS IT IN THE CORRECT SPELLING
                          0500   * BUFFER AND RETURNS TO 'HANG'
004F 010001000            0501   HANG     CALLL    CLEAR          PUT BLANKS IN DISPLAY
001F 110111010   0236     0502
0030 001000001            0503            TCY      8
007A 000000100            0504   HANG3    DYN
0075 010000100            0505            CALLL    SPLNTR+1       * COMPARE DISPLAY DIGIT TO
0068 110101110   0374     0506
6057 011100000            0507            ALEC     0              * DIGIT IN CORRECT
002E 101111010   0504     0508            BRANCH   HANG3          * SPELLING BUFFER
                          0509   * FINDS THE FIRST DIGIT THAT IS NOT A
                          0510   * BLANK, STARTING FROM THE RIGHT SIDE;
                          0511   * THE ROUTINE BELOW THEN PUTS CURSORS IN
                          0512   * THE DIGITS CORRESPONDING TO LETTERS
005C 010011000            0513            LDX      1
0038 000101100            0514   HANG4    TAMDYN
0070 100111000   0514     0515            BRANCH   HANG4
0061 010001101            0516   SONG     BL       TONES
0043 101000111   1657     0517
                          0518   * IF THE HANGMAN FLAGS ARE SET UP, LETTER
                          0519   * KEYS GO TO 'HANG1' AFTER SPEAKING THE LETTER
                          0520   ** THIS ROUTINE COMPARES LETTER ENTERED TO CORRECT SPELLING
0006 001001011            0521   HANG1    TCY      13
0000 010010000            0522            LDX      0              * BIT 1= WORD NOT COMPLETE
001B 001100000            0523            TCMIY    0              * BIT 0=CORRECT LETTER
0037 001000001            0524            TCY      8
006E 010100011            0525   HANG5    SBIT     3              BIT IS SET AFTER EACH DIGIT IS COMPARED
0050 000000100            0526            DYN
003A 101011011   0562     0527            BRANCH   HANG6
0074 001000001            0528            TCY      8              COMPARISONS ARE COMPLETE
0069 010100111            0529   HANG10   RBIT     3              RESET BIT 3 IN EACH DIGIT
0053 000000100            0530            DYN
0026 101101001   0529     0531            BRANCH   HANG10
004C 001001011            0532            TCY      13
0018 000100000            0533            TBIT     0              WAS THE LETTER CORRECT?
0031 101100011   0555     0534            BRANCH   HANG11
0062 010010100            0535            LDX      2              NO
0045 000110010            0536            IMAC                    * ADD 1 TO INCORRECT
000A 000101111            0537            TAM                     * GUESS COUNTER
```

TABLE IX-3 (Continued)

| | | | | | | | |
|---|---|---|---|---|---|---|---|
| 0015 | 010001111 | | 0538 | | LDP | 15 | |
| 0028 | 011100110 | | 0539 | | ALEC | 6 | |
| 0056 | 100101100 | 2219 | 0540 | | BRANCH | DISP/KB | |
| 002C | 010011000 | | 0541 | IWIN | LDX | 1 | |
| 0058 | 001000101 | | 0542 | | TCY | 10 | |
| 0030 | 001100000 | | 0543 | | TCMIY | 0 | |
| 0060 | 001101110 | | 0544 | | TCMIY | 7 | |
| 0041 | 001100000 | | 0545 | IWIN1 | TCMIY | 0 | |
| 0002 | 001100000 | | 0546 | | TCMIY | 0 | |
| 0005 | 001001111 | | 0547 | | TCY | 15 | |
| 0004 | 010010100 | | 0548 | | LDX | 2 | |
| 0017 | 001100000 | | 0549 | | TCMIY | 0 | |
| 002F | 010010001 | | 0550 | | LDX | 8 | CLEAR HANGMAN |
| 005E | 001000001 | | 0551 | | TCY | 8 | |
| 003C | 010100110 | | 0552 | | RBIT | 1 | |
| 0078 | 010000101 | | 0553 | | BL | LOADDISP | |
| 0071 | 101111001 | 1456 | 0554 | | | | |
| 0063 | 000100010 | | 0555 | HANG11 | TBIT | 1 | |
| 0047 | 101100001 | 0516 | 0556 | | BRANCH | SONG | |
| 000E | 001000101 | | 0557 | YOUWIN | TCY | 10 | YES |
| 001D | 010011000 | | 0558 | | LDX | 1 | |
| 003B | 001100100 | | 0559 | | TCMIY | 2 | |
| 0076 | 001101110 | | 0560 | | TCMIY | 7 | * 'YOU WIN' |
| 0060 | 101000001 | 0545 | 0561 | | BRANCH | IWIN1 | |
| 0058 | 010000100 | | 0562 | HANG6 | CALLL | SPLNTR+1 | *CHECK IF CORRECT |
| 0036 | 110101110 | 0374 | 0563 | | | | |
| 006C | 011100000 | | 0564 | | ALEC | 0 | *LETTER HAS ALREADY |
| 0059 | 101101110 | 0525 | 0565 | | BRANCH HANGS | | *BEEN ENTERED IN EACH DIGIT |
| 0032 | 001001111 | | 0566 | | TCY | 15 | NO |
| 0064 | 000101001 | | 0567 | FINDIT | TMA | | PUT LETTER CODE IN ACC |
| 0049 | 001000001 | | 0568 | | TCY | 8 | * FIND THE FIRST LETTER |
| 0012 | 000000100 | | 0569 | HANG7 | DYN | | * THAT HASN,T YET |
| 0025 | 000100011 | | 0570 | | TBIT | 3 | * BEEN ENTERED |
| 004A | 100010010 | 0569 | 0571 | | BRANCH | HANG7 | * CORRECTLY |
| 0014 | 010111111 | | 0572 | | RETN | | * |
| 0029 | 000101111 | | 0573 | | TAM | | STORE LETTER CODE |
| 0052 | 001001111 | | 0574 | | TCY | 14 | *GET OTHER HALF OF |
| 0024 | 010001100 | | 0575 | | CALLL | FINDIT | *LETTER CODE AND STORE IT |
| 0048 | 111100100 | 0567 | 0576 | | | | |
| 0010 | 010011000 | | 0577 | | LDX | 1 | * |

TABLE IX-3 (Continued)

```
0021  000101111         0578            TAM                    *
0042  010000100         0579            CALLL    SPLNTR+1      CHECK TO SEE IF
0004  110101110  0374   0580
0009  011100000         0581            ALEC     0             NEW LETTER MATCHES
0013  100101101  0591   0582            BRANCH   HANG8
0027  010011000         0583            LDX      1             * DOES NOT MATCH
004F  000101011         0584            TYA                    * PUT BLANK BACK
001C  001100011         0585            TCMIY    12            * IN DISPLAY
0039  010010000         0586            LDX      0
0072  001001011         0587            TCY      13
0065  010100010         0588            SBIT     1             SET FLAG FOR WORD NOT COMPLETE
004B  000101000         0589            TAY
0016  100110100  0593   0590            BRANCH   HANG9         RET
002D  000101011         0591   HANG8    TYA                    CORRECT LETTER GUESS
005A  001001011         0592            TCY      13            *
0034  010100000         0593   HANG9    SBIT     0             * CORRECT LETTER FLAG IF Y=13
0068  000101000         0594            TAY
0051  101101110  0525   0595            BRANCH   HANG5
                        0596   *
                        0597   *  NXTWORD--RESETS FLAGS, INCREMENTS COUNTERS AND POINTERS
                        0598   *
0022  010110010         0599   NXTWORD  COMX8                  *
0044  001000010         0600            TCY      4             INCREMENT PHRASE COUNTER
0008  000101001         0601            TMA
0011  001110100         0602            ACACC    2
0023  011100001         0603            ALEC     8
0046  100011001  0606   0604            BRANCH   NXT2
000C  000000110         0605            CLA
0019  000101111         0606   NXT2     TAM
0033  001000110         0607            TCY      6             RESET HITS FLAG6
0066  010100100         0608            RBIT     0
004D  010100110         0609            RBIT     1
001A  001000000         0610            TCY      0             INCREMENT R&E POINTER
0035  000110010         0611            IMAC                   *
006A  000101111         0612            TAM                    *
0055  000101010         0613            IMY                    *
002A  010000100         0614            LDP      2
0054  001010101         0615            YNEC     10            *
002B  100000111  0345   0616            BRANCH   USPELL+1
0050  010000100         0617            BL       F3
0020  100100101  0431   0618
```

TABLE IX-4

```
                              0619            ORGPG     4
0000  010001000               0620  GAME#2    CALLL     CLEAR        PUTS BLANKS AND CURSOR IN DISPLAY
0001  110111010    0236       0621
0003  010010001               0622            LDX       8            DAM
0007  001001110               0623            TCY       7
000F  001100110               0624            TCMIY     6            SET MODE FOR CODE BREAKER
001F  010100010               0625            SBIT      1            SET GO FLAG
003F  010001101               0626            BL        TONES
007F  101000111    1657       0627
                              0628  *
007E  010010001               0629  DIFFSLV   LDX       8
007D  001001110               0630            TCY       SEVEN        **
007B  000101001               0631            TMA
0077  010010000               0632            LDX       0
006F  001000000               0633            TCY       0
005F  001101000               0634  BLANKM    TCMIY     1
003E  001010001               0635            YNEC      8
007C  101011111    0634       0636            BRANCH    BLANKM
0079  001001000               0637            TCY       1
0073  011100000               0638            ALEC      0
0067  101000011    0656       0639            BRANCH    LZEROS
                              0640  *
004F  001100000               0641            TCMIY     0            A
001E  001000010               0642            TCY       4
003D  001100000               0643            TCMIY     0            I
                              0644  *
007A  010011000               0645            LDX       ONE          **
0075  001000000               0646            TCY       DISPLAY      **
006A  001100100               0647            TCMIY     2            S
0057  001100000               0648            TCMIY     0            A
002E  001100001               0649            TCMIY     8            Y
005C  001101101               0650            TCMIY     11
003A  001100001               0651            TCMIY     8            I
0070  001101100               0652            TCMIY     3            T
0061  101110100    0665       0653            BRANCH    BLANK
                              0654  *
                              0655  *
0043  001100000               0656  LZEROS    TCMIY     0            PUT ,SPELL, IN DISPLAY
0006  001011010               0657            YNEC      5
000D  101000011    0656       0658            BRANCH    LZEROS
                              0659  *
001B  010011000               0660            LDX       ONE          **
```

```
0037 001000000        0661           TCY     DISPLAY     **
006E 001100100        0662           TCMIY   LSWSS       **
0050 001101111        0663           TCMIY   LSWSP       **
003A 001100010        0664           TCMIY   LSWSE       **
0074 001101101        0665 BLANK     TCMIY   11
0069 001010001        0666           YNEC    8
0053 101110100  0665  0667           BRANCH  BLANK
0026 001001111        0668 PUTSLVL   TCY     LEVEL       * PUT LEVEL IN DISPLAY
004C 000101001        0669           TMA                 **
001A 001001110        0670           TCY     7
0031 000101111        0671           TAM                 **
                      0672 *
0062 010010000        0673           LDX     ZERO        **
0045 001100000        0674           TCMIY   0
                      0675 *
0004 010110010        0676           CIIMXB              * CLEAR GO FLAG
0015 001000001        0677           TCY     FLAG2       **
002B 001100000        0678           TCMIY   0
0056 010111111        0679           RETN                **
002C 010010000        0680 NUSTRANS  LDX     0           CALCULATE LETTER ADDRESS
005B 001001111        0681           TCY     15
0030 000101001        0682           TMA
0060 010011000        0683           LDX     1
0041 001000011        0684           TCY     12
0002 001100000        0685           TCMIY   0
0005 001100000        0686           TCMIY   0
000B 001001101        0687           TCY     11
0017 000101111        0688           TAM
002F 010000000        0689           CALLL   ADDCARRY
005F 111011000  0112  0690
003C 010010000        0691           LDX     0
0078 001000111        0692           TCY     14
0071 000101001        0693           TMA
0063 010011000        0694           LDX     1
0047 001000101        0695           TCY     10
000F 000101111        0696           TAM
001D 010000000        0697           CALLL   ADDCARRY
003B 111011000  0112  0698
0076 000000110        0699           CLA
006D 001110011        0700           ACACC   12
005B 001000101        0701           TCY     10
0036 010000000        0702           CALLL   ADDCARRY
006C 111011000  0112  0703
0059 010000101        0704 ADDCTR6   CALLL   MEMADDR
```

TABLE IX-4 (Continued)

```
0032  111011000  1501  0705
0064  010001110        0706              CALLL    LOADRESS
0049  111000010  1121  0707
0012  010000111        0708              BL       ADDWDS2
0025  100001010  2057  0709
004A  010010100        0710  RETNSHCH LDX      2                RETNSHCH FLAG=ACC
0014  001001111        0711              TCY      15               *
0029  000101001        0712              TMA
0052  010001111        0713              LDP      15
0024  011101000        0714              ALEC     1                SPELL?
0048  100101100  2219  0715              BRANCH   DISP/KB
0010  010001101        0716              LDP      11
0021  011100100        0717              ALEC     2
0042  101000010  1680  0718              BRANCH   NXTTONE
0004  010001100        0719              LDP      3
0009  011101100        0720              ALEC     3                NXTWORD?
0013  100100010  0599  0721              BRANCH   NXTWORD
0027  010000101        0722              LDP      10
004E  011100010        0723              ALEC     4                NEG?
001C  100001001  1540  0724              BRANCH   MSPEL3
0039  010000001        0725              LDP      8
0072  011101010        0726              ALEC     5                SAY IT?
0065  101100011  1232  0727              BRANCH   DISLP=5
004B  010001001        0728              LDP      9
0016  011100110        0729              ALEC     6                SPEAK LETTER?
002D  101110110  1372  0730              BRANCH   LET+4
005A  010001100        0731              LDP      3
0034  011101110        0732              ALEC     7
0068  100000110  0521  0733              BRANCH   HANG1
0051  011100001        0734              ALEC     8
0022  100000000  0479  0735              BRANCH   GAME#1
0044  010000101        0736              LDP      10
0008  011101001        0737              ALEC     9
0011  101101010  1570  0738              BRANCH   ADDCTR2
0023  010000001        0739              LDP      8
0046  011100101        0740              ALEC     10
000C  101100011  1232  0741              BRANCH   DISLP=5
                       0742  *   TSTBIT2-->USED IN LOADING LNK/EDT TO TEST FOR 3 WORDS OF ZERO
                       0743  *            1 WORD OF 0001
                       0744  *
0019  010110010        0745  TSTBIT2  COMXR                     DAM REG
0033  001000100        0746              TCY      2
0066  010100110        0747              RBIT     1
004D  010100101        0748              RBIT     2
001A  010110010        0749              COMXR
```

TABLE IX-5

```
                                      ORGPG      5                    **
                           *  STORE SEED NUMBER
0000  010010010            RANDOM     LDX        4
0001  001000101                       TCY        10
0003  000000110                       CLA
0007  010001111                       CALLL      FIL$LOOP
000F  110101110   2183
001F  001001110                       TCY        7
003F  010010001                       LDX        8
007F  010001110                       LDP        7
007E  000100000                       TBIT       0
007D  101110011   1039                BRANCH     LDPREV
007B  010100000                       SBIT       0
0077  010001010                       LDP        5
                           *  CURLEVL**>
                           *  STORES NUMBER OF ENTRIES IN CURRENT LEVEL
                           *  INTO RAM
                           *
006F  001000101            CURLEVL    TCY        10
005F  010011000                       LDX        1
                           *   ZERO OUT ROM ADDR
003E  001100000                       TCMIY      0
007C  001100000                       TCMIY      0
0079  001100000                       TCMIY      0
0073  001100000                       TCMIY      0
0067  001000101                       TCY        10
004F  010111111                       RETN
                           *  FIND DIFFICULTY LEVEL
001E  001001111                       TCY        15
003D  000101001                       TMA
007A  001000101                       TCY        10
0075  000101111                       TAM
006B  010000111                       CALLL      ADD8
0057  110001100   2139
002E  010000101                       CALLL      MEMADDR
005C  111011000   1501
                           *  OUTPUT # OF ENTRIES IN THIS LEVEL
0038  010001110                       CALLL      OUTADDR2
0070  111000001   1083
0061  001001111                       TCY        15
0043  010011010                       LDX        5
0006  000101111                       TAM
000D  010001110                       CALLL      OUTADDR2
001B  111000001   1083
0037  001001111                       TCY        15
006E  010010010                       LDX        4
005D  000101111                       TAM
003A  010011010                       LDX        5
0074  000000111                       DMAN
0069  100011000   0804                BRANCH     DECMEM
0053  000101111                       TAM
0026  010010010                       LDX        4
004C  000000111                       DMAN
0018  000101111            DECMEM     TAM
0031  010011100                       LDX        3
0062  001000001                       TCY        8
0045  000101001                       TMA
000A  010011010                       LDX        5
0015  001000000                       TCY        0
002B  000101111                       TAM
0056  010011100                       LDX        3
002C  001001001                       TCY        9
0058  000101001                       TMA
0030  010010010                       LDX        4
0060  001000000                       TCY        0
0041  000101111                       TAM
```

TABLE IX-5 (Continued)

```
                                  * DETERMINE IF SEED IS '>' NUMBER OF ENTRIES
0002  001001111               DECLOOP   TCY      15
0005  000000001                         ALEM
0008  101111000   0825                  BRANCH   RANOK
0017  001000000                         TCY      0
002F  001111100                         ACACC    3
005E  000101111                         TAM
003C  100000010   0818                  BRANCH   DECLOOP
0078  000001001               RANOK     MNEA
0071  101011001   0837                  BRANCH   RANOK2
0063  001000000                         TCY      0
0047  010011010                         LDX      5
000F  000101001                         TMA
001D  001001111               DECLOOP3  TCY      15
003B  000000001                         ALEM
0076  101011001   0837                  BRANCH   RANOK2
006D  001000000                         TCY      0
005B  001111100                         ACACC    3
0036  000101111                         TAM
006C  100011101   0830                  BRANCH   DECLOOP3
0059  010110010               RANOK2    COMX8
                              * ZERO RWE POINTER
0032  001000000                         TCY      0
0064  001100000                         TCMIY    0
0049  010011010               RPLOOP    LDX      5
0012  010001101                         CALLL    RCOMX8
0025  111001100   1631
004A  000101001                         TMA
0014  000000101                         IYC
0029  001111000                         ACACC    1
0052  110101000   0888                  CALL     INCARRY
0024  000101100                         TAMDYN
0048  010010010                         LDX      4
0010  000101001                         TMA
0021  000000101                         IYC
0042  000010101                         AMAAC
0004  000101111                         TAM
0009  010001101               RANARND   CALLL    RCOMX8
0013  111001100   1631
0027  000101001                         TMA
004E  001001111                         TCY      15
001C  000000001                         ALEM
0039  101100101   0861                  BRANCH   RANCNT
0072  101000100   0870                  BRANCH   ZRORAND
0065  000001001               RANCNT    MNEA
004B  101100110   0878                  BRANCH   RANCOMP
0016  010011010                         LDX      5
002D  010001101                         CALLL    RCOMX8
005A  111001100   1631
0034  000101001                         TMA
0068  001001111                         TCY      15
0051  000000001                         ALEM
0022  101100110   0878                  BRANCH   RANCOMP
0044  010001101               ZRORAND   CALLL    RCOMX8
0008  111001100   1631
0011  001100000                         TCMIY    0
0023  000000100                         DYN
0046  010010010                         LDX      4
000C  001100000                         TCMIY    0
0019  001100000                         TCMIY    0
```

TABLE IX-5 (Continued)

```
0033  101001001  0841  0877            BRANCH    RPLOOP
0066  001000000        0878  RANCOMP   TCY       0
                       0879  *  COMPARE RANDOM # TO # OF ENTRIES
0040  010110010        0880            COMXB
001A  000110010        0881            IMAC
0035  000101111        0882            TAM
006A  011101001        0883            ALEC      9
0055  101001001  0841  0884            BRANCH    RPLOOP
002A  010001110        0885            BL        RANSTOP
0054  100000000  1021  0886
                       0887  *
0028  000101111        0888  INCARRY   TAM
0050  010010010        0889            LDX       4
0020  000110010        0890            IMAC
0040  010111111        0891            RETN
```

TABLE IX-6

```
                       0892            ORGPG     6          **
                       0893  ****      CODE      BREAKER    ******
0000  010001000        0894  CRYPTO    CALLL     SPACE=3    ELIMINATE CURSOR FROM DISPLAY
0001  111100011  0273  0895
0003  001000000        0896            TCY       0
0007  010010000        0897  CRY1      LDX       0
000F  000110011        0898            MNEZ                 TEST MSB OF DISPLAY CHARACTER
001F  100111101  0915  0899            BRANCH    CRY2       BRANCH IF MSB=1
003F  010011000        0900  COMPL     LDX       1
007F  000110010        0901            IMAC                 * COMPLEMENT THE LSD OF
007E  000110001        0902            CPAIZ                * THE DISPLAYED LETTER
007D  010111111        0903            RETN
007B  011101001        0904            ALEC      9          * IF A CHARACTER CODE
0077  100111110  0908  0905            BRANCH    CRY3       * PAST 'Z' HAS BEEN
006F  001110110        0906            ACACC     6          * CREATED, ADD 6 TO GET A LETTER
005F  101010111  0919  0907            BRANCH    CRY6       RET
003F  000101111        0908  CRY3      TAM                  STORE COMPLEMENT OF LSD
007C  010010000        0909  CRY5      LDY       0
0079  001101000        0910            TCMIY     1          SET MSB TO 1
0073  001010001        0911  CRY4      YNEC      8          ARE ALL LETTERS FINISHED?
0067  100000111  0897  0912            BRANCH CRY1          NO, CONTINUE
```

TABLE IX-6 (Continued)

```
004F  010001101         0913  CRY12   BL       TONES
001E  101000111  1657   0914
0030  010000110         0915  CRY2    CALLL    COMPL
007A  110111111  0900   0916
0075  011101010         0917          ALEC     5          * TEST FOR CODES OTHER
006B  101111100  0909   0918          BRANCH   CRY5       * THAN LETTERS AND SKIP THEM
0057  000101111         0919  CRY6    TAM
002E  010010000         0920          LDX      0
005C  001100000         0921          TCMIY    0          SET MSB TO ZERO
0038  101110011  0911   0922          BRANCH   CRY4       RET
0070  010011100         0923  CLUE    LDX      3
0061  001000001         0924          TCY      8
0043  000101001         0925          TMA                 GET HEX RANDOM NUMBER
0006  011101110         0926          ALEC     7          * IF NUMBER IS GREATER
0000  100110111  0929   0927          BRANCH   CLUE1      * THAN 7, ADD 8
001B  001110001         0928          ACACC    8          *
0037  000101000         0929  CLUE1   TAY                 SET Y RANDOMLY 0- 7
006E  000000100         0930  CLUE2   DYN                 * LOOK FOR FIRST
005D  101110100  0933   0931          BRANCH   YOK
003A  001001110         0932          TCY      7
0074  010000100         0933  YOK     CALLL    SPLNTR+1   * LETTER THAT HASN'T
0069  110101110  0374   0934
0053  011100000         0935          ALEC     0          * BEEN CORRECTLY ENTERED
0026  101101110  0930   0936          BRANCH   CLUE2
004C  010010100         0937          LDX      2
0018  000100000         0938          TBIT     0          MSB IS A ONE?
0031  100000101  0952   0939          BRANCH   CLUE3      YES
0062  010011100         0940  GETIT   LDX      3          NO
0045  000101001         0941          TMA                 * GET LSD OF LETTER
0004  010010000         0942          LDX      0          * FROM CORRECT SPELLING
0015  001000111         0943          TCY      14         * BUFFER AND PUT IT IN
002B  000101101         0944          TAMIYC              * KEY CODE
0056  010111111         0945          RETN
002C  001100000         0946          TCMIY    0          SET MSB=0
0058  001001011         0947  CLUE4   TCY      13
0030  010010100         0948          LDX      2
0060  000101001         0949          TMA
0041  010000100         0950          BL       MISS3
0002  100110101  0471   0951
0005  111100010  0940   0952  CLUE3   CALL     GETIT
000B  001101000         0953          TCMIY    1          SET MSB=1
0017  101011000  0947   0954          BRANCH   CLUE4      RET
002F  000101000         0955  F2      TAY
```

TABLE IX-6 (Continued)

| | | | | | | | | |
|---|---|---|---|---|---|---|---|---|
| 003C | 101001111 | 0913 | 0957 | | BRANCH | CRY12 | | |
| 0078 | 010010000 | | 0958 | | LDX | 0 | | 10 |
| 0071 | 001001010 | | 0959 | | TCY | 5 | | |
| 0063 | 001101000 | | 0960 | | TCMIY | 1 | | |
| 0047 | 001100100 | | 0961 | | TCMIY | 2 | | |
| 000E | 001100100 | | 0962 | | TCMIY | 2 | | |
| 001D | 010011000 | | 0963 | | LDX | 1 | | |
| 003A | 001001010 | | 0964 | | TCY | 5 | | |
| 0076 | 001100111 | | 0965 | | TCMIY | 14 | | |
| 006D | 001101000 | | 0966 | | TCMIY | 1 | | |
| 005B | 001100000 | | 0967 | | TCMIY | 0 | | |
| 0036 | 101001111 | 0913 | 0968 | | BRANCH | CRY12 | | |
| 006C | 010011100 | | 0969 | F5 | LDX | 3 | | |
| 0059 | 001001011 | | 0970 | | TCY | 13 | | LNK/EDT VALUE |
| 0032 | 001100000 | | 0971 | | TCMIY | 0 | | |
| 0064 | 010011000 | | 0972 | F2LOOP | LDX | 1 | | |
| 0049 | 001000101 | | 0973 | | TCY | 10 | | |
| 0012 | 001100100 | | 0974 | | TCMIY | 2 | | |
| 0025 | 001100010 | | 0975 | | TCMIY | 4 | | |
| 004A | 001100000 | | 0976 | | TCMIY | 0 | | |
| 0014 | 001100000 | | 0977 | | TCMIY | 0 | | |
| 0029 | 010011010 | | 0978 | | LDX | 5 | | |
| 0052 | 001001011 | | 0979 | | TCY | 13 | | # OF CORRECT SCORES |
| 0024 | 000101001 | | 0980 | | TMA | | | |
| 0048 | 000010101 | | 0981 | | AMAAC | | | CORRY? |
| 0010 | 101001101 | 1012 | 0982 | | BRANCH | NOF2 | | |
| 0021 | 010011000 | | 0983 | | LDX | 1 | | |
| 0042 | 001000101 | | 0984 | | TCY | 10 | | |
| 0004 | 000010101 | | 0985 | | AMAAC | | | |
| 0009 | 101101010 | 1015 | 0986 | | BRANCH | NOF3 | | |
| 0013 | 000101111 | | 0987 | | TAM | | | |
| 0027 | 010111111 | | 0988 | FINL2 | RETN | | | |
| 004F | 010000101 | | 0989 | | CALLL | MEMADDR | | |
| 001C | 111011000 | 1501 | 0990 | | | | | |
| 0039 | 010001110 | | 0991 | | CALLL | LOADRESS | | LOAD ADDRESS |
| 0072 | 111000010 | 1121 | 0992 | | | | | |
| 0065 | 010011000 | | 0993 | | LDX | 1 | | |
| 004B | 010000011 | | 0994 | | CALLL | TRANS=1 | | STORE N DAM |
| 0016 | 110100011 | 1036 | 0995 | | | | | |
| 002D | 010001001 | | 0996 | | BL | F4 | | |

TABLE IX-6 (Continued)

```
005A 101001101  1422
0034 001000101        FINL3    TCY      10
0068 010011000        FINL6    LDX      1
0051 000101001                 TMA
0022 010010010                 LDX      4
0044 000101101                 TAMIYC
0008 001010111                 YNEC     14
0011 101101000  0999           BRANCH   FINL6
0023 010001010                 CALLL    CURLEVL
0046 111101111  0769
000C 001100010                 TCMIY    4
0019 001101110                 TCMIY    7
0033 010001000                 BL       SPK4
0066 101100101  0311
                      *
0040 010011000        NOF2     LDX      1
001A 001000101                 TCY      10
0035 000010101                 AMAAC
006A 000101101        NOF3     TAMIYC
0055 000110010                 IMAC
002A 000101111                 TAM
0054 100100111  0988           BRANCH   FINL2
```

TABLE IX-7

```
                               ORGPG    7                        **
                      *  LOADED 10 VALUES =STORE LAST VALUE
0000 001100000        RANSTOP  TCMIY    0
0001 001000101                 TCY      10
0003 010011010                 LDX      5
0007 000101001                 TMA
000F 001000111                 TCY      14
001F 000101111                 TAM
003F 010010010                 LDX      4
007F 001000101                 TCY      10
007E 000101001                 TMA
007D 001000111                 TCY      14
007B 000101111                 TAM
0077 010011010        RSCRAM2  LDX      5
006F 111110000  1052           CALL     RSCRAM
005F 010010010                 LDX      4
003E 111110000  1052           CALL     RSCRAM
007C 010001000                 BL       RANRTN
0079 101110011  0215
                      *  LDPREV==> LOADS NEXT VALUE NTO RWE
0073 001000111        LDPREV   TCY      14
0067 010010010                 LDX      4
004F 000101001                 TMA
001E 001000000                 TCY      0
003D 000101111                 TAM
007A 001000111                 TCY      14
0075 010011010                 LDX      5
006B 000101001                 TMA
0057 001000000                 TCY      0
002E 000101111                 TAM
005C 010001010                 LDP      5
0038 101011001  0837           BRANCH   RANOK2
                      *  SCRAMBLES RWE WORDS
0070 001000000        RSCRAM   TCY      0
0061 000101001                 TMA
0043 001000110                 TCY      6
0006 000000011                 XMA
000D 001000000                 TCY      0
001B 000101101                 TAMIYC
0037 000101001                 TMA
```

IX-7 (Continued)

```
100E   001001110        1059        TCY      7
105D   000000011        1060        XMA
103A   001001000        1061        TCY      1
1074   000101101        1062        TAMIYC
1069   000101001        1063        TMA
1053   001001010        1064        TCY      5
1026   000000011        1065        XMA
104C   001000100        1066        TCY      2
1018   000101101        1067        TAMIYC
1031   000101001        1068        TMA
1062   001000001        1069        TCY      8
1045   000000011        1070        XMA
100A   001001100        1071        TCY      3
1015   000101101        1072        TAMIYC
1028   000101001        1073        TMA
1056   001001001        1074        TCY      9
102C   000000011        1075        XMA
105A   001000010        1076        TCY      4
1030   000000011        1077        XMA
1060   010111111        1078        RETN
```

TABLE IX-7 (Continued)

```
                              1079   *
                              1080   *  OUTADDR2:
                              1081   *  LOADS 4 BITS INTO K-LINES USING PDC AND OUTPUT 4 BITS
                              1082   *
0041  001000011               1083   OUTADDR2 TCY      12          ** CHIP SELECT
0002  000001101               1084            SETR                 **
0005  001001101               1085            TCY      11          L/R = 0
0008  000001101               1086            SETR
0017  001000101               1087            TCY      10
002F  000000110               1088            CLA                  ACC=OUTPUT 4 BITS COMMAND
005F  001110001               1089            ACACC    EIGHT       **
003C  000001101               1090            SETR                 **
0078  000110110               1091            RSTR                 **
0071  000001101               1092            SETR                 **
0063  000110110               1093            RSTR                 **
0047  000001101               1094            SETR                 **
000E  000110110               1095            RSTR                 **
0010  000001101               1096            SETR                 **
003B  000110110               1097            RSTR                 **
0076  000000110               1098            CLA                  **
0060  001110010               1099            ACACC    FOUR        **
005B  000001101               1100            SETR                 1ST PDC LOADS COMMAND
0036  000110110               1101            RSTR                 *
006C  001001101               1102            TCY      11
0059  000110110               1103            RSTR
0032  001000101               1104            TCY      10
0064  000001101               1105            SETR                 2ND PDC APPLIES SR TO K-LINES
0049  000110110               1106            RSTR                 *
0012  001110000               1107            ACACC    0
0025  000001000               1108            TKA                  LOAD INTO ACC
004A  000001101               1109            SETR                 3RD PDC DISCONNECTS SR
0014  000110110               1110            RSTR                 *
0029  001001101               1111            TCY      11
0052  000001101               1112            SETR
0024  010010100               1113            LDX      2
0048  000100011               1114            TBIT     3
0010  101001011       1131    1115            BRANCH   LSHIFT-1
0021  010111111               1116            RETN
                              1117   *
                              1118   *  END OF OUTADDR2 SUBROUTINE
                              1119   *
                              1120   *
```

TABLE IX-7 (Continued)

| | | | | | | | |
|---|---|---|---|---|---|---|---|
| 0042 | 001001101 | | 1121 | LOADRESS | TCY | 11 | |
| 0004 | 010010100 | | 1122 | | LDX | 2 | |
| 0009 | 010100011 | | 1123 | | SBIT | 3 | * |
| 0013 | 001000101 | | 1124 | | TCY | 10 | |
| 0027 | 000000110 | | 1125 | | CLA | | |
| 004E | 001111100 | | 1126 | | ACACC | 3 | |
| 001C | 010010100 | | 1127 | | LDX | 2 | MEMORY FOR LOOP |
| 0039 | 000101110 | | 1128 | LOADR+1 | TAMZA | | |
| 0072 | 010011000 | | 1129 | | LDX | 1 | |
| 0065 | 101000001 | 1083 | 1130 | | BRANCH | OUTADDR2 | |
| 004B | 001001011 | | 1131 | LSHIFT-1 | TCY | 13 | |
| 0016 | 010011000 | | 1132 | | LDX | 1 | |
| 002D | 000000011 | | 1133 | LSHIFT | XMA | | SHIFT ROUTINE |
| 005A | 000000100 | | 1134 | | DYN | | * |
| 0034 | 001011001 | | 1135 | | YNEC | 9 | * |
| 0068 | 100111101 | 1133 | 1136 | | BRANCH | LSHIFT | * |
| 0051 | 001000101 | | 1137 | | TCY | 10 | TEST LOOP COUNT |
| 0022 | 010010100 | | 1138 | | LDX | 2 | * |
| 0044 | 000000111 | | 1139 | | DMAN | | * |
| 0008 | 100111001 | 1128 | 1140 | | BRANCH | LOADR+1 | * |
| 0011 | 001001101 | | 1141 | | TCY | 11 | |
| 0023 | 010100111 | | 1142 | | RBIT | 3 | |
| 0046 | 010111111 | | 1143 | | RETN | | |
| | | | 1144 | * | | | |
| 000C | 010011010 | | 1145 | FL2 | LDX | 5 | |
| 0019 | 001001011 | | 1146 | | TCY | 13 | |
| 0033 | 000000110 | | 1147 | | CLA | | |
| 0066 | 001110101 | | 1148 | | ACACC | 10 | |
| 0040 | 000000011 | | 1149 | | XMA | | |
| 001A | 000110000 | | 1150 | | SAMAN | | |
| 0035 | 000101111 | | 1151 | | TAM | | |
| 006A | 010111111 | | 1152 | | RETN | | |
| 0055 | 001000110 | | 1153 | ROM | TCY | 6 | |
| 002A | 010010001 | | 1154 | | LDX | 8 | |
| 0054 | 000101001 | | 1155 | | TMA | | |
| 0028 | 001110001 | | 1156 | | ACACC | 8 | |
| 0050 | 000101111 | | 1157 | | TAM | | |
| 0020 | 010001111 | | 1158 | | BL | DISP/KH | |
| 0040 | 100101100 | 2219 | 1159 | | | | |

TABLE IX-8

```
                             1160              ORGPG      8
                             1161   *
                             1162   *  CALADDR--> STICKS ADDRESS WANTED INTO LNK/EDT
                             1163   *
0000   001000111             1164   CALADDR    TCY        14
0001   001100101             1165              TCMIY      10
0003   001001001             1166              TCY        9
0007   010011000             1167              LDX        1
000F   000101001             1168              TMA
001F   001111111             1169              ACACC      15
003F   010110010             1170              COMX8                     ADDRESS DAM
007F   000101111             1171              TAM
007E   001000101             1172              TCY        10
007D   000101001             1173   TMAA       TMA
007B   010011000             1174              LDX        1
0077   000101101             1175              TAMIYC
006F   010110010             1176              COMX8                     ADDRESS DAM
005F   001010111             1177              YNEC       14
003E   101111101   1173      1178              BRANCH     TMAA
007C   111001111   1183      1179   CALL+2     CALL       CAL+1
0079   010011110             1180              LDX        7
0073   000101111             1181              TAM                       STORE WORD
0067   010110010             1182              COMX8                     ADDRESS DAM
004F   001000111             1183   CAL+1      TCY        14             GET Y POINTER
001E   000110010             1184              IMAC                      *
0030   000101111             1185              TAM                       *
007A   000101010             1186              TMY                       *
0075   000000100             1187              DYN
006B   000101001             1188              TMA
0057   001001001             1189   OUTSRTN    TCY        9              GET LNK/EDT POINTER
002E   000101010             1190              TMY                       *
005C   010110010             1191              COMX8                     EXIT DAM
003D   010111111             1192              RETN
0070   010010110             1193              LDX        6              STORE WORD
0061   000101111             1194              TAM                       *
0043   010110010             1195              COMX8                     ADDRESS DAM
0006   001001001             1196              TCY        9
000D   000110010             1197              IMAC
001B   000101111             1198              TAM
0037   001000111             1199              TCY        14
006F   000101010             1200              TMY
0050   001010111             1201              YNEC       14             Y=14? IF YES,
003A   101111100   1179      1202              BRANCH     CALL+2         LOAD 2 MSW
```

TABLE IX-8 (Continued)

| | | | | | | | |
|---|---|---|---|---|---|---|---|
| 0074 | 001000100 | | 1203 | | TCY | 2 | |
| 0069 | 010100101 | | 1204 | | RBIT | 2 | |
| 0053 | 010011000 | | 1205 | | LDX | 1 | |
| 0026 | 001001001 | | 1206 | | TCY | 9 | |
| 004C | 010000011 | | 1207 | | BL | LNKCNT2 | |
| 0018 | 101101100 | 1798 | 1208 | | | | |
| 0031 | 010011100 | | 1209 | ULRN+1 | LDX | 3 | |
| 0062 | 001001011 | | 1210 | | TCY | 13 | |
| 0045 | 001101010 | | 1211 | | TCMIY | 5 | |
| 000A | 010001101 | | 1212 | ULRN+2 | BL | CORR+1 | |
| 0015 | 101111110 | 1590 | 1213 | | | | |
| | | | 1214 | * | | | * CALCULATES ADDRESS |
| | | | 1215 | * | | | * LOADS CSB |
| 0028 | 001100000 | | 1216 | DISLP-1 | TCMIY | 0 | |
| 0056 | 010000101 | | 1217 | | BL | LOADDISP | |
| 002C | 101111001 | 1456 | 1218 | | | | |
| 0058 | 010000111 | | 1219 | DISLP7 | CALLL | SPEAK+1 | |
| 0030 | 110000001 | 2010 | 1220 | | | | |
| 0060 | 010000011 | | 1221 | | CALLL | TRANS-1 | |
| 0041 | 110100011 | 1836 | 1222 | | | | |
| 0002 | 010010100 | | 1223 | DISLP+2 | LDX | 2 | |
| 0005 | 001001111 | | 1224 | | TCY | 15 | * |
| 0008 | 001101010 | | 1225 | | TCMIY | 5 | |
| 0017 | 010001010 | | 1226 | | CALLL | CURLEVL | |
| 002F | 111101111 | 0769 | 1227 | | | | |
| 005E | 001100111 | | 1228 | | TCMIY | 14 | |
| 003C | 001100110 | | 1229 | | TCMIY | 6 | |
| 0078 | 010000010 | | 1230 | | BL | ADDCTR6 | |
| 0071 | 101011001 | 0704 | 1231 | | | | |
| 0063 | 001001111 | | 1232 | DISLP-5 | TCY | 15 | |
| 0047 | 010110010 | | 1233 | | COMX8 | | ADDRESS DAM |
| 000F | 001101111 | | 1234 | | TCMIY | 15 | |
| 0010 | 010110010 | | 1235 | DISPLOOP | COMX8 | | EXIT DAM |
| 003B | 001000111 | | 1236 | | TCY | 14 | |
| 0076 | 010011100 | | 1237 | | LDX | 3 | |
| 006D | 010100000 | | 1238 | | SBIT | 0 | |
| 005B | 010001111 | | 1239 | | BL | DISP/KB | |
| 0036 | 100101100 | 2219 | 1240 | | | | |
| 006C | 010110010 | | 1241 | DISLP+1 | COMX8 | | ADDRESS DAM |
| 0059 | 001001111 | | 1242 | | TCY | 15 | LOOP |
| 0032 | 010000111 | | 1243 | | DMAN | | * |

TABLE IX-8 (Continued)

```
0064  000101111         1244                TAM                          *
0049  000110011         1245                MNEZ                         *
0012  100011101   1235  1246                BRANCH   DISPLOOP            * ELSE
0025  001000111         1247                TCY      14
004A  010011100         1248                LDX      3
0014  010100100         1249                RBIT     0
0029  010010001         1250                LDX      8
0052  010001001         1251                LDP      9
0024  001000100         1252                TCY      2
0048  000100011         1253                TBIT     3
0010  101010011   1341  1254                BRANCH   LET4
0021  000100001         1255                TBIT     2
0042  101001010   1385  1256                BRANCH   RESTO2
0004  010000001         1257                LDP      8
0009  010010100         1258                LDX      2
0013  001001111         1259                TCY      15
0027  000101001         1260                TMA
004E  011101001         1261                ALEC     9
001C  101110010   1264  1262                BRANCH   DISP8
0039  101101000   1271  1263                BRANCH   DISP5
0072  001100101         1264  DISP8         TCMIY    10
0065  010011000         1265                LDX      1
0048  010110010         1266                COMXB                        ADDRESS DAM
0016  010000011         1267  DISP9         CALLL    TRANS-1
002D  110100011   1836  1268
005A  010000111         1269                BL       ADDWDS2
0034  100001010   2057  1270
0068  010001001         1271  DISP5         CALLL    DELAY2
0051  110100111   1398  1272
0022  010110010         1273                COMXB
0044  001000000         1274                TCY      0                   INCREMENT RWE POINTER
0008  000110010         1275                IMAC                         *
0011  000101101         1276                TAMIYC
0023  001100000         1277                TCMIY    0
0046  011101001         1278                ALEC     9
000C  101010000   1291  1279                BRANCH   DISP6
0019  001000000         1280                TCY      0
0033  001100000         1281                TCMIY    0
0066  001100000         1282                TCMIY    0
004D  010011010         1283                LDX      5
001A  010001110         1284                CALLL    RSCRAM
0035  111110000   1052  1285
```

TABLE IX-8 (Continued)

```
006A  010010010        1286                LDX      4
0055  010001110        1287                CALLL    RSCRAM
002A  111110000  1052  1288
0054  010000100        1289                BL       USPELL+1
0028  100000111  0345  1290
0050  010001001        1291     DISP6      CALLL    DELAY2
0020  110100111  1398  1292
0040  100110001  1209  1293                BRANCH   ULRN+1
```

TABLE IX-9

```
                       1294                ORGPG    9
                       1295     *
                       1296     *  LETTER==>TRANSFERS LETTERS TO BE SPOKEN, FROM THE CSB
                       1297     *    INTO THE LINK/EDIT AND THEN CALCULATES THE ADDRESS FOR L/E.
                       1298     *
0000  001001111        1299     LETTER     TCY      15
0001  000000110        1300                CLA
0003  010000111        1301                CALLL    RETURN4
0007  110000100  2113  1302
000F  010001000        1303                CALLL    CLEAR
001F  110111010  0236  1304
003F  001001000        1305                TCY      1
007F  010110010        1306                COMX8                       *
007E  001100000        1307                TCMIY    0                  *
007D  001001111        1308                TCY      15
007B  001101000        1309                TCMIY    1
0077  010011100        1310     LETTER+1   LDX      3                  LOAD LSW ==>ACC
006F  001001000        1311                TCY      1                  *
005F  010001101        1312                CALLL    CONX8              *
003E  110011000  1632  1313
007C  000101001        1314                TMA                         *
0079  010011110        1315                LDX      7                  STORE IN LNK/EDT
0073  001000000        1316                TCY      0                  *
0067  000101111        1317                TAM                         *
004F  010010100        1318                LDX      2                  MSW
001E  001001000        1319                TCY      1                  GET Y POINTER
003D  010001101        1320                CALLL    COMX8              *
```

TABLE IX-9 (Continued)

```
007A  110011000  1632  1321
0075  000101001        1322         TMA                  LOAD MSW
0068  010000101        1323         LDP     10
0057  000100001        1324         TBIT    2            LAST LETTER?
002E  111010011  1485  1325         CALL    SETBIT2      YES, SETBIT2
005C  010001111        1326         LDP     15
0038  000100011        1327         TBIT    3            SYLLABLE?
0070  111010101  2291  1328         CALL    SETBIT3      SET SYLLABLE FLAG
0061  001000000        1329         TCY     0            *
0043  010010110        1330         LDX     6            *
0006  000101111        1331         TAM                  *
0000  010100101        1332         RBIT    2
0018  010100111        1333         RBIT    3
                       1334  *   CALCULATE ADDRESS OF LETTER
0037  001000100        1335         TCY     2            FLAG WORD
006E  010010001        1336         LDX     8
0050  010000001        1337         LDP     8
003A  000100011        1338         TBIT    3            SYLLABLE?
0074  100011101  1235  1339         BRANCH  DISPLOOP
0069  010001001        1340         LDP     9
0053  001000000        1341  LET4   TCY     0
0026  010010110        1342         LDX     6
004C  000101001        1343         TMA
0018  000010101        1344         AMAAC                MULTIPLY BY 2
0031  000101111        1345         TAM
0062  010011110        1346         LDX     7            *
0045  000101001        1347         TMA
000A  000010101        1348         AMAAC
0015  111000010  1394  1349         CALL    TLETTER      CARRY, GO TO TLETTER
0026  000101111        1350         TAM
0056  010011110        1351         LDX     7
002C  000101001        1352         TMA
0058  001110011        1353         ALACC   12
0030  111000010  1394  1354         CALL    TLETTER
0060  000101111        1355         TAM
                       1356  *   LOADS LETTER ADDRESS INTO FOM ADDR AREA (RAM)
0041  010000111        1357         CALLL   SPEAK+1
0002  110000001  2010  1358
0005  010011100        1359         LDX     3            FLAG
0008  001001011        1360         TCY     13           *
0017  001100011        1361         TCMIY   12
002F  010010100        1362         LDX     2            FLAG
```

TABLE IX-9 (Continued)

```
005E  001001111         1363                  TCY     15                      *
003C  001100110         1364                  TCMIY   6
0078  001001000         1365                  TCY     1
0071  010001101         1366                  CALLL   COMX8
0063  110011000   1032  1367
0047  010000101         1368                  CALLL   DPLOAD
000E  111110011   1457  1369
0010  010000010         1370                  BL      ADDCTR6
0038  101011001   0704  1371
0076  001000100         1372  LET+4     TCY     2
                        1373  *   SPEAKS LETTER
0060  010110010         1374                  COMX8                           *
005B  010100111         1375                  RBIT    3
0036  000100001         1376                  TBIT    2                       *
006C  100010010   1383  1377                  BRANCH  RESTO
0059  001001000         1378                  TCY     1
0032  000110010         1379                  IMAC                            BUMP POINTER FOR CSB
0064  000101111         1380                  TAM                             *
0049  101110111   1310  1381                  BRANCH  LETTER+1                GET NEXT LETTER--ALWAYS B.
                        1382  *   RESTORE LNK/EDT POINTER AND RETURN          TO CONTINUE SPEAKING
0012  010000001         1383  RESTO     BL      DISLP-5
0025  101100011   1232  1384
004A  010100101         1385  RESTO2    RBIT    2
0014  010010100         1386                  LDX     2
0029  001001111         1387                  TCY     15
0052  001101100         1388                  TCMIY   3
0024  001001000         1389                  TCY     1
0048  010110010         1390                  COMX8
0010  010000101         1391                  BL      REPT2
0021  100000011   1439  1392
                        1393  *   INCREMENT WHEN OVERFLOW OCCURS
0042  000101111         1394  TLETTER   TAM
0004  010010110         1395                  LDX     6
0009  000110010         1396                  IMAC
0013  010111111         1397                  RETN
0027  000000110         1398  DELAY2    CLA
004E  010010100         1399                  LDX     2                       DELAY BUFFER--RAM
001C  001000001         1400                  TCY     8                       *
0039  001100000         1401                  TCMIY   0                       CLEAR
0072  001100000         1402                  TCMIY   0                       *
0065  001100000         1403                  TCMIY   0
004B  001000001         1404                  TCY     8
```

TABLE IX-9 (Continued)

| | | | | | | | |
|---|---|---|---|---|---|---|---|
| 0016 | 000101111 | | 1405 | DELAY2+1 | TAM | | |
| 0020 | 000110010 | | 1406 | | IMAC | | |
| 005A | 101101000 | 1409 | 1407 | | BRANCH | PLUSONE | |
| 0034 | 100010110 | 1405 | 1408 | | BRANCH | DELAY2+1 | |
| 0068 | 000101101 | | 1409 | PLUSONE | TAMIYC | | |
| 0051 | 000110010 | | 1410 | | IMAC | | |
| 0022 | 100010001 | 1414 | 1411 | | BRANCH | WORD3 | |
| 0044 | 000101100 | | 1412 | | TAMDYN | | |
| 0008 | 100010110 | 1405 | 1413 | | BRANCH | DELAY2+1 | |
| 0011 | 000101101 | | 1414 | WORD3 | TAMIYC | | |
| 0023 | 000110010 | | 1415 | | IMAC | | |
| 0046 | 101100110 | 1420 | 1416 | | BRANCH | QUIT | |
| 000C | 000101100 | | 1417 | | TAMDYN | | |
| 0019 | 000000100 | | 1418 | | DYN | | |
| 0033 | 100010110 | 1405 | 1419 | | BRANCH | DELAY2+1 | |
| 0066 | 010111111 | | 1420 | QUIT | RETN | | |
| | | | 1421 | * | | | |
| 0040 | 010001110 | | 1422 | F4 | CALLL | FL2 | STORE # OF WRONG RESPONSES |
| 001A | 110001100 | 1145 | 1423 | | | | |
| 0035 | 010000110 | | 1424 | | CALLL | F2LOOP | |
| 006A | 111100100 | 0972 | 1425 | | | | |
| 0055 | 010000101 | | 1426 | | CALLL | MEMADDR | |
| 002A | 111011000 | 1501 | 1427 | | | | |
| 0054 | 010001110 | | 1428 | | CALLL | LOADRESS | |
| 0028 | 111000010 | 1121 | 1429 | | | | |
| 0050 | 010000110 | | 1430 | | BL | FINL3 | |
| 0020 | 100110100 | 0998 | 1431 | | | | |

TABLE IX-10

```
                                1432             ORGPG    10
                                1433  *
                                1434  *  REPEAT ROUTINE-->REPEATS PHRASE PREVIOUSLY SPOKEN
                                1435  *        TWO REPEATS OR MORE CAUSES PHRASE TO BE SPOKEN SLOWER
                                1436  *
0000  010010100                 1437  REPEAT    LDX      2
0001  001001111                 1438            TCY      15
0003  001100000                 1439  REPT2     TCMIY    0
0007  010011000                 1440            LDX      1
000F  001000101                 1441            TCY      10
001F  010110010                 1442  RPT+1     COMX8                  DAM REG
003F  000101001                 1443            TMA                    STORE WORD-->ACC
007F  010110010                 1444            COMX8                  EXIT DAM
007E  000101101                 1445            TAMIYC
0070  001010111                 1446            YNEC     14            *
007B  100011111        1442     1447            BRANCH   RPT+1         *
0077  010110010                 1448            COMX8
006F  001001000                 1449            TCY      1
005F  001100000                 1450            TCMIY    0
003E  010000111                 1451            BL       ADDWDS2
007C  100001010        2057     1452
                                1453  *   LOADDISP-->
                                1454  *   SUBROUTINE TO DISPLAY WORD BEING USED IN LEARN MODE
                                1455  *
0079  001000000                 1456  LOADDISP  TCY      0             INITIALIZE Y/POINTER
0073  010011100                 1457  DPLOAD    LDX      3             TRANSFER LSW'S
0067  000101001                 1458            TMA                    *
004F  010011000                 1459            LDX      1             *
001E  000101111                 1460            TAM                    *
0030  010010100                 1461            LDX      2             TRANSFER MSW'S
007A  000101001                 1462            TMA                    *
0075  010010000                 1463            LDX      0             *
006B  000101111                 1464            TAM
0057  010111111                 1465            RETN
002E  000100000                 1466            TBIT     0
005C  101100001        1470     1467            BRANCH   LDONE
003B  001100000                 1468            TCMIY    0
0070  101000011        1471     1469            BRANCH   LDONE+1
0061  001101000                 1470  LDONE     TCMIY    1
0043  001010001                 1471  LDONE+1   YNEC     8
0006  101110011        1457     1472            BRANCH   DPLOAD        NO. LOOP--ELSE.
000D  010010001                 1473            LDX      8
```

TABLE IX-10 (Continued)

```
0018  001001110        1474            TCY      7
0037  000101010        1475            TMY
006E  010000001        1476            LDP      8
005D  001011010        1477            YNEC     5
003A  101011000  1219  1478            BRANCH   DISLP7
0074  010000010        1479            BL       ADDCTR6
0069  101011001  0704  1480
                       1481  *
                       1482  *
                       1483  *  SETBIT2  -  SUBROUTINE TO USE DAM REG FOR FLAG PURPOSES
                       1484  *
0053  010110010        1485  SETBIT2  COMX8                     DAM REG
0026  001000100        1486            TCY      2
004C  010100001        1487            SBIT     2              TEST BIT 2
0018  001001000        1488            TCY      1
0031  000101010        1489            TMY
0062  010110010        1490            COMX8                    EXIT DAM
0045  010111111        1491            RETN
                       1492  *
000A  010110010        1493  SETBIT1  COMX8
0015  001000100        1494            TCY      2
0028  010100010        1495            SBIT     1
0056  010110010        1496            COMX8
002C  010111111        1497            RETN
                       1498  *
                       1499  * MEMLOOP- LOADS ADDRESS INTO ROM ADDRESS, 4 BITS AT A TIME
                       1500  *
0058  001000011        1501  MEMADDR  TCY      12              CHIP SELECT
0030  000001101        1502            SETR
0060  001001101        1503            TCY      11             L/R = 1 (INPUT)
0041  000001101        1504            SETR                     R11 = 1
0002  001000101        1505            TCY      10
0005  000000110        1506            CLA
000B  001111100        1507            ACACC    3              FOR LOOP COUNT, ACC = 3
0017  010010100        1508            LDX      2              MEMORY FOR LOOP (SAVE ADDR)
002F  000101110        1509  MEMLOOP  TAMZA
005E  010011000        1510            LDX      1
003C  001110100        1511            ACACC    TWO
0078  000001101        1512            SETR                     LOADS COMMAND
0071  000110110        1513            RSTR                     *
0063  000101001        1514            TMA                      4 BITS OF ADDR -->ACC
0047  001110000        1515            ACACC    0
```

```
000E 000001101           1516                     SETR                    LOADS DATA
0010 000110110           1517                     RSTR                    *
003B 001001011           1518                     TCY       13
0076 000000011           1519   SHIFTUP           XMA                     SHIFT ROUTINE       *
0060 000000100           1520                     DYN                     *    SHIFT UP IN    *
005B 001011001           1521                     YNEC      9             *    SAME REGISTER  *
0036 101110110    1519   1522                     BRANCH    SHIFTUP       * * * * * * * * * * *
006C 001000101           1523                     TCY       10            ORIGINAL WORD
0059 010010100           1524                     LDX       2             REG=6
0032 000000111           1525                     DMAN                    MEM=1,==> ACC  LOOP
0064 100101111    1509   1526                     BRANCH    MEMLOOP
0049 000101111           1527                     TAM
0012 001111100           1528                     ACACC     3
0025 000001101           1529                     SETR
004A 000110110           1530                     RSTR
0014 000000110           1531                     CLA
0029 000001101           1532                     SETR
0052 000110110           1533                     RSTR
0024 010011000           1534   MEMDRED           LDX       ONE        * DUMMY READ TO SETUP MEMORY ADDRESS
0048 001000101           1535                     TCY       TEN           **
0010 001110001           1536                     ACACC     EIGHT         **
0021 000001101           1537                     SETR                    **
0042 000110110           1538                     RSTR                    **
0004 010111111           1539                     RETN
0009 010001000           1540   MSPEL3            CALLL     CLEAR
0013 110111010    0236   1541
0027 010001001           1542                     CALLL     DELAY2
004E 110100111    1398   1543
001C 100000000    1437   1544                     BRANCH    REPEAT
                         1545   * SPELLING IS INCORRECT
0039 010111111           1546   MISSPELL          RETN
0072 010110010           1547                     COMX8
0065 001000110           1548                     TCY       6             FLAG
004B 010001000           1549                     LDP       1
0016 000100010           1550                     TBIT      1             BIT 1==>0=FIRST TRY
002D 100001001    0304   1551                     BRANCH    NOPHRASE      BIT 1==>1=SECOND TRY
005A 010100010           1552                     SBIT      1             *
                         1553   * LOAD NEGATIVE RESPONSE INTO L/E
0034 010011010           1554   SCORE             LDX       5
0068 001001011           1555                     TCY       13
0051 000110010           1556                     IMAC
0022 000101111           1557                     TAM
```

TABLE IX-10 (Continued)

```
0044  010011100         1558            LDX     3
0008  001001011         1559            TCY     13          FLAG
0011  001100100         1560            TCMIY   2
0023  010001010         1561            CALLL   CURLEVL
0046  111101111   0769  1562
000C  000000101         1563            IYC
0019  001100110         1564            TCMIY   6
0033  010010100         1565            LDX     2           FLAG
0066  001001111         1566            TCY     15          *
004D  001100010         1567            TCMIY   4
001A  010001000         1568            BL      SPK4
0035  101100101   0311  1569
006A  001100000         1570  ADDCTR2   TCMIY   0           FOR RETNSBCH
0055  010011100         1571            LDX     3
002A  001001011         1572            TCY     13
0054  001100010         1573            TCMIY   4
0028  010001101         1574            BL      CORR+1
0050  101111110   1590  1575
                        1576  *
```

TABLE IX-11

```
                        1577              ORGPG     11
                        1578  *
                        1579  *  POINTERS DAM-WORD 0--> RANDOM WORD ENTRY POINTER
                        1580  *  POINTER DAM-WORD 1 --> CORRECR SPELLING BUFFER POINTER
                        1581  *
0000  010110010         1582  CORRSSPL  COMX8               DAM REG-POINTER
0001  001000000         1583            TCY     0
0003  001100000         1584            TCMIY   0           ZEROS OUT POINTER
0007  001100000         1585            TCMIY   0
000F  001100000         1586            TCMIY   0
001F  001100000         1587            TCMIY   0
003F  010110010         1588            COMX8               OUT OF DAM REG
007F  010111111         1589            RETN
007E  010001010         1590  CORR+1    CALLL   CURLEVL
007D  111101111   0769  1591
007B  001001111         1592            TCY     15
0077  000101001         1593            TNA
006F  000010101         1594            AMAAC
```

TABLE IX-11 (Continued)

```
005F  001110010         1595            ACACC     4
003E  001000101         1596            TCY       10
007C  000101111         1597            TAM
0079  010000111         1598            CALLL     ADD8
0073  110001100   2139  1599
0067  010000101         1600            CALLL     MEMADDR
004F  111011000   1501  1601
001E  010001110         1602            CALLL     LOADRESS
003D  111000010   1121  1603
                        1604  *
                        1605  *  RESIDENT:
                        1606  *     LOOP TO TRANSFER ADDRESS FROM RESIDENT (RAM) TO ADDRESS
                        1607  *     REGION (RAM)
                        1608  *
007A  001001110         1609  RESIDENT  TCY       7                   OLD BLKCSB ROUTINE
0075  000000110         1610  CSB2      CLA
006B  001111000         1611            ACACC     1
0057  010010100         1612            LDX       2
002E  000101111         1613            TAM
005C  010011100         1614            LDX       3
0038  001110101         1615            ACACC     10
0070  000101100         1616            TAMDYN
0061  101110101   1610  1617            BRANCH    CSB2
0043  010011000         1618            LDX       1
0006  001000001         1619            TCY       8
000D  001100100         1620            TCMIY     2
001B  010011010         1621  ADRSCALC  LDX       5                   LSW
0037  111001100   1631  1622            CALL      RCOMX8
006F  000101001         1623  ADD2ROM   TMA                           READY FOR ADDITION
005D  010011000         1624            LDX       1                   LSW OF ROM ADDR REGION
003A  001000101         1625            TCY       10
0074  010000000         1626            CALLL     ADDCARRY
0069  111011000   0112  1627
0053  010010010         1628            LDX       4
0026  001000000         1629            TCY       0                   *
                        1630  *
004C  001000000         1631  RCOMX8    TCY       0
001B  010110010         1632  COMX8     COMX8
0031  000101010         1633            TMY
0062  010110010         1634            COMX8
0045  010111111         1635            RETN
000A  000101001         1636            TMA
```

TABLE IX-11 (Continued)

```
0015  010011000         1637                LDX      1              ROM ADDR REGION
0028  001001101         1638                TCY      11             *
0056  010000000         1639                CALLL    ADDCARRY
002C  111011000   0112  1640
0058  001000001         1641                TCY      8              *
0030  000000111         1642                DMAN                    ADD2ROM TO BE EXECUTED TWICE
0060  000101111         1643                TAM                     *
0041  000110011         1644                MNEZ
0002  100011011   1621  1645                BRANCH   ADR$CALC
0005  010000101         1646                CALLL    MEMADDR
0008  111011000   1501  1647
0017  010001110         1648                CALLL    LOADRESS
002F  111000010   1121  1649
005E  010000101         1650                CALLL    MEMADDR
003C  111011000   1501  1651
                        1652      *
0078  010000011         1653                BL       OUTADDR
0071  100000000   1723  1654
                        1655      *
0063  000101111         1656      TONE22    TAM
0047  010001010         1657      TONES     CALLL    CURLEVL
000E  111101111   0769  1658
001D  001100001         1659                TCMIY    8
0038  001101110         1660                TCMIY    7              *
0076  010011100         1661                LDX      3
006D  001000001         1662                TCY      8
0058  010100100         1663                RBIT     0
0036  010100111         1664                RBIT     3
006C  000101001         1665                TMA
0059  010011000         1666                LDX      1
0032  001000101         1667                TCY      10
0064  000010101         1668                AMAAC
0049  100100100   1676  1669                BRANCH   TONCARRY
0012  000101111         1670      TONE3     TAM
0025  010010100         1671                LDX      2
004A  001001111         1672                TCY      15
0014  001100100         1673                TCMIY    2
0029  010000010         1674                BL       ADDCTR6
0052  101011001   0704  1675
0024  000101101         1676      TONCARRY  TAMIYC
0048  000110010         1677                IMAC
0010  000101111         1678                TAM
```

TABLE IX-11 (Continued)

```
0021  100010010  1670  1679                      BRANCH   TONE3
0042  001001110        1680  NXTTONE   TCY      7
0004  010010001        1681            LDX      8
0009  000101010        1682            TMY
0013  001011010        1683            YNEC     5
0027  101100101  1669  1684            BRANCH   CRY24
004E  010010100        1685            LDX      2
001C  001001111        1686            TCY      15
0039  001101110        1687            TCMIY    7
0072  101001011  1692  1688            BRANCH   TONESCOR
0065  001100000        1689  CRY24     TCMIY    0
                       1690  *  RETURN TO ROUTINE
                       1691  *
0048  010010001        1692  TONESCOR  LDX      8
0016  001000001        1693            TCY      8
0020  000100001        1694            TBIT     2
005A  101010001  1698  1695            BRANCH   TON12
0034  010001111        1696            BL       DISP/KB
0068  100101100  2219  1697
0051  010010100        1698  TON12     LDX      2
0022  001000111        1699            TCY      14
0044  000000111        1700            DMAN
0008  101100011  1656  1701            BRANCH   TONE22
0011  010010001        1702            LDX      8
0023  001000001        1703            TCY      8
0046  010100101        1704            RBIT     2
000C  010011010        1705            LDX      5
0019  001001011        1706            TCY      15
0033  000101001        1707            TMA
0066  010011000        1708            LDX      1
0040  010000110        1709            LDP      6
001A  011101001        1710            ALEC     9
0035  101101100  0969  1711            BRANCH   F5
006A  010001010        1712            CALLL    CURLEVL
0055  111101111  0769  1713
002A  001100110        1714            TCMIY    6
0054  001101110        1715            TCMIY    7
0028  010000010        1716            BL       ADDCTR6
0050  101011001  0704  1717
                       1718            ORGPG    12
                       1719  *
                       1720  *    OUTADDR*
                       1721  *       LOADS CORRECT SPELLING BUFFER WITH ACTUAL SPELLING CODE
                       1722  *
0000  010001110        1723  OUTADDR   CALLL    OUTADDR2
```

TABLE IX-12

```
0001  111000001  1083  1724
0003  010011100        1725              LDX     3
0007  001001000        1726              TCY     1                 *
000F  010001101        1727              CALLL   COMX8
001F  110011000  1632  1728
003F  000101111        1729              TAM
007F  010001110        1730              CALLL   OUTADDR2          PDC FOR OUTPUT COMMAND
007E  111000001  1083  1731
007D  010010100        1732              LDX     2
007B  001001000        1733              TCY     1
0077  010001101        1734              CALLL   COMX8
006F  110011000  1632  1735
005F  010000101        1736              LDP     10
003F  000101111        1737              TAM
007C  000100001        1738              TBIT    2                 END OF SPELLING?
0079  110001010  1493  1739              CALL    SETBIT1
0073  010000011        1740              LDP     12
0067  010110010        1741              COMX8
004F  001001000        1742              TCY     1
001E  000110010        1743              IMAC                      INCREMENT COR SPEL POINTER
003D  000101111        1744              TAM
007A  001000100        1745              TCY     2
0075  000100010        1746              TBIT    1                 TEST FLAG
006B  100111000  1751  1747              BRANCH  LNK$ET
0057  100101110  1749  1748              BRANCH  EXDAM2
002E  010110010        1749  EXDAM2      COMX8
005C  100000000  1725  1750              BRANCH  OUTADDR           ADDR--> ALWAYS BRANCH
0038  000000110        1751  LNK$ET      CLA
0070  001001001        1752              TCY     9
0061  010011000        1753              LDX     1
0043  000101111        1754  LNK$ET+1    TAM
0006  010001110        1755              CALLL   OUTADDR2          PDC FOR OUTPUT 4 BITS
000D  111000001  1083  1756
001B  010000101        1757              LDP     10
0037  011100000        1758              ALEC    0
006F  111010011  1485  1759              CALL    SETBIT2
005D  010000011        1760              LDP     12
003A  011100000        1761              ALEC    0
0074  101001100  1766  1762              BRANCH  LNKON
0069  010000101        1763              LDP     10
0053  011101000        1764              ALEC    1
0026  110001010  1493  1765              CALL    SETBIT1
004C  010000011        1766  LNKON       CALLL   LNKPTR2
0018  111011110  1785  1767
0031  010001110        1768              CALLL   OUTADDR2          PDC
```

```
0062  111000001  1083  1769
0045  010000010        1770             LDP      4
0004  001111111        1771             ACACC    15
0015  110011001  0745  1772             CALL     TSTBIT2
0026  001111000        1773             ACACC    1
0056  010000111        1774             CALLL    LNKPTR
002C  111101000  2130  1775
0058  000110010        1776             IMAC
0030  000101111        1777             TAM                      *
0060  010001110        1778             CALLL    OUTADDR2        PDC'S
0041  111000001  1083  1779
0002  010000010        1780             LDP      4
0005  001111111        1781             ACACC    15
0006  110011001  0745  1782             CALL     TSTBIT2
0017  010000011        1783             LDP      12
002F  001111000        1784             ACACC    1
005F  010011000        1785  LNKPTR2    LDX      1
003C  001001001        1786             TCY      9               *
0078  000101010        1787             TMY                      *
0071  010011110        1788             LDX      7
0063  000101111        1789             TAM                      STORE WORD
0047  001000101        1790             TCY      10              R10
000F  010111111        1791             RETN
0010  010001110        1792             CALLL    OUTADDR2
003F  111000001  1083  1793
0076  011100000        1794             ALEC     0
0060  101100100  1801  1795             BRANCH   LNKEND
0056  010000111        1796  LNKCNT     CALLL    LNKPTR
0036  111101000  2130  1797
006C  000110010        1798  LNKCNT2    IMAC
0059  101000010  1813  1799             BRANCH   ENDSPEL           GO TO ENDSPEL
0032  101000011  1754  1800             BRANCH   LNK$ET+1        ELSE
0064  010110010        1801  LNKEND     COMX8
0049  001000100        1802             TCY      2
0012  000100010        1803             TBIT     1
0025  100000100  1814  1804             BRANCH   ENDSPEL1
004A  000100001        1805             TBIT     2
0014  101010010  1808  1806             BRANCH   LNK4
0029  101011011  1796  1807             BRANCH   LNKCNT
0052  000100000        1808  LNK4       TBIT     0
0024  100010001  1833  1809             BRANCH   F9
0048  010100000        1810             SBIT     0
0010  010000001        1811             BL       CALADDR
0021  100000000  1164  1812
0042  010110010        1813  ENDSPEL    COMX8                    ADDRESS DAM
```

TABLE IX-12 (Continued)

```
0004  001000100        1814  ENDSPEL1  TCY     2
0009  001100000        1815            TCMIY   0
0013  010011100        1816            LDX     3
0027  001001011        1817            TCY     13
004E  000101001        1818            TMA
001C  010000111        1819            LDP     14
0039  011101100        1820            ALEC    3
0072  100000000  2009  1821            BRANCH  SPEAK
0065  010000011        1822            LDP     12
0043  011100010        1823            ALEC    4                  'SPELL'
0016  100101010  1847  1824            BRANCH  USPELL3
0020  010000001        1825            LDP     8
0054  011101010        1826            ALEC    5                  'SAY IT'
0034  100101011  1216  1827            BRANCH  DISLP-1
0068  010001100        1828            LDP     3
0051  011100111        1829            ALEC    14
0022  101001111  0501  1830            BRANCH  HANG
0044  010001111        1831            BL      DISP/KB
0008  100101100  2219  1832
0011  010010010        1833  F9        LDX     4
                       1834  *   TRANS-->STORES CALCULATED ADDRESS IN DAM FOR USE IN LINK/EDIT
                       1835  *
0023  001000101        1836  TRANS-1   TCY     10
0046  000101001        1837  TRANS     TMA                        LOAD ACC
000C  010110010        1838            COMX8
0019  000101101        1839            TAMIYC
0035  010110010        1840            COMX8
0066  001010111        1841            YNEC    14
004D  101000110  1837  1842            BRANCH  TRANS
0014  010111111        1843            RETN
0035  010110010        1844            COMX8
006A  010000001        1845            BL      CALADDR
0055  100000000  1164  1846
002A  010000111        1847  USPELL3   CALLL   SPEAK+1
0054  110000001  2010  1848
0028  010000011        1849            CALLL   TRANS-1
0050  110100011  1836  1850
0020  010000111        1851            BL      SPEAK
0040  100000000  2009  1852
```

```
                    1853             ORGPG     13
                    1854  *
                    1855  *
                    1856  *
                    1857  *          THE FOLLOWING ROUTINE DIRECTS THE PROGRAM FLOW ACCORDING TO THE
                    1858  *          KEY PRESSED.
                    1859  *
0000 000100010      1860  KEY00    TBIT      1
0001 100111011 1933 1861           BRANCH    KEY2
0003 010010001      1862  KEY0     LDX       8             * LETTER KEYS
0007 001000001      1863           TCY       8
000F 000100010      1864           TBIT      1             TEST GO FLAG
001F 101011111 1875 1865           BRANCH    TRANSFER
003F 001001110      1866           TCY       7
007F 000100001      1867           TBIT      2             TEST FOR MODE OTHER THAN SPELL
                    1868  *                                *  OR LEARN
007E 101011111 1875 1869           BRANCH    TRANSFER
007D 011101100      1870           ALFC      3             A,B,C,D?
007B 101100001 1892 1871           BRANCH    KEY12
0077 010000010      1872  KEY13    BL        DIFF$LV       CHANGE LEVL IN DISPLAY
006F 101111110 0629 1873
                    1874  *
005F 001001110      1875  TRANSFER TCY       7
003E 010010001      1876           LDX       8
007C 000101010      1877           TMY
0079 001011010      1878           YNEC      5
0073 100011110 1882 1879           BRANCH    TRANS3
0067 010000010      1880           BL        NO$TRANS
004F 100101100 0680 1881
001E 001001111      1882  TRANS3   TCY       15
003D 010010000      1883           LDX       0
007A 000101001      1884           TMA
0075 001001101      1885           TCY       11
006B 000101010      1886           TMY
0057 010001000      1887           LDP       1
002E 001010001      1888           YNEC      8
005C 100000000 0194 1889           BRANCH    NOTFULL
0038 010001011      1890           LDP       13
0070 100010100 1946 1891           BRANCH    NOP
0061 001001111      1892  KEY12    TCY       15            * STORE
0043 010011000      1893           LDX       1             * NEW
0006 000101111      1894           TAM                     * DIFFICULTY LEVEL
000D 101110111 1872 1895           BRANCH    KEY13
001B 011100101      1896  KEY1     ALFC      10            * MSD=1
0037 101000111 1930 1897           BRANCH    KEY15
```

TABLE IX-13 (Continued)

| | | | | | | | |
|---|---|---|---|---|---|---|---|
| 006E | 011100111 | | 1898 | | ALEC | 14 | |
| 005D | 101101001 | 1902 | 1899 | | BRANCH | KEY7 | |
| 003A | 010000010 | | 1900 | | BL | GAME#2 | KEY=1F * CODEBREAKER |
| 0074 | 100000000 | 0620 | 1901 | | | | |
| 0069 | 011101011 | | 1902 | KEY7 | ALEC | 13 | |
| 0053 | 100011000 | 1906 | 1903 | | BRANCH | KEY8 | |
| 0026 | 010001100 | | 1904 | | BL | GAME#1 | KEY=1E * HANGMAN |
| 004C | 100000000 | 0479 | 1905 | | | | |
| 0018 | 010010001 | | 1906 | KEY8 | LDX | 8 | |
| 0031 | 001001110 | | 1907 | | TCY | 7 | |
| 0062 | 000101010 | | 1908 | | TMY | | PUT MODE # IN Y |
| 0045 | 011101101 | | 1909 | | ALEC | 11 | |
| 000A | 101000001 | 1918 | 1910 | | BRANCH | KEY14 | |
| 0015 | 001011010 | | 1911 | | YNEC | 5 | * CHECK MODE -- |
| 002B | 100101100 | 1914 | 1912 | | BRANCH | K10A | * IGNORE ERASE AND |
| 0056 | 100010100 | 1946 | 1913 | | BRANCH | NOP | |
| 002C | 001000001 | | 1914 | K10A | TCY | 8 | |
| 0058 | 000100010 | | 1915 | | TBIT | 1 | TEST GO FLAG |
| 0030 | 100000101 | 1921 | 1916 | | BRANCH | KEY10 | |
| 0060 | 100010100 | 1946 | 1917 | | BRANCH | NOP | |
| 0041 | 010001110 | | 1918 | KEY14 | BL | ROM | |
| 0002 | 101010101 | 1153 | 1919 | | | | |
| | | | 1920 | * | | | * HANGMAN MODE |
| 0005 | 011100011 | | 1921 | KEY10 | ALEC | 12 | |
| 000B | 100010001 | 1974 | 1922 | | BRANCH | ERASE | KEY=1C * ERASE |
| 0017 | 001001110 | | 1923 | | TCY | 7 | |
| 002F | 000101010 | | 1924 | | TMY | | |
| 005E | 001011110 | | 1925 | | YNEC | 7 | * IGNORE ENTER |
| 003C | 101110001 | 1928 | 1926 | | BRANCH | KEY9 | * IN RANDOM LETTER |
| 0078 | 100010100 | 1946 | 1927 | | BRANCH | NOP | * MODE |
| 0071 | 010001000 | | 1928 | KEY9 | BL | ENTER | KEY=1D * ENTER |
| 0063 | 101011000 | 0254 | 1929 | | | | |
| 0047 | 000101011 | | 1930 | KEY15 | TYA | | PUT 15 IN ACC |
| 000E | 010001011 | | 1931 | | BL | KEY0 | * LETTERS Q-Z |
| 0010 | 100000011 | 1862 | 1932 | | | | |
| 003B | 010010001 | | 1933 | KEY2 | LDX | 8 | MSD=2 |
| 0076 | 001001110 | | 1934 | | TCY | 7 | |
| 006D | 011101100 | | 1935 | | ALEC | 3 | |
| 005B | 101010010 | 1949 | 1936 | | BRANCH | KEY3 | |
| 0036 | 011100110 | | 1937 | | ALEC | 6 | |
| 006C | 101110010 | 1962 | 1938 | | BRANCH | KEY6 | |
| 0059 | 000101010 | | 1939 | | TMY | | PUT MODE IN Y |
| 0032 | 001011010 | | 1940 | | YNEC | 5 | * IGNORE CLUE |
| 0064 | 100010100 | 1946 | 1941 | | BRANCH | NOP | * KEY UNLESS |
| 0049 | 010000110 | | 1942 | | LDP | 6 | |

TABLE IX-13 (Continued)

| | | | | | | | |
|---|---|---|---|---|---|---|---|
| 0012 | 001000001 | | 1943 | | TCY | 8 | * IN HANGMAN MODE |
| 0025 | 000100010 | | 1944 | | TBIT | 1 | * AND GO FLAG |
| 004A | 101110000 | 0923 | 1945 | | BRANCH | CLUE | |
| 0014 | 010001111 | | 1946 | NOP | BL | DISP/KB | * ENTER KEYS IN |
| 0029 | 100101100 | 2219 | 1947 | | | | |
| | | | 1948 | * | | | KEY=27 * CLUE |
| 0052 | 011100100 | | 1949 | KEY3 | ALEC | 2 | |
| 0024 | 100100001 | 1953 | 1950 | | BRANCH | KEY4 | |
| 0048 | 010000000 | | 1951 | | BL | OFF | KEY=23 * OFF |
| 0010 | 101110001 | 0124 | 1952 | | | | |
| 0021 | 011101000 | | 1953 | KEY4 | ALEC | 1 | |
| 0042 | 100010011 | 1957 | 1954 | | BRANCH | KEY5 | |
| 0004 | 010000100 | | 1955 | | BL | SPELL | |
| 0009 | 100010001 | 0462 | 1956 | | | | |
| 0013 | 010000000 | | 1957 | KEY5 | LDP | 0 | |
| 0027 | 011100000 | | 1958 | | ALEC | 0 | |
| 004E | 101001001 | 0142 | 1959 | | BRANCH | GAME#3 | KEY=20 * RANDOM LETTER |
| 001C | 010000100 | | 1960 | | BL | LEARN | KEY=21 * LEARN |
| 0039 | 100011001 | 0466 | 1961 | | | | |
| 0072 | 000100001 | | 1962 | KEY6 | TBIT | 2 | * TEST FOR MODES OTHER |
| 0065 | 100010100 | 1946 | 1963 | | BRANCH | NOP | * THAN SPELL OR LEARN |
| 004B | 011100010 | | 1964 | K16 | ALEC | 4 | |
| 0016 | 101000100 | 1972 | 1965 | | BRANCH | K17 | |
| 0020 | 001000001 | | 1966 | | TCY | 8 | |
| 005A | 000100010 | | 1967 | | TBIT | 1 | GO FLAG |
| 0034 | 100001100 | 1977 | 1968 | | BRANCH | K19 | |
| 0068 | 011101010 | | 1969 | | ALEC | 5 | REPLAY? |
| 0051 | 101001101 | 1981 | 1970 | | BRANCH | K23 | |
| 0022 | 100010100 | 1946 | 1971 | | BRANCH | NOP | |
| 0044 | 010001000 | | 1972 | K17 | BL | GO | KEY=24 * GO |
| 0008 | 101111100 | 0213 | 1973 | | | | |
| 0011 | 010001000 | | 1974 | ERASE | CALL | CLEAR | |
| 0023 | 110111010 | 0236 | 1975 | | | | |
| 0046 | 100010100 | 1946 | 1976 | | BRANCH | NOP | |
| 000C | 011101010 | | 1977 | K19 | ALEC | 5 | |
| 0019 | 100100000 | 1990 | 1978 | | BRANCH | K21 | |
| 0033 | 010000101 | | 1979 | | BL | REPEAT | |
| 0066 | 100000000 | 1437 | 1980 | | | | |
| 0040 | 010010000 | | 1981 | K23 | LDX | 0 | |
| 001A | 001000000 | | 1982 | | TCY | 0 | |
| 0035 | 000110011 | | 1983 | | MNEZ | | |
| 006A | 100101010 | 1986 | 1984 | | BRANCH | K20 | |
| 0055 | 100010100 | 1946 | 1985 | | BRANCH | NOP | |
| 002A | 010011000 | | 1986 | K20 | LDX | 1 | |

TABLE IX-13 (Continued)

```
0054   001110001         1987              ACACC    8          ACC=13 AFTER THIS INSTRUCTION
0028   000001001         1988              MNEA
0050   100010100   1946  1989              BRANCH   NOP
0020   010001000         1990   K21        BL       REPLAY
0040   100101100   0250  1991
```

TABLE IX-14

```
                         1992              ORGPG    14
                         1993   ***********************************************************************
                         1994   * SPEAK                                                                 *
                         1995   * ROUTINE TO CONTROL SPEECH TO AND FROM SYNTHESIZER                     *
                         1996   *                                                                       *
                         1997   * IF SS--SET, SPEAK WAS CALLED                                          *
                         1998   * IF SS--RESET, MEMADDR WAS CALLED                                      *
                         1999   *                                                                       *
                         2000   * IF SS=1, ADDRESSES ARE TRANSFERED FROM FILES 6 AND 7 TO FILE          *
                         2001   * 1, WORDS 10-13, ELSE IF SS=0, ADDRESS IS IN FILE 1 PRIOR TO CALL      *
                         2002   *                                                                       *
                         2003   * 2 POINTERS USED                                                       *
                         2004   *     1) LINK/EDIT POINTER FOR WORDS IN FILES 6 AND 7                   *
                         2005   *     2) ROM ADDR POINTER FOR WORDS IN FILE 1.                          *
                         2006   *                                                                       *
                         2007   ***********************************************************************
                         2008   *
0000   010110101         2009   SPEAK      SEAC
0001   010011000         2010   SPEAK+1    LDX      1
0003   001000001         2011              TCY      8
0007   001100101         2012              TCMIY    10         INITIALIZE ROM ADDR POINTER
000F   001100000         2013              TCMIY    0          INITIALIZE LNK/EDT POINTER
001F   001001001         2014   SPKLOP-1   TCY      9
003F   000101010         2015   SPKLOOP    TMY                 GET WORD FROM LNK/EDT
007F   010011110         2016              LDX      7          LOAD WORD IN ACC
007E   000101001         2017              TMA                 POINTER
007D   010011000         2018              LDX      1          *
007B   001000001         2019              TCY      8          *
0077   000101010         2020              TMY                 STORE WORD
006F   000101111         2021              TAM                 BUMP POINTER
005F   001000001         2022              TCY      8          *
003E   000110010         2023              IMAC                *
007C   000101111         2024              TAM                 GET FILE FOR NEXT WORD
0079   001001001         2025              TCY      9
0073   000101010         2026              TMY                 FILE 6
0067   000000000         2027              COMX                WORD--ACC
004F   000101001         2028              TMA                 FILE 1
```

```
0030  001000001         2030            TCY      8                  POINTER
007A  000101010         2031            TMY                         *
0075  000101111         2032            TAM                         STORE WORD
006B  001001001         2033            TCY      9                  BUMP LNK/EDT POINTER
0057  000110010         2034            IMAC                        IF > 15, RETURN
002E  100100001   2111  2035            BRANCH   RETURN
005C  000101111         2036            TAM                         STORE INCREMENT
0038  001000001         2037            TCY      8                  BUMP ROM AREA POINTER
0070  000110010         2038            IMAC                        *
0061  000101110         2039            TAMZA
0043  000101010         2040            TMY                         *
0006  001010111         2041            YNEC     14                 IS Y = 14?
000D  100011111   2014  2042            BRANCH   SPKLOP-1
0018  010111111         2043            RETN
0037  001000101         2044            TCY      10                 YES, CONTINUE
006E  010000111         2045   ADDWDS   LDP      14
005D  000010101         2046            AMAAC
003A  100001010   2057  2047            BRANCH   ADDWDS2
0074  010000111         2048            LDP      14
0069  000000101         2049            IYC                         LOOP COUNT
0053  001010111         2050            YNEC     14                 *
0026  101101110   2045  2051            BRANCH   ADDWDS             *
004C  011101000         2052            ALEC     1
0016  100100001   2111  2053            BRANCH   RETURN             IF YES, RETURN
0031  010001001         2054            LDP      9
0062  011100100         2055            ALEC     2                  ACC==>2?
0045  100000000   1299  2056            BRANCH   LETTER
000A  010000101         2057   ADDWDS2  CALLL    MEMADDR
0015  111011000   1501  2058
                        2059   *        ROM ADDRESSING SUBROUTINE:                             *
                        2060   *        ASSUMES X AND Y HAVE BEEN DEFINED PRIOR TO CALLING     *
                        2061   *                                                               *
                        2062   *                                                               *
                        2063   *        LOADS ADDRESS INTO ROM ADDRESS AREA                    *
                        2064   *        ALL R LINES, ETC.... REMAIN THE SAME AS WHEN           *
                        2065   *        ENTERING SUBROUTINE.                                   *
                        2066   *                                                               *
                        2067   *****************************************************************
                        2068   *                                                               *
                        2069   *                                                               *
                        2070   *        END OF ROUTINE
                        2071   *
0028  001000011         2072   MEMADDR2 TCY      12                 CS , GIVING SYN. COMMANDS
0056  000001101         2073            SETR                        R12 = 1
002C  000000110         2074            CLA
0058  001110101         2075   SPKREG   ACACC    TEN
```

TABLE IX-14 (Continued)

| | | | | | | | |
|---|---|---|---|---|---|---|---|
| 0030 | 001000101 | | 2076 | | TCY | 10 | |
| 0060 | 000001101 | | 2077 | | SETR | | |
| 0041 | 000110110 | | 2078 | | RSTR | | * |
| 0002 | 000000110 | | 2079 | SPKREG+1 | CLA | | |
| 0005 | 001000011 | | 2080 | | TCY | 12 | |
| 000B | 000001101 | | 2081 | | SETR | | |
| 0017 | 001000101 | | 2082 | | TCY | 10 | |
| 002F | 001110111 | | 2083 | | ACACC | 14 | |
| 005E | 000001101 | | 2084 | | SETR | | 1ST PDC LOADS COMMAND |
| 003C | 000110110 | | 2085 | | RSTR | | * |
| 0078 | 001001101 | | 2086 | | TCY | 11 | |
| 0071 | 000110110 | | 2087 | | RSTR | | |
| 0063 | 001000101 | | 2088 | | TCY | 10 | |
| 0047 | 000001101 | | 2089 | | SETR | | 2ND PDC APPLIES TALK TO CTLB |
| 000E | 000110110 | | 2090 | | RSTR | | * |
| 001D | 001110000 | | 2091 | | ACACC | 0 | |
| 003B | 000001000 | | 2092 | | TKA | | |
| 0076 | 000001101 | | 2093 | | SETR | | 3RD PDC RELEASES OUTPUT |
| 006D | 000110110 | | 2094 | | RSTR | | * |
| 005B | 001001101 | | 2095 | | TCY | 11 | |
| 0036 | 000001101 | | 2096 | | SETR | | |
| 006C | 010011100 | | 2097 | | LDX | 3 | |
| 0059 | 001001111 | | 2098 | | TCY | 15 | |
| 0032 | 000101111 | | 2099 | | TAM | | |
| 0064 | 000100000 | | 2100 | | TBIT | 0 | |
| 0049 | 101011010 | 2125 | 2101 | | BRANCH | BITSET0 | |
| 0012 | 010011000 | | 2102 | | LDX | 1 | |
| 0025 | 001000001 | | 2103 | | TCY | 8 | |
| 004A | 001100101 | | 2104 | | TCMIY | 10 | |
| 0014 | 000010010 | | 2105 | | CCLA | | |
| 0029 | 011100000 | | 2106 | | ALEC | ZERO | |
| 0052 | 101001000 | 2109 | 2107 | | BRANCH | RETS | |
| 0024 | 100011111 | 2014 | 2108 | | BRANCH | SPKLUP-1 | |
| 004B | 010011000 | | 2109 | RETS | LDX | 1 | |
| 0010 | 001000001 | | 2110 | | TCY | 8 | |
| 0021 | 000101110 | | 2111 | RETURN | TAMZA | | ACC = ZERO |
| 0042 | 001001111 | | 2112 | | TCY | 15 | |
| 0004 | 010010110 | | 2113 | RETURN4 | LDX | SIX | |
| 0009 | 000101111 | | 2114 | | TAM | | |
| 0013 | 010011110 | | 2115 | | LDX | SEVEN | |
| 0027 | 000101100 | | 2116 | | TAMDYN | | |
| 004E | 100000100 | 2113 | 2117 | | BRANCH | RETURN4 | |

TABLE IX-14 (Continued)

```
001C  010111111        2118               RETN
0039  010110100        2119  RETURN+1     REAC
0072  001001111        2120  RETURN+2     TCY     15               TALK BIT
0065  010011100        2121               LDX     3                *
004B  010100100        2122               RBIT    0                *
0016  010000010        2123               BL      RETNSBCH
002D  101001010  0710  2124
005A  010001111        2125  BITSETO      LDP     15
0034  100101100  2219  2126               BRANCH  DISP/KB
                       2127  *
                       2128  *            END OF SPEECH CONTROL SUBROUTINE
                       2129  *
0068  010011000        2130  LNKPTR       LDX     1                POINTER FOR LNK/EDT
0051  001001001        2131               TCY     9                *
0022  000101010        2132               TMY                      *
0044  010010110        2133               LDX     6
0008  000101111        2134               TAM                      STORE WORD
0011  010011000        2135               LDX     1                POINTER
0023  001001001        2136               TCY     9                *
0046  010111111        2137               RETN
                       2138  *
000C  001000110        2139  ADD8         TCY     6
0019  010010001        2140               LDX     8
0033  000100011        2141               TBIT    3
0066  100011010  2144  2142               BRANCH  RADD8
004D  101010101  2147  2143               BRANCH  RADD2
001A  010011000        2144  RADD8        LDX     1
0035  001001011        2145               TCY     13
0064  001100001        2146               TCNIY   8
0055  010111111        2147  RADD2        RETN
```

TABLE IX-15

```
                       2148               ORGPG   15
                       2149  *
                       2150  *                    POWER UP / CLEAR ROUTINE
                       2151  *
                       2152  *            THIS ROUTINE SETS UP INITIAL CONDITIONS IN RAM
                       2153  *
                       2154  *
                       2155  *
0000  001001111        2156  START        TCY     FIFTEEN          * RESET ALL R-LINES
0001  000110110        2157  LOOPSST      RSTR                     **
0003  000000100        2158               DYN                      **
0007  100000001  2157  2159               BRANCH  LOOPSST          **
```

TABLE IX-15 (Continued)

```
000F 001001011        2160              TCY     13
001F 000001101        2161              SETR
003F 001001111        2162              TCY     15
007F 010111111        2163              RETN                   **
007E 000000110        2164              CLA                    **
007D 010010001        2165              LDX     8
007B 110101110  2183  2166              CALL    FILSLOOP       **
0077 010011110        2167              LDX     SEVEN          **
006F 110101110  2183  2168              CALL    FILSLOOP       **
005F 010010110        2169              LDX     SIX            **
003E 110101110  2183  2170              CALL    FILSLOOP       **
007C 010011010        2171              LDX     FIVE           **
0079 110101110  2183  2172              CALL    FILSLOOP       **
0073 010010010        2173              LDX     FOUR           **
0067 110101110  2183  2174              CALL    FILSLOOP       **
004F 010011100        2175              LDX     THREE          **
001E 110101110  2183  2176              CALL    FILSLOOP       **
003D 010010100        2177              LDX     TWO            **
007A 110101110  2183  2178              CALL    FILSLOOP       **
0075 010011000        2179              LDX     ONE            **
006B 110101110  2183  2180              CALL    FILSLOOP       **
0057 010010000        2181              LDX     ZERO           **
                      2182   *
002E 000101100        2183   FILSLOOP   TAMDYN                 * ROUTINE FILLS FILE WITH CONTENTS
005C 100101110  2183  2184              BRANCH  FILSLOOP       **OF ACC.
003B 010111111        2185              RETN                   **
                      2186   *
                      2187   *
0070 010001000        2188   DSP7       CALLL   CLEAR
0061 110111010  0236  2189
                      2190   *
0043 010000010        2191              CALLL   DIFFSLV        * DISPLAY DIFF LEVEL A - SPELL MODE
0006 111111110  0629  2192
000D 000000110        2193              CLA
001B 001001101        2194              TCY     11
0037 000110110        2195              RSTR
006E 001000011        2196              TCY     12
005D 000001101        2197              SETR
003A 001000101        2198              TCY     10
0074 000001101        2199              SETR
0069 000110110        2200              RSTR
0053 000001101        2201              SETR
0026 000110110        2202              RSTR
004C 001001101        2203              TCY     11
0018 000001101        2204              SETR
```

TABLE IX-15 (Continued)

```
0031  001000101         2205                 TCY      10
0062  000001101         2206                 SETR
0045  000110110         2207                 RSTR
000A  010000101         2208                 CALLL    MEMORED
0015  110100100  1534   2209
0028  010001101         2210                 BL       TONES
0056  101000111  1657   2211
                        2212     *
                        2213     *
                        2214     *                     KEYBOARD SCAN / DISPLAY ROUTINE
                        2215     *
                        2216     *           THIS ROUTINE DISPLAYS THE CONTENTS OF 'DISPLAY BUFFER' AND
                        2217     *           CHECKS FOR A KEYPRESS.
                        2218     *
002C  010011100         2219     DISP/KB     LDX      3
0058  001001101         2220                 TCY      11
0030  001100000         2221                 TCMIY    0                 RESET TIMEOUT COUNTER
0060  000110110         2222                 RSTR                       RESET R12 TO ENABLE DISPLAY
0041  001100000         2223                 TCMIY    0
0002  000000110         2224                 CLA
0005  001000011         2225     DSP1        TCY      12
0008  010010000         2226                 LDX      0
0017  000101101         2227                 TAMIYC                     STORE DEBOUNCE COUNTER; SET Y=0
002F  001100000         2228                 TCMIY    0                 RESET R-LINE POINTER
005E  001001111         2229                 TCY      15
003C  000001101         2230                 SETR                       R=15, TURN ON FILAMENT
0078  001000000         2231                 TCY      0
0071  010011000         2232     DSP2        LDX      1                 *
0063  000101001         2233                 TMA                        *
0047  010111000         2234                 TDO                        * LOAD SEGMENT PLA
000E  010010000         2235                 LDX      0                 *
0010  000101001         2236                 TMA                        *
0038  000001001         2237                 MNEA                       *
0076  010110000         2238                 TDO                        *
0060  000001101         2239                 SETR                       TURN ON NEW R-LINE
0058  001001111         2240                 TCY      15
0036  000110110         2241                 RSTR                       R=15, TURN OFF FILAMENT
006C  010000000         2242                 BL       TIMEUP            * INCREMENT RANDOM NUMBER GENERATOR/
0059  101000101  0103   2243
                        2244     *                                      * TIMEOUT COUNTER
0032  001001011         2245     DISP/KB1    TCY      13
0064  000110010         2246                 IMAC                       INCREMENT R-LINE POINTER
0049  000101111         2247                 TAM
0012  001001111         2248                 TCY      15
0025  000001101         2249                 SETR                       TURN ON FILAMENT
004A  000101000         2250                 TAY
```

TABLE IX-15 (Continued)

```
0014  000000100         2251                DYN
0029  000110110         2252                RSTR                   RESET LAST R-LINE
0052  000000101         2253                TYC
0024  001010001         2254                YNEC      8            SCAN COMPLETE?
0048  101110001   2232  2255                BRANCH    DSP2         NO
0010  001001111         2256                TCY       15           YES
0021  000110110         2257                RSTR                   RESET FILAMENT
0042  010000000         2258                CALLL     TIMEUP1      INCREMENT RANDOM NUMBER/TIMEOUT COUNTER
0004  110101011   0106  2259                                       ONE EXTRA TIME. TOTAL=9 PER DISPLAY SCAN
                        2260     *
0009  010010000         2261                LDX       0
0013  001000101         2262                TCY       10
0027  000110010         2263                IMAC                   INCREMENT DEBOUNCE COUNTER
004F  100111001   2266  2264                BRANCH    DSP3
001C  000101111         2265                TAM
0039  001000011         2266     DSP3       TCY       12
0072  000110010         2267                IMAC
0065  011100101         2268                ALEC      10
0048  100000101   2225  2269                BRANCH    DSP1         CONTINUE DISPLAY IF<8
0016  010000111         2270                LDP       14
002D  001001111         2271                TCY       15
005A  010011100         2272                LDX       3
0034  000100000         2273                TBIT      0
0068  101011000   2075  2274                BRANCH    SPKREG + 1   TEST TALK
0051  010000001         2275                LDP       8
0022  001000111         2276                TCY       14
0044  000101011         2277                TYA                    SET ACC=14
0008  000100000         2278                TBIT      0
0011  101101100   1241  2279                BRANCH    DISLP+1
0023  010001111         2280                LDP       15
0046  100000101   2225  2281                BRANCH    DSP1         RET
000C  010010000         2282     KEYSEVL    LDX       0
0019  001000111         2283                TCY       14           * PUT LSD OF KEY CODE
0033  000101001         2284                TMA                    * IN ACC
0066  001001111         2285                TCY       15
004D  010001011         2286                LDP       13
0014  000100000         2287                TBIT      0
0035  100011011   1896  2288                BRANCH    KEY1
0064  100000000   1860  2289                BRANCH    KEY00
                        2290     *
0055  010010001         2291     SETBIT3    LDX       8
0024  001000100         2292                TCY       2
0054  010100011         2293                SBIT      3            SET BIT 3
0028  010111111         2294                RETN
                        2295     *
```

TABLE X

| $I_0$ | $I_1$ | $I_0/I_1$ COMMANDS |
|---|---|---|
| 0 | 0 | No Operation |
| 0 | 1 | Load Address (LA) |
| 1 | 0 | Transfer Bit (TB) |
| 1 | 1 | Read and Branch (RB) |

TABLE XI

| Counter 619/PLA 620 Timing Sequence | | |
|---|---|---|
| STEP | COUNTER CONTENTS (HEX) | SIGNALS GENERATED |
| 1 | 0 | LA1, TB8 |
| 2 | 8 | LA2 |
| 3 | C | LA3 |
| 4 | E | LA4 |
| 5 | F | |
| 6 | 7 | |
| 7 | 3 | |
| 8 | 1 | |

TABLE XII

| TB8 READ SEQUENCE | | | |
|---|---|---|---|
| TEP | COUNTER 623 CONTENTS (BINARY) | COUNTER 624 CONTENTS (HEX) | SIGNALS GENERATED |
| 1 | 10 | F | SAD, INC |
| 2 | 10 | E | DC, INC |
| 3 | 10 | C | DC, INC |
| 4 | 10 | 8 | DC, INC |
| 5 | 10 | 0 | DC, INC |
| 6 | 10 | 1 | DC, INC |
| 7 | 10 | 3 | SAM, DC, INC |
| 8 | 10 | 7 | PC, $\overline{ZERO}$ |

TABLE XIII

| TB8 READ SEQUENCE | | | |
|---|---|---|---|
| TEP | COUNTER 623 CONTENTS (BINARY) | COUNTER 624 CONTENTS (HEX) | SIGNALS GENERATED |
| 1 | 11 | F | SAD, INC |
| 2 | 11 | E | DC, INC |
| 3 | 11 | C | DC, INC |
| 4 | 11 | 8 | DC, INC |
| 5 | 11 | 0 | DC, INC |
| 6 | 11 | 1 | DC, INC |
| 7 | 11 | 3 | SAM, DC, INC |
| 8 | 11 | 7 | PC |
| 9 | 01 | F | SAD, TF |
| 0 | 01 | E | BR, PC |
| 1 | 01 | C | BR, DC |
| 2 | 01 | 8 | BR, DC |
| 3 | 01 | 0 | BR, DC |
| 4 | 01 | 1 | DC |
| 5 | 01 | 3 | SAM, DC |
| 6 | 01 | 7 | PC |
| 7 | 00 | F | SAD, TF |
| 8 | 00 | E | BR |
| 9 | 00 | C | BR |
| 0 | 00 | 8 | BR |
| 1 | 00 | 0 | |
| 2 | 00 | 1 | |
| 3 | 00 | 3 | |
| 4 | 00 | 7 | PC |
| 5 | 10 | F | SAD, INC |
| 6 | 10 | E | DC, INC |
| 7 | 10 | C | DC, INC |
| 8 | 10 | 8 | DC, INC |
| 9 | 10 | 0 | DC, INC |
| 0 | 10 | 1 | DC, INC |
| 1 | 10 | 3 | SAM, DC, INC |
| 2 | 10 | 7 | PC, ZERO |

What is claimed is:

1. A parameter interpolation for a speech synthesizer having an input means for receiving target values of speech parameters and a memory means for storing interpolated values of speech parameters, said parameter interpolator comprising:

(a) first means coupled to said input means and said memory means for calculating the difference between the target values of the parameters and values of the parameters stored in said memory means;

(b) second means coupled to said first means and said memory means for adding a portion of differences calculated by said first means to values parameters stored in said memory means;

(c) third means for determining the particular portions of the differences to be added by said second means according to the formula $1/2^N$ where N=0, 1, 2. . . N; and (d) fourth means for inserting the output of said second means into said memory means.

2. The parameter interpolator according to claim 1 wherein N equals the number three.

3. A parameter interpolator for a speech synthesizer having an input means for receiving a plurality of target values of speech parameters and a memory means for storing a plurality of values of speech parameters being utilized by said speech synthesizer, said parameter interpolator comprising:

(a) timing means for generating eight interpolation cycles;

(b) subtractor means coupled to said input means and said memory means for calculating the difference between the target values of said parameters and the values of said parameters stored in said memory means during each interpolation cycle;

(c) adder means coupled to said subtractor means and to said memory means for adding a selected portion of the difference calculated by said subtractor means to the values of said parameters stored in said memory means during each interpolation cycle, said adder means adding one-eighth of differences during each of three successive interpolation cycles, adding one-fourth of the differences during each of two successive interpolation cycles, adding one-half of the differences during each of two another successive interpolation cycles and adding the entire differences during one of the eight interpolation cycles; and (c) circuit means for replacing the values of the parameters stored in said memory means with the results of addition performed by said adder means during each interpolation cycle.

4. The interpolator according to claim 3, wherein said circuit means replaces each value of the parameters stored in said memory means after each value has been applied to said adder and subtractor means during each interpolation cycle and before the values in the memory means are output to the adder and subtractor means during the next successive interpolation cycle.

5. The interpolator according to claim 4, wherein said speech synthesizer is responsive to an excitation parameter which is indicative of voiced and unvoiced speech, and wherein said interpolator further includes a detector responsive to a change between voiced and unvoiced speech and means for disabling said adder from adding either one-eight, one-fourth, or one-half of the differences to the values stored in said memory means in response to said detector detecting a change from voiced to unvoiced speech or unvoiced to voiced speech, whereby the values of the parameters in said memory means are not interpolated to the target values in eight steps but rather assume the target values in one step during changes from voiced to unvoiced speech or unvoiced to voiced speech.

6. The system according to claim 4, wherein the values of the parameters in said memory means and the target values of the parameters from said input means are applied in serial to said subtractor means and wherein said adder means includes means for delaying the output of the subtractor means by either zero, one, two or three bits whereby the portion of the differences added in the adder correspond to $1/2^N$ wherein N is equal to the number of bits of delay occuring in said delay means.

7. The system according to claim 6, wherein said circuit means includes a delay circuit for delaying the results of the addition by either zero, one, two or three bits, the delay circuit delaying:

(i) three bits when the delay means is delaying zero bits, (ii) delaying two bits when the delay means is delaying one bit, (iii) delaying one bit when the delay means in delaying two bits, and (iv) delaying zero bits where the delay means is delaying three bits.

8. A speech parameter interpolator for a speech synthesis circuit having an input for receiving target values of digital speech parameters and a memory for storing values of said digital speech parameters used by said synthesis circuit in synthesizing speech, said interpolator comprising:

(a) subtractor means coupled to said input means and to said memory for calculating the difference between said target values and the values stored in said memory;

(b) first means for generating $2^N$ interpolation cycles, where N equal 0,1,2. . . N; and (c) means coupled to said subtractor means and said memory, and responsive to said first means for adding a selected portion of the difference calculated by said subtractor means, during each of said interpolation cycles, to the values of said digital speech parameters stored in said memory.

* * * * *

UNITED STATES PATENT AND TRADEMARK OFFICE

CERTIFICATE OF CORRECTION

PATENT NO. : 4,189,779

DATED : February 19, 1980

INVENTOR(S) : George L. Brantingham

It is certified that error appears in the above—identified patent and that said Letters Patent is hereby corrected as shown below:

Inventor's name should read -- George L. Brantingham --.

Signed and Sealed this

*Twenty-seventh* Day of *May 1980*

[SEAL]

*Attest:*

SIDNEY A. DIAMOND

*Attesting Officer* *Commissioner of Patents and Trademarks*